US011676201B2

(12) United States Patent
Rampell et al.

(10) Patent No.: US 11,676,201 B2
(45) Date of Patent: Jun. 13, 2023

(54) METHODS FOR AN ALTERNATIVE PAYMENT PLATFORM

(71) Applicant: TRIALPAY, INC., Palo Alto, CA (US)

(72) Inventors: Alastair Rampell, Palo Alto, CA (US); Alexander Campbell, San Jose, CA (US); Terry Angelos, Palo Alto, CA (US)

(73) Assignee: TRIALPAY, INC., Mountain View, CA (US)

( * ) Notice: Subject to any disclaimer, the term of this patent is extended or adjusted under 35 U.S.C. 154(b) by 463 days.

(21) Appl. No.: 16/542,224

(22) Filed: Aug. 15, 2019

(65) Prior Publication Data
US 2019/0370891 A1   Dec. 5, 2019

Related U.S. Application Data

(63) Continuation of application No. 13/444,266, filed on Apr. 11, 2012, now Pat. No. 10,424,010, which is a
(Continued)

(51) Int. Cl.
*G06Q 30/00*   (2023.01)
*G06Q 30/08*   (2012.01)
(Continued)

(52) U.S. Cl.
CPC ............. *G06Q 30/08* (2013.01); *G06Q 20/14* (2013.01); *G06Q 30/0207* (2013.01);
(Continued)

(58) Field of Classification Search
CPC .... G06Q 30/08; G06Q 20/14; G06Q 30/0207; G06Q 30/0253; G06Q 30/0267;
(Continued)

(56) References Cited

U.S. PATENT DOCUMENTS 3,724,274 A   4/1973 Millar
4,722,348 A   2/1988 Ligtenberg
(Continued)

FOREIGN PATENT DOCUMENTS

WO   2008014226 A2   1/2008
WO   2008014226 A3   11/2008

OTHER PUBLICATIONS

Notice of Allowance dated Mar. 18, 2020 for U.S. Appl. No. 13/444,161 (pp. 1-13).
(Continued)

*Primary Examiner* — Meredith A Long
(74) *Attorney, Agent, or Firm* — K&L Gates LLP

(57) ABSTRACT

Methods and systems are provided for providing an alternative payment platform, including method and systems for providing a platform for presenting an alternate offer to a user who is engaged with a primary offer and receiving an indication of the user's engagement with the alternate offer, wherein the user's engagement with the alternate offer serves as an alternative form of payment for an item associated with the primary offer. Such methods and systems may further include methods and systems for selecting one or more alternate offers engagement with which serves as an alternative form of payment for an item associated with a primary offer, presenting the selected alternate payment offers to a user, receiving an indication of engagement with at least one of the alternate offers, receiving payment in exchange for presenting the accepted offer and providing payment to the offeror of the primary offer.

20 Claims, 67 Drawing Sheets

Related U.S. Application Data continuation of application No. 11/781,856, filed on Jul. 23, 2007, now abandoned.

(60) Provisional application No. 60/914,298, filed on Apr. 26, 2007, provisional application No. 60/869,899, filed on Dec. 13, 2006, provisional application No. 60/868,767, filed on Dec. 6, 2006, provisional application No. 60/825,885, filed on Sep. 15, 2006, provisional application No. 60/820,701, filed on Jul. 28, 2006.

(51) Int. Cl.
   G06Q 30/0207 (2023.01)
   G06Q 30/0251 (2023.01)
   G06Q 30/0273 (2023.01)
   G06Q 30/0601 (2023.01)
   G06Q 40/00 (2023.01)
   G06Q 50/18 (2012.01)
   G06Q 20/14 (2012.01)

(52) U.S. Cl.
   CPC ..... *G06Q 30/0253* (2013.01); *G06Q 30/0267* (2013.01); *G06Q 30/0273* (2013.01); *G06Q 30/0601* (2013.01); *G06Q 30/0611* (2013.01); *G06Q 30/0633* (2013.01); *G06Q 40/00* (2013.01); *G06Q 50/188* (2013.01)

(58) Field of Classification Search
   CPC ........... G06Q 30/0273; G06Q 30/0601; G06Q 30/0611; G06Q 30/0633; G06Q 40/00; G06Q 50/188
   See application file for complete search history.

(56) References Cited

U.S. PATENT DOCUMENTS

| | | | |
|---|---|---|---|
| 4,958,642 A | 9/1990 | Christian |
| 4,961,433 A | 10/1990 | Christian |
| 4,967,753 A | 11/1990 | Haase |
| 5,059,851 A | 10/1991 | Corl |
| 5,105,818 A | 4/1992 | Christian |
| 5,109,851 A | 5/1992 | Jadvar |
| 5,163,445 A | 11/1992 | Christian |
| 5,174,295 A | 12/1992 | Christian |
| 5,178,159 A | 1/1993 | Christian |
| 5,179,952 A | 1/1993 | Buinevicius |
| 5,240,437 A | 8/1993 | Christian |
| 5,348,481 A | 9/1994 | Ortiz |
| 5,358,409 A | 10/1994 | Obara |
| 5,413,508 A | 5/1995 | Obara |
| 5,517,989 A | 5/1996 | Frisbie |
| RE35,648 E | 11/1997 | Tenerz |
| 5,701,905 A | 12/1997 | Esch |
| 5,795,299 A | 8/1998 | Eaton |
| 5,797,848 A | 8/1998 | Marian |
| 5,797,856 A | 8/1998 | Frisbie |
| RE35,924 E | 10/1998 | Winkler |
| 5,846,205 A | 12/1998 | Curley |
| 5,991,650 A | 11/1999 | Swanson |
| 7,213,742 B1 | 5/2007 | Birch |
| 7,376,580 B1 | 5/2008 | Walker |
| 7,401,034 B1 | 7/2008 | Srivastava |
| 7,437,313 B1 | 10/2008 | Mussaman |
| 7,647,252 B2 | 1/2010 | Rampell |
| 7,698,171 B2 | 4/2010 | Rampell |
| 7,702,577 B1 | 4/2010 | Dickelman |
| 7,788,139 B2 | 8/2010 | Rampell |
| 7,848,960 B2 | 12/2010 | Rampell |
| 8,126,772 B1 | 2/2012 | Lefebvre |
| 8,639,629 B1 | 1/2014 | Hoffman |
| 10,387,948 B2 | 8/2019 | Rampell |
| 10,424,010 B2 | 9/2019 | Rampell |
| 10,733,664 B2 | 8/2020 | Rampell |
| 2002/0007340 A1 | 1/2002 | Isaf |
| 2002/0046096 A1 | 4/2002 | Srinivasan |
| 2002/0046104 A1 | 4/2002 | Kaddeche |
| 2002/0062249 A1 | 5/2002 | Iannacci |
| 2002/0072951 A1 | 6/2002 | Lee |
| 2002/0095333 A1 | 7/2002 | Jokinen |
| 2002/0120519 A1 | 8/2002 | Martin |
| 2002/0128057 A1 | 9/2002 | Walker |
| 2002/0138349 A1 | 9/2002 | Platt |
| 2002/0138400 A1 | 9/2002 | Kitchen |
| 2002/0147663 A1 | 10/2002 | Walker |
| 2002/0165771 A1 | 11/2002 | Walker |
| 2002/0188527 A1 | 12/2002 | Dillard |
| 2002/0198044 A1 | 12/2002 | Walker |
| 2003/0027635 A1 | 2/2003 | Walker |
| 2003/0032476 A1 | 2/2003 | Walker |
| 2003/0040963 A1 | 2/2003 | Kogler |
| 2003/0083970 A1 | 5/2003 | Bigman |
| 2003/0144907 A1 | 7/2003 | Cohen |
| 2003/0158796 A1 | 8/2003 | Balent |
| 2003/0208424 A1 | 11/2003 | Tenorio |
| 2003/0225630 A1 | 12/2003 | Kakuta |
| 2004/0073496 A1 | 4/2004 | Cohen |
| 2004/0193485 A1 | 9/2004 | Ilberg |
| 2004/0225614 A1 | 11/2004 | Arnold |
| 2004/0267611 A1 | 12/2004 | Hoerenz |
| 2005/0040230 A1* | 2/2005 | Swartz ................ G06Q 20/20 235/383 |
| 2005/0102202 A1 | 5/2005 | Linden |
| 2005/0173522 A1 | 8/2005 | Turner |
| 2005/0192885 A1 | 9/2005 | Horowitz |
| 2005/0230473 A1 | 10/2005 | Fajkowski |
| 2005/0251440 A1 | 11/2005 | Bednarek |
| 2006/0085259 A1 | 4/2006 | Nicholas |
| 2006/0149641 A1 | 7/2006 | Loeb |
| 2006/0224464 A1 | 10/2006 | Walker |
| 2006/0271441 A1 | 11/2006 | Mueller |
| 2006/0282312 A1 | 12/2006 | Carlson |
| 2007/0022021 A1 | 1/2007 | Walker |
| 2007/0043613 A1 | 2/2007 | Longest |
| 2007/0061190 A1 | 3/2007 | Wardell |
| 2007/0276730 A1 | 11/2007 | Lee |
| 2007/0299745 A1 | 12/2007 | Mulderry |
| 2008/0071619 A1* | 3/2008 | Charlton ............ G06Q 30/0214 705/14.16 |
| 2008/0071634 A1 | 3/2008 | Rampell |
| 2008/0077506 A1 | 3/2008 | Rampell |
| 2008/0091528 A1 | 4/2008 | Rampell |
| 2008/0133426 A1 | 6/2008 | Porat |
| 2008/0162315 A1 | 7/2008 | Rampell |
| 2008/0162316 A1 | 7/2008 | Rampell |
| 2008/0162370 A1 | 7/2008 | Rampell |
| 2008/0162371 A1 | 7/2008 | Rampell |
| 2008/0183559 A1* | 7/2008 | Frazier ................. G06Q 30/02 705/7.32 |
| 2009/0292599 A1 | 11/2009 | Rampell |
| 2011/0131089 A1 | 6/2011 | Walker |
| 2012/0197716 A1 | 8/2012 | Rampell |
| 2012/0197717 A1 | 8/2012 | Rampell |
| 2012/0197730 A1 | 8/2012 | Rampell |
| 2012/0197731 A1 | 8/2012 | Rampell |
| 2019/0370892 A1 | 12/2019 | Rampell |

OTHER PUBLICATIONS

Office Action dated Apr. 7, 2020, for U.S. Appl. No. 13/444,021 (pp. 1-24).

Office Action dated Jun. 5, 2020 for U.S. Appl. No. 12/430,656 (pp. 1-30).

"U.S. Appl. No. 11/781,831 Non-Final Office Action dated Aug. 26, 2008", OARN, 8 pages.

"U.S. Appl. No. 11/781,831, Non Final Office Action dated Oct. 8, 2009", 11 pages.

"U.S. Appl. No. 11/781,831 Final Office Action dated Aug. 4, 2010", 14 pages.

"U.S. Appl. No. 11/781,831, Non-Final Office Action dated Feb. 26, 2009", 10 pages.

(56) References Cited

OTHER PUBLICATIONS

"U.S. Appl. No. 11/781,844, Notice of Allowance dated Dec. 11, 2009", 11 Pages.
"U.S. Appl. No. 11/781,844,Non-FinalOffice Action dated Sep. 30, 2008", OARN, 12 pages.
"U.S. Appl. No. 11/781,844, Final Office Action dated May 13, 2009", 12 pages.
"U.S. Appl. No. 11/781,856 Non-Final Office Action dated Aug. 29, 2008", OARN, 11 Pgs.
"U.S. Appl. No. 11/924,443 Non-Final Office Action dated Sep. 8, 2008", OARN , 7 Pgs.
"U.S. Appl. No. 12/430,656, Non-Final Office Action dated Apr. 25, 2012", 15 pages.
"U.S. Appl. No. 12/430,656, Final Office Action dated Jan. 14, 2013", NPL-31 , 17 pgs.
"U.S. Appl. No. 13/444,021, Non-Final Office Action dated Jun. 7, 2012", 26 pages.
"U.S. Appl. No. 13/444,161, Non-Final Office Action dated Jun. 8, 2012", 30 pages.
"U.S. Appl. No. 13/444,266, Non-Final Office Action dated Jun. 8, 2012", 30 pages.
"U.S. Appl. No. 11/924,454, Non-Final Office Action dated Sep. 8, 2008", OARN,7 pgs.
"U.S. Appl. No. 11/924,443, Notice of Allowance dated Oct. 20, 2009", 37.
U.S. Appl. No. 10/985,834 Final Office Action dated Oct. 20, 2009, 10 pgs.
U.S. Appl. No. 11/781,856, Final Office Action dated Oct. 9, 2009, 14 Pgs.
U.S. Appl. No. 11/781,856 Non-Final Office Action dated Dec. 23, 2013, 24 pages.
U.S. Appl. No. 11/781,856, Non-Final Office Action dated Apr. 3, 2009, 12 pgs.
U.S. Appl. No. 11/924,410 Non-Final Office Action dated Sep. 8, 2008, OARN, 7 Pgs.
U.S. Appl. No. 11/924,410, Notice of Allowance dated Oct. 18, 2010, 10 pgs.
U.S. Appl. No. 11/924,410, Final Office Action dated Oct. 20, 2009, 10 Pgs.
U.S. Appl. No. 11/924,429, Notice of Allowance dated May 24, 2010, 32 pgs.
U.S. Appl. No. 11/924,429 Non-Final Office Action dated Sep. 8, 2008, OARN, 07 pgs.
U.S. Appl. No. 11/924,429, Final Office Action dated Oct. 22, 2009, 15 Pgs.
U.S. Appl. No. 11/924,454 Final Office Action dated Sep. 15, 2009, 16 pgs.
U.S. Appl. No. 12/430,656, Non-Final Office Action dated Aug. 5, 2011, 10 pages.
U.S. Appl. No. 12/430,656, Non-Final Office Action dated Oct. 12, 2011, 21 pages.
U.S. Appl. No. 13/444,021 Final Office Action dated Jan. 10, 2013, 26 pages.
U.S. Appl. No. 13/444,161 Final Office Action dated May 24, 2013, 27 pages.
U.S. Appl. No. 13/444,161 Non-Final Office Action dated Dec. 19, 2012, 31 pgs.
U.S. Appl. No. 13/444,266 Non-Final Office Action dated Dec. 21, 2012, 39 pgs.
U.S. Appl. No. 13/444,266, Final Office Action dated May 24, 2013, 28 pages.
ISA, "International Search Report and Written Opinion", For US Patent Application No. PCT/US07/74166, dated Aug. 25, 2008.
Magda Konieczna, "Option to pay ticket or buy a helmet", North Shore News, Vancouver, B.C.: Aug. 11, 2004, p. 12 http://proquest.umi.com/pqdweb?did=679799051&sid=4&Fmt=3&clientId=19649&R-QT=309&VName=PQD.
Notice of Allowance dated Apr. 4, 2019 for U.S. Appl. No. 13/444,364 (pp. 1-10).
Notice of Allowance dated May 9, 2019 for U.S. Appl. No. 13/444,266 (pp. 1-12).
Office Action dated Apr. 2, 2018 for U.S. Appl. No. 12/430,656 (pp. 1-23).
Office Action dated Dec. 10, 2018 for U.S. Appl. No. 13/444,021 (pp. 1-21).
Office Action dated Jul. 27, 2018 for U.S. Appl. No. 13/444,161 (pp. 1-13).
Office Action dated Jul. 27, 2018 for U.S. Appl. No. 13/444,266 (pp. 1-13).
Office Action dated Jun. 14, 2018 for U.S. Appl. No. 13/444,021 (pp. 1-19).
Office Action dated Mar. 12, 2018 for U.S. Appl. No. 13/444,364 (pp. 1-10).
U.S. Appl. No. 11/781,856 Non-Final Office Action dated Jul. 31, 2014, 22 pages.
"U.S. Appl. No. 11/781,856 Final Office Action dated May 7, 2015", 26 pages.
Office Action (Final Rejection) dated Feb. 15, 2022 for U.S. Appl. No. 16/544,473 (pp. 1-12).
Office Action (Non-Final Rejection) dated Jun. 20, 2022 for U.S. Appl. No. 16/544,473 (pp. 1-13).
Office Action (Preinterview first office action) dated Dec. 14, 2021 for U.S. Appl. No. 16/544,473 (pp. 1-5).

* cited by examiner trialpay    Help | Check order status

Completed Transactions | Pending Transactions | My Account    terry_angelos@yahoo.com (logout)

Pending Transactions

☐ DidTheyReadIt

× Stamps.com - hide details
Started on 08/31/2006 and typically credits in a few minutes
resume offer | submit receipt for this offer | hide offer instructions > Offer Instructions : Stamps.com
> - Sign up with Stamps.com at the website below (30-day free trial).
> - If you are a previously existing Stamps.com customer you are *not eligible* for this promotion.

● Blockbuster Online - hide details
Started on 08/31/2006 and typically credits in a few minutes
resume offer | submit receipt for this offer | offer instructions × Web.com - view details
× AMEX - BlueCash Card (US) - view details Terms & Conditions    Privacy

4002

Fig. 40 trialpay        Help | Check order status

Submit your receipt for Get 3 Months of DidTheyReadIt Using TrialPay

Completed an offer but not yet received credit?
1. Please provide a receipt that proves you successfully completed a TrialPay offer
2. A receipt is usually a notification email from the advertising partner and we use this information to verify you have successfully completed the offer Before submitting a receipt:
1. Make sure you have successfully completed a TrialPay offer.
2. Check your bulk email folder to ensure a TrialPay confirmation email has not already been sent to your email account.
3. For non instant offers, allow 24 hours for your offer to be verified by our advertising partner.
4. Remember, some offers, such as credit cards, require approval and this may take several days to occur.

If you are certain that you have not received credit for a valid completed offer, please submit a receipt below.

Offer: --Choose One--
- --Choose One--
- Stamps.com
- Blockbuster Online
- Web.com
- AMEX - BlueCash Card (US)
- Other Privacy

4102

Fig. 41 trialpay                                    Help | Check order status

Submit your receipt for Get 3 Months of DidTheyReadIt Using TrialPay

Completed an offer but not yet received credit?
1. Please provide a receipt that proves you successfully completed a TrialPay offer
2. A receipt is usually a notification email from the advertising partner and we use this information to verify you have successfully completed the offer Before submitting a receipt:
1. Make sure you have successfully completed a TrialPay offer.
2. Check your bulk email folder to ensure a TrialPay confirmation email has not already been sent to your email account.
3. For non instant offers, allow 24 hours for your offer to be verified by our advertising partner.
4. Remember, some offers, such as credit cards, require approval and this may take several days to occur.

If you are certain that you have not received credit for a valid completed offer, please submit a receipt below.

Offer: Stamps.com

Offer Directions: Reminder, to complete this offer:
Sign up with Stamps.com at the website below (30-day free trial).
If you are a previously existing Stamps.com customer you are*not eligible* for this promotion.

Date Offer Completed: Jul 12 2007

Receipt:
At least 100 characters
[Submit]

Terms & Conditions    Privacy

4202

Fig. 42 trialpay  Help | Check order status

Completed Transactions | Pending Transactions | My Account  terry_angelos@yahoo.com (logout)

Update your account information

First Name
[Terry]

Last Name
[Angelos]

Email address
[terry_angelos@yahoo.com]

[Update →]  Change your password

Terms & Conditions  Privacy

Photobucket Support <support@photobucket.com> wrote:
Date: Tue, 17 Apr 2007 13:32:17 -0600
To: mbenet00@yahoo.com
Subject: Welcome To Photobucket! Your username is trialpay 1218
From: Photobucket Support <support@photobucket.com>

Thank you for signing up with Photobucket.

Here is your username and password information. Please keep this information safe.

Username:
Password:

To get started with uploading, linking, and sharing your images and videos, sign into your account at http://www.photobucket.com Thanks!
Photobucket Tip#1: Want to upload and store up to 50,000 images and hundreds of videos (up to 10 minutes long each) with no bandwith limits? Upgrade to Pro now!

http://photobucket.com/upgrade.php?goto=welcomenewusers

Invite your friends to join Photobucket!
http://photobucket.com/invite

Michael L. Benet
(925) 408-4007
mbenet00@yahoo.com

Advertiser Panel Dashboard trialpay advertiser panel    Logout

| Dashboard | Reports |

BlockBuster Dashboard

| Offer | CPA |
|---|---|
| BLOCKBUSTER Total Access | $45.00 |

Select Offer: [All ▼]
  All
  BLOCKBUSTER Total Access

| Key Performance | | Completions | Conversion Rate |
|---|---|---|---|
| Today | 142 | 11 | 7.75% |
| Yesterday | 335 | 31 | 9.25% |
| Month to Date | 5,180 | 455 | 8.78% |
| Last Month | 10,252 | 936 | 9.13% |
| Grand Total | 37,171 | 3,232 | 8.69% |

6302

Fig. 63 trialpay advertiser panel

Dashboard | Reports

BlockBuster Dashboard

| Offer | CPA |
|---|---|
| BLOCKBUSTER Total Access | $45.00 |

Select Offer [All ▼]
  All
  BLOCKBUSTER Total Access

| Key Performance Metrics | Clicks | Completions | Conversion Rate |
|---|---|---|---|
| Today | 142 | 11 | 7.75% |
| Yesterday | 335 | 31 | 9.25% |
| Month to Date | 5,180 | 455 | 8.78% |
| Last Month | 10,252 | 936 | 9.13% |
| Grand Total | 37,171 | 3,232 | 8.69% |

Logout trialpay advertiser panel     <u>Logout</u>

| Dashboard | Reports |

Transactions By Date | Transactions Detail

Transactions Detail

Summary

| Date | Clicks | Completions |
|---|---|---|
| Today | 146 | 12 |
| Yesterday | 335 | 31 |
| Month to Date | 5,184 | 456 |
| Last Month | 10,252 | 936 |
| Total | 37,175 | 3,233 |

*Summary figures updated every 15 minutes*

Filters

Offer: —All Offers—
Date Range: ⦿ All time
○ Jan 1 2007 - Jul 17 2007
[Apply] [Export to CSV]

Current Selection: Jan 1, 2007 - Jul 17, 2007
Total Completions: 3235

Viewing transactions 1 - 25 of 3235    1 2 3 4 5 6 Next

| Transaction Date | SID | OID | Offer Name | CPA |
|---|---|---|---|---|
| 21-Mar-07 | U511166 | | BLOCKBUSTER Total Access | $45.00 |
| 21-Mar-07 | U512126 | | BLOCKBUSTER Total Access | $45.00 |
| 04-Apr-07 | U577602 | | BLOCKBUSTER Total Access | $45.00 |
| 04-Apr-07 | U577667 | | BLOCKBUSTER Total Access | $45.00 |
| 04-Apr-07 | U577761 | | BLOCKBUSTER Total Access | $45.00 |
| 04-Apr-07 | U578439 | | BLOCKBUSTER Total Access | $45.00 |
| 04-Apr-07 | U578528 | | BLOCKBUSTER Total Access | $45.00 |
| 05-Apr-07 | U579772 | | BLOCKBUSTER Total Access | $45.00 |
| 05-Apr-07 | U580243 | | BLOCKBUSTER Total Access | $45.00 |
| 05-Apr-07 | U580348 | | BLOCKBUSTER Total Access | $45.00 |
| 05-Apr-07 | U580436 | | BLOCKBUSTER Total Access | $45.00 |
| 05-Apr-07 | U581598 | | BLOCKBUSTER Total Access | $45.00 |
| 05-Apr-07 | U581613 | | BLOCKBUSTER Total Access | $45.00 |
| 05-Apr-07 | U581750 | | BLOCKBUSTER Total Access | $45.00 |

| | A | B | C | D | E | F |
|---|---|---|---|---|---|---|
| 1 | Transaction Date | SID | OID | Offer Name | CPA | |
| 2 | 21-Mar-07 | U511166 | | BLOCKBUSTER Total Access | 45 | |
| 3 | 21-Mar-07 | U512126 | | BLOCKBUSTER Total Access | 45 | |
| 4 | 4-Apr-07 | U577602 | | BLOCKBUSTER Total Access | 45 | |
| 5 | 4-Apr-07 | U577667 | | BLOCKBUSTER Total Access | 45 | |
| 6 | 4-Apr-07 | U577761 | | BLOCKBUSTER Total Access | 45 | |
| 7 | 4-Apr-07 | U578439 | | BLOCKBUSTER Total Access | 45 | |
| 8 | 4-Apr-07 | U578528 | | BLOCKBUSTER Total Access | 45 | |
| 9 | 5-Apr-07 | U579772 | | BLOCKBUSTER Total Access | 45 | |
| 10 | 5-Apr-07 | U580243 | | BLOCKBUSTER Total Access | 45 | |
| 11 | 5-Apr-07 | U580348 | | BLOCKBUSTER Total Access | 45 | |
| 12 | 5-Apr-07 | U580436 | | BLOCKBUSTER Total Access | 45 | |
| 13 | 5-Apr-07 | U581598 | | BLOCKBUSTER Total Access | 45 | |
| 14 | 5-Apr-07 | U581613 | | BLOCKBUSTER Total Access | 45 | |
| 15 | 5-Apr-07 | U581750 | | BLOCKBUSTER Total Access | 45 | |
| 16 | 5-Apr-07 | U581792 | | BLOCKBUSTER Total Access | 45 | |
| 17 | 5-Apr-07 | U581791 | | BLOCKBUSTER Total Access | 45 | |
| 18 | 5-Apr-07 | U581817 | | BLOCKBUSTER Total Access | 45 | |
| 19 | 5-Apr-07 | U582207 | | BLOCKBUSTER Total Access | 45 | |
| 20 | 5-Apr-07 | U582494 | | BLOCKBUSTER Total Access | 45 | |
| 21 | 5-Apr-07 | U582543 | | BLOCKBUSTER Total Access | 45 | |
| 22 | 5-Apr-07 | U582719 | | BLOCKBUSTER Total Access | 45 | |
| 23 | 5-Apr-07 | U582704 | | BLOCKBUSTER Total Access | 45 | |
| 24 | 5-Apr-07 | U582985 | | BLOCKBUSTER Total Access | 45 | |
| 25 | 5-Apr-07 | U583256 | | BLOCKBUSTER Total Access | 45 | |
| 26 | 5-Apr-07 | U583537 | | BLOCKBUSTER Total Access | 45 | |
| 27 | 5-Apr-07 | U583970 | | BLOCKBUSTER Total Access | 45 | |
| 28 | 5-Apr-07 | U584156 | | BLOCKBUSTER Total Access | 45 | |
| 29 | 5-Apr-07 | U584121 | | BLOCKBUSTER Total Access | 45 | |
| 30 | 5-Apr-07 | U584182 | | BLOCKBUSTER Total Access | 45 | |
| 31 | 5-Apr-07 | U584400 | | BLOCKBUSTER Total Access | 45 | |
| 32 | 5-Apr-07 | U584420 | | BLOCKBUSTER Total Access | 45 | |
| 33 | 5-Apr-07 | U584408 | | BLOCKBUSTER Total Access | 45 | |
| 34 | 5-Apr-07 | U584761 | | BLOCKBUSTER Total Access | 45 | |
| 35 | 5-Apr-07 | U584933 | | BLOCKBUSTER Total Access | 45 | |
| 36 | 5-Apr-07 | U584979 | | BLOCKBUSTER Total Access | 45 | |
| 37 | 6-Apr-07 | U585135 | | BLOCKBUSTER Total Access | 45 | |
| 38 | 6-Apr-07 | U585176 | | BLOCKBUSTER Total Access | 45 | |
| 39 | 6-Apr-07 | U584821 | | BLOCKBUSTER Total Access | 45 | |
| 40 | 6-Apr-07 | U585946 | | BLOCKBUSTER Total Access | 45 | |
| 41 | 6-Apr-07 | U586644 | | BLOCKBUSTER Total Access | 45 | |

METHODS FOR AN ALTERNATIVE PAYMENT PLATFORM

CROSS-REFERENCE TO RELATED APPLICATIONS

This application is a continuation of U.S. patent application Ser. No. 13/444,266, filed Apr. 11, 2012, which is a continuation of US patent application Ser. No. 11/781,856 filed Jul. 23, 2007, which claims the benefit of the following provisional applications: U.S. Provisional Application No. 60/820,701 filed Jul. 28, 2006; U.S. Provisional Application No. 60/825,885 filed Sep. 15, 2006; U.S. Provisional Application No. 60/868,767 filed Dec. 6, 2006; U.S. Provisional Application No. 60/869,899 filed Dec. 13, 2006; and U.S. Provisional Application No. 60/914,298 filed Apr. 26, 2007. Each of the foregoing applications is hereby incorporated by reference in its entirety.

BACKGROUND

1. Field

This invention generally relates to payment for products or services. The invention specifically relates to methods and systems that enable providing an alternate form of payment for products or services.

2. Background

Existing systems for lead generation in advertising of products and services have drawbacks that either result in diminishing marginal return, or inefficacy. Acquiring access to high quality leads that have a relevance to the product or service being advertised or promoted is considered of higher value than less relevant or random leads.

In addition, on-line response to advertisements, offers, and promotions continues to support increasingly higher levels of spending by advertisers, and product or service providers, for high quality leads. This has led to an increasing shift to online direct marketing from all segments of the marketplace. Recent annual spending in this segment increased substantially.

Meanwhile, consumers continue to seek ways of acquiring goods and services, such as software and other digital goods and services, at lower prices, or for free. In particular, many consumers are not accustomed to paying for premium content and services online, such as software, publications, games, etc, especially since there are many free alternatives. For many online goods and services, especially digital products where the marginal cost of additional production is negligible or zero and the digital item is not tangible, a fair economic value of these goods and services is hard for the consumer to quantify. This makes a traditional purchase decision difficult. Also, there is a phenomenon of comparative taste; that is, the willingness of customers to pay for particular goods and services varies from customer to customer. One customer may be willing to pay full price for one item but unwilling to pay at all for another item, while for a second customer the situation may be reversed. Thus, the demand for a particular item reflects a distribution of prices at which particular customers are willing to pay for the item, ranging from zero to the highest price that any single customer would be willing to pay. For goods and services with respect to which the marginal cost of production is negligible, a merchant would ideally like to differentiate among these customers, charging each one of them a price that reflects the extent of that particular customer's demand. This distribution of demand also results in merchants valuing different customers differently. A particular type of customer may be highly attractive to one merchant, because that customer places a premium on that merchant's offerings, while the same customer may not be attractive for another merchant, because the opposite is true with respect to that merchant's offerings. Thus, applicant has recognized that a need exists for methods and systems that allow merchants to provide an opportunity for customers with low willingness to pay to for one merchant's item to engage with other merchants (advertisers) for whom the customers have a higher willingness to pay for the alternate merchant items, and visa versa. In this way, both the original and secondary merchants benefit from the customer's differentiated tastes (willingness to pay for one item over another).

A need also exists for methods and systems that facilitate gaining access to high quality leads by online advertisers and others who benefit from these leads and for allowing consumers to benefit from such access by participating in favorable offers for such goods and services. Stated from the perspective of the vendor, there is a need to "monetize" non-paying users who are unwilling to use traditional payment methods to access premium goods and services online and to establish an alternative payment mechanism that enables these users to barter other sources of value (such as customer demographics) not catered for in traditional payment methods.

SUMMARY

Provided herein are methods and systems for alternative payments of products or services. An alternative payment platform as herein described may provide an advertiser with access to high-value customers. The alternative payment platform may provide benefit to a wide range of markets such as online services, online content providers, software products, shareware, information services, online retailers, financial services, publishers, online games, virtual goods, and the like. For many online goods and services, especially digital products where the marginal cost of additional production is negligible or zero, the true (economic) value of these goods and services is hard for the consumer to quantify. This makes a traditional purchase decision difficult. In some cases, an alternative payment method enables a customer to exchange a more tangible item for the intangible digital product. For example, a customer looking to purchase an online subscription to a newspaper, may instead elect to sign-up for a weekly wine club (at much greater cost), since the value of the tangible goods (i.e. wine) is clearly quantified. An alternative payment platform may facilitate a product or service vendor receiving compensation for providing products, premium goods, or services to users who are unwilling to use traditional payment methods to access the premium goods and services. The alternative payment platform may also enable these merchants to exchange other sources of value, such as customer demographics, that are not supported in traditional payment methods for products, premium goods, or services.

The alternative payment platform may offer a high degree of scalability as it may be integrated with any type of e-commerce transaction. The alternative payment platform may facilitate optimizing alternative payment offer selection for vendors. This optimization may be performed locally for each vendor. It may also be performed across a plurality of vendors associated with the payment platform, such that the benefits of optimization may accrue to all parties associated with the platform.

The alternative payment platform may make readily available to users a substantial number of ways to pay for a product or service that are not available today. It may allow a user to directly receive value for engaging with a secondary offeror, such as by trying or buying something from the secondary offeror or perhaps by simply providing his demographic and contact information in association with a product or service offering.

Terms such as "merchant," "offeror," "vendor," "seller," and "advertiser," are used herein to refer to any parties who engage in the business of offering goods, products, services, or other items, such as by sales, leases, licenses, or other forms of transaction, whether conducted by electronic commerce, digital commerce, offline commerce, or other channels. Use of one such term should be understood to encompass the others, except where context indicates otherwise. Without limitation of the foregoing, the terms "merchant" and "primary offeror" are used in most cases herein to refer interchangeably to a party who offers a primary offer, such as an offer to sell an item or bundle of items at a price or prices, while the terms "advertiser" and "secondary offeror" are used interchangeably herein in most cases to refer to a party who provides an alternative to the primary offer. Such alternatives to a primary offer may include alternatives to provide the item of the primary offer upon different terms and conditions, such as upon different payment terms, or may refer to a completely different item from an unrelated merchant and are referred to herein interchangeably as "alternative offers," "alternative payment offers," and "secondary offers." Terms such as "secondary offer," "secondary offering," "alternative offer," "alternative offering," "alternative payment offer," "alternative payment offering," "alternate offer," "alternate offering," "discount offer," "discount offering," and the like should be understood as various species of secondary or alternative offer, and except where context indicates otherwise, it should be understood that in various embodiments described herein one such species may be substituted for another, resulting in additional alternative embodiments of the methods and systems disclosed herein.

Methods and systems are provided for providing an alternative payment platform, including method and systems for providing a platform for presenting an alternate offer to a user who is engaged with a primary offer and receiving an indication of the user's engagement with the alternate offer, wherein the user's engagement with the alternate offer serves as an alternative form of payment for an item associated with the primary offer. Such methods and systems may further include methods and systems for selecting one or more alternate offers engagement with which serves as an alternative form of payment for an item associated with a primary offer, presenting the selected alternate payment offers to a user, receiving an indication of engagement with at least one of the alternate offers, receiving payment in exchange for presenting the accepted offer and providing payment to the offeror of the primary offer.

BRIEF DESCRIPTION OF FIGURES

The systems and methods described herein may be understood by reference to the following figures:

FIG. 40 shows a screen summarizing pending transactions.

FIG. 41 depicts an interface screen with instructions about how to submit a receipt.

FIG. 42 depicts an interface screen to submit a receipt.

FIG. 43 depicts a screen in which a user updates account details.

FIG. 46 depicts a screen in which an upgrade from a free version to a premium version is offered.

FIG. 49 depicts a screen in which a user abandons a shopping cart.

FIG. 50 depicts a post-transaction or post-action offer associated with an alternative payment platform.

FIG. 53 shows a screen depicting an alternative payment method alongside traditional payment methods.

FIG. 54 shows a screen depicting an e-mail campaign in which an alternative payment method is offered.

FIG. 57 shows a screen depicting an automated e-mail.

FIG. 58 shows an order confirmation screen.

FIG. 63 shows a screen depicting an advertiser panel dashboard.

FIG. 64 shows a screen depicting an advertiser panel.

FIG. 65 shows a screen depicting an advertiser panel.

FIG. 66 shows a screen depicting a transaction report.

DETAILED DESCRIPTION OF FIGURES

Figure 1:
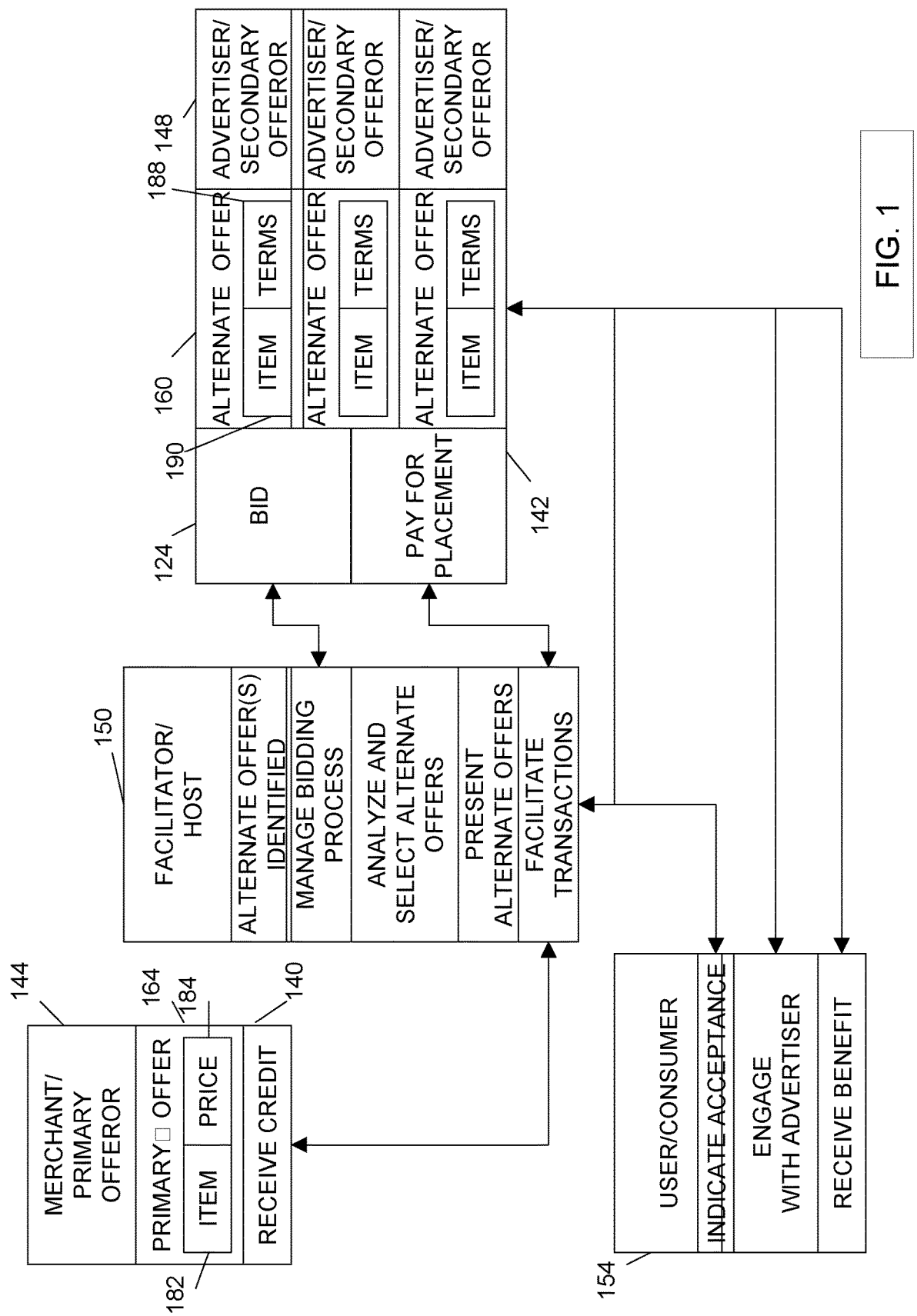
FIG. 1 depicts a block diagram with components of an alternative payment platform.

FIG. 1 shows roles of certain entities that interact in the use of an alternative payment platform 100 as described herein. A facilitator 150 facilitates interaction of merchants, or primary offerors 144, advertisers, or secondary offerors 148, and users 154 (referred to interchangeably herein as consumers). The merchant, or primary offeror 144, makes an offer 164, such as an offer of an item 182 at a price 184. A user 154 may initially engage with the merchant 144, such as to consider whether to purchase the item 182 at the price 184, such as by viewing the item at the merchant's website; however, for various reasons, such as unwillingness to pay the full price 184 of the item 182, the user 154 may be reluctant to complete the transaction with the merchant 144. Meanwhile, various advertisers, or secondary offerors 148, may introduce alternate offers 160 into the marketplace, such as for other items 190. Those secondary offerors 148 may be willing to offer an economic compensation (such as a payment) to engage with user 154. This is particularly true in cases where the advertiser perceives that it will receive a significant benefit from having the opportunity to engage with the user 154, such as to establish the user 154 as a long-time customer of the advertiser 148. In various preferred embodiments of the methods and systems disclosed herein, the facilitator 150 (referred to interchangeably herein as the host) may manage an alternative payment platform 100 to enable advertisers 148 to engage with user 154 in return for an appropriate economic compensation which the facilitator 150 may use to adjust the price 184 of item 182, thus providing an incentive for the user 154 to engage with advertiser 148 and may also use to compensate the merchant 144 for such price adjustment and for allowing the advertiser 148 to engage with the user 154. The facilitator 150 may present relevant alternate offers 160 to users 154, thereby enabling the users 154 to obtain desired items 182 on alternative terms, such as on a discounted or free basis. The facilitator 150 may further facilitate an exchange of value among the facilitator 150, the advertiser 148 and the merchant 144, such as by debiting the advertiser 148, retaining an amount for the facilitator 150 and crediting the merchant 144. Thus, each party obtains a benefit from the facilitation of the alternative payment transaction. The merchant 144 receives a payment/credit, notwithstanding the reluctance of the user 154 to transact with the merchant 144. The advertiser 148 obtains the opportunity to engage with a user 154, such as to increase participation in trial programs offered by the advertiser 148, or the like. The user 154 obtains a desired item 182 on favorable terms, such as on a discounted or free basis. The facilitator 150 receives payment from the advertiser for presenting the alternate offer 160 and/or enabling the user 154 to engage with the alternative offer 160.

Referring still to FIG. 1, the facilitator 150 may optionally undertake various activities in managing the alternative payment platform 100, such as searching for or identifying alternate offers 160, managing the process by which advertisers 148 are given the opportunity to present alternate offers 160 to users 154 (such as by conducting a bidding process, or the like), analyzing various parameters associated with alternate offers 160, such as to optimize the selection, timing, placement, and the like of particular alternate offers 160 to users 154, presenting alternate offers 160 to users 154 (such as in an ecommerce environment of the original merchant 144 or in a different environment), and facilitating the completion of the transaction among the user 154, advertiser 148 and merchant 144 (such as managing payment details, fulfillment, allocation of debits and credits, handling of receipts, prevention of fraud and other problems, and the like).

Figure 2:
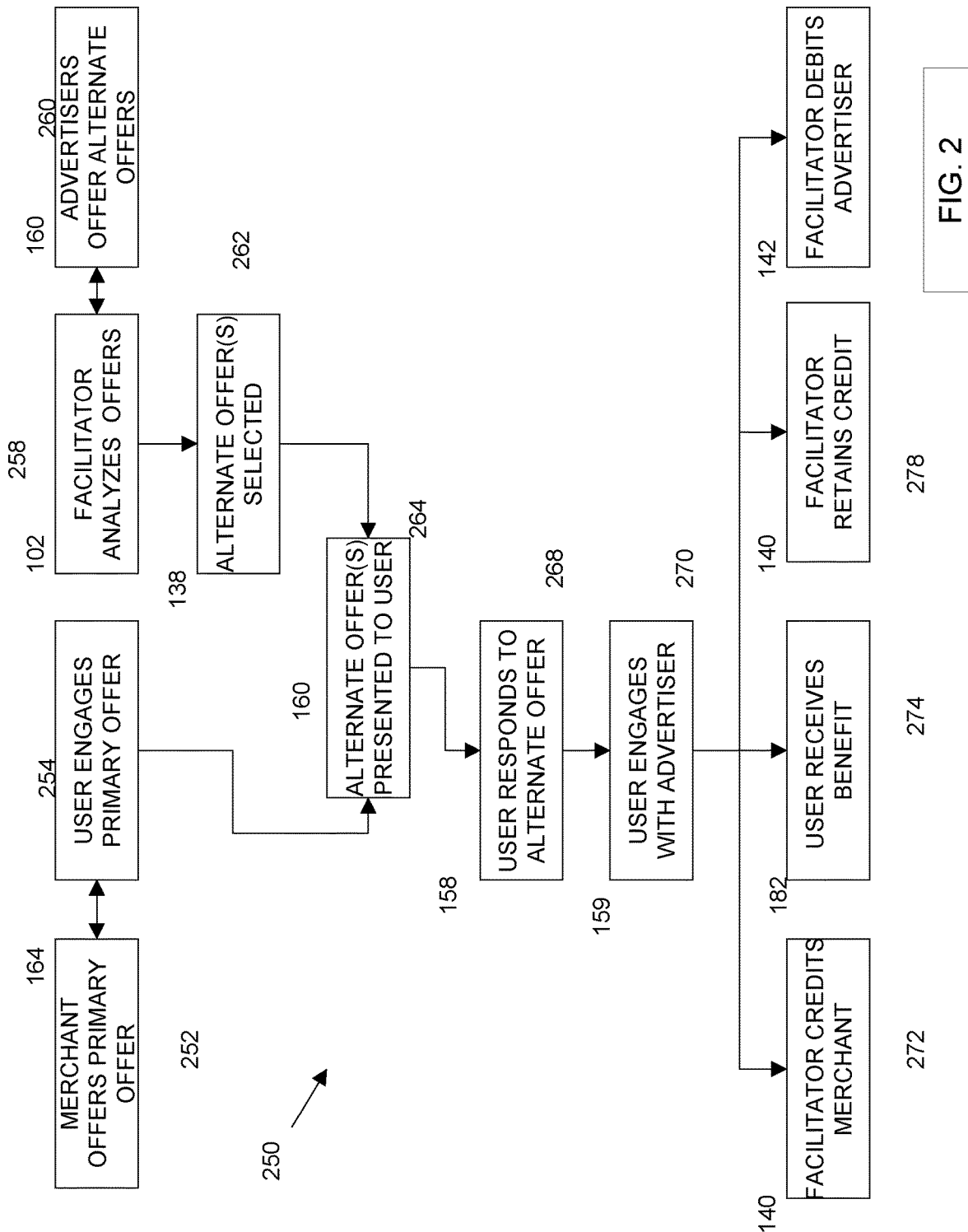
FIG. 2 depicts a flow diagram of activities associated with an alternative payment platform.

Referring to FIG. 2, a flow diagram 250 shows certain actions that take place in the context of an alternative payment platform 100 in one embodiment of an interaction of a merchant 144, advertiser 148 and user 154 with a platform managed by a facilitator 150. At a step 252, a merchant 144 offers a primary offer 164, such as offering an item 182 at a price, and a user 154 initially engages with the primary offer 164 at a step 254, such as by viewing the merchant's 144 presentation of the primary offer 164 at the merchant's 144 website, in an email, or the like. Meanwhile, advertisers 148 offer various alternate offers 160 at a step 260. The facilitator 150 analyzes the various alternate offers 160 at a step 258. The facilitator 150, undertaking various actions described in more detail elsewhere herein, may select one or more alternate offers 160 at a step 262. Upon selection at the step 262, the alternate offer(s) 160 may be presented to the user 154 at a step 264. The user 154 may respond to the alternate offer 160 at a step 268 and, in one preferred embodiment, may engage with the advertiser 148 at a step 270, such as by engaging in a free trial program with respect to another item 190, purchasing another item 190, or some other engagement, such as providing personal information, completing a survey or questionnaire, registering interest and/or a willingness to be contacted by advertiser 148 regarding another item 190 (users' 154 various reactions to alternate offers 160 being collectively referred to herein as a secondary offer communications 158). Subsequent to engagement of the user 154 with the advertiser, the facilitator 150 may give the merchant 144 a credit 140 or payment at a step 272 (such as upon the facilitator's 150 receiving an indication of the user's 154 engagement with the alternate offer 160). At a step 274 the user may receive the benefit associated with the alternate offer 160 (such as receiving the item 182 on a discounted or free basis). At a step 278 the facilitator 150 may retain a benefit, such as a credit, fee, or the like. At a step 280 the advertiser 148 may receive a debit 142 or make a payment (such payment/debit obligation being optionally triggered by the user's 154 having engaged with the advertiser 148, the advertiser 148 having the opportunity to present the alternate offer 160, or other conditions).

Figure 3:
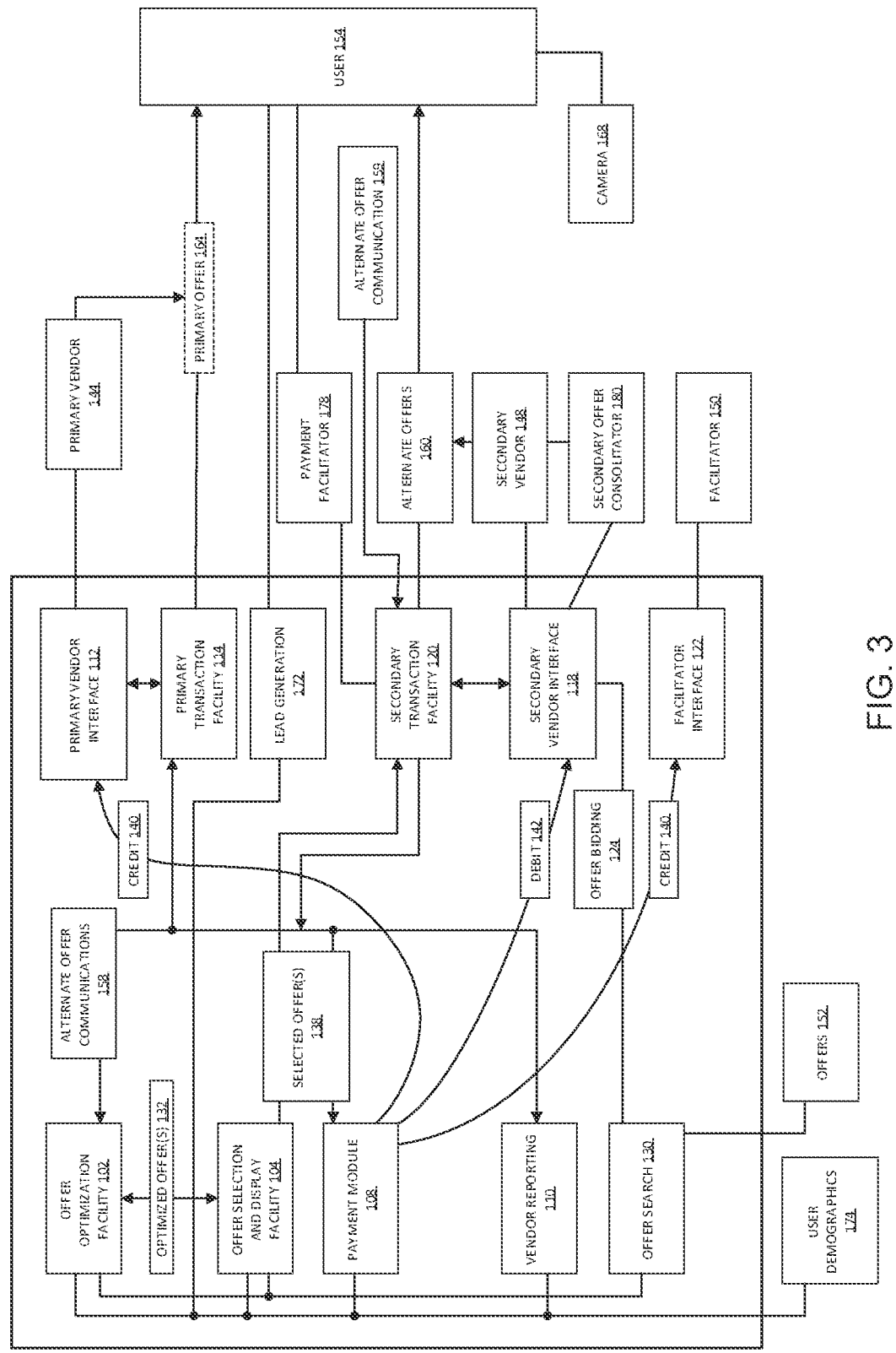
FIG. 3 depicts a block diagram of additional details of an alternative payment platform.
Figure 4:
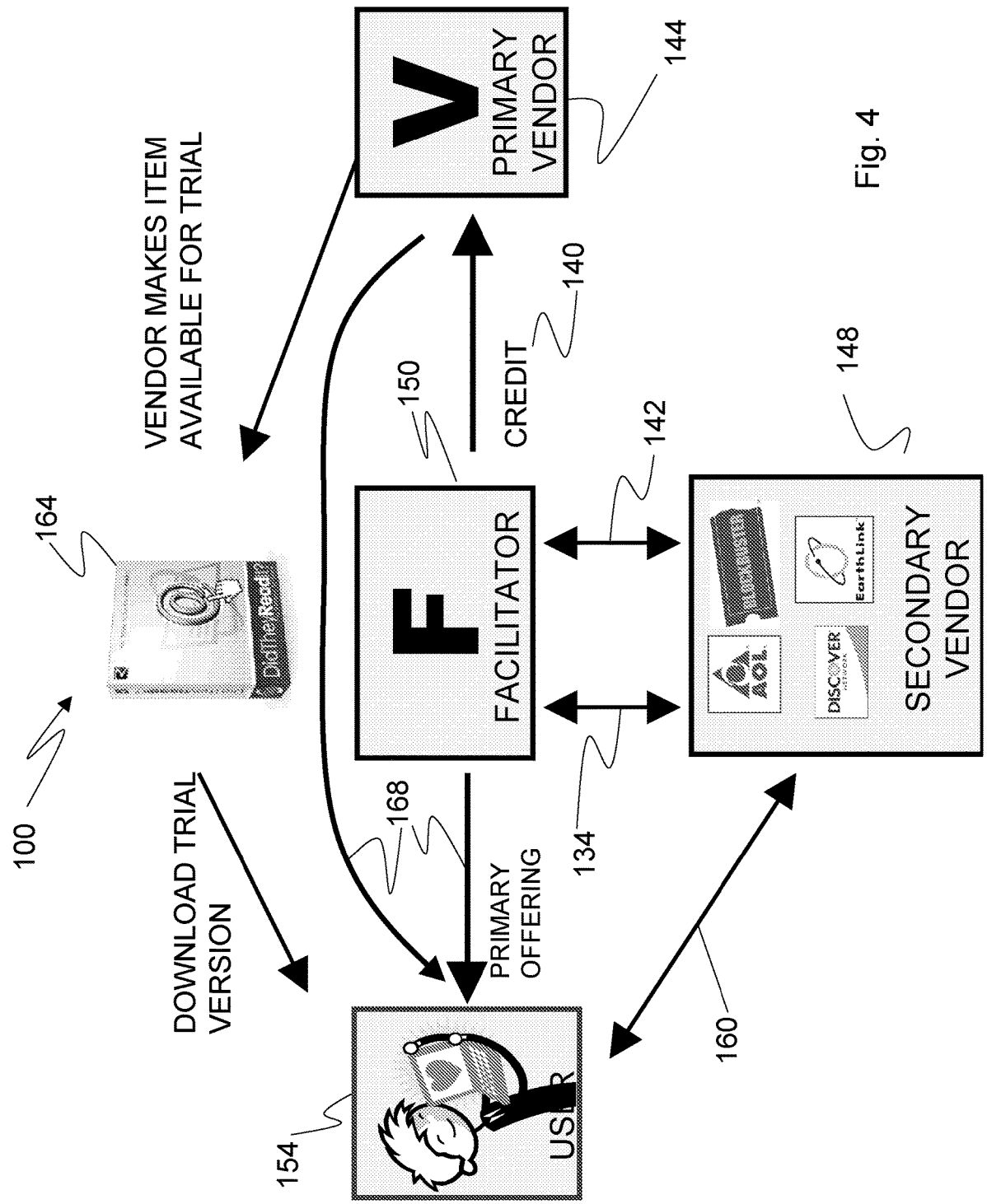
FIG. 4 depicts a flow diagram of steps associated with an alternate payment platform.

Referring to FIGS. 3 and 4, additional details are provided with respect to optional components of an alternative payment platform 100 and various actions that may optionally take place in the context of such alternative payment platform 100. Such components and steps may include a facilitator 150, a primary vendor 144, a secondary offeror 148, a primary offer 164, an alternate offer 160, a debit 142, and a credit 140. Upon notification by the secondary offeror 148 that a user 154 has engaged with the secondary offeror 148, such as by accepting an alternate offer 160, the facilitator 150 may coordinate activities associated with authorizing delivery of an item 182 associated with the primary offer 164 and facilitating a credit 140. The secondary offeror 148 may make available, through the alternative payment platform 100, one or more alternate offers 160 for the user 154, which, with the assistance of the facilitator 150, may be associated with the primary offer 164. The secondary offeror 148 may accept engagement by a user 154, such as acceptance/ completion of an alternate offer 160 by a user 154 and make a payment, which may be retained in part and distributed in part by the facilitator 150. It should be noted that completion of an alternate offer 160 may result from varying degrees of engagement with the alternate offer 160. For example, completion may involve merely viewing the alternate offer 160, taking an action required with respect to the alternate offer 160, accepting the alternate offer 160 (such as thereby binding the user 154 to undertake some action), or other action specified by the secondary offeror 148 with respect to the alternate offer 160. In a preferred embodiment, the user 154 may receive the item 182 associated with the primary offer 164 from the facilitator 150 in exchange for engaging with the secondary offeror 148, such as completing an alternative offer 160. In this case, the user benefit described in FIG. 1 and FIG. 2 may be a one hundred percent discount or some other mechanism to allow the user 154 to receive, activate, extend or make permanent his use of the item 182 associated with the primary offer 164, such as and without limitation for the activation, extension, or permanent use thereof. In embodiments, the primary offer 164 may encompass any and all products or services. Any and all references to a "product" may, without limitation, refer to a product and/or service. Likewise, any and all references to a "service" may refer to a product and/or service.

An alternate form of primary offer 164 may be an authorization for an adjustment in a purchase price of the primary offer 164. The adjustment may be immediate, allowing the user 154 to complete the purchase at a reduced price, or it may be a reimbursement such as a rebate. In this way, a user 154 may choose to receive the product or service at a reduced price in exchange for completing one or more alternative payment secondary offers 160. The resulting purchase transaction may include a combination of an alternative payment and a traditional payment.

A facilitator 150 may use a secondary offer consolidator 180 to assist with identification and consolidation of alternate offers 160. Such a consolidator 180 may be an advertising network manager, an advertisement placement manager, or similar party, or may use or comprise a software-based service for consolidating alternate offers 160 and may act on behalf of the offerors with regard to the alternate payment platform 100. Such a consolidator 180 may charge a fee for consolidating offers 160.

The primary vendor 144 may make available a primary offer 164 for download 104 or other delivery to the user 154 and may receive credit 140 once the secondary offeror 148 notifies the facilitator 150 that the consumer 154 has successfully completed one or more secondary offers 160. Such notification may be provided from the secondary offeror 148 to the facilitator 150 as a separate transaction, or the notification may be encompassed in the debit 142. The facilitator 150 pays the primary vendor 144 an amount specified by the primary vendor 144 or agreed by the primary vendor 144 and facilitator 150. Upon delivery to the user 154 of the item 182 associated with the primary offer 164, the primary vendor 144 may notify the facilitator 150 such that the facilitator 150 may confirm that the user 154 has received the benefit promised for engaging with the alternate offer 160.

The credit 140 paid to the primary vendor 144 may include a fixed portion related to a retail cost or other cost such as a minimum primary offer 164 price. The credit 140 paid to the primary vendor 144 may include a variable portion related to a profit earned by the facilitator 150 from debit 142 by the secondary offeror 148. The variable amount may be based upon various factors, such as the number of primary offers 148 for which the facilitator 150 has arranged alternate offers 160, the economics associated with the alternate offers 160, and the like, or a percentage of the profit, for example. The price paid may be based on an estimated profit, an estimated debit 142, an actual profit, an actual debit 142, and other estimated or actual financial factors associated with the alternate payment platform 100, such as fees, secondary offer consolidator 180 charges, and the like. The credit 140 may be adjusted based on prior credits 140 and actual financial factors related to the primary vendor 144, primary offer 164, user 154, secondary offeror 148, alternate offer 160, other participants, and the like. In an example, a credit 140 may be reduced because a prior credit 140 paid to the primary vendor 144 was based on an estimated debit 142 that turned out to be higher than the actual debit 142.

The financial terms of an alternate payment transaction, such as the credit 140 to the primary offeror 144, the debit 142 to the secondary offeror 148, the amount retained by the facilitator 150, and the like may be determined by agreement between the facilitator 150 of the alternate payment platform 100, the secondary offeror 148 and the primary vendor 144 in advance of an alternate offer 160 being presented. However, the agreement may include variable pricing, wherein the amount paid may be determined at the time the alternate offer 160 is accepted (such as during the user 154 checkout process). This may allow a primary vendor 144 to differentiate pricing based on attributes of the user 154, such as geography (consumers in low GDP per capita countries pay less for the product/service than consumers in high GPD per capital countries) or user 154 credit worthiness (consumers with greater propensity to select higher-end offers will result in higher payments to the primary vendor 144 than consumers who select lower-end offers). The primary vendor 144 may elect to adjust the amount to be paid by the alternate payment platform 100 based on an aspect of the user 154.

The price paid may be based on an algorithm that may facilitate scalability of the platform. The algorithm may accept inputs related to the primary offer 164, the primary vendor 144, and the like. These inputs may introduce ambiguity, such as default versus custom payments and margin-based versus fixed-dollar payments, that may be resolved by logic associated with the algorithm. Aspects of offers and vendors may be classified to facilitate determining logic for resolving such ambiguity and for determining payment amounts. Offers may be classified as margin-based payments that may automatically base the margin on economies associated with the alternate offer 160, the secondary offer consolidator 180, and the like.

In certain optional embodiments, offers may be associated with margin-based payments that include customization on an offer-specific basis, or fixed-dollar payments, which may also include customization on an offer-specific basis. Vendor payment aspects that may impact the logic may be classified as a base case, wherein no additional vendor criteria are required to determine the payment. Other vendor classifications include non-standard aligned classifications, wherein a primary vendor 144 may define custom payment criteria while remaining aligned with an alternate offer 160 related payment paradigm; custom margins, wherein a primary vendor 144 defines a fully custom margin scheme that may be independent of alternate offer 160 or secondary offeror 148 related economies; and flat payout (fixed pricing), wherein a primary vendor 144 requires a fixed payment per transaction to facilitate avoiding impact on payments caused by other variables. These classifications are only exemplary and are not meant to be limiting. The algorithms, logic, classifications, and other aspects of primary vendor 144 payments should be considered extensible so that additional classifications may be introduced and supported. Resolution of the ambiguities herein described may be based, at least in part, on a rules table that may include offer parameters, vendor parameters, and the like. Additionally, the platform 100 may support fully customized payments that may be applied. Such customized payments may be configured to override or work in cooperation with the algorithms associated with payments.

Changes to primary vendor 144 payment rules may be incorporated into the rules tables, algorithms, customized payments, and the like. The following exemplifies one of many possible payment configurations.

TABLE-US-00001 Payment Table Offer type Offer 1; Offer 2; Offer 3; Revenue $20 Revenue $20 Revenue $90 Secondary Custom Fixed Vendor type margin 20% margin 25% payout $50 Small Co; $20.times. 80%=$16 $20.times. 75%=$15 $50 Big Co; custom $20.times. 85%=$17 $20.times. 75%=$15 $50 margin 15% Strong Co; $20.times. 90%=$18 $20.times. 90%=$18 $90.times. 90%=$81 fixed margin 10% Fixed Co; fixed $10 $10 $10 payment $10

In the previous table, payment ambiguity is resolved by entries in the table, such as when offer type 2 custom margin overrides vendor Big Co custom margin, resulting in Big Co receiving $17 for offer 1, but only $15 for offer 2.

To facilitate an administrator of the platform 100, or a vendor accessing the platform 100 managing the payment algorithms, logic, rules, and the like, one or more of the following screens may be included in one or more interfaces of the platform 100: payouts for all offers associated with a specific vendor, payouts for all vendors associated with a specific offer, configuration of vendor rules and parameters, configuration of offer rules and parameters, override screen triggered by a change to an offer (e.g. a change to the offer classification), override screen triggered by a change to a vendor (e.g. a new vendor classification), offer record screen to create linkage with one or more of these screens, and vendor record screen to create linkage with one or more of these screens.

The payment module 108 may record indications of events associated with alternate offers 160, such as notifications that various activities have taken place respect to offers (such as engagement with alternate offers 160, acceptance of alternate offers 160, approval of alternate offers 160 (where approval is necessary), or completion of alternate offers, such that upon occurrence of relevant events or activities, each primary vendor 144 may receive the credit 140 herein disclosed. The vendor payment facility may perform a financial payment transaction to a primary vendor 144 account, such as and without limitation a bank account, for an amount associated with any and all accumulated offer notifications. This financial payment transaction may occur upon offer notifications, from time to time, periodically, and so forth.

The debit 142 from the secondary offeror 148 may include a fixed portion related to the alternate offer 160 or related to the primary offer 164 with which the alternate offer 160 is associated. The fixed portion may be set by the secondary offeror 148 or the facilitator 150. The debit 142 may include a variable amount such as an amount based on the number of new users 154 who complete an alternate offer 160 with the secondary offeror 148. The variable amount may be based on a quality of the user 154 completing the alternate offer 160. The quality of the user 154 may include a user characteristic such as a user demographic. Commission based secondary offers 160 may require an adjustable debit 142 wherein the amount debited from the secondary offeror 148 is calculated at the time the alternate offer 160 is executed. A credit 140 resulting from a commission based alternate offer 160 may also be variably based at least in part on the commission of the alternate offer 160. The payment module 108 may perform the calculations and issue the debit 142 and credit 140 accordingly.

The alternative payment platform 100 may include a primary offer 164 that may be coordinated by the facilitator 150 and the primary vendor 144. The user 154 may receive the ability to obtain access to the item 182 associated with the primary offer 164, such as receiving an authorization code, a serial number, product authorization key, link to download an authorized copy of the product, and the like upon completing an alternate offer 160. The user 154 may receive an email, instant message, phone call, fax, or other communication from the facilitator 150 or primary vendor 144 with details on how to access, retrieve, activate and/or make use of the primary offer 164.

To receive the authorization from the primary vendor 144, the facilitator 150 may request product authorization from the vendor by providing user 154 information to the primary vendor 144 to facilitate sending the primary offer 164. The information may include the user's 154 email address, first and last name, unique customer id (i.e. for additional tracking), and so forth. The facilitator 150 may also send the primary vendor 144 product identification, a random number, a security code for validating the request for product authorization confirming the request is from the facilitator 150. The security code may be a SHA1 encryption of a concatenation of the random number, the user's 154 email address, and a vendor security passkey. The vendor security passkey may be a unique identifier known only to the primary vendor 144 and the facilitator 150. The primary vendor 144 may specify this to the facilitator 150 or the facilitator 150 may provide this to the primary vendor 144 separately from a product authorization request. The request for authorization may be provided in the form of a GET or POST command issued to a script such as a (PHP or Perl script) on the primary vendor's 144 website for automatically generating the authorization. Such a script may create database or logfile entries of the command and authorization for purposes of record keeping.

In order to allow the facilitator 150 to provide authorization to a user 154 to allow the user 154 to use the item 190 associated with an alternate offer 160, the primary vendor 144 may provide to the facilitator 150 information that allows access to the item 182 associated with each primary offer 164, such as a list of authorizations such as keys, download links, serial numbers, registration codes, login/password combinations, and the like and make this information known to the facilitator 150. Alternatively, the secret information necessary to enable user authorization may be provided only to the facilitator 150. The facilitator 150 may select one of the authorizations from the list of authorizations and automatically associate this with a user 154. The authorization may be communicated to the user 154 in a variety of ways. For example, the authorization could be delivered in an email or may be automatically be updated in an account created by the facilitator 150 for the user 154, such that the account can be securely accessed by the user 154 on an as needed basis. In certain embodiments, an email may be provided to the facilitator 150 from the primary vendor 144 after the primary vendor 144 has customized it such as to include additional information that may be useful to the user 154, such as a support email address, a thank you from the primary vendor 144, and the like. Alternatively, the facilitator 150 may customize the email for the primary vendor 144 or may provide a standard email with the authorization to the user 154.

The user 154 may be notified of the alternate offer 160 in a variety of ways. The way of notifying the user 154 may influence the likelihood of the user 154 completing the offer 160. Therefore it may be beneficial to include a plurality of ways of notifying the user 154 of the offer 160. However, it may not be beneficial in that the user 154 may disregard all subsequent offers after declining the first offer 160.

In embodiments, processing notifications associated with an alternate offer 160 may require a certain processing time (such as may be associated with credit card approvals). In such cases, the facilitator 150 may (with agreement from the primary vendor 144), provide an initial authorization to temporarily extend the use of primary offer 164, thus allowing time for the notification with respect to the alternate offer 160 to be received by the facilitator 150 and a final authorization to be sent to the user 154. This initial authorization may be associated with primary offers 164 that have a limited use policy, such as and without limitation a policy that would otherwise cause the primary offers 164 to expire during the processing period. The following paragraphs describe a number of ways of notifying the user 154 of the alternate offer 160.

A user 154 may be notified of an alternate offer 160 by receiving an email during the limited use phase of the primary offer 164. The email may be delivered to the user 154 at or near the end of the trial such that the user 154 may be inclined to continue using the product since the user 154 may have already used the trial primary offer 164 effectively. An email reminder at the end of a trial may help users 154 "on-the-fence" to commit to a purchase. The alternative payment offer 160 may provide a material incentive for those users 154 to commit to an action/sale.

A user 154 may be notified of the alternate offer 160 by an electronic communication. This communication may be rendered as a displayed message on a client facility of the user 154. In embodiments and without limitation, the client facility may comprise a home computer, a mobile computing facility (such as and without limitation a PDA, cell phone, pager, laptop computer, and so on), an automotive computing facility or in-dash automotive display, and so forth. The message may appear in a startup window (also known as a "nag screen") that reminds the user 154 that the product they are using is a trial or limited-use version and they must pay for it or complete an alternate offer 160 to continue to use it beyond the trial limit. It will be appreciated that all references to a webpage, whether described herein or in the documents that may be included herein by reference, may refer to any and all possible renditions of an electronic communication by a client facility for the user 154. A user 154 may receive a notification that is associated with the alternate payment platform 100 when the user 154 uninstalls software.

In support of an email campaign or generally using email to inform users 154 about the alternate payment platform 100 and alternate payment options, a user's 154 activity that is associated with the email (such as if or when an email is read) may be tracked. Tracking a user 154 activity that is associated with an email that is related to the alternate payment platform 100 may be useful in managing continued email or other communication with a user 154. Such tracking may alert the alternate payment platform 100 of when a user 154 has read an email, of how long the email was opened (being viewed) by the user 154, of the geographic location of the user 154 when the user 154 read the email, and so on. A commercial product such as "didtheyreadit" may provide such a tracking capability and may be associated with the alternate payment platform 100. Alternatively, a tracking capability may be included within the alternate payment platform 100 or may be provided by a third party.

Email tracking of alternate offers 160, for example, may facilitate the user 154 accepting an alternate offer 160. By tracking a user's 154 activity that is associated with the email, it may be possible to make changes to further emails (e.g. different email title, different secondary offer 160, different source email address, and so on) based on the tracked activity. As an example, a user 154 may read an email of an alternate offer 160 within several hours of the email being sent. A follow-up email that refers to the earlier email may be sent to the user 154, implicitly making a connection for the user 154 to their earlier experience of reading the earlier email. This may allow the alternate payment platform 100 to tailor the follow-up email to potentially improve the chances of the user 154 accepting the alternate offer 160. A user 154 that reads a tracked email and further interacts with the alternate payment platform 100 to view additional alternate payment options (that is, alternate offers 160) may be receptive to additional alternate offers 160.

A user 154 may be notified of the alternate offer 160 on the primary vendor 144 payment webpage. This notification may be in lieu of or independent of a primary offer 164. The notice may be provided to the user 154 as an alternate way of paying for the product even if they have not yet used the primary offer 164. In this way, a user 154 may elect to complete an alternate offer 160 instead of using another form of payment at the time of purchase of the product. The notice may be presented to the user 154 as a payment option similarly to other forms of payment such as a credit card or electronic payment option. In an example, online video games may be for sale without a trial period. The alternative payment platform 100 may enable users 154 to select an alternate offer 160, perhaps instead of or in addition to other forms of payment.

A user 154 may be notified of an alternate offer 160 as a result of a user 154 navigating web pages of a primary vendor 144 website. A user 154 may use web browser navigation icons, keyboard or mouse input, or commands to open, close, display, minimize, or otherwise change the display of a web page of a primary vendor 144 website (navigate). A user 154 may move a web browser pointer to be placed over a navigation selection as herein described including links within the web page. If the pointer remains over a navigation selection or link briefly, an overlay image may be displayed notifying the user 154 that the alternate payment platform 100 may be accessed through the navigation selection or link.

Navigating through primary vendor 144 web pages may result in an offer of the alternate payment platform 100 being displayed to the user 154. The display may include a pop-up web browser type window, a redirection of navigation to a web browser window, a confirmation window, a balloon or other graphic image, an audio message, a video or animation display, and any other type of visual or audible output intended to gain the attention of the user 154. The navigation resulting display may be transient, being displayed briefly. It may require input from the user 154 before the navigation is executed, such as selecting among a plurality of navigation actions. It may require the user 154 to confirm a navigation selection, wherein canceling the navigation selection may allow a user 154 to use the alternate payment platform 100.

In an example of web browser based navigation offer notification, a user 154 may be viewing a web page of a primary vendor 144 website, such as a primary offer 164 description, a primary offer 164 purchase confirmation, a primary offer 164 shopping cart, and the like. The user 154 may select to close the web page by selecting the window close icon (or other navigation selection as herein disclosed). Upon navigating to close the web page, a confirmation window may be displayed. The user 154 may be required to select among three options: continue to close the web page, cancel the navigation, or review secondary offers 160 through the alternate payment platform 100. Alternatively, the user 154 may be presented with one or more secondary offers 160 among the navigation options.

The facilitator 150 may facilitate the display of alternate offers 160 in a multitude of ways, herein called touchpoints, in order to facilitate a transaction between the user 154, primary vendor 144 and advertiser 148. These touchpoints define the context in which the facilitator 150 may display or otherwise present the alternate offers 160 to the user 154 and by which the user 154 is encouraged to complete an alternate offer 160 and receive a benefit such as receiving an item 182 associated with the primary offer 164.

In another example, a user 154 may be viewing a web page of a primary vendor 144 website and may enter a URL in the web browser address field. Upon detecting the address field change or when the user 154 selects to navigate to the entered URL, the web browser may display a notification, such as a transition web page, wherein the user 154 may be asked to try the alternate payment platform 100 to alternatively purchase an item associated with the viewed web page. The user 154 may select to continue navigating to the entered URL or may try the alternate payment platform 100 and navigate to a webpage associated with the alternate payment platform 100.

In another example, a user 154 may attempt to cancel the purchase of a primary offer 164 by exiting the payment processing website of a primary vendor 144 website (or third party shopping cart for the primary vendor 144). Upon detecting that the user 154 is attempting to cancel the purchase (such as by hitting the back button in the browser or by navigating away from the shopping cart), the web browser may display a notification, such as a transition web page, wherein the user 154 may be asked to try the alternate payment platform 100 to view alternative offers 160 and alternatively purchase the primary offer 164 by completing one or more alternative offers 160.

In another example, a user 154 may receive an email based on a previous interaction with primary vendor 144 (downloaded a trial version of the primary offer 164, using the limited version of the primary offer 164, etc.) to try the alternate payment platform 100 to alternatively purchase an item associated with the primary vendor 144.

In another example, a user 154 may attempt to fraudulently activate the fully functional primary offer 164. Upon detecting the attempted fraud, the user 154 may be prompted to view a notification, such as a transition web page, wherein the user 154 may be asked to try the alternate payment platform 100 to alternatively purchase the primary offer 164. The user 154 may elect to try the alternate payment platform 100 and navigate to a webpage associated with the alternate payment platform 100.

In another example, a user 154 may attempt to uninstall the trial version of primary offer 164. Upon detecting the product has been uninstalled, the user 154 may be prompted to view a notification, such as a transition web page, wherein the user 154 may be asked to try the alternate payment platform 100 to alternatively purchase the primary offer 164. The user 154 may elect to try the alternate payment platform 100 and navigate to a webpage associated with the alternate payment platform 100.

A webpage of a primary vendor 144 website may include an alternate payment button or other selectable element that may be placed on the page with equal, lesser, or greater prominence than a buy button. In an example of greater prominence, the alternate payment selection button may include animated graphics to attract a user's 154 attention. Lesser prominence may include placing the alternate payment selection button at the bottom of the web page along side contact or other selections that are not payment related. Equal prominence may include placing the buy button and the alternate payment button side by side with similar visual impact. The alternate payment selection may be presented in a wide range of combinations of position and visual prominence that include the above examples and many others. The prominence of the alternate payment selection may be specified in a contractual agreement between a facilitator 150 of the alternate payment platform 100 and a primary vendor 144. The prominence may be selected to meet a certain marketing objective. The prominence may alternatively be based on an aspect of the user 154 (such as a user preference) so that the alternate payment selection element is more appealing to the user 154. Independent of prominence, selection of the alternate payment element may result in an alternate offer 160 being presented to the user 154 as an alternate payment option.

The navigation alternatives herein described may be performed by aspects of the web page being viewed (such as HTML code) or by other software executing on the user 154 computing facility in association with the web browser (such as a plug-in, applet, browser menu, or the like). Although a web browser is described for viewing web pages of a primary vendor 144 web site, other web page access and display software, programs, devices, hardware, and services may also be used to display and navigate the web pages.

A user 154 may be notified of offers by configuring an RSS reader to deliver information related to primary offers 164 or primary vendors 144 being associated with secondary offers 160 or secondary offerors 148. In this way the user 154 may create a wish list of offer combinations and may be notified of published electronic information related to the combinations. The wish list may be created through a webpage of the alternate payment platform 100, or through RSS reader software.

Alternative payment secondary offers 160 may be associated with the primary offer 164, the primary vendor 144, or the user 154. A primary offer 164 or alternate offer 160 may be provided to a user 154 based on user 154 attributes such as demographics, geo-profile of comparable consumers, and the like. Based on information the user 154 provides to the facilitator 150 or secondary offeror 148 while completing an alternate offer 160, the offer may be selected from an inventory of offers or dynamically generated. The offer may be based on a relevance to one or more user 154 demographics such as age, income, address, sex, profession, marital status, and the like. The offer may be selected to maximize the overall profit of the transaction based on a conversion rate, a payout amount and total volume of completed secondary offers 160 from all vendors associated with the alternative payment platform 100, and the like.

A secondary offeror 148 may be an advertiser, product supplier, service provider, market research firm, non-profit agency, educational institution, or any other entity that may benefit from a user 154 engaging with the secondary offeror 148 by completing an alternative payment offer 160. Since in certain optional embodiments the secondary offeror 148 may only pay the facilitator 150 for a completed alternate offer 160, the secondary offeror 148 can, in such cases have some improved confidence that the information provided by the user 154 is accurate, since the same information may be used to provide the primary offer 164. The secondary offeror 148 may also seek primary vendors 144 with which they may establish cross promotional arrangements. They may also seek primary vendors 144 with products that align with their own product objectives such that a user 154 of the primary vendor 144 product may have a greater likelihood of having an interest in the alternate offer 160.

The facilitator 150 may solicit or receive from the users 154 of primary offers 164 recommendations or suggestions for items or services of interest to the users 154. Such recommendations and suggestions may also be provided to the facilitator 150 by the primary vendor 144 on behalf of the users 154. Additionally or alternatively, the primary vendor 144 may provide to the facilitator 150 demographic and/or preference data. In embodiments, this data may be utilized by the facilitator 150 in targeting secondary offers 160 to users 154 so as to increase conversion rates for the primary vendor 144. The facilitator 150 may solicit primary vendors 144 and/or alternative payment secondary offerors 148 for such items or services. The facilitator 150 may coordinate the association of a primary offer 164 with an alternate offer 160 based on the suggestions or recommendations. The facilitator 150 may seek new primary vendors 144 and/or secondary offerors 148 to provide items or services based on the suggestions or recommendations.

The alternative payment platform 100 may allow a primary offeror 144 to reduce costs associated with product returns, since the user 154 has not made a monetary payment for the product, such as if the return policy of the primary offeror 144 is tied to the actual price paid by the user 154 for the item 182 associated with the primary offer 164.

An alternate payment platform 100 may include an offer optimization facility 102, which may select and/or create an optimized offer 132. Optimization of an alternate offer 160 may be based at least in part on one or more aspects of the alternate offer 160, a secondary offeror 148, a primary offer 164, a user 154, and timing associated with the alternate offer 160. An alternate offer 160 that is not accepted by a user 154 may not provide significant value to the secondary offeror 148, primary vendor 144, user 154, or facilitator 150. Therefore, secondary offers 160 may be optimized so they are relevant to the user 154 thereby increasing the likelihood of user 154 acceptance. Offer optimization may be based on an aspect of the alternate offer 160. The alternate offer 160 may include aspects such as approval terms, alternate offer 160 cost to the user 154, time to process an alternate offer 160, age restrictions to accept the alternate offer 160, residency requirements, cancellation options, and the like. One or more of these aspects may be combined so that an alternate offer 160 may be optimized on a combination such as age restrictions and alternate offer 160 cost to the user 154. In an example, an alternate offer 160 may be optimized based on approval terms. The approval terms of secondary offers 160 may be evaluated to determine which alternate offer 160 may provide the best approval terms. One alternate offer 160 may require approval based on an on-line credit scoring method that returns an approval decision to the user 154 in seconds. Another alternate offer 160 may require approval by an underwriting department that requires 10 days for an approval decision. In this example, the alternate offer 160 that returns an approval decision in seconds may be considered to be optimal as compared with the other alternate offer 160 because a user 154 is more likely to accept an offer with immediate feedback as compared with an offer that requires considerable time for approval. Offer optimization may also include combining one or more of these aspects with one or more aspects of the user 154, facilitator 150, primary vendor 144, primary offer 164, and alternate offer 160 timing. Certain combinations are exemplified elsewhere herein.

In another example, offer optimization may also be based on an aspect of the popularity of an alternate offer 160. Popularity optimization may be beneficial in that a more popular alternate offer 160 is likely to be frequently accepted, thereby providing value.

Optimization may be based on one or more aspects of a secondary offeror 148. The aspects of a secondary offeror 148 for optimization may include cross marketing arrangements, time for the secondary offeror 148 to pay the facilitator 150, amount the secondary offeror 148 pays the facilitator 150 for an alternate offer 160 acceptance, the number of potential secondary offers 160 from the secondary offeror 148, a traffic/payout plan, and the like.

Offer optimization based on aspects of the alternate offer 160 may be related to offer optimization based on the secondary offeror 148. As an example, a secondary offeror 148 may provide a plurality of secondary offers 160. This plurality of secondary offers 160 may be combinable so that payout tier traffic volume may be reached using a combination of alternate offer 160 acceptances. A secondary offeror 148 that permits combining secondary offers 160 to reach a payout tier increased payout may be optimized above a secondary offeror 148 that does not permit combining secondary offers 160. In this example, the secondary offers 160 of the secondary offeror 148 that can be combined may be presented before other secondary offers 160.

An offer may be optimized based on an aspect of a primary offer 164. Aspects of a primary offer 164 may include the class of primary offer 164, the list (or normal) price, the discounted price of the primary offer 164, and the like.

An offer may be optimized based on one or more aspects of a primary vendor 144. Aspects of a primary vendor 144 may include business affiliations between a primary vendor 144 and a secondary offeror 148, alternate offer 160 preferences or restrictions, the number of primary offers 164 available to the alternate payment platform 100 from the vendor, a volume discount threshold, and the like.

When primary offer 164 aspects and primary vendor 144 aspects are combined for optimization, secondary offers 160 may be selected that have a high relevance to a user 154 of a primary offer 164 and may more readily be accepted.

An offer may be optimized based on one or more aspects of a user 154. Aspects of a user 154 for optimization may include demographics, prior alternate offer 160 acceptance history, geographic region, browser type, internet connection speed, receipt history, prior transaction history, and the like.

An offer may be optimized based on one or more aspects of timing. Aspects of timing for optimization may include time until expiration of an alternate offer 160, duration of an alternate offer 160, a difference between the time to deliver the primary offer 164 and time to approve the alternate offer 160, and the like. Optimization of secondary offers 160 based on timing may include selecting an alternate offer 160 that expires sooner than one that expires later since the later expiring alternate offer 160 may be presented after the sooner expiring alternate offer 160 expires.

An offer may be optimized to maximize revenue (e.g. vendor revenue, platform revenue); to target users 154 based on user 154 demographics, user 154 behavior, user 154 interaction with the platform 100, and the like. Offer optimization may be unique for each secondary offeror 148, alternate offer 160, secondary offer consolidator 180, and other secondary offer related aspects such as offer terms, offer timing, and the like. Offer optimization may be dynamic so that it takes into account secondary offerors 148 who may be approaching a pricing threshold associated with secondary offer payouts to the platform 100. Offers may also be optimized to generate the highest quality leads for secondary offerors 148.

The offer optimization facility 102 may include access to one or more databases containing secondary offers 160, preferences, user 154 transaction history, demographics, and the like. The results of an optimization may be stored in one or more of the databases, delivered to the offer selection and display facility 104, or both.

Offer optimization may include one or more algorithms to facilitate optimizing offers. Optimization algorithms may include heuristic optimization algorithms, Markov decision processes, ranking techniques, steepest descent methods, conjugate gradient methods, and the like. In an example, non-gender-neutral offers based on the gender of the user may be selected through a Markov decision process. Offers relating to women's clothing may be optimized to be presented to female users, while offers relating to men's clothing may be optimized to be presented to male users.

Optimization may be performed locally for each vendor. It may also be performed across a plurality of vendors associated with the payment platform 100, so that the benefits of optimization may accrue to all parties associated with the platform 100.

An aspect of the alternate payment platform 100 may include an offer selection and display facility 104. The offer selection and display facility 104 may match an offer or offers to a user 154, match an offer or offers to a primary offer 164, match an offer to an optimization result, and the like. The offer selection and display facility 104 may also present offers. The offers may be presented based on location, based on an aspect of the offer, based on a user 154 preference, based on a primary vendor 144 preference, based on an optimization result, based on a secondary offeror 148 preference, and the like.

The offer selection and display facility 104 may select a plurality of offers to be presented to a user 154 based on the geographic location of the user 154. For example and without limitation, a user 154 located in the United States may be presented with a selection of offers that can be transacted in the United States, while a user 154 located in Canada may be presented with a selection of offers that can be transacted in Canada.

The offer selection and display facility 104 may facilitate a user's 154 viewing of any and all combinations of offers available through the alternate payment platform 100. When facilitating such viewing, the offer selection and display facility 104 may mark any and all offers that might not be valid for the user 154. This mark may involve italicizing text, graying out text or graphics, using an alternate visual representation to provide the offer, and so on.

In another example, the optimization facility may have optimized offers 132 into a results list or group of optimized offers 132. The selection facility may first access this results list or group when selecting one or more offers to present to a user 154. The selection facility may apply selection criteria as herein described to the optimized results list or group of offers. The selection facility may present none, some, or all of the offers in the optimization results list with none or some other offers.

The selection facility may arrange the offers for presentation to the user 154 so that optimized offers 132 are presented first or more prominently than non-optimized offers 132. In certain preferred embodiments, optimized offers 132 are presented in a list of offers, rather than one-by-one.

The selection facility may facilitate presenting the offers in an order or prominence that is relevant to the user 154. In an example, a user 154 may instruct the selection facility through a user 154 interface to arrange the offers so that the offers with the greatest relevance to the user 154 are presented first or more prominently. To the extent that a user 154 may be unknown to the alternate payment platform 100 when offers are presented, the user 154 may enter relevant information that may be used in the selection of offers. For example, the user 154 may be presented a list of interest areas from which they could select one or more. The selection facility may use this information to identify and present to the user 154 offers that are relevant to the user's 154 interests.

Alternatively, the user 154 may select to register with the alternate payment platform 100 so that each time the user 154 accesses the platform 100, the preferences, interests, and other information related to the user 154 can be applied to offer selection by the offer selection and display facility 104.

The selection facility may include an interface to the optimization facility, the payment module 108, and other modules and facilities of the alternate payment platform 100 as necessary. The selection facility may also include an interface to one or more databases containing offers, preferences, user 154 transaction history, demographics 174, and the like.

In certain preferred embodiments, the offer selection and display facility 104 may further include web pages for presenting aspects of the offer and or the alternate payment platform 100. The web pages may include user 154 interaction screens related to viewing, evaluating, selecting, and responding to an alternate payment offer. The offer selection and display facility 104 may allow a facilitator 150 to associate new secondary offers 160 with one or more primary vendors 144 so that a user 154 selecting to alternatively pay for the primary offer 164 may select the associated new alternate offer 160. The association may be based at least in part on pricing of the offer, geography, and primary vendor 144 preferences.

The offer selection and display facility 104 may also provide alternate offer 160 tracking so that a user 154 will not see and cannot accept two related secondary offers 160. In an example, a user 154 may accept an alternate offer 160 from Blockbuster from primary vendor A. Although the Blockbuster alternate offer 160 is available from primary vendor B, the user 154 may not be presented the Blockbuster alternate offer 160 through primary vendor B. In this way, the user 154 may not be presented offers that the user 154 cannot accept and the secondary offeror 148 does not have to deny the user's 154 acceptance of the alternate offer 160. This may also maintain the image and integrity of the alternate payment platform 100.

Secondary offerors 148 may provide variable payment for acceptance of an alternate offer 160 based on the quality of the user 154 engagement. An aspect of quality may be geography which may be represented by regional pricing. Offer selection, as may be performed through offer selection and display facility 104 may include regional pricing. Offer selection may be based at least in part on an aspect of the secondary offeror 148 payment terms as they relate to geography. Aspects of secondary offeror 148 payment terms that may affect payments to the platform 100 may include the user location, such as the user country, county, district, postal code, neighborhood, town, city, street, and the like. Offer selection with regional pricing may facilitate an administrator of the platform 100 to quickly and clearly select one or more offers that meet the applicable pricing and geographic constraints.

Offer selection and display facility 104 may include logic for selecting an offer based on location to support regional pricing. The logic may iterate through each user location associated with each potentially related offer and identify offers that target the user 154 location (e.g. country) and have an expected payout (pricing) greater than the minimum acceptable price agreed to by the primary vendor 144 for the primary offer 164. The logic may consider user location, offer availability in the user 154 location, pricing of offer in the user 154 location, primary offer 164 price, and other factors associated with offer selection and display facility 104 as described elsewhere herein. The logic may determine that an offer may not suitably meet selection criteria. In an example, the minimum acceptable price that primary vendor 144 has agreed to accept with respect to a primary offer 164 that is presented to a user 154 in the USA may be $8. In this case, any offer yielding less than this amount to the primary vendor 144 will not be displayed to the user 154.

A user 154 interface associated with the platform 100 such as the primary vendor interface 112, the secondary offeror interface 118, the facilitator interface 122, and the like may include offer selection related input. In an optional example, the platform 100 interface may facilitate displaying offers based on a target user 154 location, an actual user 154 location, and the like. A user 154 target location may include North America which may include the US mainland, portions of Mexico, Canada, Puerto Rico, and the like. Therefore targeting North America may display only those offers that are valid in the geographic regions associated with the target location. Offer selection may be based at least in part on pre-defined offer groups as may be presented through a template that may be based at least in part on a vendor, industry, geography, and the like.

The alternate payment platform 100 may include a payment module 108. The payment module 108 may facilitate transactions associated with payments related to the alternate payment platform 100. The payment module 108 may maintain payment records. The payment records may be maintained permanently such as in one or more databases of the alternate payment platform 100. The payment module 108 may track a user 154 interaction with an accepted offer in such a way that the accepted offer is associated with a secondary offeror 148, a primary vendor 144, a user 154, and a primary offer 164. The payment module 108 may facilitate processing accepted offer approval notifications from the secondary offeror 148 so that payments can be processed and a user 154 can receive the primary offer 164. It should be noted that a variety of conditions may result in an offer 160 being completed. In some cases, any engagement by a user 154 with the offer 160 may be sufficient to complete the offer 160, ranging from viewing the offer 160 to accepting the offer to performing some action, such as actually trying an item 190 associated with the alternate offer 160. For example, in one embodiment an accepted offer may exist once a user 154 has completed data and payment entry, and has agreed to all terms of an offer 160. An accepted offer may or may not require approval by the secondary offeror 148 in order to be completed, and in cases where approval is required, the acceptance of the offer 160 may or may not in fact be approved by the secondary offeror 148. Thus, only some accepted offers require approval. Such may be the case, for example, for offers that involve user 154 payments or credit approval. An accepted offer that requires approval becomes a completed offer once a secondary offeror 148 approves the accepted offer. In some cases the secondary offeror 148 may not approve an accepted offer and, consequently, the accepted offer may be vacated. In other cases any accepted offer is completed. It should be noted that while in some cases there is a distinction between accepted offers and completed offers, in many cases an accepted offer, a completed offer, or an engagement by the user 154 with the secondary offeror 148 are equivalent in the methods and systems disclosed herein; therefore, references to each of these terms should be understood to encompass, in various alternative embodiments, the others, except where context depends on the distinctions described here.

The payment module 108 may process payments associated with offers of the alternate payment platform 100. To process a payment, the payment module 108 may include receiving notification or an indication of engagement by user 154 with an alternate offer 160, such as by accepting or completing an offer, receiving notification of an accepted offer approval, receiving electronic payment (or record of electronic payment) from the secondary offeror 148, sending notification of accepted offer approval to the primary vendor 144, sending electronic payment to the primary vendor 144, sending payment to the facilitator 150, and the like.

The payment module 108 may process a payment associated with a secondary offeror 148. The payment module 108 may access a database or other storage of secondary offeror 148 payment information such as a fixed amount and a variable amount associated with a secondary offeror 148 payment. The payment module 108 may use this information for verifying the secondary offeror 148 payment. The payment module 108 may also determine an amount owed by the secondary offeror 148 and may issue a debit 142 to the secondary offeror 148 for the determined amount. The payment module 108 may determine this for each accepted offer or may determine it on an aggregation of accepted offers as often a once per hour, day, week or other time period. The payment module 108 may process an electronic payment received from the secondary offeror 148 in one or more portions such as a fixed portion and a variable portion. The payment module 108 may verify a fixed portion includes an amount related to an agreed payment for each accepted offer approval. The payment module 108 may verify the secondary offeror 148 electronic payment includes a variable amount such as an amount based on the number of new users 154 who complete an alternative payment offer with the secondary offeror 148. The payment module 108 may access a database or other storage of secondary offeror 148 payment information such as the fixed amount and the variable amount for use in verifying the secondary offeror 148 payment. The payment module 108 may record the secondary offeror 148 payment in a permanent record such as one or more databases of the alternate payment platform 100.

The payment module 108 may process primary vendor 144 payments associated with an accepted offer notification or an accepted offer approval notification by the secondary offeror 148. The payment module 108 may process a payment to be made to the primary vendor 144 that includes one or more portions such as a fixed portion and a variable portion. The payment module 108 may access a database of primary vendor 144 payment information to determine the fixed and/or variable portion of a primary vendor 144 payment. The payment module 108 may process records associated with the primary vendor 144 such as related profit earned by the facilitator 150, number of accepted offers and accepted offer approvals associated with the primary vendor 144, and the like to determine the fixed portion and/or the variable portion to be paid to the primary vendor 144. The payment module 108 may determine an amount owed to the primary vendor 144 for each accepted offer or may determine the amount owed on an aggregation of accepted offers as often a once per hour, day, week or other time period. The payment module 108 may record the primary vendor 144 payment in a permanent record such as one or more databases of the alternate payment platform 100.

The payment module 108 may facilitate processing a payment associated with a user 154. The payment module 108 may send a payment to a user 154 (such as to a user's 154 bank account or other electronic account). The payment module 108 may receive payment from a user 154 (such as from a user's 154 bank account, credit card or other electronic account). The payment module 108 may record the user 154 payment in a permanent record such as one or more databases of the alternate payment platform 100. The payment module 108 may facilitate processing both alternative payments as well as traditional payment processing (such as with a credit card). In embodiments, processing may facilitate a blended or hybrid payment, with a component of traditional payment and a component of alternative payment. In such a "blended" or "hybrid" payment transaction, the payment module 180 may be used in a two-part (or multi-part) transaction; thus, in one part the payment is via a traditional payment method (such as a credit card), while in another part the payment is via the alternate payment platform 100. The payment module 108 may send a payment to a user 154 (such as to a user's 154 bank account or other electronic account). The payment module 108 may receive payment from a user 154 (such as from a user's 154 bank account, credit card or other electronic account). The payment module 108 may record the user 154 payment in a permanent record such as one or more databases of the alternate payment platform 100.

The alternate payment platform 100 may include vendor reporting 110. Vendor reporting 110 may facilitate collection, compilation, delivery, and presentation of information related to a vendor's association with the alternate payment platform 100. Vendor reporting 110 may include reporting related to a primary vendor 144, a secondary offeror 148, a facilitator 150, a primary offer 164, or the like. Vendor reporting 110 may include reporting related to payments, offer traffic, user 154 information such as demographics, and the like. Vendor reporting 110 may collect information from other elements of the alternate payment platform 100 including one or more databases such as a transaction database. Vendor reporting 110 may be performed based on a schedule (such as each day, week, month, quarter, etc.), based on an event, based on a request, and the like. Aspects of vendor reporting 110 may be performed based on different factors. For example, collection and compilation may be performed on a schedule or with each transaction, while delivery or presentation may only be performed on a schedule or when requested.

Vendor reporting 110 may include reports relating a primary offer 164 to one or more secondary offers 160. For example, a report may include a list of secondary offers 160 made to users 154 of the alternate payment platform 100 to purchase a primary offer 164. The report may include results from a plurality of users 154 purchasing the primary offer 164 through the alternate payment platform 100. The list may show each secondary offer completed, the number of times users 154 selected each offer, the number of users 154 who accepted each offer, the number of offer approvals, and other information relevant to assessing a relationship between a primary offer 164 and one or more offers.

Primary vendors 144 may receive reports from vendor reporting 110 that show payments and transactions such as a listing of each transaction and the associated payment sent to the primary vendor 144. The report may include subtotals for primary offers 164, calendar periods, secondary offerors 148, and the like.

Secondary offerors 148 may receive reports from vendor reporting 110 related to offer performance. As described elsewhere herein a user 154 may be presented with a plurality of secondary offers 160. The user 154 may select any alternate offer 160 presented to view details of the alternate offer 160 and the alternate payment platform 100 may record the order of detail view selections made by the user 154. A report may indicate the number of times an alternate offer 160 was selected for detail viewing first, second, third, and so forth. This report may be useful to the secondary offeror 148 in preparation of secondary offers 160 to make them more attractive to the user 154, thereby improving the alternate offer 160 selection position. A secondary offeror 148 may also be interested in a relationship of an alternate offer 160 detail view selection order to acceptance of the alternate offer 160 by the user 154.

Vendor reporting 110 may be useful to a facilitator 150 of the alternate payment platform 100. The facilitator 150 may receive reports comparing secondary offerors 148. Secondary offerors 148 may be compared on a variety of aspects including payments, payment rate, payment time, comparison of payment data to payment terms, and the like. A vendor report that indicates a first vendor generates higher revenue than a second vendor may be useful to a facilitator 150 in managing services provided to the vendors.

Vendor reporting 110 may be useful to a facilitator 150 in managing aspects of the alternate payment platform 100 such as offer optimization and offer selection. A report that indicates a completed offer for a first primary offer 164 (such as virus protection software) is generating a preferred level of payments from the secondary offeror 148. The facilitator 150 may prefer to adjust the offer optimization or offer selection so that the offer is displayed to users 154 purchasing a second primary offer 164 (such as video editing software).

Vendor reporting 110 may also include reports on transaction and viewing activity based on a source of user traffic. Sources of user traffic may include websites, web pages, checkout screens, email, product nag screens, on-line shopping cart abandonment event, and the like. Information such as quantity of user transactions sourced from the traffic source, amount of revenue generated per source, and the like. User traffic source reports may be beneficial to a vendor in assessing the user sourcing strategies so that they vendor can make adjustments to potentially improve revenue.

Vendor reporting 110 may also include reporting capability associated with a self service tier for primary vendors 144, secondary offerors 148, and the like. Vendor reporting 110 may include transaction lists, transaction detail, transaction integrity model display, totals by week, month, touch point, and the like. Reporting 110 may include payment records, pending payments, mix of pending and complete payments, credit extensions, mix of offers, and the like. Extended reporting based on vendor defined variables, aggregating categories underlying transactions, conversion rates, and the like may also be included in vendor reporting 110. Conversion rate metrics may be reported based on aspects such as revenue per visit, revenue per user, number and rate of converted users, and the like. Reporting 110 may also include various reports on user 154 traffic sources and/or statistics associated with traffic sources. Traffic related reports may include presenting information and analysis associated with touch points before the sale, after the sale, during the sale, by email, by website, by intra-product nag screens and messages, physical world sources, mobile users, and metrics such as vendor performance metrics.

An alternate payment platform 100 may include a primary vendor interface 112. The primary vendor interface 112 may interconnect with other aspects of the alternate payment platform 100 such as a primary transaction facility 114, the payment module 108, and the like. The primary vendor interface 112 may facilitate a vendor interacting with the alternate payment platform 100. A primary vendor 144 may access the alternate payment platform 100 through one or more web sites or web pages of the primary vendor interface 112. The primary vendor interface 112 may include a welcome guide that may guide a vendor setting up an account and interacting with the alternate payment platform 100. The vendor may enter information such as primary offer 164 descriptions, primary offer 164 pricing, offer preferences and restrictions, pricing adjustments based on geographic location, pricing adjustments based on a temporary sale, pricing volume discounts, authorization codes or authorization URLs, lists of authorization codes or authorization URLs, rules or guidelines associated with the lists, payment account information, vendor reporting 110 requirements, user 154 information, vendor contact information such as an email address, checkout page URLs, checkout page alternate payment offer options, payee bank details such as bank account number, contact preference information, minimum acceptable price for a completed secondary offer 160 that relates to a primary offer 164, and the like. The primary vendor interface 112 may provide web pages that facilitate a primary vendor 144 viewing and exporting reports generated by vendor reporting 110.

The primary vendor interface 112 may provide security and access controls for employees such as requiring a primary vendor 144 to log in using a user name and/or password to access the alternate payment platform 100.

In an example of another aspect of the primary vendor interface 112, the primary vendor 144 may correspond with a facilitator 150, a secondary offeror 148, a user 154, and the like through a communication aspect of the primary vendor interface 112. In embodiments, the primary vendor interface 112 may be provided as an application programming interface, a service-oriented architecture, or any and all other machine-machine interfaces.

The primary vendor interface 112 may be embodied as an automatic service, such as and without limitation according to a service-oriented architecture or any other computing architecture. In an example, a primary vendor 144 may dynamically configure the minimum acceptable price associated with a primary offer 164 during an alternative payment transaction. In this way, the primary vendor 144 can dynamically configure the payment platform 100 to meet certain business needs such as profit margin etc.

The primary vendor interface 112 may support a primary vendor 144 requesting approval of changes to an aspect of a primary offer 164 such as a minimum price to be paid to the primary vendor 144. The primary vendor interface 112 may be adapted to automatically approve some changes, such as email address, while requiring manual approval, such as by a facilitator 150 for other changes like pricing details, targeted geographies, and the like.

An alternate payment platform 100 may include a primary transaction facility 114. The primary transaction facility 114 may interconnect with other aspects of the alternate payment platform 100 such as a primary vendor interface 112, an accepted offer, a secondary transaction facility 120, a primary offer 164, user 154, and the like. The primary transaction facility 114 may include processing transactions associated with a primary offer 164, an accepted offer, an approved accepted offer, and a user 154.

The primary transaction facility 114 may interface with the primary vendor interface 112 to exchange information related to a primary offer 164. The information exchanged may include information such as a user 154 name and email, user 154 ID, a primary offer 164 identifier, serial number, revision, options, activation or authorization code, URL (such as a link to a licensed copy of a primary offer 164), and order ID of the current user 154 transaction. This information may provide support to primary vendors 144 offering primary offers 164 that are not downloadable and/or are not serialized. This information may also facilitate the primary vendor 144 easily and securely fulfilling a user 154 order of the primary offer 164. In response to a user 154 accepting an offer (or an accepted offer being approved by the secondary offeror 148), the primary transaction facility 114 may send information to the user 154 such as an activation code, or primary offer 164 URL so that the user 154 may complete a transaction to acquire the primary offer 164. The primary transaction facility 114 may receive a list of primary offer 164 authorization codes or URLs and may select, according to rules associated with the list, a code or URL to be sent to the user 154. The primary transaction facility 114 may track and record the codes or URLs selected from the list so that they are not duplicated or improperly used. The information sent from the primary transaction facility 114 to the user 154 may facilitate a user 154 acquiring or using an item 182 associated with a primary offer 164.

The primary transaction facility 114 may receive a notification of an accepted alternate offer 160. The notification of an accepted alternate offer 160 may be conditionally based on one or more aspects of the alternate offer 160. A conditionally accepted offer may need approval by the secondary offeror 148 to be authorized. The primary transaction facility 114 may provide a notification to the user 154 associated with the conditional acceptance. The notification may include information related to instructions for receiving the primary offer 164 once their accepted offer is approved by the secondary offeror 148. The notification may also include a temporary license or code for use of the primary offer 164 for a limited period of time, typically until the offer is approved. The primary vendor interface 112 may also receive payment requests, such as requests for credit 140 associated with a transaction, or with a plurality of transactions.

The alternate payment platform 100 may include a secondary offeror interface 118 such as may be used by a secondary offeror 148. The secondary offeror interface 118 may interconnect with other aspects of the alternate payment platform 100 such as a secondary transaction facility 120, the payment module 108, a secondary offeror 148 and other aspects such as a facilitator interface 122, or one or more databases of the alternate payment platform 100.

The secondary offeror interface 118 may facilitate a vendor interacting with the alternate payment platform 100. A secondary offeror 148 may access the alternate payment platform 100 through one or more web sites or web pages of the secondary offeror interface 118. The secondary offeror 148 may enter information such as offers, offer descriptions, offer pricing, offer preferences and restrictions, pricing adjustments based on geographic location, pricing adjustments based on a temporary sale, pricing volume discounts, payment account information, vendor reporting 110 requirements, user 154 information, and the like. The secondary offeror interface 118 may provide web pages that facilitate a secondary offeror 148 viewing and exporting reports generated by vendor reporting 110.

The secondary offeror interface 118 may also facilitate a secondary offeror 148 providing offer graphics, text, URLs, web pages that may be displayed on a web brow ser as part of presenting secondary offers 160 to users 154. The secondary offeror interface 118 may also facilitate a secondary offeror 148 providing rules or guidelines associated with offers that may be related to offer optimization or offer selection. The secondary offeror interface 118 may also receive payment requests, such as a debit 142 associated with an offer transaction, or with a plurality of transactions.

The secondary offeror interface 118 may provide security such as requiring a secondary offeror 148 to log in using a user name and/or password to access the alternate payment platform 100.

In an example of another aspect of the secondary offeror interface 118, the secondary offeror 148 may correspond with a facilitator 150, a primary vendor 144, a user 154, and the like through a communication aspect of the secondary offeror interface 118.

The secondary offeror interface 118 may be embodied as an automatic service, such as and without limitation according to a service-oriented architecture or any other computing architecture.

A secondary offeror 148 may use a secondary offeror interface 118 to interact directly with the alternate payment platform 100. The secondary offeror interface 118 may be used to activate, configure, manage and monitor an account on the alternate payment platform 100. The secondary offeror interface 118 may display leads generated, advertising statistics, commissions paid, and the like. The secondary offeror interface 118 may facilitate automatic transaction importing, whereby offers are batched together and processed according to rules setup by the secondary offeror 148. In an example, certain transactions may contain multiple payment components based on whether a user 154 provides additional value to the secondary offeror 148 by further engaging with the secondary offeror 148 such as by continuing to make use of the secondary offer 160 after an initial trial period. An alternate payment platform 100 may include a secondary transaction facility 120. The secondary transaction facility 120 may interconnect with other aspects of the alternate payment platform 100 such as a secondary offeror interface 118, one or more selected alternate offer(s) 138, such as selected from a wider range of potentially relevant alternate offers 160, an accepted alternate offer 160, a user 154, and the like. The secondary transaction facility 120 may include processing transactions associated with selected offer(s) 138, an accepted alternate offer 160, a user 154, and the like.

The secondary transaction facility 120 may interface with the secondary offeror interface 118 to exchange information related to an offer. The information exchanged may include information such as a user name and email, an offer identifier, serial number, revision, options, activation or authorization code, URL (such as a link to an authorized offer). In response to a user 154 accepting an alternate offer 160 (or an accepted offer being approved by the secondary offeror 148 in cases where approval is required), the secondary transaction facility 120 may send information to the user 154 such as an activation code, or URL so that the user 154 may access, activate and otherwise have unrestricted use of the primary offer 164.

The secondary transaction facility 120 may include one or more web sites or web pages associated with presenting secondary offers 160 to users 154 of the alternate payment platform 100. The web pages may also facilitate a user 154 evaluating, selecting and completing an alternate offer 160 from a plurality of secondary offers 160 selected by the offer selection and display facility 104. A user 154 may, through one or more web pages of the secondary transaction facility 120, browse and review secondary offers 160 and accept an alternate offer 160. The secondary transaction facility 120 may provide the accepted offer information to the secondary offeror interface 118 for purposes of facilitating the secondary offeror 148 receiving a user's 154 alternate offer 160 acceptance.

The secondary transaction facility 120 may, through the one or more web pages complete the transactions associated with an alternate offer 160 so that the secondary offeror 148 is only notified of the transaction and delivered the relevant user 154 information (including payment information).

The alternate payment platform 100 may include a universal shopping cart that displays to the user 154 aspects of the current transactions such as the primary offer 164, the primary vendor 144, the natural or primary vendor price for the primary offer 164, the alternate offer 160, a status of the alternate offer 160, a payment method, and the like. The universal shopping cart may display, such as through a web browser, a plurality of primary offers 164 selected by the user 154 along with selected secondary offers 160, and other relevant information.

The secondary transaction facility 120 may be embodied as an automatic service, such as and without limitation according to a service-oriented architecture or any other computing architecture.

The alternate payment platform 100 may include a facilitator interface 122. The facilitator interface 122 may facilitate a facilitator 150 interacting with the alternate payment platform 100. The facilitator interface 122 may include one or more web sites or web pages, RSS feeds, and the like. A facilitator 150 may setup and maintenance the alternative payment platform 100 through the facilitator interface 122. The facilitator interface 122 may facilitate viewing and controlling one or more alternate payment platforms 100. The facilitator interface 122 may provide web pages that facilitate a facilitator 150 viewing reports generated by the alternate payment platform 100 such as may be generated by vendor reporting 110. In an example of another aspect of the facilitator interface 122, the facilitator 150 may correspond with a primary vendor 144, a secondary offeror 148, a user 154, other facilitators 150, and the like through a communication aspect of the facilitator interface 122.

A facilitator 150 may manage aspects of the alternate payment platform 100 through the facilitator interface 122. For example, the facilitator 150 may configure aspects of the alternate payment platform 100 such as the secondary transaction facility 120, the payment module 108, and other aspects such as the facilitator interface 122 or one or more databases of the alternate payment platform 100. The facilitator interface 122 may provide web pages through which a facilitator 150 may establish user names and passwords and associate access rights such as access controls to aspects of the alternate payment platform 100 to the user names.

The facilitator interface 122 may provide security and access control such as requiring a facilitator 150 to log in using a user name and/or password to access the alternate payment platform 100.

The facilitator interface 122 may be embodied as an automatic service, such as and without limitation according to a service-oriented architecture or any other computing architecture.

The facilitator interface 122 may facilitate a facilitator 150 sending email to users 154, primary vendors 144, secondary offerors 148, and any other user or participant in the alternate payment platform 100. In an example, the facilitator interface 122 may include a list of system issued emails and a 're-send' button that, when selected by the facilitator 150, automatically resends a selected email to one or more participants.

The facilitator interface 122 may also provide system integrity and rules checking capabilities so that a facilitator 150 may test the alternate payment platform 100. Rules such as minimum credit amount a primary vendor 144 will accept may be violated as aspects of the system change dynamically (such as a secondary offeror 148 changing offer terms). A manual or automatic integrity check to verify transactions are meeting the rules may be beneficial to the primary vendor 144.

The alternate payment platform 100 may also include demo or dummy offers, vendors, and payment models that can be used to test "end-to-end" alternate payments.

The alternate payment platform 100 may include communications between elements of the platform 100. The communications may include information such as data associated with optimized offers 132, selected offers 138, accepted secondary offers 160, debits 142, credits 140, configuration, reporting, correspondence, and the like. The communication may be a result of an action, event, request, schedule or other aspect of the alternate payment platform 100. Communication may include any form of electronic communication such as email, messaging, text messaging, voice mail, e-commerce transaction, file transfer, database transfer, HTTP, TCP/IP, and other types of communication modes, formats, and content. Communication associated with the alternate payment platform 100 may include security aspects such as encoding, encrypting, password protection, SSL, VPN, and other security measures to facilitate protecting communication.

Communications associated with the alternate payment platform 100 may include optimized offers 132. Optimized offers 132 may be communicated between at least an offer optimization facility 102 and an offer selection and display facility 104. Optimized offer 132 communication may include information related to optimization of offer alternatives as may be performed by the offer optimization facility 102 as herein described. In an example, the offer optimization facility 102 may communicate one or more offers that meet one or more optimization criteria such as conversion rate or profitability. The one or more optimized offers 132 may be communicated to the selection facility for inclusion in an offer selection process. The optimized offer 132 communication may include prioritization criteria associated with various aspects of the optimized offer 132 so that the selection facility may include the relevant prioritization criteria in the selection process.

In embodiments an optimized offer 132 may be communicated by the selection facility as a selected offer(s) 138 to the secondary transaction facility 120.

Communications associated with the alternate payment platform 100 may include selected offers 138. Selected offers 138 may be communicated between at least an offer selection and display facility 104 and a secondary transaction facility 120. Selected offers 138 communication may include one or more selected offers 138. The selected offers 138 may be communicated to the secondary transaction facility 120 based on an event, a request, a schedule, or other aspect associated with selecting an offer. The selection facility may send a selected offer(s) 138 communication when a user 154 accesses the alternate payment platform 100 to acquire a primary offer 164 from a primary vendor 144. In such a situation, the selection facility may communicate a list of selected offers 138 that the secondary transaction facility 120 may present to the user 154. The selected offer(s) 138 communication may include HTML representing the selected offers 138. The selected offer(s) 138 communication may include a link or URL to HTML, XML, or other electronic representation of the selected offer(s) 138. A selected offer 138 may be communicated by the secondary transaction facility 120 as becoming an accepted alternate offer 160 based on a user 154 interaction with the secondary transaction facility 120.

Communications associated with the alternate payment platform 100 may include a secondary offer response 134. Communication to respond to an alternate offer 160 may occur among at least the secondary transaction facility 120, the primary transaction facility 114, the offer optimization facility 102, the payment module 108, vendor reporting 110, other aspects of the platform 100 such as one or more databases, and the like. Communicating a secondary offer response 134 may include information associated with at least one transaction facilitated by the secondary transaction facility 120. The alternative payment platform 100 may provide a user 154 with a status of whether an alternate offer 160 has been completed, such as whether the user 154 has completed all actions necessary for engaging with the secondary offeror 148, accepting an alternate offer 160, or the like, or whether an accepted offer has been approved by the secondary offeror 148, in cases where approval is required.

A secondary offer response 134 communication may include an acceptance of an alternate offer 160. The information may include data such as an offer, user 154 identifying information, a primary offer 164, and the like. The information may also include data relevant to the offer evaluation and selection actions associated with the accepted alternate offer 160. Such data may include identification of the accepted alternate offer 160 as pending approval of a secondary offeror 148, time until approval, number of offers reviewed by the user 154 before accepting the alternate offer 160, and the like.

Communicating the accepted alternate offer 160 may occur in real-time between at least the secondary transaction facility 120 and the primary transaction facility 114 so that the user 154 may be provided the primary offer 164 associated with accepting the alternate offer 160. As an example, a user 154 may receive a primary offer 164 of a software program download contingent upon the user 154 accepting an alternate offer 160. The user 154 may review one or more secondary offers 160 such as may be presented by the alternate payment platform 100, and accept one. Upon completion of the user 154 acceptance of the alternate offer 160, which may be facilitated by the secondary transaction facility 120, the communication between the secondary transaction facility 120 and the primary transaction facility 114 may occur. As herein described, the primary transaction facility 114 may receive the communication and provide the user 154 with information about accessing and activating a primary offer 164. The offer optimization facility 102 may receive a communication indicating completion of the alternate offer 160. The information associated with the communication may be included in subsequent offer optimizations. The offer optimization facility 102 may process the information resulting in an indication, for example, that an alternate offer 160 is popular. The communication may also include information about other secondary offers 160 related to the accepted alternate offer 160. The other alternate offer 160 information may be processed to determine their popularity (or lack of popularity). The offer optimization facility 102 may use the information included with and associated with the completed alternate offer communication 158 in any manner of offer optimization as herein described.

The payment module 108 may receive an alternate offer communication 158, such as a communication that an offer has been completed. The payment module 108 may use the communication to identify one or more debits 142 and credits 140 associated with the completed alternate offer 160. Each debit 142 and/or credit 140 may be identified by the communication directly, indirectly, or a combination thereof. In an example, the alternate offer communication 158 may directly identify the secondary offeror 148 and the debit 142 amount to be charged to the secondary offeror 148 in connection with a completed alternate offer 160. The communication may also include a primary offer 164 reference or identifier that the payment module 108 may use to access the relevant primary vendor 144, credit information, user 154 information, and the like from one or more databases. To account for transaction associated errors, the payment module 108 may support charge backs. Charge backs may facilitate recovering credits 140 or adjusting debits 142 for a secondary offering 170 failure. The alternate payment platform 100 may perform a charge back if the alternate payment platform 100 does not receive the debit 142 amount charged to the secondary offeror 148. The total charge back may appear as a reduction in a future credit 140 to a primary vendor 144. The total charge back may appear as a fee to the primary vendor 144. Vendor reporting module 110 may provide reports of transaction activity, including fulfillment errors and charge backs to primary vendors 144, secondary offerors 148, the facilitator 150, and any other participant or regulatory agency legally authorized to review financial transactions of the alternate payment platform 100.

Vendor reporting facility 110 may receive an alternate offer communication 158 indicating completion of an alternate offer 160. Vendor reporting 110 may use the communication to generate one or more vendor reports or other reports as herein described. The communication may trigger one or more actions associated with vendor reporting 110 such as compiling data for vendor reporting 110 and others as herein described.

An alternate offer communication 158 may include any communication about alternate offer(s) 160 among the facilitator 150, secondary offeror(s) 148, and users 154. In one embodiment, such an alternate offer communication 158 may include a search criteria as provided by a user 154. The search criteria may include one or more keywords, primary vendors 144, products, secondary offerors 148, services, payment amounts, payment types, and the like. The search criteria may be used by the alternate payment platform 100 to search one or more databases to identify one or more offers having a relevance to one or more aspects of the search criteria. The alternate payment platform 100 may present, such as through the secondary transaction facility 120, the one or more identified offers to a user 154.

The secondary offer response 134 may include user 154 preferences, opinion, votes, or the like related to one or more secondary offers 160. The alternate payment platform 100 may use these and other aspects of secondary offer communications 158 to facilitate optimizing offers such as through the offer optimization facility 102.

Communications associated with the alternate payment platform 100 may include credit communications. Credit communication may occur among the payment module 108, a facilitator interface 122, a primary vendor interface 112, vendor reporting 110, and the like. Credit communication may include information such as credit 140 amount, identifiers for a transaction, user 154, primary offer 164, primary vendor 144, alternate payment platform 100, facilitator 150, payment plan, and the like. A credit communication may include information that may facilitate an electronic financial transfer between two financial entities. For example, a credit 140 transaction may include an authorization code with which a primary vendor 144 may withdraw an amount identified in the credit communication from a financial account associated with the alternate payment platform 100.

In another example, a credit communication may be an email with a link such as a URL that, when accessed allows a receiver of the email to accept a payment into a PayPal (or similar) account.

A credit communication may occur as a result of an event (such as an accepted alternate offer 160 communication), an action (such as a facilitator 150 instructing the payment facility to issue a credit 140), a schedule (such as a monthly minimum payment), a request (such as a primary vendor 144 requesting a credit 140), or other aspect of the alternate payment platform 100.

A facilitator interface 122 may receive a credit communication. The facilitator interface 122 may receive a notification that a credit 140 has been accrued or deposited. The credit 140 may be associated with an accepted alternate offer 160. The credit 140 may also be associated with a fee of the alternate payment platform 100. In an example of such a fee, the alternate payment platform 100 may require a fee be paid by a primary vendor 144 to establish an account with the platform 100. A fee may be charged to a secondary offeror 148 based on an offer presentation volume, an offer acceptance volume, a number of offers, and the like. The credit communication may indicate the source of the credit 140, the amount, and the time of the credit 140. The credit communication may alternatively indicate that a credit 140 is due (or will soon be due) to the facilitator 150 so that the facilitator 150 as the option to take action regarding the credit 140 due.

A primary vendor interface 112 may receive a credit communication. The primary vendor interface 112 may receive a notification that a credit 140 has been accrued or deposited. The credit 140 may be associated with an accepted alternate offer 160. The credit 140 may also be associated with a fee of the alternate payment platform 100. In an example of such a fee, the alternate payment platform 100 may issue a credit 140 of a required a fee based on an aspect of the business being conducted with the alternate payment platform 100. A fee may be credited back to a primary vendor 144 based on primary offer 164 volume, an offer acceptance volume associated with an alternate offer 160 or a primary offer 164, a number of primary offers 164, and the like. The credit communication may indicate the source of the credit 140, the amount, and the time of the credit 140. The credit communication may alternatively indicate that a credit 140 is due (or will soon be due) to the primary vendor 144 so that the primary vendor 144 has the option to take action regarding the credit 140 due.

Communications associated with the alternate payment platform 100 may include debit communication. Debit communication may occur among a payment module 108, a secondary offeror interface 118, and other aspects of the alternate payment platform 100. Debit communication may include information such as debit 142 amount, identifiers for a transaction, user 154, alternate offer 160, secondary offeror 148, alternate payment platform 100, facilitator 150, payment plan, and the like. A debit communication may include information that may facilitate an electronic financial transfer between two financial entities. For example, a debit 142 transaction may include an authorization code with which a secondary offeror 148 may deposit an amount identified in the credit communication to a financial account associated with the alternate payment platform 100. In another example, a debit communication may be an email with a link such as a URL that, when accessed allows a receiver of the email to deposit a debit 142 into a PayPal account.

A debit communication may occur as a result of an event (such as an accepted alternate offer 160 communication), an action (such as a facilitator 150 instructing the payment facility to issue a debit 142), a schedule (such as a monthly minimum payment request), a request (such as a requesting a secondary offeror 148 requesting to pay a debit 142), or other aspect of the alternate payment platform 100.

A secondary offeror interface 118 may receive a debit communication. The secondary offeror interface 118 may receive a notification that a debit 142 has accrued. The debit 142 may be associated with an accepted alternate offer 160. The debit 142 may also be associated with a fee of the alternate payment platform 100. In an example of such a fee, the alternate payment platform 100 may issue a debit 142 for a required a fee based on an aspect of the business being conducted with the alternate payment platform 100. A fee may be debited from secondary offeror 148 based on alternate offer 160 volume, an offer acceptance volume, a number of secondary offers 160, and the like. The debit communication may indicate the source of the debit 142 request, the amount, and the due date of the debit 142. The debit communication may alternatively indicate that a debit 142 is due (or will soon be due) so that the secondary offeror 148 has the option to take action regarding the debit 142 owed.

The alternate payment platform 100 may include one or more primary vendors 144. Each primary vendor 144 may be uniquely identified by the alternate payment platform 100 so that credits 140, transactions, and the like associated with each primary vendor 144 may be tracked by the alternate payment platform 100. The unique identifier of a primary vendor 144 may be generated by the alternate payment platform 100 when the primary vendor 144 registers.

A primary vendor 144 may make available one or more primary offers 164 such as products or services. The primary vendor 144 may associate one or more products or services with the alternate payment platform 100 to facilitate a user 154 acquiring the product or service through the alternate payment platform 100. Such an association may establish a primary offer 164 of the alternate payment platform 100.

A primary vendor 144 may identify limits of use associated with a primary offer 164. The limits of use may relate to the alternate payment platform 100. The alternate payment platform 100 may, through the primary transaction facility 114 for example, based at least in part on the limits of use, contact a user 154 on a primary vendor's 144 behalf to acquire the product or service using the alternate payment platform 100.

The primary vendor 144 association with the alternate payment platform 100 may embody a variety of interactions. An example of one interaction may include a primary vendor 144 making available a product or service for download or other delivery to the user 154. The primary vendor 144 may receive payment from the alternate payment platform 100 once the alternate payment platform 100 receives notification that the user 154 has successfully completed one or more secondary (alternate payment) offers 160. The platform 100 pays the primary vendor 144 an amount specified by the primary vendor 144 or agreed by the primary vendor 144 and the alternate payment platform 100 facilitator 150.

The primary vendor 144 may receive, such as through the primary vendor interface 112, information associated with an alternate offer 160 transaction and a primary offer 164. The primary vendor 144 may evaluate the received information to determine if the primary vendor 144 should send authorization of a primary offer 164 to the alternate payment platform 100 through the primary vendor interface 112 so that the primary transaction facility 114 can execute the primary offer 164 with the user 154.

The primary vendor 144 may execute a primary offer 164 directly with a user 154. The primary vendor 144 may execute the offering through one or more web pages, emails, messages, texts, calls, letters, packages, and the like.

The primary vendor 144 may include one or more websites or web pages independent of the alternate payment platform 100. One or more of the web pages may be associated with the alternate payment platform 100. The primary vendor 144 may be responsible for maintaining any or all web pages that associate the primary vendor 144 product or service offers with the alternate payment platform 100. Alternatively, the primary vendor 144 may only maintain a link to web pages associated with the alternate payment platform 100 and the facilitator 150 may be responsible for maintaining any or all associated web pages.

A primary vendor 144 may establish cross promotional arrangements with secondary offerors 148. The primary vendor 144 may notify the alternate payment platform 100 of the cross promotional arrangement through the primary vendor interface 112.

The primary vendor 144 may interact with users 154 directly, such as through a primary offer 164. The primary vendor 144 may alternatively interact with users 154 indirectly through the alternate payment platform 100, such as through a primary offer 164. The mode of interaction may be indistinguishable to the user 154 so that the user 154 may perceive that the primary vendor 144 is directly interacting with them at all times.

The alternate payment platform 100 may include one or more secondary offerors 148. Each secondary offeror 148 may be uniquely identified by the alternate payment platform 100 so that debits 142, transactions, and the like associated with each secondary offeror 148 may be tracked by the alternate payment platform 100. The unique identifier of a secondary offeror 148 may be generated by the alternate payment platform 100 when the secondary offeror 148 registers.

A secondary offeror 148 may make available one or more secondary offers 160 to users 154 through the alternate payment platform 100. The secondary offeror 148 may associate one or more products or services with secondary offers 160 of the alternate payment platform 100 to facilitate a user 154 acquiring the product or service through the alternate payment platform 100. Such an association may establish an alternate offer 160 on the alternate payment platform 100.

A secondary offeror 148 may identify limits of use, terms of approval, payment terms, and the like associated with an alternate offer 160. The limits of use, terms of approval, and payment terms may relate to the alternate payment platform 100. In an example, the alternate payment platform 100 may, through the secondary transaction facility 120 and based at least in part on limits of use, contact a user 154 on a secondary offeror's 148 behalf to facilitate acquiring the product or service associated with the alternate offer 160 by using the alternate payment platform 100.

The secondary offeror's 148 association with the alternate payment platform 100 may encompass a variety of interactions. An example of one interaction may include a secondary offeror 148 making available a product or service for download or other delivery to the user 154. The secondary offeror 148 may send payment to the alternate payment platform 100 once the alternate payment platform 100 notifies the secondary offeror 148 that the user 154 has successfully completed one or more secondary (alternate payment) offers 160. The secondary offeror 148 may pay the alternate payment platform 100 an amount specified by the secondary offeror 148 or agreed by the secondary offeror 148 and alternate payment platform 100 facilitator 150.

The secondary offeror 148 may receive, such as through the secondary offeror interface 118, information associated with a user 154 acceptance of an alternate offer 160 transaction. The secondary offeror 148 may evaluate the received information to determine if the secondary offeror 148 should authorize the user 154 acceptance of the alternate offer 160 so that the secondary transaction facility 120 can execute the alternate offer 160 with the user 154.

The secondary offeror 148 may execute a secondary offer 160 directly with a user 154. The secondary offeror 148 may execute the secondary offer 160 through one or more web pages, emails, messages, texts, calls, letters, packages, and the like.

The secondary offeror 148 may include one or more websites or web pages independent of the alternate payment platform 100. One or more of the web pages may be associated with the alternate payment platform 100. The secondary offeror 148 may be responsible for maintaining any or all web pages that associate the secondary offeror 148 product or service secondary offers 160 with the alternate payment platform 100. Alternatively, the secondary offeror 148 may only maintain a link to web pages associated with the alternate payment platform 100 and the facilitator 150 may be responsible for maintaining any or all associated web pages.

A secondary offeror 148 may establish cross promotional arrangements with primary vendors 144. The secondary offeror 148 may notify the alternate payment platform 100 of the cross promotional arrangement through the secondary offeror interface 118.

The secondary offeror 148 may interact with users 154 directly, such as through an alternate offer 160. The secondary offeror 148 may alternatively interact with users 154 indirectly through the alternate payment platform 100, such as through an alternate offer 160. The mode of interaction may be indistinguishable to the user 154 so that the user 154 may perceive that the secondary offeror 148 is directly interacting with them at all times.

The secondary offeror 148 may be an advertiser, promoter, or other entity interested in establishing connections with new customers. The secondary offeror 148 may also be a primary vendor 144 in relation to the alternate payment platform 100. In this way a primary offer 164 may be presented to a user 154 as an alternate offer 160. In an example, a vendor may provide pet products. The user 154 may be acquiring dog food and may be offered to receive the dog food for an alternate payment. The alternate payment may be an offer by the vendor to purchase a new type of dog shampoo, join a mailing list, sign up for a credit card account with the vendor, and the like.

In the preceding example the alternate payment platform 100 may be embodied within an electronic commerce infrastructure of the vendor. Such an embodiment may facilitate the vendor taking advantage of the methods and systems of the alternate payment platform 100 as herein described without having to route electronic commerce through a separate platform. Such an embodiment may be licensed by the vendor from the facilitator 150. The vendor may pay the facilitator 150 a fee for the licensing. The fee may be based on a one time fee, unit pricing, average product cost, offer presentation volume, number of primary 164 and secondary offers 160 supported, calendar time, and any number of other aspects of the vendor business or the alternate payment platform 100.

In embodiments, without limitation, the alternate payment platform 100 may be provided as a service, such as and without limitation according to a service-oriented architecture or any other computing architecture. Use of the service may or may not be associated with a fee, such as and without limitation an access fee, service fee, transaction fee, and the like.

The alternate payment platform 100 may include one or more facilitators 150. Each facilitator 150 may be uniquely identified by the alternate payment platform 100 so that debits 142, transactions, and the like associated with each facilitator 150 may be tracked by the alternate payment platform 100. The unique identifier of a facilitator 150 may be generated by the alternate payment platform 100 when the facilitator 150 registers with the platform 100.

A facilitator 150 may identify limits of use, terms of approval, payment terms, and the like associated with the alternate payment platform 100. In an example, the alternate payment platform 100 may, through one or more interfaces or transaction facilities contact a participant on a facilitator's 150 behalf to facilitate a debit 142, credit 140, or other transaction associated with the alternate payment platform 100.

The facilitator's 150 association with the alternate payment platform 100 may embody a variety of interactions. The interactions may include setup and maintenance of the alternative payment platform 100, viewing and controlling one or more alternate payment platforms 100, viewing reports generated by the alternate payment platform 100 such as may be generated by vendor reporting 110, corresponding with a primary vendor 144, a secondary offeror 148, a user 154, or other facilitators 150.

The facilitator 150 may manage aspects of the alternate payment platform 100 through a facilitator interface 122. For example, the facilitator 150 may configure aspects of the alternate payment platform 100 such as the secondary transaction facility 120, the payment module 108, and other aspects such as the facilitator interface 122 or one or more databases of the alternate payment platform 100. A facilitator 150 may establish user names and passwords and associate access rights to aspects of the alternate payment platform 100 to the user names.

The facilitator 150 may receive payment from the alternate payment platform 100. The payment may be a result of a secondary offeror 148 making a payment, a vendor paying a fee, and the like. The alternate payment platform 100 may credit 140 a facilitator 150 an amount specified by a vendor or agreed by the vendor and the facilitator 150.

The facilitator 150 may receive, such as through the facilitator interface 122, information associated with a vendor registration request. The facilitator 150 may evaluate the received information to determine if the vendor should be authorized to participate in alternate payment platform 100.

The facilitator 150 may contact a participant of the alternate payment platform 100. The facilitator 150 may execute the contact through one or more web pages, emails, messages, texts, calls, letters, packages, and the like.

The facilitator 150 may include one or more websites or web pages independent of the alternate payment platform 100. One or more of the web pages may also be associated with the alternate payment platform 100. The facilitator 150 may be responsible for maintaining any or all web pages that associate the facilitator 150 with the alternate payment platform 100. Alternatively, the facilitator 150 may only maintain a link to web pages associated with the alternate payment platform 100 and the alternate payment platform 100 may be responsible for maintaining any or all associated web pages.

A facilitator 150 may establish cross-promotional arrangements with primary vendors 144, secondary offerors 148, other facilitators 150, other alternate payment platforms 100, payment facilitators 150, offer consolidators, and the like. The facilitator 150 may notify the alternate payment platform 100 of the cross promotional arrangement through the facilitator interface 122.

The facilitator 150 may be an advertiser, promoter, or other entity interested in establishing connections with new customers. The facilitator 150 may also participate in the alternate payment platform 100 as one or more other participants as herein described.

The alternate payment platform 100 may include one or more users 154. Each user 154 may be uniquely identified by the alternate payment platform 100 so that payments, transactions, and the like associated with each user 154 may be tracked by the alternate payment platform 100. The unique identifier of a user 154 may be generated by the alternate payment platform 100 when the user 154 registers.

A user 154 may accept one or more primary offers 164 such as products or services. The user 154 may acquire one or more products or services with the alternate payment platform 100 to facilitate acquiring the product or service, thereby establishing a primary offer 164 of the alternate payment platform 100.

A user 154 may accept limits of use associated with a primary offer 164. The limits of use may relate to the alternate payment platform 100. The user 154 may, through the primary transaction facility 114 for example, based at least in part on the limits of use, contact the alternate payment platform 100 to acquire the product or service from the primary vendor 144.

The user 154 association with the alternate payment platform 100 may embody a variety of interactions. Examples of user 154 interactions may include transactions and other interactions as herein described. User 154 interactions with the alternate payment platform 100 may be associated with a primary transaction facility 114, a secondary transaction facility 120, a primary offer 164, an alternate offer 160, and the like.

The user 154 may receive, such as through the secondary transaction facility 120, information associating an alternate offer 160 with a primary offer 164. The user 154 may evaluate the received information to determine if the user 154 should accept the alternate offer 160. The user 154 may further interact with the alternate payment platform 100 to search for an alternate offer 160 based at least in part on a search criteria. In an example, the user 154 may access a web page of the secondary transaction facility 120 and enter offer search criteria such as keywords. The alternate payment platform 100 may search one or more databases of offers to identify one or more offers that match an aspect of the search criteria. The user 154 may review these identified offers and may select zero or more of them.

The user 154 may execute a primary offer 164 directly with a primary vendor 144. The user 154 may execute the offering through one or more web pages, emails, messages, texts, calls, letters, packages, and the like associated with the primary vendor 144 or the alternate payment platform 100.

The user 154 may interact with other participants of the alternate payment platform 100 such as vendors, facilitators 150, and the like. The mode of interaction may be indistinguishable to the user 154 so that the user 154 may perceive that the participant is directly interacting with them.

The user 154 may be an individual, couple, family, business, non-profit, government agency, government office, public official, and the like.

Aspects of the user 154 may include communications. The communications may be associated with the alternate payment platform 100, a primary vendor 144, a secondary offeror 148, and the like. The communications may include voice, data, images, text, and the like. User 154 voice communication may include voice mail, voice calls, voice recognition, voice prompting, voice responses, and the like. Services and products associated with a primary offer 164 or an alternate offer 160 may be delivered by voice communication. User data communication may include user names, passwords, security codes, financial data, numerical data, and the like. Services and/or products associated with a primary 164 or alternate offer 160 may be delivered by data communications. User image communication may include product and service images, diagrams, installation drawings, user images, document images, electronic signatures, and the like.

Aspects of user 154 communication may include a secondary offer response 134 such as a user 154 acceptance of an alternate offer 160. A user 154 secondary offer response 134 may include user 154 preferences, opinion, votes, or the like related to one or more secondary offers 160. The alternate payment platform 100 may use these and other aspects of secondary offer communications 158 to facilitate optimizing offers such as through the offer optimization facility 102.

A user 154 may communicate a secondary offer response 134 in response to the alternate payment platform 100 presenting one or more selected offers 138 to the user 154. A user 154 may alternatively communicate a secondary offer response 134 in response to a communication by the alternate payment platform 100, a primary vendor 144, a secondary offeror 148, or the like requesting user 154 input. Such a communication request may include an alternate offer 160 that the user 154 may accept in exchange for the user 154 input.

A user 154 communication may include an alternate offer 160. A user 154 alternate offer 160 communication may include presentation of one or more secondary offers 160. Such communication may occur through a website or web pages presented to a user 154 web browser. Web pages associated with an alternate offer 160 user 154 communication may include web pages for evaluating and selecting an offer. The web pages may include a screen in which a vendor makes an item available, a product confirmation screen, a help screen, a user 154 contact input screen, a default screen of offerings, a list of all offerings screen, a category or country filter menu, an offer selection confirmation screen, and the like. The user 154 alternate offer 160 communication may include images, text, data, voice, and any combination thereof.

The alternate payment platform 100 may include a primary offer 164. The primary offer 164 may be any combination of a product, service, information, discount, gift certificate, loan, financial equity, real-estate, futures contract, membership, lottery entry, vacation, and the like. The primary offer 164 may be represented by a physical item such as a book, a non-physical item such as electronic content (e.g. computer game, image, password), and the like. The value of the primary offer 164 may be determined based on a market valuation or may be set by the primary vendor 144. However, the primary offer 164 value may be unknown such as with a lottery ticket that may be worthless (a losing ticket), moderate value (small winning), or large value (jackpot winner).

The primary offer 164 may include limits such as use limits associated with the offer. Use limits of a primary offer 164 may be related to an aspect of the offer such as time, quantity of uses, functionality, output, accuracy, advertising, and the like.

A primary offer 164 may include one or more of a Book, DVD, Magazine & Newspaper, Music, Textbook, Video download, VHS, Apparel & Accessories, Jewelry & Watches, Shoes, Computer, Office, Software, Audio & Video, Camera & Photo, Cell Phone & Service, Computer & Video Game, Musical Instrument, Generally, Consumer Electronics, Food, Gourmet Food, Grocery, Pet Supply, Beauty, Heath & Personal Care, Bed & Bath, Furniture & Decor, Home Improvement, Kitchen, Domestic/Home, Outdoors, Garden, Baby, Toy & Game, Exercise & Fitness, Sports & Outdoors, Automotive, Industrial & Scientific, Tools & Hardware, Fresh Flowers & Indoor Plants, Regular Sale Item, Outlet Sale Item, Daily Special Items, Utility, Movies, audiobooks, a media subscription (e.g. a movielink-.com subscription or the like), music tracks, music collections, virtual goods such as credits, and the like.

A primary offer 164 may include a service such as Accounting, Computer, Consulting, Dating/Match-making, Other Professional, and the like.

A primary offer 164 may include a type of offer such as Specialty Good, Unsought Good (e.g. something that requires a hard sell), Perishable Good, Durable Good, Non-Durable or Consumable Good, Capital Good, Parts and Materials, Supplies and Services, Commodities, By-primary offers 164, and the like.

A primary offer 164 may be associated with a Gift, Baby Registry, e-Card, Gift Certificate, Shopping List, Wedding Registry, Wish List, Media Library, Associate Program, Affiliate Program, Subscription, Web store, Networking site (based on "interests"), Search Query, a blog, or the like.

A primary offer 164 may be associated with a promotion such as Advertising, Sales Promotion, Publicity, Personal selling, Internet promotion, In-store (e.g. voucher & special offers), Loyalty card offer, Competition (in-store, on packaging, or online), Packaging, Press, TV advertising, Radio, Cinema advertising, Poster/Billboard, Pop-up advertising, Podcast advertising, Email offer, Blog advertising, and the like.

The primary offer 164 may include office and personal electronics products; computers such as desktops, notebooks, tablet PCs, personal digital assistants (PDA), servers, workstations, fax servers, internet-cache servers, barebones systems, POS/kiosk systems; monitors & displays such as CRT monitors, LCD monitors, plasma monitors, projectors; printers such as color laser, mono laser, ink-jet, photo printers, multifunction units, dot-matrix, plotters, label printers, bar code printers, specialty printers, receipt printers, scanners, point-of-sale printer; software such as antivirus software, business software, development tools, education & entertainment, graphics & publishing, internet software, network management software, OS & utilities, security; electronics such as digital cameras, film cameras, camcorders, security cameras, games, digital media players, televisions, home audio, home video, home furniture, GPS, telephony, appliances, office equipment; networking such as adapters, client, communications, conferencing, hubs, infrastructure, KVM switches, modems, routers, security, software, switches, test equipment, wireless; storage devices such as CD drives, CD-DVD duplicators, CD-DVD servers, DVD drives, fibre channel switches, flash drives, floppy drives, hard drives, magneto-optical drives, media, network attached storage, removable drives, SAN equipment, storage enclosures, tape automation, tape drives; accessories such as cables, memory, flash memory, power & surge protection, computer components, audio hardware, video hardware, keyboards & mice, batteries, carrying cases, computer accessories, printer supplies, CD-DVD accessories, monitor & display accessories, mounting hardware, camera-camcorder accessories, PDA accessories, network accessories, projector accessories, scanner accessories, computer furniture, phone, cellular accessories, office & cleaning supplies, and so forth.

The primary offer 164 may also include AV supplies & equipment, basic supplies & labels, binders & accessories, janitorial, business cases, calendars & planners, custom printing, desk accessories, executive gifts, filing & storage, paper, forms, envelopes, pens, pencils & markers, printer & fax supplies, promotional products, school supplies, phones & accessories, or other products found in office, school, or home environments.

The primary offer 164 may include items such as groceries, produce, cuts of meat, deli products, health and beauty products, clothing, towels, pillows, artwork, models, tableware, collectibles, antiques, potted plants, financial instruments such as bonds, certificates of deposit, currency, and the like.

A secondary offer 160 may include a trial of downloaded media. The downloaded media may include movies, movie trailers, movie collections, still photos, slide shows, audio books, electronic books (e-books), music, music tracks, music collections (albums), and the like. A trial of the downloaded media may include a license for a user 154 to use the downloaded media for a limited time, or may include access to a portion of the downloaded media (such as a portion of a movie). Another form of trial of downloaded media may include a chapter of an audio book or e-book, an issue of a periodical publication, and so on.

A primary offer 164 may be delivered by download, file sharing, FTP access, email, email attachment, messaging, phone call, streaming audio, streaming video, and the like. A primary offer 164 may be delivered in installments such as chapters, sections, and the like. Primary offer 164 installments may be delivered on a schedule, based on an event, upon request, by default, and the like. A primary offer 164 may be a physical item or items, or it may be a digital item or items.

A physical primary offer 164 may be delivered to an address. The address may be specified by the user 154. The delivery may be by common carrier, US mail, courier, freight, and the like. The delivery may be subject to terms such as shipping charges, shipping times, and the like. A physical primary offer 164 may include compatibility limits such as a physical size, weight, a computer memory size, a computer disk storage size, a computer operating system, a computer browser, and any other attribute or aspect of a computing facility.

The alternate payment platform 100 may include a primary offer 164. A primary offer 164 may facilitate a user 154 acquiring, accessing, receiving, activating, or otherwise using a primary offer 164. A primary offer 164 may result in activating, extending, or making permanent a use of the primary offer 164. In an example, a primary offer 164 may allow a user 154 to use a product (e.g. software) or a service (e.g. access to an investment advice website) for a limited time. As a result of accepting an alternate offer 160, a user 154 of the alternate payment platform 100 may receive through a primary offer 164, a copy of the software that does not have a time limit, or a password to allow permanent access to the investment website. Although the example here is for the user 154 to receive a primary offer 164 that makes the use of the primary offer 164 permanent, other types of use extension and activation may also be included in the primary offer 164. The password may provide a one year membership to the investment website, allowing the user 154 to access the investment website for 12 months. The software may be useable permanently but support or updates may be limited to 90 days. Many other primary offerings 168 may be apparent from these examples and are included herein.

A primary offer 164 may facilitate acquiring a primary offer 164. A user 154 may use the alternate payment platform 100 when accepting a primary offer 164, such as when performing an ecommerce transaction to acquire, lease, or temporarily use the primary offer 164. The primary offer 164 may provide information to the user 154 that may allow a user 154 to acquire the primary offer 164. Such information may include a proof of purchase, an in-store pickup authorization, a payment authorization, a certificate redeemable for the primary offer 164, a credit 140 to an account, and the like. In an example, a user 154 may accept an alternate offer 160 to purchase a primary offer 164 with the user's 154 credit 140 account provided by the primary vendor 144. The alternate offer 160 may further provide a refund of the primary offer 164 purchase price to the credit 140 account. The primary offer 164 may include information confirming the purchase price being charged to the credit 140 account and the refund.

In another example, the primary offer 164 may include primary offer 164 package shipment confirmation and tracking information. The shipping information in the primary offer 164 could facilitate a user 154 receiving the primary offer 164. If the primary offer 164 is a gift for another individual from the user 154, the primary offer 164 could represent a confirmation of shipment of the gift.

A primary offer 164 may include a temporary extension of authorization for use of the primary offer 164 associated with a conditionally accepted alternate offer 160. The extension may be based at least on a time required for a secondary offeror 148 to complete an assessment of a user's 154 acceptance of the alternate offer 160. If the secondary offeror 148 approves the accepted alternate offer 160, the primary offer 164 may include a permanent extension, replacement of authorization, or the like. The primary transaction facility 114 may provide a notification to the user 154 associated with the conditional acceptance. The notification may include information related to instructions for receiving the primary offer 164 once the user's 154 accepted offer is approved by the secondary offeror 148.

A primary offer 164 may be communicated to the user 154 by the primary vendor 144, the alternate payment platform 100, or a combination thereof.

The alternate payment platform 100 may include an alternate offer 160. The alternate offer 160 may be any combination of a product, service, information, discount, gift certificate, loan, financial equity, real-estate, futures contract, membership, lottery entry, vacation, and the like. The alternate offer 160 may be represented by a physical item such as a book, a non-physical item such as electronic content (e.g. computer game, image, password), and the like. The value of the alternate offer 160 may be determined based on a market valuation or may be set by the secondary offeror 148. However, the alternate offer 160 value may be unknown such as with a lottery ticket that may be worthless (a losing ticket), moderate value (small winning), or large value (jackpot winner).

The alternate offer 160 may include limits such as use limits associated with the offer. Use limits of an alternate offer 160 may be related to an aspect of the offer such as time, quantity of uses, functionality, output, accuracy, advertising, and the like.

An alternate offer 160 may include one or more of a Book, DVD, Magazine & Newspaper, Music, Textbook, Video download, VHS, Apparel & Accessories, Jewelry & Watches, Shoes, Computer, Office, Software, Audio & Video, Camera & Photo, Cell Phone & Service, Computer & Video Game, Musical Instrument, Generally, Consumer Electronics, Food, Gourmet Food, Grocery, Pet Supply, Beauty, Heath & Personal Care, Bed & Bath, Furniture & Decor, Home Improvement, Kitchen, Domestic/Home, Outdoors, Garden, Baby, Toy & Game, Exercise & Fitness, Sports & Outdoors, Automotive, Industrial & Scientific, Tools & Hardware, Fresh Flowers & Indoor Plants, Regular Sale Item, Outlet Sale Item, Daily Special Item, Utility, Movies, audio books, a media subscription (e.g. a movielink.com subscription or the like), music tracks, music collections, and the like.

A primary offer 164 may include a service such as Accounting, Computer, Consulting, Dating/Match-making, Other Professional, and the like.

An alternate offer 160 may include a type of offer such as Specialty Good, Unsought Good (e.g. something that requires a hard sell), Perishable Good, Durable Good, Non-Durable or Consumable Good, Capital Good, Parts and Materials, Supplies and Services, Commodities, By-primary offers 164, and the like.

An alternate offer 160 may be associated with a Gift, Baby Registry, e-Card, Gift Certificate, Shopping List, Wedding Registry, Wish List, Media Library, Associate Program, Affiliate Program, Subscription, Web store, Networking site (based on "interests"), Search Query, a blog, or the like.

An alternate offer 160 may be associated with a promotion such as Advertising, Sales Promotion, Publicity, Personal selling, Internet promotion, In-store (e.g. voucher & special offers), Loyalty card offer, Competition (in-store, on packaging, or online), Packaging, Press, TV advertising, Radio, Cinema advertising, Poster/Billboard, Pop-up advertising, Podcast advertising, Email offer, Blog advertising, and the like.

The alternate offer 160 may include office and personal electronics products; computers such as desktops, notebooks, tablet PCs, personal digital assistants (PDA), servers, workstations, fax servers, internet-cache servers, barebones systems, POS/kiosk systems; monitors & displays such as CRT monitors, LCD monitors, plasma monitors, projectors; printers such as color laser, mono laser, ink jet, photo printers, multifunction units, dot-matrix, plotters, label printers, bar code printers, specialty printers, receipt printers, scanners, point-of-sale printer; software such as antivirus software, business software, development tools, education & entertainment, graphics & publishing, internet software, network management software, OS & utilities, security; electronics such as digital cameras, film cameras, camcorders, security cameras, games, digital media players, televisions, home audio, home video, home furniture, GPS, telephony, appliances, office equipment; networking such as adapters, client, communications, conferencing, hubs, infrastructure, KVM switches, modems, routers, security, software, switches, test equipment, wireless; storage devices such as CD drives, CD-DVD duplicators, CD-DVD servers, DVD drives, fibre channel switches, flash drives, floppy drives, hard drives, magneto-optical drives, media, network attached storage, removable drives, SAN equipment, storage enclosures, tape automation, tape drives; accessories such as cables, memory, flash memory, power & surge protection, computer components, audio hardware, video hardware, keyboards & mice, batteries, carrying cases, computer accessories, printer supplies, CD-DVD accessories, monitor & display accessories, mounting hardware, camera-camcorder accessories, PDA accessories, network accessories, projector accessories, scanner accessories, computer furniture, phone, cellular accessories, office & cleaning supplies, and so forth.

The alternate offer 160 may also include AV supplies & equipment, basic supplies & labels, binders & accessories, janitorial, business cases, calendars & planners, custom printing, desk accessories, executive gifts, filing & storage, paper, forms, envelopes, pens, pencils & markers, printer & fax supplies, promotional products, school supplies; phones & accessories, or other products found in office, school, or home environments.

The alternate offer 160 may include items such as groceries, produce, cuts of meat, deli products, health and beauty products, clothing, towels, pillows, artwork, models, tableware, collectibles, antiques, potted plants, financial instruments such as bonds, certificates of deposit, currency, and the like.

A secondary offer may include a trial of downloaded media. The downloaded media may include movies, movie trailers, movie collections, still photos, slide shows, audio books, electronic books (e-books), music, music tracks, music collections (albums), and the like. A trial of the downloaded media may include the user 154 receiving a license to use the downloaded media for a limited time, may include access to a portion of the downloaded media (such as a portion of a movie), and so on. Another form of trial of downloaded media may include a chapter of an audio book or e-book, an issue of a periodical publication, and the like.

An alternate offer 160 may be delivered by download, file sharing, FTP access, email, email attachment, messaging, phone call, streaming audio, streaming video, and the like. An alternate offer 160 may be delivered in installments such as chapters, sections, and the like. Alternate offer 160 installments may be delivered on a schedule, based on an event, upon request, by default, and the like. An alternate offer 160 may be a physical item or items, or it may be a digital item or items.

A physical alternate offer 160 may be delivered to an address. The address may be specified by the user 154. The delivery may be by common carrier, US mail, courier, freight, and the like. The delivery may be subject to terms such as shipping charges, shipping times, and the like. A physical alternate offer 160 may include compatibility limits such as a physical size, weight, a computer memory size, a computer disk storage size, a computer operating system, a computer browser, and any other attribute or aspect of a computing facility.

The alternate payment platform 100 may include a secondary offering 170. A secondary offering 170 may facilitate a user 154 acquiring, accessing, receiving, activating, or otherwise using an alternate offer 160. A secondary offering 170 may result in activating, extending, or making permanent a use of the alternate offer 160. In an example, an alternate offer 160 may allow a user 154 to use a product (e.g. software) or a service (e.g. access to an investment advice website) for a limited time. As a result of accepting an alternate offer 160, a user 154 of the alternate payment platform 100 may receive through a secondary offering 170, a copy of the software that does not have a time limit, or a password to allow permanent access to the investment website. Although the example here is for the user 154 to receive a secondary offering 170 that makes the use of the alternate offer 160 permanent, other types of use extension and activation may also be included in the secondary offering 170. The password may provide a one year membership to the investment website, allowing the user 154 to access the investment website for 12 months. The software may be useable permanently but support or updates may be limited to 90 days. Many other secondary offerings 160 may be apparent from these examples and are included herein.

A secondary transaction facility 120 may facilitate completing an execution of an alternate offer 160. The alternate offer 160 may facilitate performing an ecommerce transaction to acquire, lease, or temporarily use the alternate offer 160. The secondary transaction facility 120 may provide information to the user 154 that may allow a user 154 to complete an execution of the alternate offer 160. Such information may include a proof of purchase, an in-store pickup authorization, a payment authorization, a certificate redeemable for the primary offer 164, a credit 140 to an account, and the like. In an example, a user 154 may accept an alternate offer 160 to purchase a primary offer 164 by opening a credit 140 account with the secondary offeror 148.

An alternate offer 160 may further provide a refund of the primary offer 164 purchase price to the credit 140 account. The alternate offer 160 may include information confirming the purchase price being charged to the credit 140 account and the refund.

In another example, the alternate offer 160 may include alternate offer 160 package shipment confirmation and tracking information. The shipping information in the alternate offer 160 could facilitate a user 154 receiving the alternate offer 160. If the alternate offer 160 is a gift for another individual from the user 154, the secondary offering 170 could represent a confirmation of shipment of the gift.

An alternate offer 160 may include a temporary extension of authorization for use of the alternate offer 160 associated with a conditionally accepted alternate offer 160. The extension may be based at least on a time required for a secondary offeror 148 to complete an assessment of a user's 154 completion of the alternate offer 160. If the secondary offeror 148 approves the accepted alternate offer 160 (in cases where approval is required), the alternate offer 160 may include terms for a permanent extension, replacement of authorization, or the like. The secondary transaction facility 120 may provide a notification to the user 154 associated with the conditional acceptance. The notification may include information related to instructions for receiving the alternate offer 160 once their accepted offer is approved by the secondary offeror 148.

An alternate offer 160 may be communicated to the user 154 by the secondary offeror 148, the alternate payment platform 100, or a combination thereof.

The alternate payment platform 100 may include promotions. Promotions may be associated with a primary offer 164, a primary vendor 144, an alternate offer 160, a secondary offeror 148, a facilitator 150, the alternate payment platform 100, and the like. In an example, a primary offer 164 may include a book. A user 154 may be offered a promotion of a DVD version of the book in exchange for the user 154 evaluating alternate offers 160 via the alternate payment platform 100. Upon completion of an evaluation of the alternate platform 100 (which may include the user 154 providing input and necessary user 154 contact information), the alternate payment platform 100 may facilitate delivering the DVD to the user 154.

An alternate offer 160 presented to a user 154 of the alternate payment platform 100 may be associated with this primary offer 164 to develop a promotion that may include a DVD version of the primary offer 164 book. The DVD may be provided to the user 154 once the user 154 has accepted an alternate offer 160. The DVD may be in addition to any product or service included with the alternate offer 160.

The alternate payment platform 100 may include an offer bidding module 124. The offer bidding module 124 may be associated with a secondary offeror 148 through a secondary offeror interface 118, an offer search module 130, and other aspects of the alternate payment platform 100 such as one or more databases. The offer bidding module 124 may facilitate bidding related to secondary offers 160. Bidding may be useful in determining alternate offer 160 placement in a presentation of secondary offers 160 to a user 154. Bidding may also be useful to the alternate payment platform 100 in selecting one or more offers to present to a user 154. Bidding may also facilitate optimizing secondary offers 160.

The bidding module 124 may receive bids from secondary offerors 148 that relate to specific secondary offers 160, or that relate to any alternate offer 160 from the secondary offeror 148. The bidding module 124 may compare bids to facilitate ranking the bids and associated offers based at least partially on the bid amount. A bid may include a presentation amount to be paid upon confirmation of a placement to a user 154, an acceptance amount to be paid upon user acceptance of the offer, an approval amount to be paid upon approval of the user's 154 acceptance of the offer, and any other amount such as a marketing fee, a transaction fee, and the like.

Bid amounts may be based on quality of users 154 accepting secondary offers, volume of use acceptances, and the like. In an example, a user 154 from a particular primary vendor 144 may be significantly more affluent and thus have a greater ability to transact with a secondary offeror 148, than a user 154 from a different primary vendor. The secondary offeror 148 may be willing to bid more for this user 154 from the higher quality primary vendor 144.

The bidding module 124 may process the bids including associating bids with secondary offers 160, secondary offerors 148, and the like for use by the offer search facility 130, the offer optimization facility 102, offer selection and display facility 104, and the like. The bidding module 124 may also store information such as bids, bid history, and the like in one or more databases of the alternate payment platform 100.

For example and without limitation, a participant of the alternate payment platform 100 such as a secondary offeror 148 may place a bid with the bidding module 124 to obtain a preferred placement of an offer in a presentation of offers to a user 154. The bidding module 124 may determine that an aspect of this bid, such as the amount of the bid, enables the alternate payment platform 100 to fulfill the preferred placement of the offer associated with the bid. Upon selection of the offer by the offer selection and display facility 104, and presentation of the offer by the secondary transaction facility 120, the offer would be presented to the user 154 in the preferred placement. The preferred placement may include preferred presentation such as ranking in a list, highlighting, images, font, animation, and the like that may differentiate this offer from other offers.

A secondary offer's 160 placement preference may be affected by bid flexibility. Bid flexibility may be related to an alternate offer 160, a secondary offeror 148, or other elements of the secondary offer process. Bid flexibility may be specified when a bid is placed or may be based on a secondary offeror 148 preference. Bid flexibility may include a maximum number of times the bid will automatically be increased (kicks) to keep pace with other bids. Bid flexibility may also include an amount per kick, a total kick amount, a maximum bid amount, or any combination thereof.

A secondary offeror 148 may specify the bid flexibility as a preference that may apply to all secondary offer bids placed by the advertiser. The secondary offeror 148 may use the secondary offeror interface 118 to specify bid flexibility preferences.

Secondary offers 160 associated with highly flexible bids may be provided higher placement preferences. For example, a bid with a 50% upside bid amount flexibility may be placed ahead of an identical bid with only 20% upside bid amount. In this way, secondary offerors 148 who are willing to spend more per secondary offer may be receive improved placement relative to other secondary offerors 148.

In addition to considering bid flexibility in alternate offer 160 placement, the performance of the secondary offeror 148 and the alternate offer 160 may be included in placement preference. It may be understood that a factor in the likelihood that a secondary offer 148 will be accepted is a previous performance measurement associated with the offer. For example, a secondary offer with a high number of acceptances from previous placements may be highly placed in a new secondary offer. Also, a high number of alternate offer 160 placements may improve the placement of future secondary offers 160 from the secondary offeror 148.

Some factors that may affect a secondary offer's 160 placement may also affect amounts debited from a secondary offeror 148 that is associated with the secondary offer's 160 placement. Factors such as click-throughs (user selections) of secondary offers 160 may indicate a relevance and/or user interest in the secondary offer 160. Although a high (or relatively advantageous) placement of an alternate offer 160 may be valuable to a secondary offeror 148, engaging the user 154 in further evaluation of the alternate offer 160 may be of value even if the user 154 does not accept the alternate offer 160. For example, a user 154 who clicks through (selects) an alternate offer 160 may be presented with further details about the offer as well as other information that the secondary offeror 148 may deem to be relevant. In this way, the secondary offeror 148 may gain the attention of the potential new customer. This may provide some measurable value to the secondary offeror 148.

The secondary offeror 148 may be willing to pay a fee based on click through rates as measured daily, weekly, monthly, or the like. The fee that the secondary offeror 148 is willing to pay may be debited 142 from the secondary offeror 148 on a schedule, based on a volume, based on an event such as an alternate offer 160 acceptance, and so on. A debit amount may be associated with each click through and may be accumulated over time (an accumulation interval may include hours, day, week, month, et cetera) by the secondary transaction facility 120. The debit amount may be debited 142 at least once per accumulation interval. Alternatively, a secondary offeror 148 may specify that click through debits may be accumulated and added to debits made for accepted offers.

In an example, the alternate payment platform 100 may receive a user 154 request for an ecommerce transaction. The alternate payment platform 100 may select a non-monetary compensation offer through an automated ecommerce bidding process included in the bidding module 124. The alternate payment platform 100 may present the selected non-monetary compensation offer to the user 154.

The bidding module 124 may be embodied as an automatic service, such as and without limitation according to a service-oriented architecture or any other computing architecture.

The bidding module 124 may facilitate a secondary offeror 148 bidding for alternate offer 160 placement. The bidding module may interact with the primary transaction facility 114 and other elements of the alternate payment platform 100 such as user demographics 174, user transaction history (including alternate payment history), one or more databases of the alternate payment platform 100, the offer optimization facility 102, and the offer selection and display facility 104, and any other element as needed to facilitate offer bidding.

The bidding module 124 may compute a consumer score for a user 154 seeking to alternatively purchase a primary offer 164. The consumer score may be useful in facilitating offer bidding. To compute the consumer score, the bidding module 124 may assess information related to the primary offer 164 and the active user 154. The bidding module 124 may receive information about a primary offer transaction from the primary transaction facility 114. The information may include the primary vendor 144, primary offer 164, and the user 154. The bidding module may retrieve the user's 154 transaction history from one or more of the databases of the alternate payment platform 100. The bidding module may also retrieve the user's 154 demographics 174. The bidding module may combine the information about the primary offer 164, the user 154 transaction history, and the active user demographics 174 to compute the user's 154 consumer score. In an example, an user 154 may be seeking to alternatively purchase a subscription to Zagat.com. The user's 154 transaction history may show the user accepted secondary offers 160 for three previous transactions with an average alternate offer 160 user cost of $75. The user's 154 demographics may indicate the user's 154 address as an upper middleclass suburb of Boston, Mass. Based on this example user information, the bidding module 124 may compute a consumer score as eight points out of a possible ten points. The bidding module 124 may present this consumer score to a plurality of secondary offerors 148 through the bidding module 124 so that the secondary offeror 148 may bid to present an alternate offer 160 to the user 154. The consumer score may refer to one or more defined characteristics of the user 154. A high consumer score may be a strong indication of that particular user 154 characteristic while a low consumer may represent an absence of that particular characteristic. The consumer score may be an aggregation of multiple similar consumer scores relating to different characteristics of the user 154. Furthermore, these scores may be valued differently by secondary offerors 148 such that one secondary offeror 148 may pay a premium for a particular score while another secondary offeror 148 will not. In this way, a secondary offeror 148 can bid on the consumer scores that best relate to type of user 154 the secondary offer 148 seeks to attract. In this document consumer score refers to an individual consumer score relating to a particular characteristic of the user 154, or an aggregation of consumer scores that may be refer to the overall characteristics of the user 154 and may be the weighted sum of the individual consumer scores.

A secondary offeror 148 may place multiple bids for multiple different consumer scores relating to various aspects of a user 154. For example, a secondary offeror 148 may place a bid for high consumer scores relating to the female gender and may also place a bid for high consumer scores relating to high household income.

Some or all of the plurality of secondary offerors 148 may bid to offer the user 154 an alternate offer 160. The secondary offerors 148 may adjust a bid amount based on the consumer score of the user 154. For example, a secondary offeror 148 may bid $20 to offer an alternate offer 160 to an user 154 with a consumer score of four. However, the same secondary offeror 148 may bid $50 for an user 154 with a consumer score of eight. The secondary offerors 148 may also include a conversion rate associated with a bid, where the conversion rate is a measure of the likelihood that a secondary offer 160 (associated with the bid) will be completed by the target user 154 (associated with the bid). An expected value based on a function of the bid and the conversion rate may be computed by the bidding module 124 for each bid received. The secondary offeror 148 bid, rate, expected value, and alternate offer 160 information may be shared with the optimization facility 102. Alternatively, the expected value may not be computed by the bidding module 124. Instead, the optimization facility may compute the expected value.

Through the bidding module 124 computation of a consumer value for the user 154, and the secondary offerors 148 placing bids and associated conversion rates for the user 154, the optimization facility 102 may now optimize among secondary offers 160 each with a computed expected value. Offer optimization may be directed toward maximizing the expected value that may be shared with the primary vendor 144 for the user transaction. To maximize the expected value of a user transaction, the offer optimization facility 102 may rank the offers based on expected value so that the offer selection and display facility 104 may select the top ranked offers for prominent presentation to the user 154. In an example, the table below shows bids and conversion rates of six secondary offerors 148 for the user with a consumer rating of eight/ten in the example above.

Secondary Offer Bid Example
TABLE-US-00002 [0308] Secondary offeror Bid Amount Conversion Rate Expected value Cingular $50 5% $2.50 Verizon $55 4% 2.20 Discover $80 2% 1.60 American Express $120 1% 1.20 RealRhapsody $30 10% 3.00 Stamps.com $40 5% 2.00

The offer optimization facility 102 (or the bidding module 124) may compute the expected value as shown in the table and forward the Cingular and the RealRhapsody offers as optimized offers 132 to the offer selection and display facility 104. The selection and display facility 104 may select one or more of the optimized offers 132 and send them to the secondary transaction facility 120 as selected offer(s) 138 for presentation to the user 154. The remaining four offers may not be presented to the user 154 unless the user rejects the Cingular and the RealRhapsody secondary offers 160. However, the remaining four offers may be presented to the user 154 along with the Cingular and RealRhapsody offers in a less prominent way such as by smaller print, lower order in a list, and the like. The bidding module 124 may provide real-time feedback to the secondary offeror 148 as to the potential impact in offer performance that may result from an increased bid. For example, a message may be sent to the secondary offeror 148 indicating that an increase of a given amount will make a particular alternate offer 160 the highest ranked offer on a page.

The alternate payment platform 100 may include an offer search facility 130. The offer search facility 130 may communicate with aspects of the alternate payment platform 100 such as a bidding module 124, the offer optimization facility 102, the offer selection and display facility 104, various databases of the alternate payment platform 100, external offer databases 152, and the like. The offer search facility 130 may comprise search techniques such as text string matching, to identify one or more offers from a plurality of offer databases 152. Searching by the offer search facility 130 may be performed as a result of an event or a request. A search event may include receiving a user 154 request for an ecommerce transaction, such as acquiring a primary offer 164 using the alternate payment platform 100. A search event may be a vendor registering with the alternate payment platform 100, a vendor introducing the alternate payment platform 100 to a new primary offer 164 or a new alternate offer 160, a user 154 rejecting all offers presented through the secondary transaction facility 120, a schedule such as a date and time, and the like. The search request may include any participant, including a user 154 of the alternate payment platform 100 sending the alternate payment platform 100 a request to perform an offer search.

The offer search facility 130 may maintain a directory of offer databases 152. Vendors and facilitators 150 may provide input to the directory so that new offer databases 152 may be searched by the search facility 130. The search facility 130 may search through specific offer databases 152 such as those in the directory. Additionally, the search facility 130 may also search throughout a network, such as the internet, for offers or offer databases 152 that have a relevance to the alternate payment platform 100.

Changes to offer databases 152 may be provided to the offer search facility 130 through a variety of notifications. In an example, an RSS feed of updates to one or more of the offer databases 152 may be monitored by the search facility 130.

The offer search facility 130 may also include information provided by bidding module 124 in identifying offers for possible presentation to users 154.

The offer search facility 130 may also receive a request from the offer selection and display facility 104 to retrieve one or more offers from one or more of the offer databases 152. Upon receiving the request, the offer search facility 130 may access the appropriate offer databases 152, retrieve the offer, and present it to the offer selection and display facility 104 for use in a presentation to a user 154, for example.

In an example, the alternate payment platform 100 may receive a user 154 request for an ecommerce transaction. The offer search facility 130 may search a plurality of databases for non-monetary compensation offers to be presented to the user 154 as further incentive to complete the transaction. The offer search facility 130 may retrieve at least one non-monetary compensation offer from the plurality of databases, and present it to the user through the alternate payment platform 100.

The offer search facility 130 may be embodied as an automatic service, such as and without limitation according to a service-oriented architecture or any other computing architecture.

The alternate payment platform 100 may include a lead generation facility 172 for developing leads of users 154 that may appeal to one or more vendors such as primary vendors 144 and secondary offerors 148. The lead generation facility may communicate with users 154, and aspects of the alternate payment platform 100 such as the offer optimization facility 102, the offer selection and display facility 104, and the like.

The lead generation facility 172 may process primary offers 164 and secondary offers 160 to generate criteria for lead generation. The criteria may include aspects of the offers such as user 154 cost, geographic limits, user demographics 174, and the like. The lead generation facility 172 may generate a lead that may contain user 154 contact information such as an email address, or messaging username, telephone number, and the like, so that the generated lead has a relevance to a primary offer 164 or an alternate offer 160.

Users may be contacted by the lead generation facility 172 based on their email address being known to the lead generation facility 172 such as would be the case if a user 154 had registered with the alternate payment platform 100. The lead generation facility 172 may contact users through a variety of other methods including, telephone, text message, instant message, and the like. User contact may include offer promotional material such as an advertisement for the offer. If the promotional material appeals to the user 154, he/she may respond and thereby generate an acceptance of an alternate offer 160 of the alternate payment platform 100. This acceptance may result in the secondary offeror 148 associated with the secondary offer 100 paying the alternate payment platform 100 a fee for providing the lead.

The lead generation facility 172 may match one or more aspects of an offer to one or more aspects of a user 154 so that the offer 160 may appeal to the user 154.

The lead generation facility 172 may be embodied as an automatic service, such as and without limitation according to a service-oriented architecture or any other computing architecture The alternate payment platform 100 may include external offer databases 152. The external offer databases 152 may be accessible by the alternate payment platform 100 through the offer search facility 130. The external offer databases 152 may be configured as a collection of records stored in one or more computers in a systematic way, so that a computer program such as the offer search facility 130 consult it to find offers. However, any collection, list, single entry, or other logically related group of offers may comprise the external offer databases 152.

One or more of the external offer databases 152 may be established and/or maintained by the alternate payment platform 100. This may be used as a primary store of offers by the alternate payment platform 100 or it may be a backup or secondary store of offers.

An external offer database 152 may be established and/or maintained by a vendor such as a secondary offeror 148 or an offer consolidator 180. The database 152 may be maintained such that, from time to time, offers may be added, removed, or changed. The addition, removal, or change of an offer in one or more of the external offer databases 152 may result in a signal, such as an RSS feed being sent to the alternate payment platform 100.

In addition to offers being stored in an external offer database 152, the alternate payment platform 100 or a vendor may also store information related to offers such as bid amounts, payment terms, account numbers, contact information, offer performance, user 154 acceptance information, and the like. Including this additional information in one or more of the external offer databases 152 may facilitate communicating the information between a vendor and the alternate payment platform 100. In an example, the offer search facility 130 may retrieve an offer and associated information as herein described from an external offer database 152 for processing by the offer optimization facility 102.

External offer databases 152 may be distributed and/or duplicated to facilitate timely searching and retrieval of information in the databases. In an embodiment including a plurality of alternate payment platforms 100, information may be stored in the external offer databases 152 to facilitate coordination of access among the alternate payment platforms 100. Alternatively, the alternate payment platform 100 may coordinate access separately from the external offer databases 152.

The alternate payment platform 100 may include user demographics 174. User demographics 174 communicate with aspects of the alternate payment platform 100 such as offer optimization facility 102, offer selection and display facility 104, vendor reporting 110, and the like. User demographics 174 may be stored in a database that may be accessible to the alternate payment platform 100 at all times. The user demographics 174 database may be external to the alternate payment platform 100 and may be established and/or maintained by a user demographics provider. Alternatively, the alternate payment platform 100 may establish and/or maintain a user demographics 174 database.

As herein described the offer optimization facility 102 and the offer selection and display facility 104 may use user demographics 174 in optimizing and selecting offers for presentation to a user 154. The user demographics 174 may facilitate presenting offers to a user 154 that have a relevance of some importance to the user 154. In an example, an offer for fly fishing equipment may have an important relevance to a user 154 with demographic aspects that may characterize the user as having an interest in outdoor participatory sports.

User demographics 174 may include a user's 154 individual demographic variables such as age, sex, race, religion, an area code, zip code, a home address, a work address, a billing address, credit information, family information, income range, birth date range, birthplace, employer, job title, length of employment, an affiliation, or other such information as described herein.

The alternate payment platform 100 may include one or more payment facilitators 178. The payment facilitators 178 may communicate with users 154 and the alternate payment platform 100 such as through the secondary transaction facility 120. Payment facilitators 178 may facilitate a user 154 acquiring a primary offer 164 through the alternate payment platform 100 by handling an aspect of the user 154 payment such as a credit transaction and the like. A payment facilitator 178 may allow a user 154 who does not choose an alternate offer 160 but who does not want to pay the amount proposed by the primary vendor 144 for the primary offer 164. The user 154 may choose to use the payment facilitator 178 of the alternate payment platform 100 because an aspect of a transaction with the payment facilitator 178 is viewed as favorable to the user.

In an example of using the payment facilitator 178 with the alternate payment platform 100, a user 154 may be presented the option of paying a one time payment of $175 to the primary vendor 144 for the primary offer 164, selecting an alternate offer 160, or using a payment facilitator 178. However, the user 154 does not want to accept an alternate offer 160. Instead, the user 154 selects to accept the payment facilitator 178 terms that may include making 7 equal payments of $25 each over a 7 month billing period. The payment facilitator 178 may require the user 154 to use a specific type of payment such as a credit card that may benefit the payment facilitator 178. The payment facilitator 178 may pay the alternate payment platform 100 a fee for facilitating the transaction with the user 154.

A payment facilitator 178 may be a credit card company, a bank, a lending company, a government agency, a non-profit organization, an individual, a credit union, an employer of the user 154, a social network, and the like. In an example, a secondary offeror 148 may offer an alternate offer 160 in association with a payment facilitator 178. The offer may provide the user 154 a discounted purchase price for the primary offer 164 if they agree to open a credit card account with the payment facilitator 178 and use the credit card to purchase the primary offer 164. The secondary offeror 148, and/or the payment facilitator 178 may pay the alternate payment platform 100 for the user 154 completing the secondary transaction and using the payment facilitator 178.

The alternate payment platform 100 may be configured by a retailer that sells products or services and extends credit to the purchaser for such a sale. The alternate payment platform 100 may facilitate such a transaction when, for example, the retailer is configured as a primary vendor 144 and the retailer credit service is configured as a payment facilitator 178.

The alternate payment platform 100 may include offer consolidators 180. Offer consolidators 180 may communicate with one or more secondary offerors 148 and one or more alternate payment platforms 100. An offer consolidator 180 may coordinate offers such as secondary offers 160 from secondary offerors 148 to enable users 154 to take advantage of the offers. An offer consolidator 180 may handle aspects of the offer such as user registration, offer approval, offer delivery, alternate payment platform 100 payment, and so on. An offer consolidator 180 may perform these and other functions for a fee paid by the secondary offerors 148.

An offer consolidator 180 may provide benefits of consolidating offers from different aspects of a vendor's business while maintaining a consistent methodology and standards for the offers. In an example, an offer consolidator 180 may manage offers from a secondary offeror 148 so that a single offer may be adjusted for different geographic regions. For example, the payment associated with an alternate offer 160 may be different with respect to accepting users 154 from different regions, the price of the primary offer 164 may vary by region, or the like.

Offer consolidators 180 may also provide additional services such as consolidating offers from a plurality of secondary offerors 148.

Figure 5:
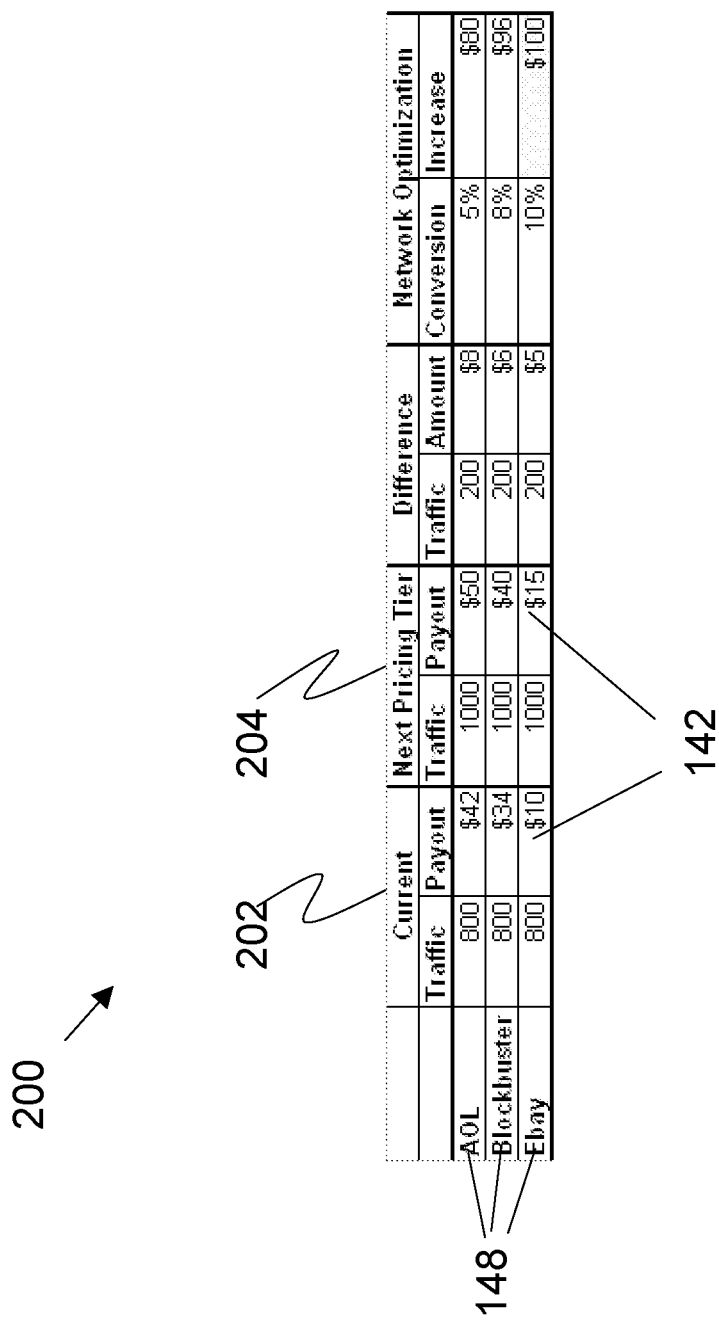
FIG. 5 shows a table depicting various facilitator payments.

Referring to FIG. 5, which is a table depicting various facilitator debits 142, debits 142 from secondary offerors 148 may be volume driven. The payment table 200 may be used to determine which offers may provide benefits of being optimized within the alternative payment platform 100. Current traffic/payout 202 may be compared to next tier pricing 204 to facilitate selecting an alternate offer 160. FIG. 5 shows that payouts will be optimized by increasing traffic by 200 to an alternate offer 160 that is associated with eBay. Once an alternate offer 160 has been optimized to a next tier pricing 204, new calculations may determine how to further direct traffic to alternative payment secondary offers 160 and thus optimize debits 142 from secondary offerors 148. The alternative payment platform 100 may facilitate and/or manage optimization of debits 142 across any or all primary vendors 144 and secondary offerors 148.

The following are examples from a user 154 perspective of the alternative payment platform 100.

In an example, a user 154 may receive a trial of the online edition of the Boston Globe by providing an alternative payment, without having to provide a financial payment or any other form of payment or submit to any other contractual obligation. The user can receive the online edition of the Boston Globe for the trial period. At one or more times before or after the trial period ends, the user may receive an offer to extend the trial offer for some period of time or to extend it in perpetuity in exchange for completing one or more offers (which may be associated with and/or comprise an alternative payment). The one or more offers may be free and may not obligate the user to any financial payment. Such an offer may include signing up for a trial of the online edition of the New York Times. In this example, the user has made a commitment to sign up for the online edition of the New York Times in exchange for an extension as herein disclosed of the online edition of the Boston Globe.

Embodiments of the present invention may present a user with something that he wants to buy. For example and without limitation, a user may download a trial copy of software, such as electronic FAX software. The trial copy includes a temporary license to use the software for a limited time. At each startup of the trial copy of software, the user is offered the opportunity to convert the temporary license into a permanent license in exchange for completing an offer to sign up for a free subscription to an on-line business journal. The offer to sign up for the free business journal subscription may be a limited time offer. In this example, the free business journal subscription offer may be limited to the same time period as the FAX software trial copy limited time. Many other examples of presenting the user with something that he wants to buy will be appreciated. All such examples are within the scope of the present disclosure.

An alternate offer 160 made in exchange for converting a primary offer 164 from a limited trial to unlimited usage may itself be limited. The offer 160 may be limited in time, such as 24 hours or the length of time of the limited primary offer 164, or some other time as may be determined by the facilitator 150 and/or the secondary offeror 148. The offer 160 limit may be associated with an event such as an event at a specific future time, or a conditional event such as a predetermined number of other users 154 accepting the offer 160. The offer 160 limit may be associated with an aspect of the relationship between the user 154 and the secondary offeror 148, such as the user 154 may not already be known to the secondary offeror 148 through a similar offer. In such an event the facilitator 150 may allow the user 154 to select another offer 160.

In embodiments, a customer may pay for a first item and receive both that item and a second item. Thus, paying for the first item may represent an alternative form of payment for the second item. For example and without limitation, a customer looking to purchase an subscription to an online newspaper may accept an alternate offer 160 to sign-up for a weekly wine club, perhaps at a much greater cost than the online newspaper subscription alone. Many other such examples will be appreciated and all such examples are within the scope of the present disclosure.

A user 154 of the alternate payment platform 100 may interact with the platform 100 through a computing facility connected to the Internet. Via this facility, the user 154 may view and interact with various user interfaces associated with the alternate payment platform 100 for evaluating alternative payment secondary offers 160 and/or selecting an offer 160. FIGS. 3 through 12 depict screenshots of exemplary webpages of the alternate payment platform 100. It will be appreciated that, throughout this disclosure and elsewhere, the word "screen" may be used to refer to "screenshot of a webpage" and that the word "webpage" may refer to a particular embodiment of a user interface of the present invention that may, in alternate embodiments, be provided according to other user interface conventions that may or may not be webpages.

Figure 6:
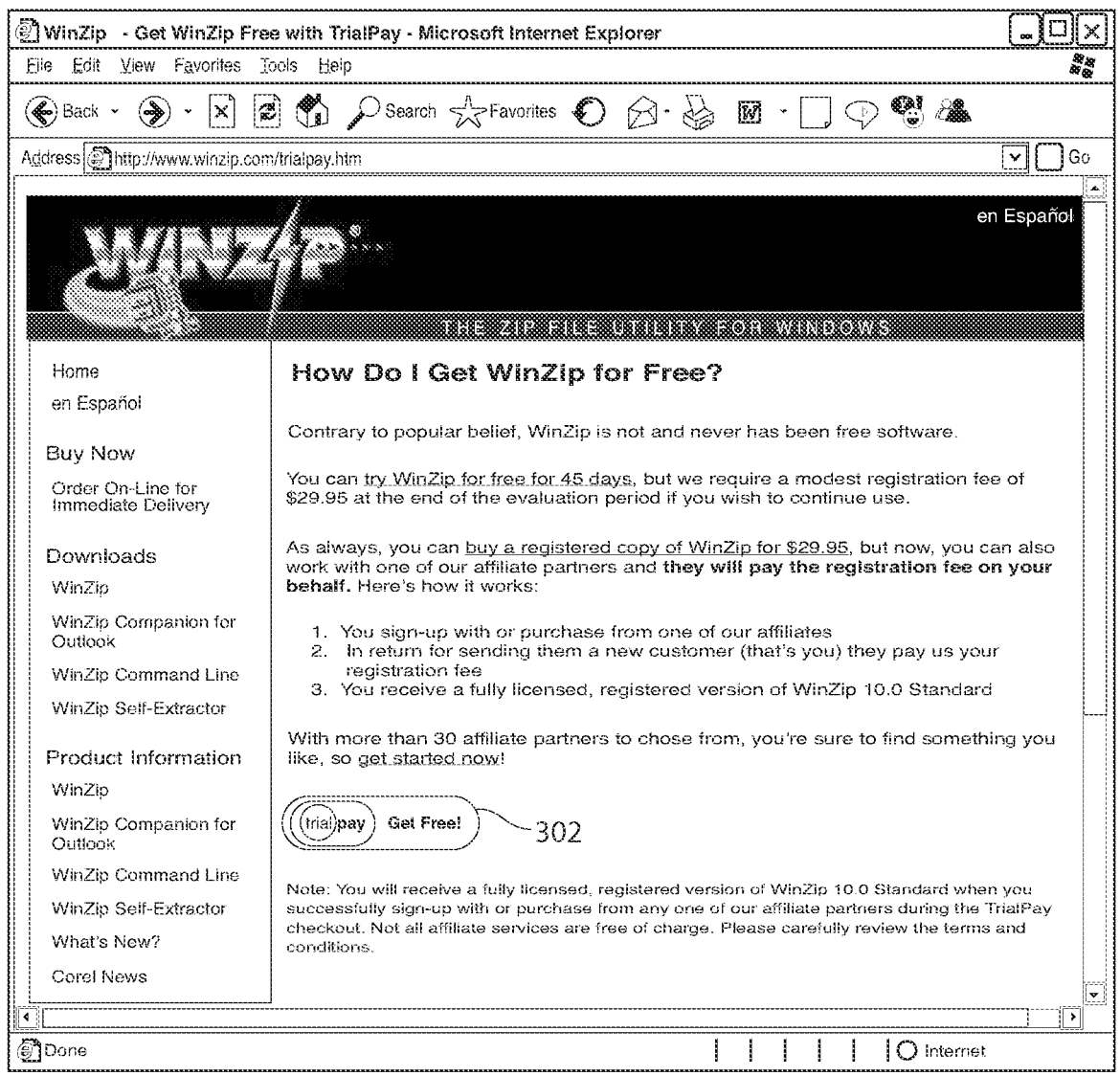
FIG. 6 depicts a screen in which a vendor makes an item available.

FIG. 6 depicts a screen (i.e. a screenshot of a webpage) in which a vendor makes an item available and associates it with the alternate payment platform 100. In embodiments, the vendor may provide this webpage and/or the alternate payment platform 100 may provide this webpage. Such a screen may be a webpage derived from a primary vendor's 144 website, which may, in embodiments, comprise an e-commerce website. On this webpage, the user 154 is introduced to an alternate way of receiving the desired primary offer 164, the alternate payment platform 100. The screen may include a brief description of an aspect of the alternate payment platform 100 that may be directed at educating a user 154 to make a selection 302.

Figure 7:
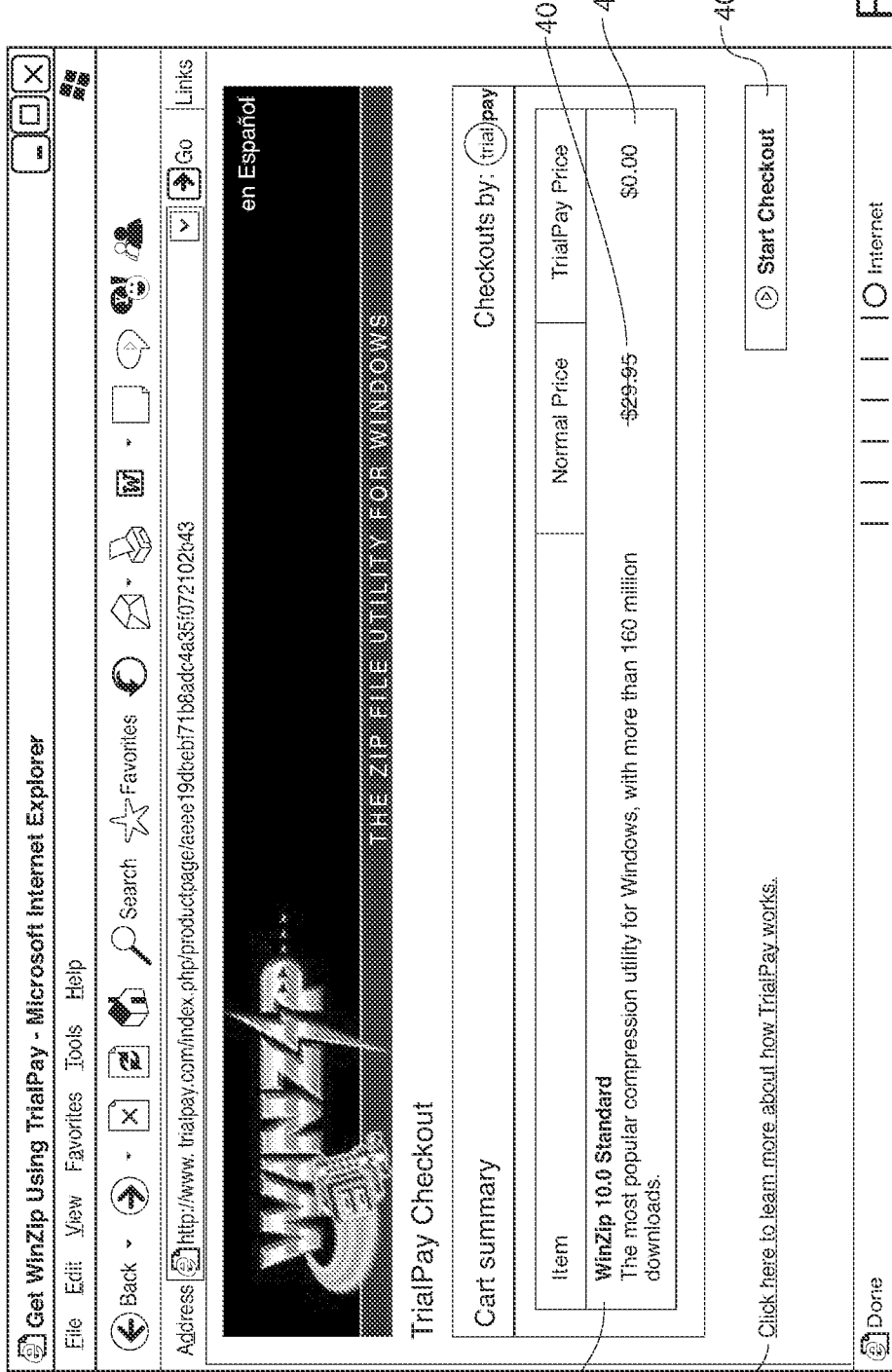
FIG. 7 depicts a product confirmation screen.

A user 154 is presented the screen of FIG. 7 when, for example, the user 154 has previously chosen the selection 302, as described hereinabove with reference to FIG. 6. The screen of FIG. 7 facilitates a user's 154 confirming the primary offer 164 that the user 154 is acquiring with the alternate payment platform 100. The screen shows the user 154 a normal price 402 and an alternate payment platform 100 price 404. In the example of FIG. 7, the alternate payment platform 100 price 404 is $0.00, indicating that the user 154 will receive the primary offer 164 for free. In embodiments, the alternate payment platform 100 price 404 may be any value, including values that are greater than or less than zero. The normal price 402 and the alternate payment platform 100 price 404 may also be presented in a currency other than dollars. The currency may be determined based on a relevance to an aspect of the user 154, such as the user's location. Other representations of prices, including terms such as "Free" and the like may be included in this screen. Alternatively, only the normal price 402 or the alternate payment platform 100 price 404 may be displayed, or neither price may be displayed. The user 154 may initiate a checkout process by selecting the start checkout button 408. The user 154 may initiate a help process by selecting the "learn more" 410 hyperlink. It will be appreciated that the various hyperlinks, buttons, and other user interface elements that are described herein and elsewhere may, in alternate embodiments, be provided as any and all kinds of user interface elements according to any user interface convention, custom, design, style, etcetera. All such user interface elements and alternate embodiments are within the scope of the present disclosure.

Figure 8:
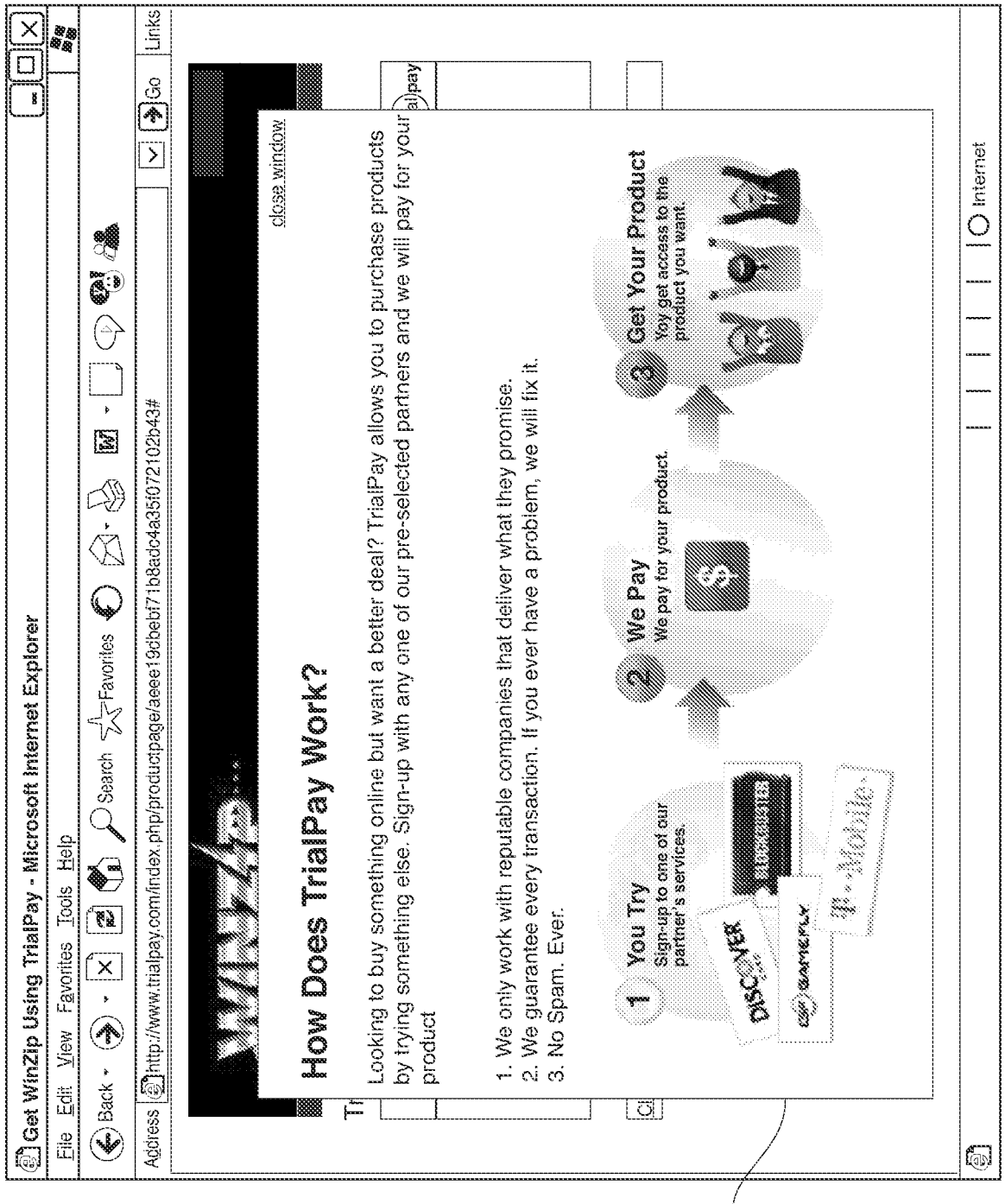
FIG. 8 depicts a help screen.

FIG. 8 depicts a help screen 502 that may be displayed when the user 154 selects the "learn more" 410 hyperlink.

Figure 9:
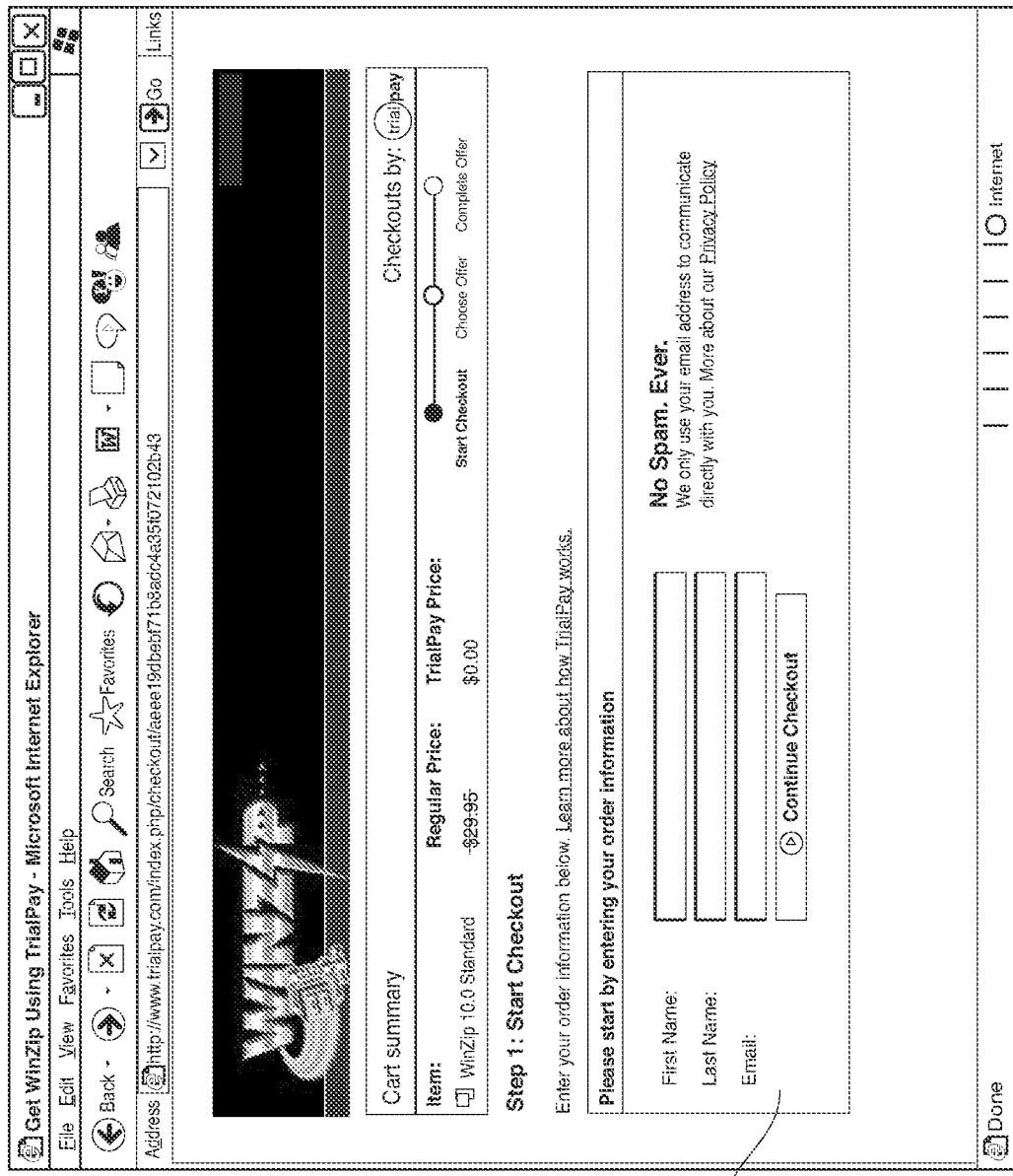
FIG. 9 depicts a user contact input screen.

Referring to FIG. 9, a user contact input screen may embody the first step in a checkout process. Once the user 154 enters a first name, last name, an email address, and selects a continue checkout 602 user interface element, the alternate payment platform 100 may present secondary offers 160 to the user 154. The order of entry of information by the user on this screen may be different than described herein, and some of the information may be optional, such as a user first name. The user 154 may be presented with representative offers such as previews of offers so that the user 154 can have an idea of what is available after signup. In this way, the user 154 may be educated about the alternate payment platform 100 and therefore be more willing to provide the necessary contact information to view secondary offers 160.

Figure 10:
FIG. 10 depicts a default screen of offerings.

FIG. 10, an exemplary default screen of alternate offers 160, may display to the user offers that may be associated with a relevance value. The relevance value may be associated with an offer optimization as herein described. The relevance value may be associated with an aspect of the user 154 that may be derived by the alternate payment platform 100 from the user 154 contact information provided in the screen of FIG. 9, or from other known, derivable, or guessable information about the user 154 (e.g. the user's ISP, country, prior use of the alternate payment platform 100, and the like). The relevance value may be associated with the product 118, the primary vendor 144, the product normal 402 price, and the like. In this screenshot, the title "Most Popular Offers" may indicate that the displayed offers are selected on the basis of a relevance value that is related to the popularity of the offers, which may be determined at least in part on other user offer selections. The screen of FIG. 10 also offers the user 154 the option of viewing 702 all secondary offers 160.

Figure 11:
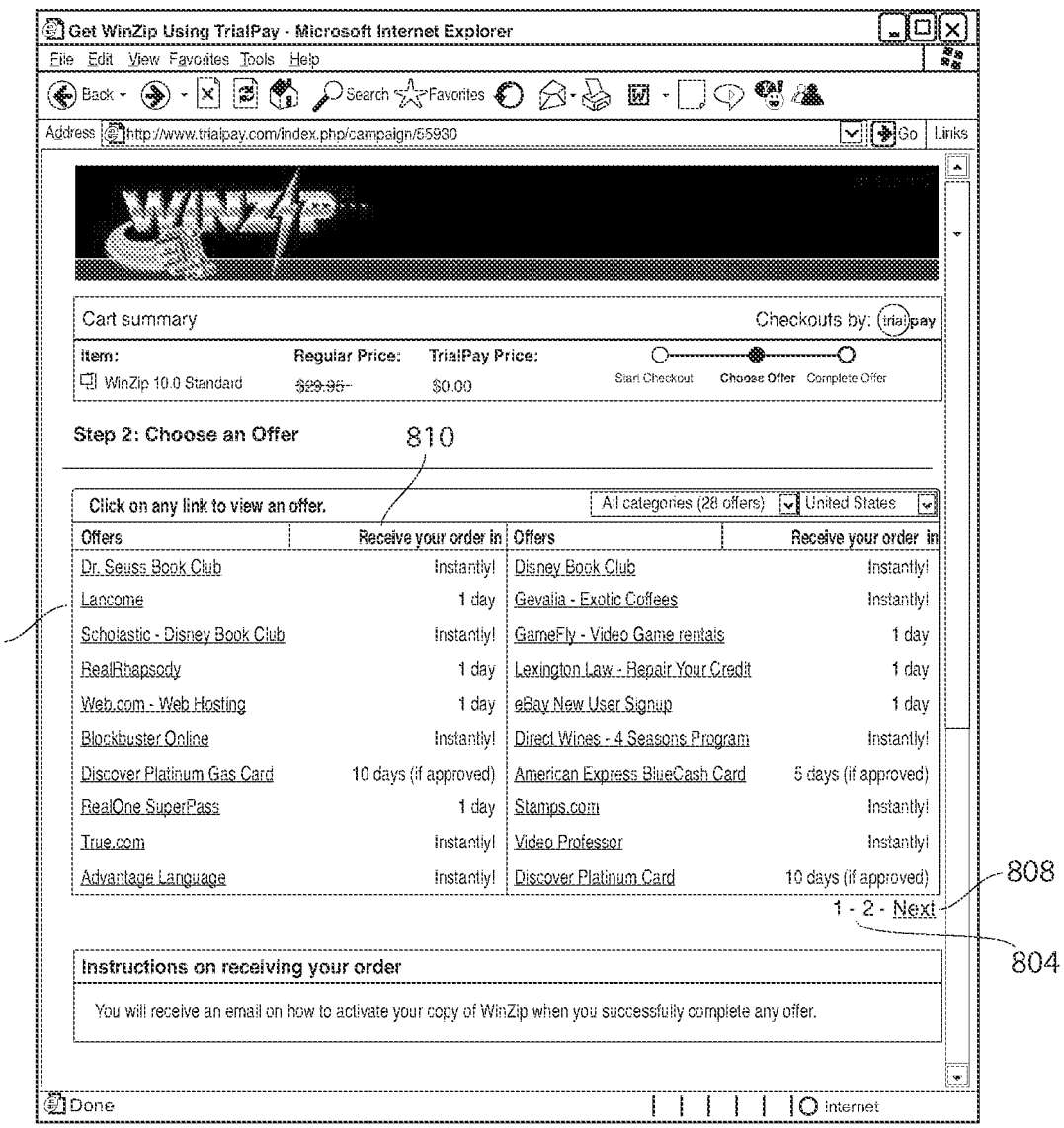
FIG. 11 depicts a list of all offerings screen.

FIG. 11 depicts a screenshot of a webpage that contains a plurality of offers selected from a list 802 of all the alternate payment platform's 100 secondary offers 160. The webpage displays a list 802 of a selection of secondary offers 160 and a summary of the product 160 or products 160 being acquired through the alternate payment platform 100. The list 802 of a selection of secondary offers 160 may be too long to be displayed on a single screen and may be continued on additional pages that may be accessible by selecting a specific page number 804 of the list or the next 808 page. The secondary offers 160 on the screen of FIG. 11 may be filtered and ordered based at least in part on a user 154 selection. For example and without limitation, the list 802 may be ordered alphabetically such as by secondary offeror 148, offer 160, time to receive the product 810, popularity, and the like. Any aspect of relevance may also be used to order the list 802.

To facilitate including user location (regionalization) in secondary offer placement for display in a list 802 as shown in FIG. 11, a ranked order of secondary offers 160 may be identified by the offer selection and display facility 104 or other aspect of the platform 100. A ranked order may be defined for each geography, such as each country or each region of a country. A primary vendor 144 may define how many secondary offers 160 may be presented per geographic region. In an example, a vendor "A" may choose to only present 4 offers in India, but may choose to present 16 offers in the US. Through a primary vendor interface 112, a primary vendor 144 may override secondary offer ranked order for any or all geographic areas.

Secondary offer screens as shown herein may also be presented in a language other than English. The selection of which language to present may be based on user preference, user location, user IP provider, and the like. Languages such as German, French, Spanish, Italian, Portuguese, and others may be available for display on secondary offer presentation web pages.

Figure 12:
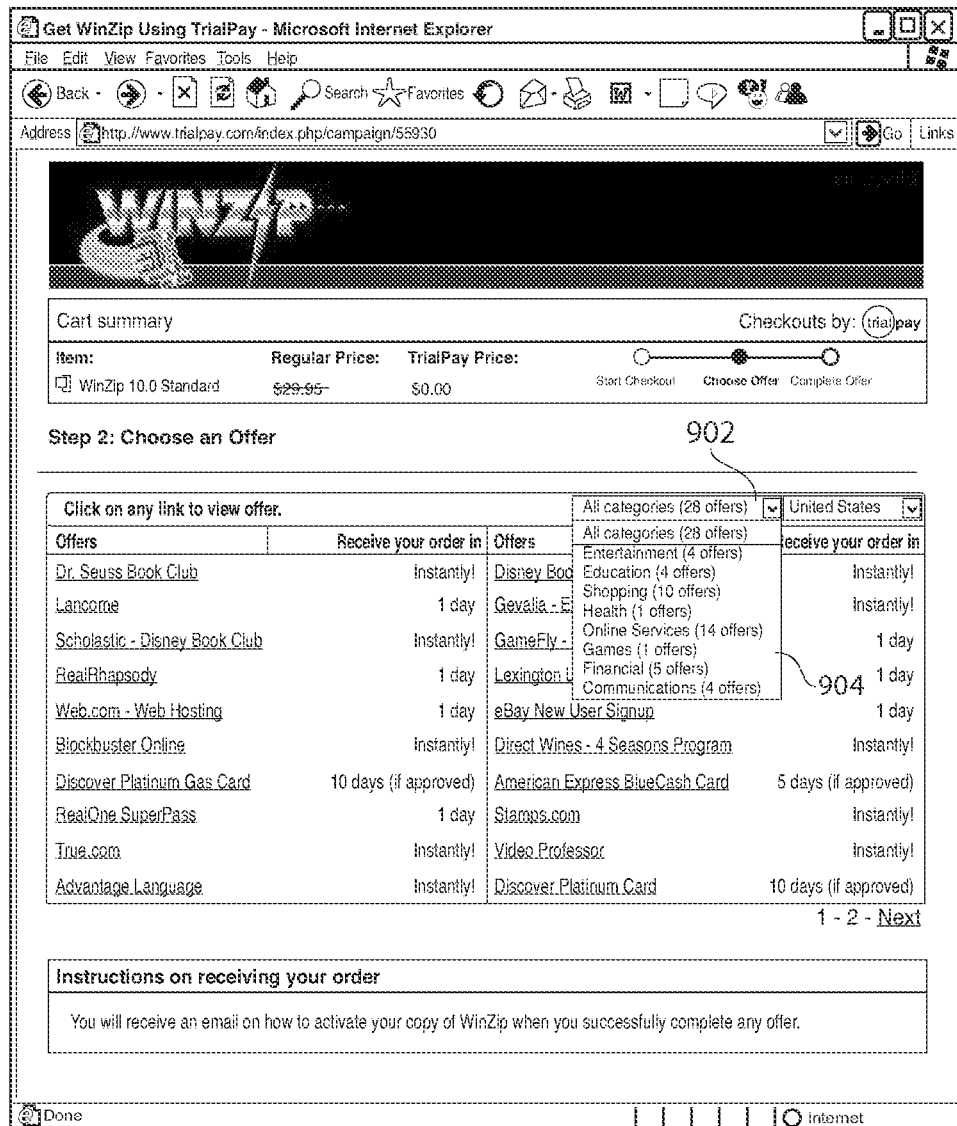
FIG. 12 depicts a category filter menu of the screen of FIG. 8.
Figure 13:
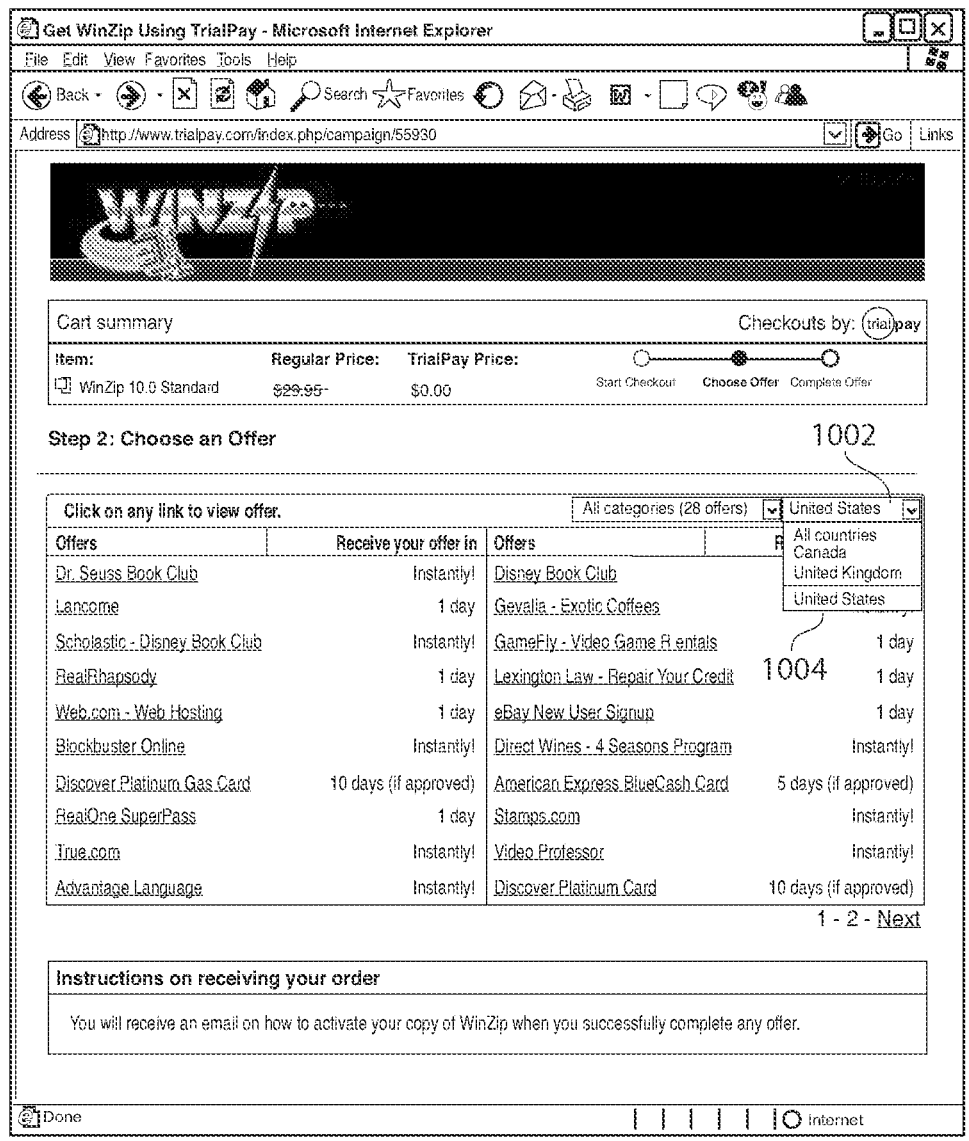
FIG. 13 depicts a country filter menu of the screen of FIG. 8.

Additionally or alternatively, the list 802 may be filtered to display a subset of secondary offers 160. FIG. 12 depicts the screen of FIG. 11 when the category filter 902 is opened. The user 154 may select one of the categories 904 presented in the filter 902. FIG. 13 depicts the screen of FIG. 11 when the country filter 1002 is opened. The user 154 may select one of the countries 1004 presented in the filter 1002. When a category filter 902 and/or a country filter 1002 is selected, the list 802 of offers may be filtered to display only secondary offers 160 that meet the filter criteria.

Figure 14:
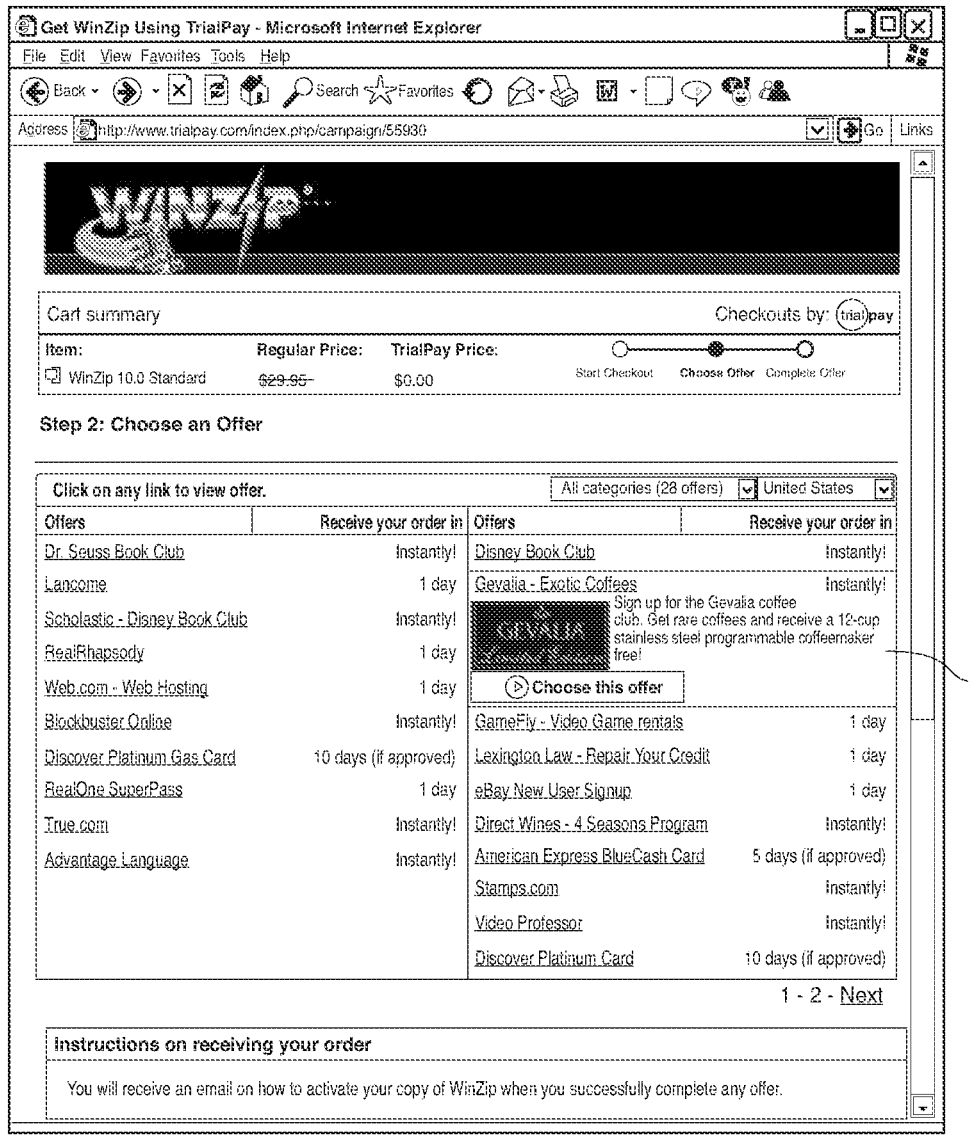
FIG. 14 depicts the screen of FIG. 8 with an offer title selected.

A user 154 may select one of the secondary offers 160 in the list 802 as shown in FIG. 14. Within the list 802, the selected offer 1102 may display relevant information, graphics, logos, and other content associated with the selected offer 1102 to facilitate a user identifying the offer 160 and/or the secondary offeror 148.

Figure 15:
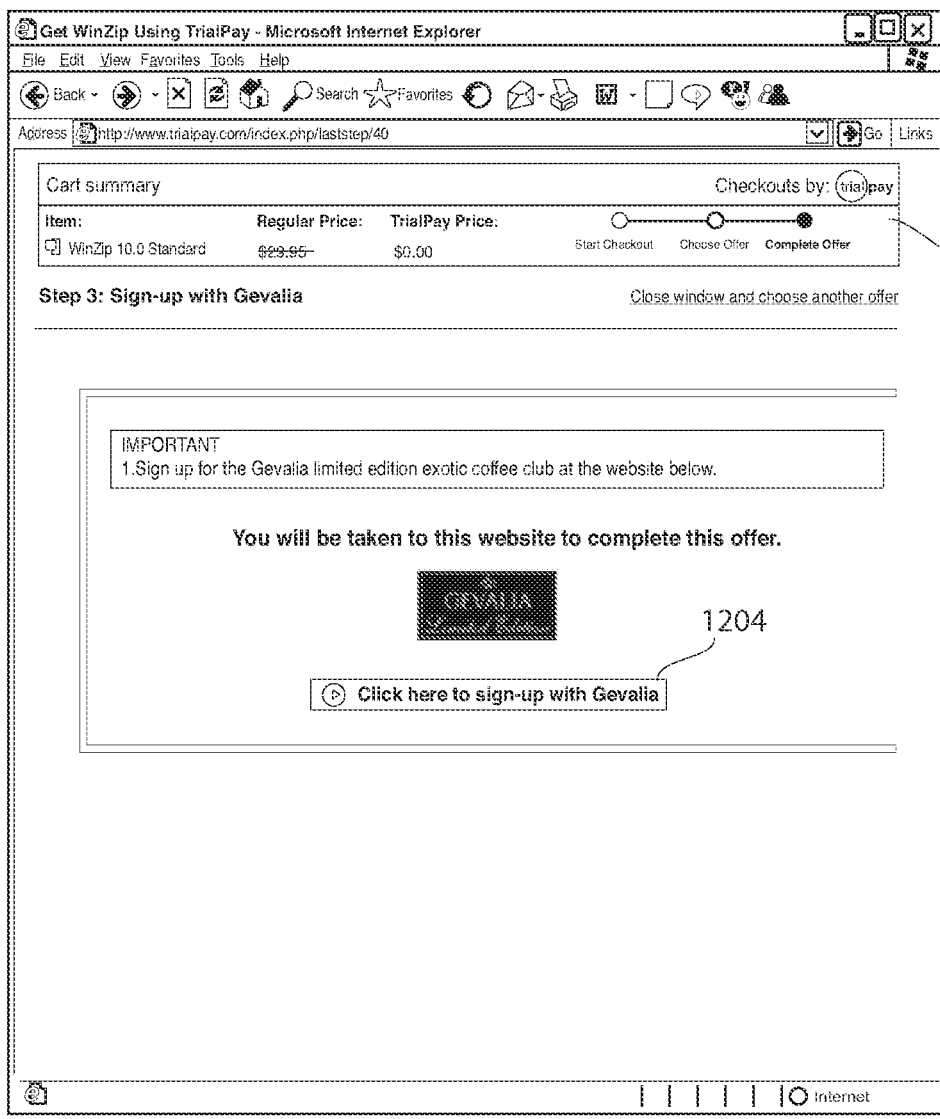
FIG. 15 depicts an offer selection confirmation screen.

As shown in FIG. 15, when a user 154 selects a selected offer 1102, a new web browser window displays a confirmation 1202 of the offer 160 and a link 1204 to the secondary offeror 148 website. While the specific example of FIG. 15 indicates the link 1204 will direct the user's 154 web browser to the secondary offeror 148 website, the link 1204 may direct the user's 154 web browser to a website of the alternate payment platform 100, such as a website managed by a facilitator 150. In this way the alternate payment platform 100 may offer vendors 160, secondary offerors 148, and users 154 the flexibility and options to interact and administer secondary offers 160 in a variety of ways.

In embodiments, an alternative form of payment may comprise a user's participation as a buyer and/or seller in an online auction venue. For example and without limitation, the seller may utilize a camera system 162 to capture an image of an item for sale. Receipt of this image at the online auction venue may constitute the alternative form of payment for an item, wherein the item may or may not encompass a promotional item offered by an owner, operator, affiliate, et cetera of the online auction venue. Many other applications of a camera system 162 in association with an alternative form of payment will be appreciated and all such applications are within the scope of the present disclosure.

Facilitating secondary offerors 148 reaching high quality users 154 may be a valuable service of the alternate payment platform 100. Secondary offerors 148 may be looking to acquire high quality users 154 to increase the likelihood that such a user 154 will become a customer of the secondary offeror 148. Determining which users 154 are high quality may be challenging in an electronic commerce environment because users 154 can make a transaction, including accepting a secondary offer, without providing key quality information such as spending habits, product preferences, and the like. A user's 154 email address and contact information, while required for most transactions, may not facilitate quality determination. In an electronic transaction such as an alternative payment transaction, users 154 may also be reluctant to provide personal details.

The alternate payment platform 100 may offer alternative ways for secondary offerors 148 to gain access to high quality users 154. By establishing a customer acquisition marketplace (also referred to herein as a "customer marketplace"), the alternative payment platform 100 may facilitate a secondary offeror 148 gaining access to high-quality users 154 through the platform's dynamic alternate offer 160 association features. The alternate payment platform 100 may allow secondary offerors 148 to specify aspects of user 154 quality that can be assessed by the platform 100. User 154 quality may include aspects of primary offers 164. Therefore, secondary offerors 148 may request their secondary offers 160 be offered to users 154 who are alternatively purchasing products or services with specified aspects. For example and without limitation, a user 154 who is interested in a primary offer 164 that involves purchasing a luxury good may be a user 154 that is ready to spend a relatively large amount of money. In this respect, the user 154 may be considered a high-quality user. For another example and also without limitation, a user 154 who is interested in a primary offer 164 that is generally associated with a particular demographic may be considered a high-quality user to a secondary offeror 148 who is a purveyor of goods that are typically purchased by members of that demographic. Many definitions of a high-quality user 154 will be appreciated and all such definitions are within the scope of the present disclosure. Similarly, many systems and methods of determining whether a user 154 is a high-quality user 154 will be appreciated and all such systems and methods are within the scope of the present disclosure.

In embodiments, there may be many secondary offerors 148 interested in acquiring users 154 who are alternatively purchasing one or more of the primary offers 164 with the specified aspects. Therefore, the alternate payment platform 100 may enable secondary offerors 148 to request promotion, placement, pricing, and the like (collectively, referred to herein simply as "placement") of their secondary offers 160 to high quality users 154. Such placement may be associated with positioning one alternate offer 160 in relation to another alternate offer 160; providing one alternate offer 160 instead of another alternate offer 160; modifying a look, feel, price, or other element of an alternate offer 160 such as and without limitation to improve the appearance and/or allure of one alternate offer 160 as compared with another; and so on. Secondary offerors 148 may include a bid in association with an alternate offer 160 placement request. The offer bidding module 124 may determine which alternate offer 160 is selected based at least in part on the bid. In an example, credit card vendors such as Discover Card, VISA, Master Card, and the like may be willing to pay more to acquire a customer alternatively purchasing a Zagat-.com subscription than a customer alternatively purchasing WinZip, perhaps because the purchase of a subscription to Zagat.com, as opposed to a purchase of WinZip, naturally leads to additional purchases (such as for restaurant visits) for which using a credit card may be a preferred method of payment. Additionally or alternatively, such a customer (i.e. a user 154) may have income or spending habits that would highly benefit a credit card vendor. This aspect of the alternate payment platform 100, which a customer marketplace may encompass, may allow secondary offerors 148 to bid on users 154 who are performing live alternative payment transactions rather than soft leads.

To facilitate the customer marketplace, the alternate payment platform 100 may allow secondary offerors 148 to specify aspects of primary offers 164 that indicate that a user 154 who is selecting the primary offer 164 might be a high quality user 154. The secondary offerors 148 may specify these aspects through one or more screens, dialogue boxes, webpages, et cetera of the secondary offeror interface 118. Aspects of the primary offer 164 may be associated with specific products or services. In other examples: a home equity lender may consider a user 154 alternatively purchasing replacement windows as a high quality customer; a horse transportation vendor may consider a user 154 alternatively purchasing a saddle as a high quality customer; a wine club may consider a user 154 alternatively purchasing a case of wine to be a high quality customer. Many other such examples will be appreciated and all such examples are within the scope of the present disclosure.

Aspects of primary offers 164 may also include categories or types of products or services. It will be appreciated from the foregoing examples that the products or services may be included in categories such as home improvement products or services, horse riding and care products or services, wine and liquor products and services, and so on. Additional category examples may include gaming products or services, camping products or services, travel product or services, boating products or services, and the like. It will be appreciated that primary offers 164 may be categorized or typed in a wide variety of ways that may be usefully specified by secondary offerors 148 to identify potentially high quality customers. All such categories, types, and combinations of aspects are contemplated by this specification and are within the scope of the present disclosure.

Aspects of primary offers 164 related to customer quality, and the secondary offeror's 148 specification of these aspects may be processed by the offer optimization facility 102 such that the optimized offer 132 selection incorporates these additional factors. Offer selection, as performed by the offer selection and display facility 104, may also be affected by these factors. A possible outcome of incorporating these additional factors into offer optimization and offer selection is a presentation by the secondary transaction facility 120 of secondary offers 160 that may have a greater relevance, and possibly greater value to the user 154 than other secondary offers 160.

In addition to the customer acquisition marketplace being useful and beneficial to secondary offerors 148, it may also be beneficial to primary vendors 144. Primary vendors 144 may view the possible associations with secondary offerors 148 as adding value by providing co-marketing and/or co-branding opportunities. Primary vendors 144 may perceive that participating in the alternate payment platform 100 may increase their sales through these offer associations and therefore the primary vendors 144 may employ the alternate payment platform 100 to provide an alternative payment option for their products and services. A user 154 that is a high quality customer to a secondary offeror 148 may also be a high quality customer to a primary vendor 144. Therefore, if a primary vendor 144 is aware that a user 154 may be able to buy the primary vendor's 144 product or service by alternatively purchasing a product or service (alternate offer 160) that the user 154 highly desires, the primary vendor 144 may want to participate in that offer association. These offer associations thereby make the alternate payment platform 100 a viable, effective, and desirable method of purchase for primary vendors 144.

Demographic and other user 154 aspects that factor into a consumer's value to a vendor may include zip code and may relate to property value. These user 154 aspects may be implicitly determined based on location detection of the user through the ISP and/or IP address. The user 154 aspects may be explicitly determined based on user-provided data such as zip code. For example, a user 154 may provide a zip code that, when evaluated against demographic data, is considered a "high approval rate" zip code for financial products such as loans, credit cards, and the like. A credit card company may be willing to pay a relatively high fee to acquire a customer from a "high approval rate" zip code.

Third-party services that provide on-line access to property value, income assessment, approval rate, and the like may provide valuable information for determining customer quality to the alternate payment platform 100. For example and without limitation, an area with relatively high property values may contain higher quality/value customer and therefore an advertiser may be willing to pay a premium to acquire a customer from such an area.

Similarly, an aspect of a user's 154 house/home/apartment may factor into customer quality/value. A user 154 in an apartment may not be a high quality/value customer for secondary offerors 148 that provide home improvement products and services. However, such a user 154 may be quite valuable to insurers that are offering apartment insurance. Therefore, determining whether a user 154 lives in an apartment, home, or other type of domicile may allow the alternate payment platform 100 to establish an appropriate quality/value factor for the customer.

Other factors such as a customer's (i.e. a user's 154) use of a particular type of internet connection, a particular type of web browser, a particular operating system, and the like may also be of value in establishing the quality/value of the customer. For example, a secondary offeror 148 offering faster internet access may consider a user with an out-of-date operating system (e.g. Windows 98) as a low quality potential customer. Conversely, a user with a current model computer, an updated operating system, and a slow internet connection may be considered a high quality potential customer. Many other examples will be appreciated and all such examples are within the scope of the present disclosure.

From the secondary offeror's 148 viewpoint, having timely access to high-quality customers who are actively performing electronic transactions may provide much greater value than traditional internet advertising and marketing techniques such as cost-per-click, keyword-based marketplaces.

The alternate payment platform 100 may allow a user 154 to establish a transaction account with the platform 100. Associated with a transaction, a user 154 may provide relevant information such as a username, password, or other information only known to the user 154 that the platform 100 may use to identify the user 154. A transaction account may be associated with the relevant information and established for the user 154. The user transaction account may be credited with transaction credits each time a user 154 completes an alternate payment transaction with the alternate payment platform 100. The transaction credits may be redeemable by the user 154 in association with an alternate payment platform 100 transaction. The transaction credits may be provided to the user 154 as a reward for an alternate payment transaction and may provide an incentive for the user 154 to use the alternate payment platform 100 again to redeem the transaction credits accumulated in his transaction account.

The transaction credits may be based on an aspect of the transaction or aspects of the transaction account. The amount of transaction credits may be based on an aspect of a primary offer 164 and/or an alternate offer 160 transacted through the alternate payment platform 100. Aspects of the offers may include the normal cost of the primary offer 164, the cost to the user 154 of the alternate offer 160, the primary offer 164 category or type, the primary vendor 144, the secondary offeror 148, and the like. Aspects of the transaction account may include a total number of transactions, a number of transactions within a predetermined timeframe, a frequency of transactions, a calculation of the total amount of primary offer 164 normal costs, and the like. Some examples of crediting user credits include: one transaction credit for each primary transaction, one transaction credit for each one dollar of primary offer 164 normal cost, one offer credit for a first transaction with a primary vendor 144, and the like.

Transaction credit redemption may be controlled based on aspects of the transaction account, the primary offer 164, or the alternate offer 160. Redemption may be permitted only after a minimum number of transaction credits have been accumulated. Redemption may also be permitted only on certain primary offers 164. While example controls and restrictions are described herein, it will be appreciated that many other types of controls, restrictions, limits, minimum balances, and the like may be applied to offer credit redemption. However, redemption may be permitted without these or other limitations. In any case, all such controls, restrictions, limits, minimum balances, and the like are within the scope of the present disclosure.

Transaction credits may be redeemed toward the alternative purchase of a primary offer 164. Such redemption may facilitate customer retention and satisfaction for the alternate payment platform 100. A user 154 may accumulate transaction credits in his transaction account and may redeem the accumulated transaction credits when making an alternative purchase. In an example, a user 154 may have accumulated ten transaction credits in his transaction account. The user 154 may select to purchase a subscription to Men's Health magazine using the alternate payment platform 100. If each transaction credit is worth one primary-offer normal-cost dollar and the subscription costs ten primary-offer normal-cost dollars, then the user 154 may purchase the magazine subscription using the ten accumulated offer credits. If the magazine subscription costs more than ten dollars, the user 154 may need to pay the difference, or select an alternative payment alternate offer 160 to cover the difference. If the magazine subscription costs less than ten dollars, the user 154 might receive the magazine subscription and keep the difference between the magazine subscription cost and the transaction account transaction credits balance in his transaction account.

It will be appreciated that transaction credits and primary offer 164 normal cost may have different value relationships than the examples herein. For example, a transaction credit may equate to one-half of a primary-offer, normal-cost dollar. Transaction credits may alternatively not have a regular relationship to primary-offer, normal-cost dollars, such that a primary offer may be assigned a fixed number of transaction credits independently of the primary offer normal cost. Any and all relationships between primary offers 164, primary offer 164 normal costs, and transaction credits are within the scope of this disclosure.

Transaction credits used to alternatively purchase a primary offer 164 may impact a primary vendor's 144 financial accounting with the alternate payment platform 100. For example and without limitation, transaction credits may be used to offset platform 100 participation fees charged to primary vendors 144. A financial agreement between a primary vendor 144 and the alternate payment platform 100 may include the primary vendor 144 accepting a predetermined number of transaction credits in lieu of payment based on a quantity of primary offers 164 transacted through the alternate payment platform 100. For example and without limitation, a primary vendor 144 may accept transaction credits in lieu of payment for two primary offers 164 for every one hundred paid primary offers. Use of transaction credits for alternatively purchasing a primary offer 164 may facilitate customer retention for the primary vendor 144 as well as the platform 100. Therefore, such an arrangement may be mutually beneficial to the primary vendor 144 and the platform 100.

Additionally, the amount paid by the alternate payment platform 100 to the primary vendor 144 for an alternative purchase of a primary offer 164 may be different than the primary offer 164 normal cost. Therefore, the value of the offer credits as perceived by the user 154 may be different than the value perceived by the primary vendor 144 or the alternate payment platform 100. This difference may also vary from user to user, region to region, country to country, and so on. For example, a user 154 in the United States may perceive a value relationship between transaction credits and primary offers that is different than what a user 154 in India perceives.

Transaction credits may alternatively be redeemed for secondary offers 160. Because secondary offers 160 may require the user 154 to purchase a product or service, transaction credits may be redeemed to offset some or all of this cost. A secondary offeror 148 may accept transaction credits as payment toward an alternate offer 160 and thereby reduce the amount charged to the user 154 to purchase the product or service of the alternate offer 160. The secondary offeror 148 may accept the transaction credits without impacting an amount it pays the alternate payment platform 100 to facilitate the secondary transaction. In this example, the alternate payment platform 100 debits the secondary offeror 148 the amount it pays, independently from the use of transaction credits.

An alternative accounting of transaction credits used to transact an alternate offer 160 may include the alternate payment platform 100 reducing the amount debited from the secondary offeror 148 based on the number of transaction credits applied. A potential benefit to the alternate payment platform 100 for this reduction in debit amount may be an increase in the number of alternate offer 160 transactions with a secondary offeror 148 such that next-tier pricing 204 for secondary offers 160 may be reached sooner than if the reduction in debit were not employed.

Any combination of the above transaction credit accounting techniques, and any other accounting technique related to transaction credits being applied to secondary offers 160, whether described herein, included herein by reference, or appreciated, are within the scope of the present disclosure.

Users 154 who have established transaction accounts with the platform 100 may have a higher value to a secondary offeror 160 than users 154 who do not have an account because information associated with the user account may facilitate targeting offers to the user 154.

The alternate payment platform 100 may also facilitate micro-payments. Micro-payments may encompass low-value electronic transactions that do not provide much residual value to a vendor after transaction fees, such as and without limitation credit card fees of 2% plus a fixed transaction fee, are deducted from an amount charged to the customer. A common example of a micro-payment is an on-line purchase of a song file. Song files cost as little as $0.99, yet credit card fees and operating costs for the transaction may substantially eliminate any profit that might otherwise be derived from the $0.99.

The alternate payment platform 100 may facilitate micro-payments by providing the vendor with 100% of the micro-payment charged to the customer, without imposing transaction fees. The alternate payment platform 100, through the debits charged to a secondary offeror 148 for facilitating an alternate offer 160 associated with a micro-payment alternative purchase, may receive cash compensation in excess of the micro-payment. This allows the alternate payment platform 100 to pay a primary vendor 144 the full micro-payment and still make a profit. In this way, the alternate payment platform 100 provides a significant benefit to the user 154 (e.g. who receives a "free" primary offer 164 that is provided in association with the user's 154 acceptance of an alternate offer 160), the secondary offeror 148 (e.g. that receives the user's 154 acceptance of the alternate offer 160), and the primary vendor 144 (e.g. that receives the full micro-payment for the primary offer 164). It will be appreciated that, due to the elimination of the transaction fee that might normally be associated with the micro-payment, the primary vendor may make a greater profit than in a standard transaction.

By combining transaction credits accumulated in a user's transaction account with micro-payment alternative purchases, the alternate payment platform 100 may further provide benefits to users 154 and primary vendors 144. For example and without limitation, a user 154 may redeem accumulated transaction credits for free song files; a primary vendor may benefit from reduced fees by accepting transaction credits while receiving 100% of micro-payments; and so on.

A method of payment may be substituted to facilitate completion of a transaction such as a primary offer 164 transaction or an alternate offer 160 transaction. The method of payment may be associated with the primary offer 164, primary vendor 144, secondary offeror 148, platform 100, user environment, payment facilitator 178 involvement, offer consolidator 180 involvement, combinations of above, and the like. The method of payment may be associated with the offer, such as the primary 164 or alternate offer 160, based at least in part on the type of offer, the fulfillment method, the environment of the offer (e.g. on-line versus point of sale), and the like. In an example, a primary offer 164 that is presented and/or fulfilled electronically, such as a download of software, may require electronic payment of any amount due from the user 154. An offer that is made and transacted at a point of sale may allow cash, checks, and other physical forms of payment. Similarly, the method of payment may be associated with the vendor, such as the primary vendor 144 or secondary offeror 148. A vendor may require a prepayment to establish a credit balance that may be used for future transactions. In an example, a ring tone vendor may require a prepayment of a minimum amount to complete a transaction. However, the user 154 may elect to use a portion of the prepayment to purchase a ring tone as part of the transaction and reserve the remainder of the prepayment in a credit account with the vendor for future purchases of ring tones, and the like.

The method of payment may be based at least in part on the user environment which may include user preferences, user computing device, user network type, user credit worthiness, user purchase history, user account status with the vendor or the platform 100, and the like. In an example, a user 154 with good credit may be offered to defer payment until a later time while fulfilling the offer requirements at the time of the transaction. In this way the vendor provides credit to the user 154, perhaps as a motivator for the user 154 to accept the offer. In another example, a user 154 may accept an offer to pre-pay for ring tones through a website of a vendor; however the user's 154 cellular phone account may be charged the pre-payment amount and future transactions against the prepaid balance may be made through the website or the user's 154 cellular phone. In another example, a mobile phone user may accept to purchase an alternate offer 160 of an upgrade to a mobile service plan as alternate payment for an upgraded phone. The user may complete the transaction by talking with a customer service or sales office of the mobile service provider and the payment for the service upgrade may be charged to the user's credit card, mobile phone account, deducted from a credit balance of a user account with the mobile service provider, and the like.

The method of payment may be associated with a payment facilitator 178 or offer consolidator 180. The method of payment may be based, at least in part on aspects of the payment facilitator 178 or offer consolidator 180. A payment facilitator 178 may support other types of payment such as contingent payment, deferred payment, third party payment, co-payment, and the like. In an example, a payment facilitator 178 may facilitate receiving payment from a user that is contingent on another event, such as a user 154 selling an item on an auction website (e.g. E-Bay or U-bid). The payment facilitator 178 may receive direct payment from the purchaser of the user 154 auctioned item and, based on the payment meeting contingency criteria, facilitate payment to the vendor, such as through the platform 100, to complete the offer. The payment facilitator 178 may deduct certain fees for facilitating the transaction from the amount received through the auction. In addition to selling an item on an auction website, any other sort of contingency may be used, such as a tax refund, an insurance payment, an annuity, a social security payment, a bank deposit, a security transaction, and the like.

The method of payment for an alternate offer 160 may differ from the method of payment for a primary offer 164. The method of payment may be associated with and based at least in part on aspects of the secondary and primary offers. An alternate offer 160 may include a discounted price for the primary offer 164, resulting in the user 154 making a reduced payment for the primary offer 164. The user 154 may also make a payment for the alternate offer 160. The user 154 method of payment for the primary offer 164 may, in such a situation, be different than the user 154 method of payment for the alternate offer 160. There may also be differences between the methods of payment accepted for the primary offer 164 and those accepted for the alternate offer 160. In example and without limitation, certain payment types may be possible for a primary offer 164, such as cash, a personal check, a credit card payment, a debit card payment, or a gift card payment, but other methods such as a PayPal transaction, bank transfer, and the like may not be available as options for an alternate offer 160 payment. In this example, payment for an alternate offer 160 may be possible by using any of the aforementioned payment types, including those methods not available for primary offer 164 payment. In this way, a user 154 may specify a different source of payment for the alternate offer 160 than may have been possible for the primary offer 164. In another example, a user 154 may indicate a different source of payment for the alternate offer 160 even if identical payment types are available for both primary and alternate offers 160. The alternate offer 160 may include the user 154 receiving a credit balance, such as a gift card, that is useable for the primary offer 164. In an example, a user 154 may receive a reduced price for the primary offer 164 by completing the alternate offer 160 and may further receive a gift card associated with the alternate offer 160 that may be used to further reduce or completely pay the reduced purchase price for the primary offer 164. In this way a user 154 may use a credit card to purchase the alternate offer 160, and may use the gift card to purchase the primary offer 164. The gift card may be provided by the secondary offeror 148, an offer consolidator 180, the platform 100, and the like. The gift card may be provided simply for the user 154 completing the alternate offer transaction, or it may be provided when the user 154 provides contact information for a friend to the secondary offeror 148, offer consolidator 180, and the like. There are many other conditions that may be associated with a user 154 receiving a gift card or other credit, and all are within the scope of this disclosure.

In addition to the method of payment being substituted, the currency exchange transactions associated with a transaction may occur away from the transaction. The currency used for payment of the alternate offer 160 may differ from the currency used to express pricing of the alternate offer 160. Exchange of the currency may occur as part of a financial transaction between the payment provider (e.g. a credit card or bank) and the vendor, platform 100, payment facilitator 187, or the like. However, the transaction may complete independently of the currency exchange. In an example, a user 154 may purchase an offer expressed in US dollars. At a later time, or through another transaction, the vendor, platform 100, payment facilitator 178, and the like may cause an exchange of the transaction currency for a currency associated with the vendor, platform 100, payment facilitator 178, and the like. For a given alternate offer 160 expressed in a particular country's currency, a user 154 may indicate that payment may be made using a different currency, the same currency, or a combination of currencies. In an example, and without limitation, a user 154 located in the United States may select an alternate offer 160 from a British entity where the pricing is indicated in British pounds. In this example, payment for the alternate offer 160 may be made using the United States dollar. In a later or separate transaction, the US dollars associated with the alternate offer 160 transaction 170 may be exchanged for British pounds by the vendor, payment facilitator 178, offer consolidator 180, and the like.

Vendors may participate in a referral system associated with the platform 100. A vendor may be a referrer or a referee in a referral relationship with another vendor. A referee may have been referred to the platform 100 by a vendor of the platform 100. A referrer may have referred a vendor to the platform 100. A vendor may receive compensation for referring another vendor to the alternate payment platform 100. In an example and without limitation, a first vendor may refer a second vendor to the alternate payment platform 100. The second vendor revenue that is associated with the platform 100 may be a basis for compensating the first vendor. The compensation to the first vendor may be based on a percent of the second vendor revenue. Alternatively, referral compensation may be graduated. The graduation may be based on a number of transactions, an amount of revenue, a number of referrals, and the like. In an example and without limitation, a primary vendor 144 may receive a 5% referral commission for the first 1000 transactions made by the second vendor and then receives only a 1% referral commission for subsequent transactions. In another example, a primary vendor 144 may receive a 1% referral commission for the first 1000 transactions made by the second vendor and then receive a 5% referral commission for all subsequent transactions. In another example, a referral commission may be a flat fee provided to the first vendor. The fee may be based on the second vendor completing a minimum number of offer transactions through the platform 100. Alternatively, the flat fee may be paid whether or not any revenue is generated by the second vendor. In any event, the total sum paid as a referral commission, the total time that a referral commission may be accumulated, or any variation or combination of total sum and total time may be limited to a pre-set maximum. Many different types of referral commission structures may be associated with the alternate payment platform 100, such as applying a commission value to an outstanding balance or establish a credit balance to pay the referrer vendor fees associated with the platform 100.

Referral commissions may be tracked so that they may be displayed and analyzed through a vendor interface of the alternate payment platform 100. The alternate payment platform 100 may record each referral agreement, each transaction of a referrer and/or a referee, and the like necessary to support referral commission tracking. The vendor interface may allow vendors to monitor and manage referral commissions. In an example and without limitation, referees may be able to track referral commissions paid to their referrer, and referrers may track, display, and manage referral commissions on behalf of their referees. Referral commission reports may be generated by the vendor interface. The vendor interface may also allow vendors to indicate a referral, update the status of a referral, request that a referral commission be paid, and the like.

Subsidizing offers may facilitate optimizing aspects of the alternate payment platform 100, such as sales. Subsidizing offers facilitates providing offers that result in a loss under limited conditions. Offer subsidizing may involve using revenue from one offer to subsidize a negative cash flow offer. Subsidizing may facilitate increasing alternate offer 160 acceptances to more quickly reach a secondary offeror 148 higher paying price tier 204. In an example and without limitation, Zagat may indicate that they would accept payment of $20 for every primary offer 164 and that they prefer eBay to be presented as an alternate offer 160. However, eBay may only be willing to pay $16 to the platform 100 when a user 154 accepts an alternate offer 160. In order to cover the gap of a $20 Zagat payout and a $16 eBay payment, a $4 portion of revenue from a different alternate offer 160 transaction 170 may be allocated to fund the eBay alternate offer 160. However, the $16 payment by eBay may increase when the number of accepted alternate offer 160 exceeds a price tier 204 threshold. If the eBay payment increases to $20 once the alternate offer 160 quantity price tier 204 is reached, the eBay alternate offer 160 may no longer be subsidized. The platform 100 may automatically and dynamically configure subsidy relationships based at least on primary vendor 144 pricing and secondary offeror 148 pricing tiers 204. Additionally, vendor rules and constraints that may limit the alternate offer 160 available based on pricing requirements, such as those herein described, may be overcome by subsidizing offers in order to introduce alternate offer 160 that may have a revenue-maximizing outcome.

An alternate offer 160 may be associated with multiple events, such as sub-offers. An accepted alternate offer 160 that may be associated with a secondary offeror 148 and a user 154 known to the alternate payment platform 100 may have independent pay events. Events associated with the user 154 and the secondary offeror 148, such as purchases, transactions, auction sales, user referrals, and the like may occur after the user 154 accepts the alternate offer 160. These associated events may be tracked by the secondary offeror 148 and/or the platform 100 so that the platform 100 may debit the secondary offeror 148 appropriately. In an example and without limitation, a user 154 may select an eBay alternate offer 160. The user 154 may activate an eBay account, make a bid, make a winning bid, execute a 'Buy It Now' transaction, and the like which may be tracked by the secondary offeror 148 and/or the platform 100 so that the platform 100 can recognize revenue from the secondary offeror 148. In another example, an alternate offer 160 transaction may be linked with a user account in the alternate payment platform 100 so that a record of the secondary transaction (e.g. user, secondary offeror, offer, and the like) may be maintained for later reference. When there is new activity associated with a previous transaction, such as a transaction between the user 154 and the secondary offeror 148 (e.g. a subscription renewal, a repeat purchase of the same offer, a sub-offer, and the like), additional revenue may be generated and associated with the user account.

Revenue generated from multiple events and/or sub-offers may be allocated to the alternate payment platform 100, a platform 100 facilitator 150, a primary vendor 144, a combination of platform 100 participants, and the like. Revenue may be generated on a per event basis or on a volume of events basis. In the scenario described above for eBay, each individual event may be valued and accumulated on a per event basis; a 'Buy It Now' transaction may generate $0.03 while a winning bid may be valued at $0.05. Events may be tracked and payment may be made when a minimum event volume threshold is reached. Alternatively, each event or sub-offer may count toward an event threshold so that reaching the threshold (perhaps within a specified time frame) results in the secondary offeror 148 paying the platform 100. The amount paid may be a variable amount based on, for example, how quickly the threshold was achieved. Revenue thusly generated may be tracked and managed through a vendor interface to the platform 100.

A participant of the alternate payment platform 100, such as a user 154, a primary vendor 144, a secondary offeror 148, a facilitator 150, and the like may ascertain the status of fulfillment of alternate offer 160 requirements for obtaining a primary offer 164. The platform 100 may track user activity associated with fulfillment of an alternate offer 160 that the user 154 selected. The platform 100 may present the user alternate offer 160 related activity on a user interface to the platform 100, a webpage, in an SMS, a pager, an IVR, an email, and the like. In an example and without limitation, if the alternate offer 160 requires that two winning bids be placed on eBay, the platform 100 may track account activation, bid placement, outbid activity, losing bids, and the number of winning bids. Once the user 154 has accumulated two winning bids, the platform 100 may provide confirmation that the alternate offer 160 requirements have been met and may provide access to the primary offer 164 such as through activation codes, passwords, serial numbers and the like associated with the primary transaction facility 114 as herein described.

A participant or user 154 of the alternate payment platform 100 may manage fulfillment of alternate offer 160 requirements through the platform 100. The user 154 may view, such as through a user interface of the platform 100, the alternate offer 160 requirements in such a way that the user 154 may access the resources, websites, and the like for fulfilling the requirements through the platform 100. In an example, a user 154 may be required to perform a purchase (by winning a bid or using 'Buy it Now') and make the payment for the purchase through PayPal. The platform 100 may provide access to eBay and PayPal so that the user 154 can complete the requirements without accessing eBay or PayPal outside of the platform 100. In this way, a user 154 known to the platform 100 may perform any or all actions and meet any or all requirements of a primary 164 and alternate offer 160 through the platform 100.

Transaction auditing may be associated with the alternate payment platform 100. The platform 100 may include accounting associated with aspects of the platform 100 such as transactions. In addition to providing financial accounting services, platform 100 accounting may provide the transaction auditing for the platform 100. Platform 100 accounting may use transaction auditing to verify financial activity associated with transactions such as comparing actual amounts received (e.g. checks, cash, electronic transfers, deposits, and the like) to transaction amounts. Transaction auditing may access transaction information including, individual transaction data, aggregated transaction data, multi-pay events, sub-offers, downstream activities stemming from an alternate offer 160, pricing volume threshold crossings, charge backs, cancelled transactions, vendor fees, currency conversion, and the like. The value associated with the transaction information may be used by transaction auditing to calculate and compare advertiser fees, referral commissions, and the like with actual amounts, such as payments from vendors. If the comparison determines that a vendor has overpaid, a credit may be issued to the vendor and a status alert may be generated notifying platform 100 accounting of the overpayment. If the comparison determines that the vendor has paid the correct amount, a status alert may be generated notifying platform 100 accounting that the vendor has no payment currently due. If the comparison determines that the vendor has paid too little, a status alert may be generated notifying platform 100 accounting of the underpayment. Additionally, an alert may be automatically delivered to the vendor for notification of such underpayment. Delivery of the alert may be by email, SMS, IVR, postal mail, and the like.

The alternate payment platform 100 may have access controls. The access control may include individualized log-ins. An individualized login, such as a user credential associated with the platform 100, may include certain capabilities associated with access and change control that may determine what aspects of the user 154 can access and what aspects of the platform 100 the user can change. In an example and without limitation, a vendor may have a primary contact and a number of secondary contacts associated with the platform 100. Contact credentials for access and change control may differ for primary contacts and secondary contacts, allowing certain tasks and capabilities to be available to primary contacts but not to secondary contacts, and vice versa. In an example and without limitation, a primary contact may be able to change a secondary contact's access level, whereas a secondary contact may not be able to change their level of access.

The access control may include audit logging. Audit logging may include recording changes, such as inserts, updates, deletions, logon errors, and the like. Recording may include writing to a database, such as an audit database, so that entries may be managed, reported, aggregated, reviewed, and the like. Writing to the audit log may be performed automatically. Audit logging may be enabled or disabled for individual users, vendors, transactions, offers, actions, action types, access criteria, and the like. The audit log may be searched, sorted, viewed, and the like. Details of the audit log may be viewed chronologically, by event type, and the like.

The access control may include access restrictions. Access to the alternate payment platform 100 may be based on the identity of a user 154, identity of a group, the action the user 154 may be performing, rules, permissions, and the like. In an example and without limitation, a rule may permit only the primary contact from a vendor to access a profile change webpage. In another example, a matrix of groups and rules/permissions, such as access control rules for the various tiers/pages of the alternate payment platform 100 may be described.

The alternate payment platform 100 may include vendor cross pollinating. The platform 100 may identify one or more offers to present to the user based at least in part on aspects of the user interaction with the platform 100. Aspects of user 154 interaction may include primary offers 164, alternate offer 160, demographic data, user preferences, user 154 queries, and the like. The platform 100 may associate one or more primary offers 164 associated with the user with one or more alternate offer 160 associated with the primary offer 164 that may or may not have been offered and/or accepted by the user to identify the one or more offers to present to the user. The one or more offers may be presented after a user has accepted an alternate offer 160 or otherwise completed one or more transactions through the platform 100. In this way a user known to the platform 100, such as a user introduced to the platform 100 indirectly through a primary offer 164 alternate payment selection, may be offered the one or more offers by the platform 100 directly.

In an example and without limitation, a user 154 who may have accessed a primary offer 164 and selected an alternate offer 160 may be presented with an additional offer after the completion of the alternate offer 160 transaction. In an example, a user 154 has obtained a primary offer 164 of a McAfee Anti-Virus product by participating in a BMG Music Club alternate offer 160. The platform 100 may directly present the user 154 an offer for a Wall Street Journal subscription. The choice of the platform 100 directly presented offer may be based on a user demographic, such as one indicating the user 154 lives in a zip code that has a good acceptance rate for Wall Street Journal subscription offers. In this way, the platform 100 may direct users (customers) toward vendors, such as primary vendors 144. The platform 100 may charge a fee associated with directing users 154 toward vendors based on the directed user 154 completing one or more transactions with the vendor.

The platform 100 may facilitate vendor cross-pollination further by associating alternate offer 160 with platform 100 primary offers 164. In an example, a user 154 may be directed to an e-commerce site to purchase a digital music player or other accessory based at least in part on the user 154 having previously accepted a digital music alternate offer 160 through the platform 100. The user 154 may also be presented an alternate offer 160 from a shoe vendor as alternative payment for the digital music player (e.g. based on a user preference or history indicating the user may have interest in an offer from the shoe vendor). In this way the platform 100 facilitates cross-pollination of e-commerce vendor, the digital music player vendor, and the shoe vendor.

Alternate offers 160 may take place before a primary offer 164 sale/checkout or after the sale/checkout. Additionally the user 154 may be presented with multiple offers from the platform 100. The platform 100 may present the multiple offers at one time, such as through a webpage showing the offers, or may be presented at more than one time. Directly presented offers may be presented in succession on individual webpages or may be presented together on a single webpage. Offers may include low value items, such as a digital music song download, and the like.

The alternate payment platform 100 may include release testing for testing changes, additions, conversion, updates, and new releases of aspects of the platform 100 to ensure the platform 100 achieves high quality performance and reliability. Release testing may be automated to support and facilitate platform 100 complexity. The platform 100 release may be deployed to a subset of users, a subset of vendors, and the like. The deployment may be automatic or manual and may include a sufficient numbers of users and vendors to create a statistically significant sample size. The release may be deployed for only certain tasks. New releases of an alternate payment platform 100 may be tested for performance, usability, bugs, advance warning of support needs, and the like. These measurements may be made automatically. In an example and without limitation, usability may be inferred from tracking user times to complete tasks, by analyzing results from subjective assessments, by tracking the number of completed versus abandoned transactions in relation to the number of bugs, and the like.

The platform 100 may be associated with vendor administration. Vendor administration may involve tracking active placements. Active placements may include URLs, emails, and other touchpoints, such as Uninstall, Nagscreen, UnSubscribe, Cancel, Shopping Cart Abandon, and the like, involving the alternate payment platform 100. Active placement tracking may involve account managers, vendors, and the like identifying where a given product page is being promoted. Active placement tracking may facilitate making sure "best practices" are implemented, identifying misrepresentations, demonstration of live examples for prospective vendors, identifying sources of traffic, and the like. In an example, active placement tracking may capture touch point type along with associated information, duration comments, and the like. A vendor interface may facilitate active placement tracking by presenting information and analysis that may identify revenue associated with a 'constant' traffic source and a transient source.

The alternate payment platform 100 may comprise a vendor interface. The vendor interface may facilitate vendor registration, configuration of the vendor account, management of a vendor account, monitoring of a vendor account, and the like. The vendor interface may facilitate monitoring of primary offers, referrals, referral commissions, active placements, statistics, and the like. Analytics and reports may be generated through a vendor interface.

The alternate payment platform 100 may comprise a primary vendor interface 112. The primary vendor interface 112 may allow primary vendors 144 to perform analytics for each product available through the alternate payment platform 100 and monitor performance of various customer communications. Analytics may be available as a daily feed through a dashboard of the primary vendor interface 112. Analytics may include traffic sources, actions taken on a product webpage, products sold, repeat customers, the association of revenue generated with traffic source, the association of revenue generated with repeat customers, payment option performance, touch point analytics, and the like. Analytics may assist primary vendors 144 in decision making and adjusting communication strategy. Analytics may assist a primary vendor 144 in determining optimal pricing of a product. In an example and without limitation, analytics may demonstrate payment option performance, such as the rate of transaction completion for credit-card transactions versus alternate payment platform 100 transactions. Analytics may assist a primary vendor 144 in determining how to convert webpage visitors into customers by analyzing past transactions. Analytics may assist a primary vendor 144 in determining when to introduce the alternate payment platform 100 during a transaction Analytics may assist in determining user 154 related fraud, such as when a user completes multiple alternate offers 160 without regard to the terms and conditions of the alternate offer 160. In an example and without limitation, analytics may assist in deciding if an alternate payment platform 100 may be introduced prior to a payment point during a transaction, with the payment point, after the payment point, at any time in the transaction, and the like by providing data regarding rates of transaction completion for each touch point. Wherever there may be a payment option, there may be a touch point.

Touch points may include email, shopping path activities, website, intra-product touch points, physical world touch points, and mobile touch points. Email touch point tracking may include tracking a user's 154 activity that is associated with an email, as described elsewhere herein. Shopping path activity touch point tracking may include tracking shopping cart abandonment, browser window closures, purchase of a lower version or upgradeable product, emails, and the like. Website touch point tracking may include tracking a user's 154 activity associated with a website, such as navigation to a download page, viewing of marketing materials, interaction with a beta/trial portion of a website, viewing of Op/Ed pieces, navigation to a fee-accessible portion of a website, participation in a product discussion forum, geographical location and demographics of a user 154, any graduated level that is outside the shopping experience, such as LinkedIn, and the like. In an example and without limitation, if a user 154 may participate in a product forum, the system may substitute marketing text with an offer to try the product for free. Intra-product touch point tracking may include tracking a user's 154 activity associated with an intra-product touch point, including web pages activated, emails sent, and/or additional offers made after uninstalling, canceling, and/or unsubscribing a product; interaction with a "nag screen"; interaction with a fraud detection system, and the like. In an example and without limitation, a user 154 may enter a piece of pirated or hacked code or serial number. If this code may be detected by the fraud detection system, the user 154 may be allowed to select an alternate offer 160 on the alternate payment platform 100 in order to obtain a valid code or serial number. Physical world touch point tracking may include tracking a user's 154 activity associated with a physical world touch point, including newspaper and periodical inserts, postal mail, in-store touch points, product inserts, and the like. Activity associated with physical world touch points may occur either on the alternate payment platform 100 or in the physical world, such as by mailing back a product insert to participate in an offer in return for a full rebate on the product. Mobile user touch point tracking may include tracking a user's 154 activity associated with a mobile touch point, including services selected, features selected, and the like.

The primary vendor interface 112 may allow primary vendors 144 to extend secondary offeror 148 timeout, as described elsewhere herein with respect to offer optimization 102. The primary vendor interface 112 may allow primary vendors 144 to add a landing page option for the check-out process. In an example and without limitation, a vendor may want to specify additional context on the alternate payment platform 100 payment module using a landing page which may be provided with default messaging, custom messaging, and the like. The landing page may be customized based on a traffic source, a season, a demographic, and the like.

The alternate payment platform 100 may comprise pricing alternatives. In an example and without limitation, a vendor may indicate a minimum acceptable price for one region of the world but indicate a different minimum acceptable price for another region. In another example, pricing may be based on a demographic. In an example and without limitation, a vendor may indicate a lower minimum acceptable price for seniors and a higher one for non-seniors. In another example, pricing may be based on a psychographic. In an example and without limitation, a vendor may indicate a lower price for members of Amnesty International. The alternate payment platform 100 payment module 108 may aggregate pricing parameters for each region, demographic, and psychographic where a vendor may indicate a pricing alternative in a pricing table. The pricing table may allow the vendor to indicate the pricing alternative as a new entry, as a percentage of a prior minimum acceptable price, and the like. Pricing alternatives may be indicated in any currency in use. The pricing table may be accessed by the payment module when a user indicates a certain regional location, demographic, psychographic, and the like.

A vendor may receive additional information related to a user 154 after a transaction is complete. In an example and without limitation, a user 154 may accept a User ID from a vendor. Using this User ID, the vendor may track and report completed offers associated with the User ID. In another example, a vendor may have access to an Order ID or Product ID associated with an alternate offer 160. The vendor may be able to track the fulfillment status of an alternate offer 160 using the Order ID or Product ID. Vendors may be able to indicate transaction parameters to which they want access. Vendors may make transaction parameter choices by configuring a transaction parameter list. Upon initiation of a new transaction, the transaction parameter list may be accessed. All relevant parameters may be delivered to the vendor once they become available in the course of the transaction. The transaction parameters may be available on a webpage, in a report, by email, and the like.

The platform 100 may facilitate offer management by allowing primary vendors 144 to select alternate offer 160 to make available as alternate payment options for their primary offers 164 (a k a pulling offers). The platform 100 may alternatively, or additionally, facilitate offer management by pushing a selected offer or offers to a primary vendor 144. The selection may be based on aspects of the primary offer 164, primary vendor 144, secondary offeror 148, alternate offer 160, user location or geography, and the like. The primary vendor 144 may review selected offers that are pushed so that only offers that meet the primary vendor 144 offer selection criteria may be presented to users seeking to use the alternative payment platform 100 to acquire a primary offer 144.

Pushing offer(s) may facilitate a reduction in the overhead and human interaction associated with pulling offers by utilizing the offer selection facilities 104 and other offer coordination aspects of the platform 100 to push highly relevant offers to the primary vendor 144 to approve use of the alternate offer 160 as alternate payment for the primary offer. Preferences and other alternate offer 160 related constraints identified by the primary vendor 144 to the platform 100 may be included in the selection of offers to push to the primary vendors 144. A primary vendor 144 may identify preferences that indicate certain types of offers, or offers with certain content may not be presented to a user as an alternate payment offer for the primary offer 164. The primary vendor 144 may identify these and other preferences through the primary vendor user interface 112. The primary vendor 144 may select options such as "accept all pushed offers," "accept all qualified pushed offers," "accept all pushed offers except those listed below," "only accept pushed offers listed below," "accept no offers automatically," and the like. A primary vendor 144 may choose to review each pushed offer or offers before making a decision about allowing the offers to be presented to users 154.

Vendors may establish relationships with affiliates to further promote sale of the vendor's product or service. Affiliates may be associated with primary vendors 144, secondary offerors 160, and may also be associated with the platform 100. An affiliate associated with the platform 100 may be similar to an alternate offer 160 consolidator 180 in that the affiliate provides a real-time connection between a user 154 and a primary 164 or alternate offer 160 through the platform 100. Vendors may compensate an affiliate for a completed transaction, such as a purchase of a primary offer 164. Therefore, vendors may want to compensate an affiliate for a user 154 who uses the alternate payment platform 100 to complete a primary offer 164. To ensure an affiliate that is involved in a platform 100 related transaction receives proper credit for a transaction for which they provided the user 154, the platform 100 may support receiving, storing, tracking, and reporting the affiliate identification associated with transactions. Maintaining a record of the relationship of an affiliate with a platform 100 transaction may facilitate proper accounting of post-transaction actions such as charge backs, credit and debit adjustments, and the like.

To promote quality use of the platform 100, a best practices forum may be associated with the platform 100. Participants to the platform 100 may have access to the best practices forum through one or more interfaces of the platform 100, through email contact, other messaging contact, physical mail, and the like. A best practices forum may benefit participants of the platform 100, such as primary vendors 144, secondary offerors 148, offer consolidators 180, payment facilitators 178, users 154, facilitators 150, and the like. A best practice forum may include material, such as on-line material, that may include getting started guides, primers, examples of touch points, examples of emails with high conversion rates, and the like. A best practice forum may include any information that may facilitate a vendor maximizing use of the platform 100 which may result in increasing platform 100 associated revenue.

The platform 100 may be associated with customer service. Customer service may facilitate a participant accessing and receiving service associated with an interaction with the platform 100. In an example, a user interface to the platform 100 may support viewing and printing receipts of all platform 100 transactions associated with the user. The transaction receipts provided by the platform 100 may include an alternate offer 160 consolidator 180 name or ID, or may instead only show the secondary offeror 148 information and the platform 100 information, thereby making it easier for a user 154 to determine if the receipt is the one desired.

Many questions asked by participants may have previously been answered. The platform 100 may be associated with at least a semi-automated customer service that may provide automatic responses to know inquiries by the users 154 and/or participants of the platform 100. Automating at least a portion of the platform's 100 customer service interaction may reduce costs. However, providing access to an administrator of the platform 100 through a customer service interface may facilitate quick, high quality answers to questions not readily identified in the semi-automated environment.

Providing information, such as offer redemption information, through the primary transaction facility 114 or as part of a primary offer 164 may include webpage based display, instruction download, emailing redemption instructions, and the like. A customer service system or interface of the platform 100 may facilitate a user 154 selecting how to receive offer redemption information for each transaction, for all transactions, for certain types of transaction, and the like. In an example, a user 154 may select to always receive redemption instructions by email, while also selecting to receive download instructions associated with wireless devices through the wireless (e.g. cellular phone) network. In this way the user 154 may select two or more non-conflicting ways of receiving offer redemption information.

The alternative payment platform 100 may be associated with offer co-registration. Offer co-registration may facilitate a user registering for two or more offers and/or services simultaneously through the platform 100. Co-registration may allow a user 154 to register for one offer, such as a primary offer 164, and simultaneously register for an alternate offer 160 that facilitates making the primary offer 164 a free offer to the user 154. In an example, a user 154 may accept an alternate offer 160 from Yahoo to signup for a Yahoo mail account to acquire the primary offer 164. During signup, the user 154 may be presented with another offer to join a mailing list to receive an upgraded Yahoo mail account for free. In another example, a user 154 may be registering to purchase a primary offer 164, such as computer software programs and may, during signup, receive an offer (e.g. through a pop-up window) to join a free computer software club using the user registration information and receiving the primary offer 164 for free. In these examples, co-registration may facilitate users gaining the advantages of the alternative payment platform 100, without having to seek out the platform 100 through a primary offer checkout process.

Offers associated with co-registration may be selected based on one or more data being input by the user. Alternatively, co-registration offers may be based on the results of a secondary offeror auction offer bidding 124 facility. In this way, a secondary offeror that desires to gain access to co-registration users, may bid high enough to be the highest bidder.

The platform 100 may be associated with extended email management facilities. Extended email facilities may include support for multiple email templates, viewing text of sent mails, remailing users, mass-mailing users and/or vendors, defining additional email parameters, and other aspects of managing email associated with the platform 100. Extended email facilities may provide platform 100 administrators, facilitators 150, primary vendors 144, secondary offerors 148, and other participants with beneficial capabilities, support, and tools to manage email communication associated with the platform 100.

Extended email facilities may include support for multiple email templates so that system level and/or vendor level email messages may be available in template form. Email templates may facilitate consistent communication of platform 100 or transaction related messages so that email recipients can readily discern the relevant aspects of the message. Consistent email messaging may also contribute to a visual brand associated with the platform 100 that may be included in the email templates.

The following email template is only an example of one type of template. The syntax, structure, content, and all aspects of this template may be different and any and all differences are herein included.

In the following Template 1, a facilitator 150, in this case referred to as TrialPay, fulfills delivery of primary offer 164, and the merchant provides instructions on how to install the product. Placeholders, denoted by % sign are dynamic parameters that will be completed at run time to personalize the email. Dear % fname %, Congratulations on successfully completing the TrialPay Checkout. To activate your copy of % productname1%, please follow these steps below: 1. Download % productname1% from % downloadURL1%

2. Install % productname1% on your computer 3. Use the following serial code to activate your version of % serialcode1% [repeat the above blocks if there are multiple products and iterate on the placeholders in the form of % productname2%, % serialcode2%, % downloadURL2%, etc] For questions about your order and the offer you completed through TrialPay, please reply to this email or contact TrialPay at generalsupport@trialpay.com.

For technical questions about installation, downloading or product usage, please contact % companyname % customer service: % supportURL % or contact % supportEmail %. [Insert additional merchant-specified instructions here] Thanks, The TrialPay Team Extended email facilities may include support for viewing text of all messages sent from the platform 100. Viewing text of message sent from the platform 100 may benefit platform 100 administrators, vendors, and users in that all participants addressing a specific email content may view the content as needed. A record, such as a log or audit trail of email messages sent by the platform 100 may be maintained and may be visible to participants of the platform 100. The record of email messages may further include a link, such as a hyperlink to the content of email messages in the email record log.

Extended email facilities may include support for re-mailing users. To provide high quality customer service, it may be beneficial to allow a platform 100 administrator such as a customer service facilitator 150 to quickly and easily re-send an email message previously sent to a user 154 by the platform 100. An interface of the platform 100, such as a facilitator interface 122 may include email re-sending capability through one or more menus of the interface. As elsewhere herein described the facilitator interface 122 may support emailing users of the platform 100. Resending emails may be included in the facilitator interface 122 email facilities.

Extended email facilities of the alternative payment platform 100 may include mass-emailing of users and/or vendors. Mass-mailing of users 154 and/or vendors may include selecting users and/or merchants based on criteria. The criteria may include alternate offer 160 activity, such as users who may have recently selected a type of alternate offer 160 (e.g. movies) or may have a pending transaction or recent receipt for the type of alternate offer 160. The criteria may include users 154 who have been directed to the platform 100 through more than one merchant. The criteria may include users 154 who have reviewed but not selected one or more types of alternate offer 160 (e.g. a user may have reviewed an entertainment offer but may have not selected the offer). These and other criteria may facilitate developing and delivering a mass emailing that targets users 154 meeting the criteria. Because the mass email is targeted, it may have a greater chance of resulting in the user taking an action such as visiting the platform 100 or accepting an offer. Criteria may also be applied to mass emailing of vendors. Some examples of vendor selection criteria for mass emailing include vendors who earn more than $500 per month and are located in Germany, vendors who only use email as their lead development source, vendors who are located in Brazil. Any information that may be available or acquired by the platform 100 may be included in a mass email selection criteria for users and/or vendors.

Extended email facilities may support defining additional email parameters and/or introducing new variables to facilitate managing email associated with the platform 100. Additional parameters and new variables may include introducing and supporting different email systems, interfacing the platform 100 email system with other aspects of the platform 100 such as accounting, transactions, and the like. Supporting defining new parameters may also facilitate introducing different types of email usage in the future.

Figure 16:
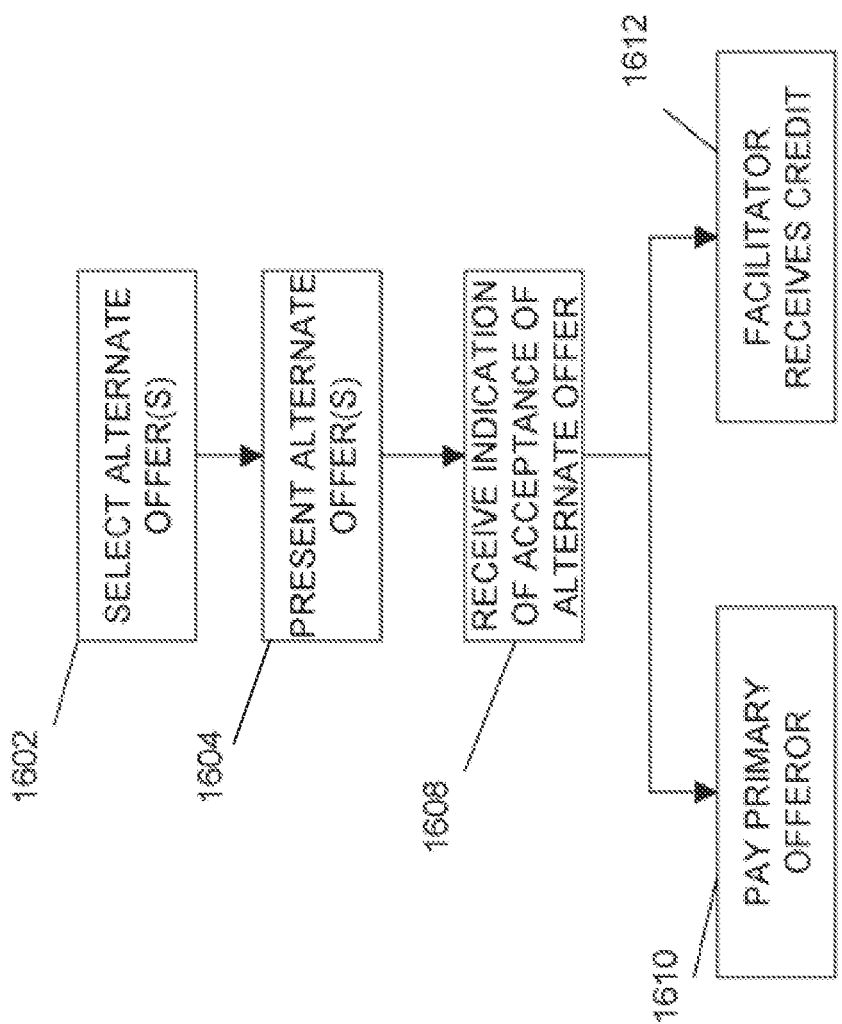
FIG. 16 depicts a block diagram of an alternative payment platform.

Referring to FIG. 16, in one preferred embodiment the methods and systems disclosed herein may include a method of facilitating an alternative payment platform 100 that includes steps of selecting alternate offers 160 at a step 1602, presenting alternate offers 160 at a step 1604, receiving an indication of acceptance by a user 154 of an alternate offer 160 (such as an indication of the user's engagement with an advertiser 148) at a step 1608, paying a primary offeror 1610 who offered an item received by the user 154 and providing a credit to the facilitator at a step 1612. Such methods and systems may include: selecting one or more alternate offers 160 to pay for an item 182 associated with a primary offer 164; presenting the selected alternate payment offers to a user 154; receiving an indication of acceptance of one of the alternate payment offers; and in response thereto receiving payment for presenting the accepted offer, and providing payment to the offeror of the primary offer 164.

In embodiments the indication of acceptance is received from the user 154. In embodiments the indication of acceptance is received from the vendor of the alternative payment offer. In embodiments the payment for the primary offer 164 is a negotiated amount. In embodiments the negotiation is between a host of alternative payment offers and the primary offer merchant 144 or the alternate offer advertiser 148. In embodiments the payment for the primary offer 164 is a variable amount. In embodiments the amount varies based on: the accepted alternate offer 160; a count of primary offer payments; lifetime value or quality of the user completing the alternate offer 160; location of the user (e.g., foreign users may be worth less to advertisers); a credit score of user; a spending capacity of the user; the propensity of user to spend; the propensity of the user 154 to use an alternate offer 160; loyalty of the user 154 to the alternate offer 160; type of alternate offer completed; number of alternate offers completed; relationship of primary vendor 144 to the host of the alternative payment platform 100 or the like. Such methods and systems may include fulfilling the primary offer or the alternate offer, such as by delivering an item or items.

In embodiments receiving an indication of user 154 acceptance of one of the alternate payment offers includes receiving a confirmation of user acceptance to the accepted offer vendor. In embodiments receiving payment for presenting the accepted offer is in response to delivering an indication of the user acceptance of the accepted offer to the accepted offer vendor.

Figure 17:
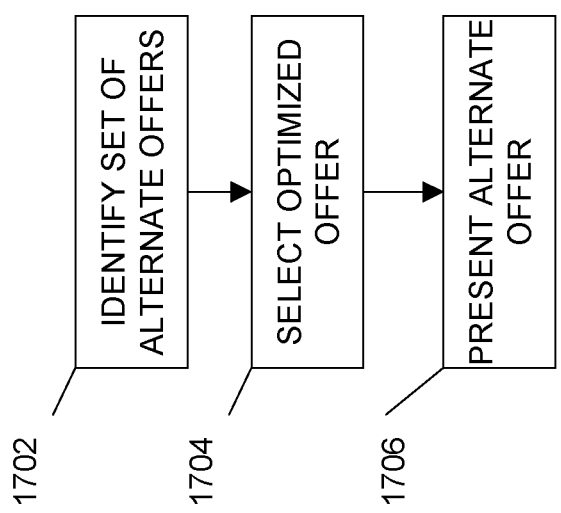
FIG. 17 depicts a block diagram of an offer optimization.

Referring to FIG. 17, in one preferred embodiment the methods and systems disclosed herein may include a method of facilitating an alternative payment platform 100 that includes steps of identifying a set of alternate offers 160 to a primary offer 164 at a step 1702, selecting an optimized offer at a step 1704 and presenting one or more optimized alternate offers 160 to a user 154 at a step 1708.

In embodiments optimizing is based on anticipated benefit to a party associated with at least one of the alternate offers 160, wherein the party is a primary offeror 144, a user 154, a facilitator 150, or a secondary offeror 148. In embodiments the optimized relationship is based on a metric associated with the quality of a user. In embodiments the optimized relationship is based on maximizing participation in a secondary offering. In embodiments the relationships comprise suitability of the offers to a user 154 associated with the primary offering.

In embodiments optimizing is based on an expected profit associated with presenting the one or more identified offers: wherein the expected profit is based on the identified offers; wherein the expected profit is for the primary vendor 144; wherein the expected profit is for the host of the alternative payment platform 100; wherein the expected profit is for the secondary offeror 148; and wherein the expected profit is for a weighted combination of the profit for at least two of the primary offeror 144, the host of the alternative payment platform 100, the user 154, and the secondary offeror 148.

In embodiments optimizing is based on user demographics. In embodiments user demographics are provided by a primary offeror or vendor 144 or by the user 154. In embodiments the user demographics include a user location. In embodiments the demographics include an IP address.

In embodiments the user demographics include at least one of user connection speed and user browser type. In embodiments optimizing is based on historic transactions associated with a primary vendor or offeror 144. In embodiments the historic transactions include selection of alternate offers 160. In embodiments optimizing is based on a URL associated with the primary offer 164. In embodiments optimizing includes reducing adverse selection. In embodiments an automatic process selects the alternate offer 160 from a plurality of alternate offers 160. In embodiments the automatic process is an optimization process that is directed at optimizing a parameter that is associated with the alternate offer 160. In embodiments the parameter is a measurement of user interest in the alternate offer 160. In embodiments the parameter represents at least one of network traffic, a conversion rate measuring a proportion of users 154 who accept the alternate offer 160, overall profit of a transaction, payout amount, and total volume of completed alternate offers 160.

Figure 18:
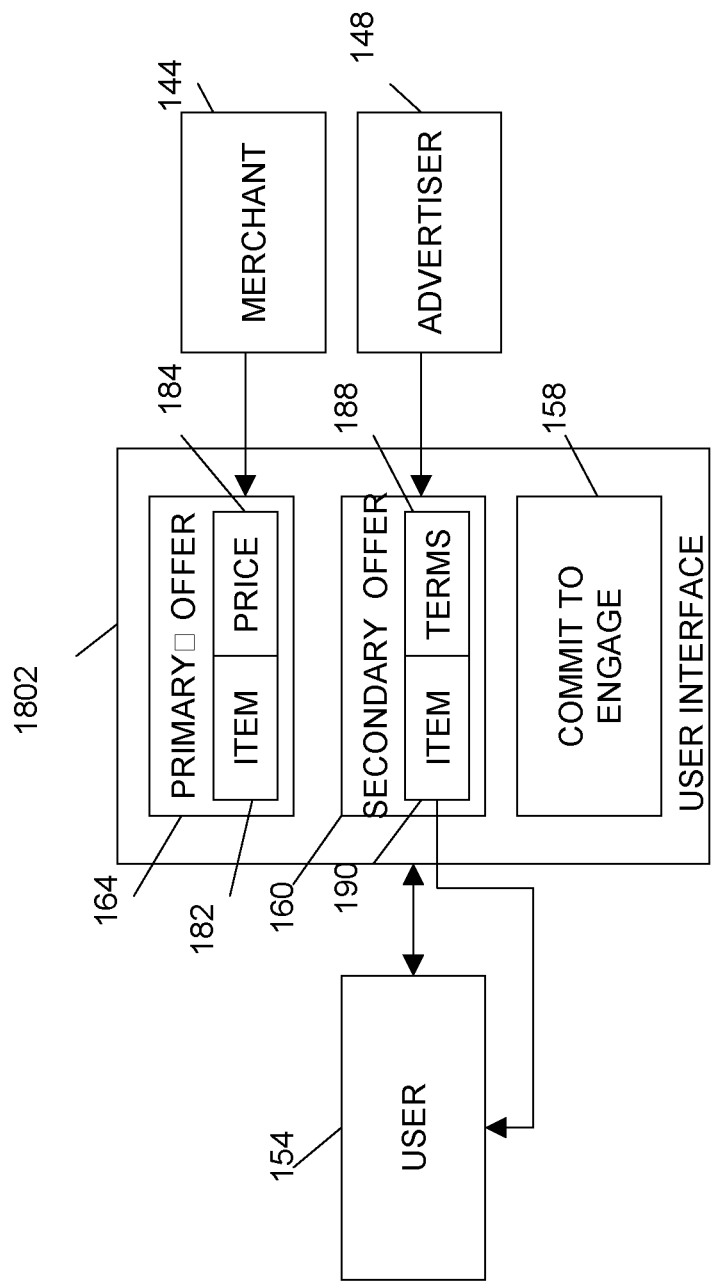
FIG. 18 depicts a block diagram of a user interface.

Referring to FIG. 18, in one preferred embodiment methods and systems are provided herein for providing a user interface to an alternate payment platform 100. Such methods and systems may include, in an environment in which a user 154 is presented with a primary offer 164, providing an interface 1802 that allows a user to view at least one alternate offer 160. Such methods and systems may include identifying an alternative form of payment for the primary offer 164; presenting an alternate offer 160 from at least one secondary offeror 148; and upon user 154 selection of an alternate offer 160, providing an interface 1802 by which a user 154 commits (such as via a response 158 to the alternate offer 160) to satisfy an obligation with respect to the selected alternate offer 160 the satisfaction of which will entitle the user to obtain an item 182 offered in the primary offer 164. In embodiments the user interface 1802 may maintain the same appearance as the environment of the primary offer 164.

In embodiments the interface maintains the same ecommerce environment of the primary offer 164. In embodiments the alternate offers 160 are ranked. In embodiments presenting the alternate offers 160 includes promoting a visual prominence of the higher ranked alternate offers 160. In embodiments the highest ranked offer is presented to influence the user 154, such as toward selecting the highest ranked offer. In embodiments the interface 1802 includes presenting real-time status of the user's 154 acceptance of the alternate offer 160. In embodiments the interface 1802 allows a user 154 to view the user's activity associated with prior primary offers 164. In embodiments the interface 1802 allows a user 154 to view the user's 154 activity associated with prior alternate offers 160. In embodiments the interface 1802 allows a user 154 to view a receipt of a primary offer 164, an alternate offer 160, and an association there between. In embodiments, upon satisfaction of the obligation, methods and systems may include providing an interface 1802 by which the fulfillment of the primary offer 164 is initiated. In embodiments fulfilling the primary offer 164 includes at least one of downloading digital content to the user 154 and providing access to a premium service. Methods and systems may further include activating at least one of the digital content and the premium service. In embodiments fulfilling the primary offer 164 includes receiving a mailing address of the user 154 for delivery of the primary offer 164.

Figure 19:
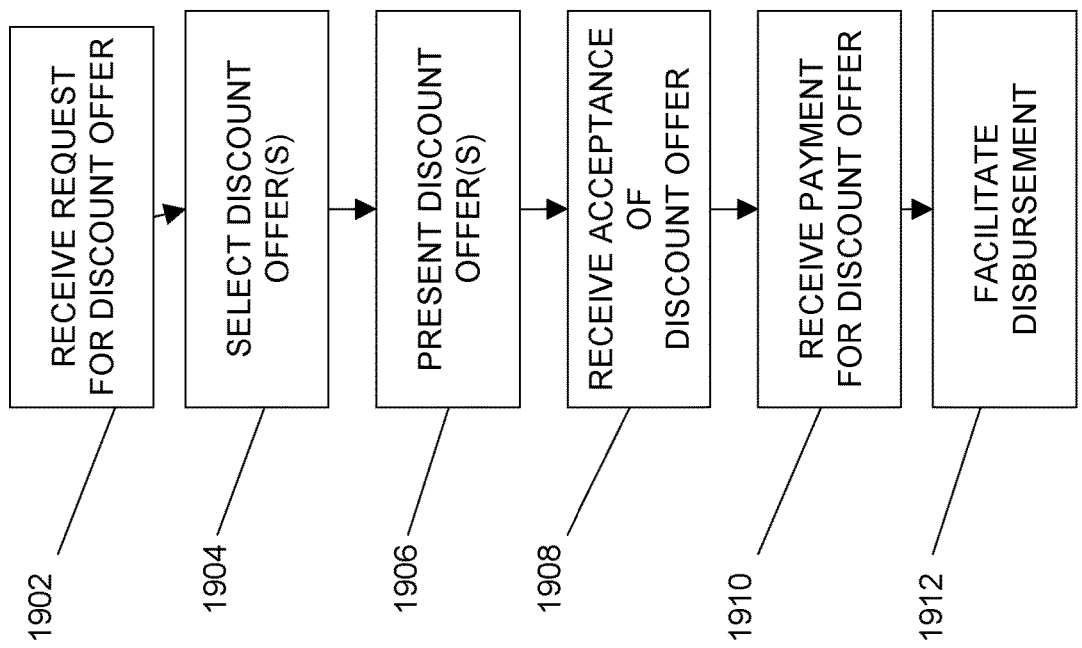
FIG. 19 depicts a block diagram of a discount offer.

Referring to FIG. 19, in one preferred embodiment the methods and systems disclosed herein may include methods and systems for electronic transaction discounting, such methods and systems including: at a step 1902, receiving a request to present discount offers for a primary offer 164, and in response thereto; at a step 1904 selecting one or more discount offers based on aspects of at least one of the primary offer 164, the request, and the discount offers; at a step 1908 presenting the selected discount offers to a user 154; at a step 1910 receiving a user 154 acceptance of one of the discount offers; including at a step 1912 receiving a method of payment; and at a step 1914 in response thereto facilitating disbursement of the payment among the primary offeror 144 and the discount offeror. In embodiments of such methods and systems the primary offer 164 payment adjustment is a discount percent. In embodiments of such methods and systems the primary offer 164 payment adjustment is a predetermined reduction amount. In embodiments of such methods and systems facilitating using the method of payment includes providing the method of payment to an accepted discount offer vendor. In embodiments of such methods and systems facilitating the method of payment includes relaying credit card information of the user 154. In certain such embodiments facilitating the method of payment includes obtaining permission to use the credit card information for the primary offer 164 and the discount offer. In embodiments facilitating using the method of payment includes providing the method of payment to a primary offeror 144. Methods and systems may further include providing a discount amount to the primary offeror 144. In certain such embodiments the user 154 may accept a plurality of discount offers to increase the discount amount.

Figure 20:
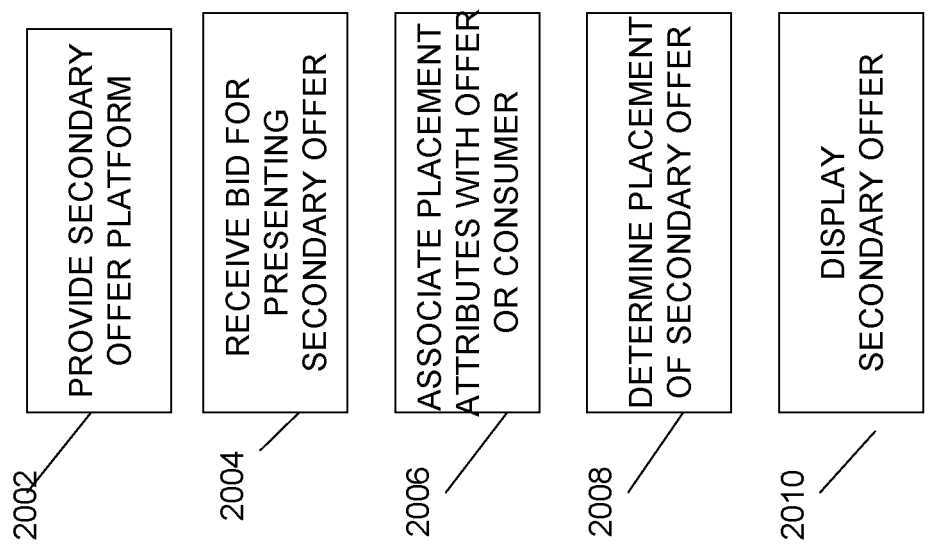
FIG. 20 depicts a block diagram of a method of taking bids for placement of secondary offerings.

Referring to FIG. 20, methods and systems disclosed herein may include methods and systems for facilitating alternate payment offer bidding. Such methods and systems may include: at a step 2002 providing a platform for presenting secondary offers as an alternative to payment for a primary offer 164; at a step 2004 receiving a bid for presenting the alternate offer 160, wherein the bid includes placement attributes; at a step 2006 associating the placement attributes with at least one of the primary offer 164 and a user related to the primary offer 164; at a step 2008 determining a placement of the alternate offer 160 based on the association of the placement attributes and a bid amount; and at a step 2010 displaying the alternate offer 160 in the determined placement in the presentation of alternate offers 160. In embodiments the placement attributes include at least one of a user attribute, characteristic or property, a location of placement, a time of placement, a size of placement, and proximity of placement to another offer. In various embodiments, bids may be for user properties (or a combination of such properties) and placement is the outcome of those bids. If advertisers bid on a "generic" user 154, in effect they are bidding on placement.

Figure 21:
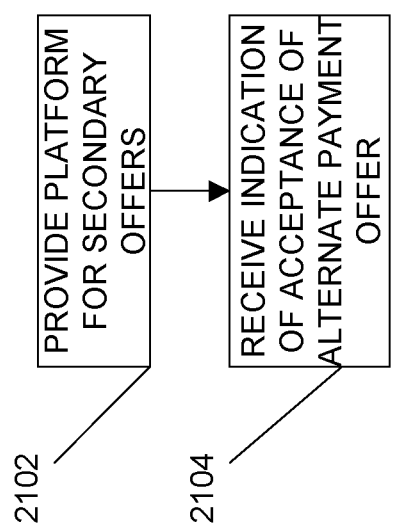
FIG. 21 depicts a block diagram of a preferred embodiment of an alternative payment platform.

FIG. 21 shows a basic method of providing an alternate payment platform 100. Such alternative payment methods and systems may include: at a step 2102 providing a platform for presenting an alternate offer 160 to a user 154; and at a step 2104 receiving an indication of the user's 154 acceptance of the alternate offer 160. In embodiments the user's 154 acceptance of terms of the alternate offer 160 comprises an alternative to a payment. In embodiments the payment is for a primary offer 164, wherein the user's acceptance comprises a commitment to satisfy an obligation with respect to the alternate offer 160.

Figure 22:
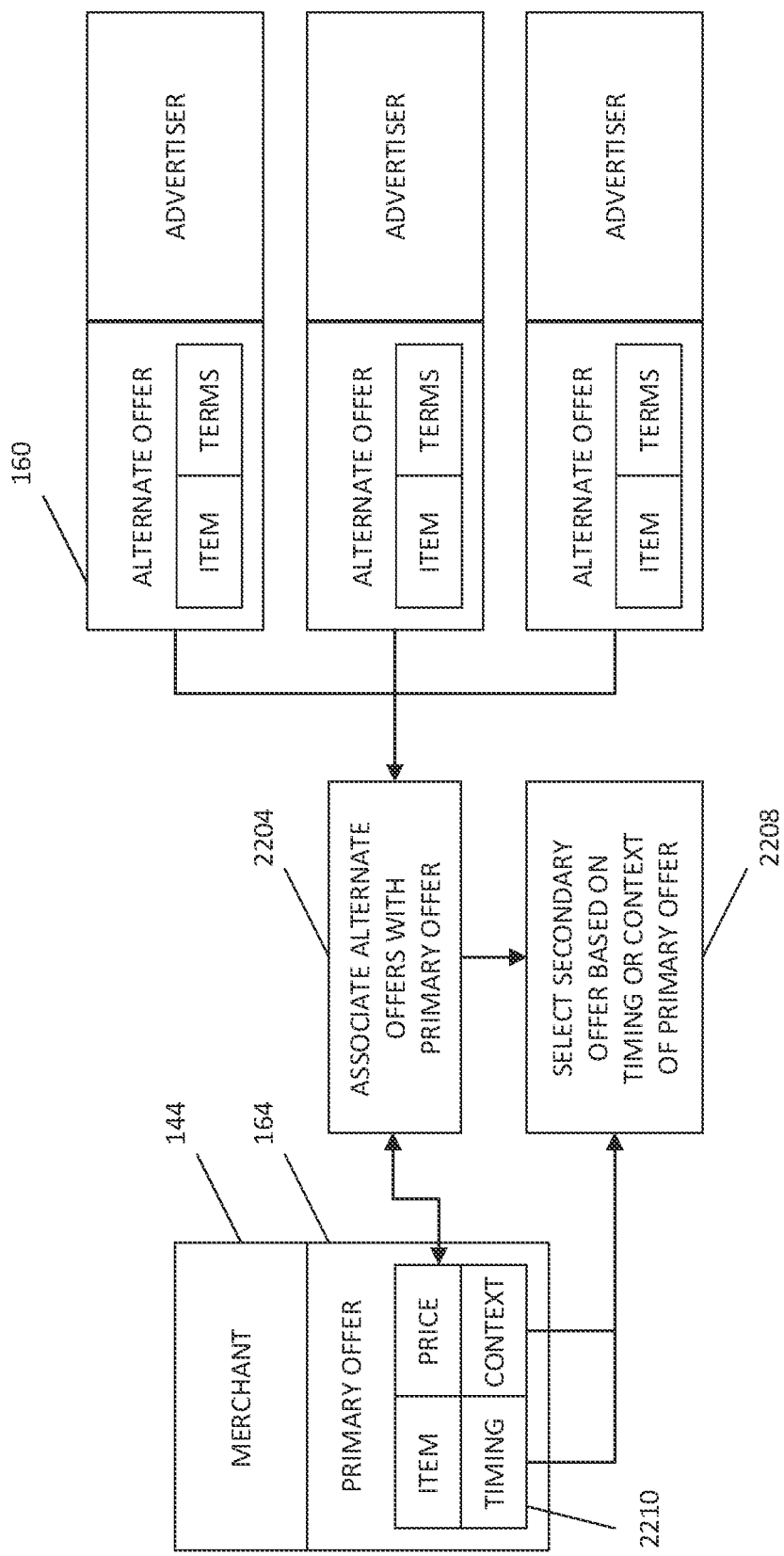
FIG. 22 depicts a block diagram related to timing or position of an offer in an alternative payment platform.

FIG. 22 shows a basic alternative payment platform 100 for supporting methods and systems disclosed herein. Such alternative payment methods and systems may include: at a step 2204, associating a plurality of alternate offers 160 from a plurality of primary offerors 144 with a primary offer 164 for an item 182, at least one such alternate offer 160 allowing an alternative form of payment for the item 182; and at a step 2208 selecting an alternate offer 160 to present in association with the primary offer 164, wherein such selection is based on at least one of the timing 2210 and the context 2212 of the primary offer 164. In embodiments the context 2212 relates to at least one of the user's 154 past transactions for the item offered in the primary offer 164, past communications received by the user 154 in connection with the primary offer 164, the user's 154 past transactions with respect to an item associated with an alternate offer 160, the demographics of the user 154, an action of the user 154 with respect to the primary offer 164, the content of a page on which the user 154 views the primary offer 164, and the communication medium used to deliver the primary offer 164. In embodiments the timing 2212 relates to at least one of the sequence of communications by which the user 154 was presented with the primary offer 164 and the amount of time during which the user 154 has viewed the primary offer 164.

Figure 23:
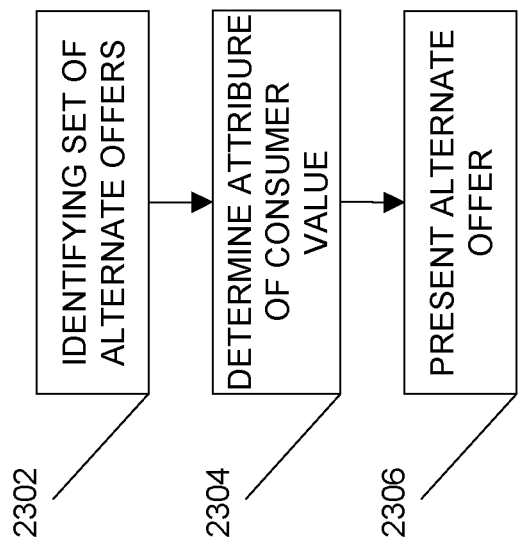
FIG. 23 depicts a block diagram of a method of consumer value optimization associated with an alternative payment platform.

FIG. 23 shows steps associated with methods and systems for optimizing user value associated with an alternate payment platform 100. Such methods and systems may include: at a step 2302 identifying a set of alternate offers 160; at a step 2304 determining an attribute of user value associated with at least one of the alternate offers 160; and at a step 2306 presenting the one or more identified offers based on the user value attribute. In embodiments the relationship is the likelihood of the user accepting an offer. In embodiments the user value is a value to a secondary offeror 148. In embodiments the optimized relationship is related to the secondary offeror payment amount. In embodiments the user value is a lifetime user value. The embodiment may further include adjusting one or more aspects of the identified offers based on the user value. In embodiments the determination of a user value includes comparing the user value to an alternate offer 160 threshold. In embodiments in response to the determination exceeding the alternate offer 160 threshold, the alternate offer 160 is included in a presentation of alternate offers 160 to the user. The embodiment may further include determining a payment to a primary vendor 144 based on user value. In various other embodiments, optimization may be based on any of the optimization factors described throughout this disclosure, including the factors described in connection with FIG. 17.

Figure 24:
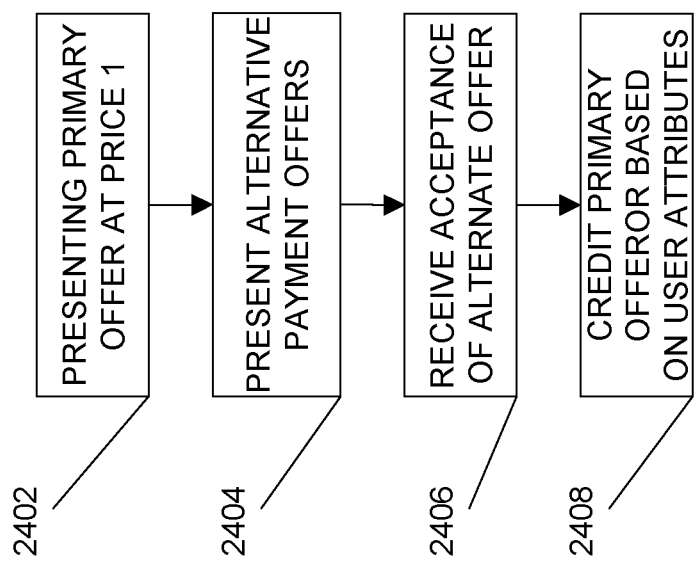
FIG. 24 depicts a block diagram of customer differentiation associated with an alternative payment platform.

FIG. 24 depicts methods and systems for supporting differentiation of users 154 use of an alternative payment platform 100 with one or more of the attributes described throughout this disclosure, such as based on the comparative value different users ascribe to various primary offers 164 and alternate offers 160. Such methods and systems may include: at a step 2402 presenting a primary offer 164 to a plurality of users 154 for a predetermined price; at a step 2404 presenting alternate payment offers to the users 154, wherein the alternate payment offers comprise a payment for the primary offer 164; at a step 2406 receiving acceptance of the alternate payment offers from the plurality of users 154; and in response thereto at a step 2408 paying a variable amount for the primary offer 164 based on an attribute of at least one of the plurality of users 154, wherein the variable amount is lower for a first user 154 than a second user 154 among the plurality of users 154, such as based on an estimate of the comparative value each such user attributes to the primary offer 164 or one or more alternate offers 160. In embodiments the estimate of comparative value used to determine the variable amount may be based on various factors, such as any of the optimization factors described throughout this disclosure, including user demographics, user location, user psychographics, past transactions executed by a user, or the like. In embodiments the variable amount paid for each user 154 of the plurality of users 154 is based on the user 154 location. In embodiments the variability of the amount is not disclosed to the plurality of users 154.

Figure 25:
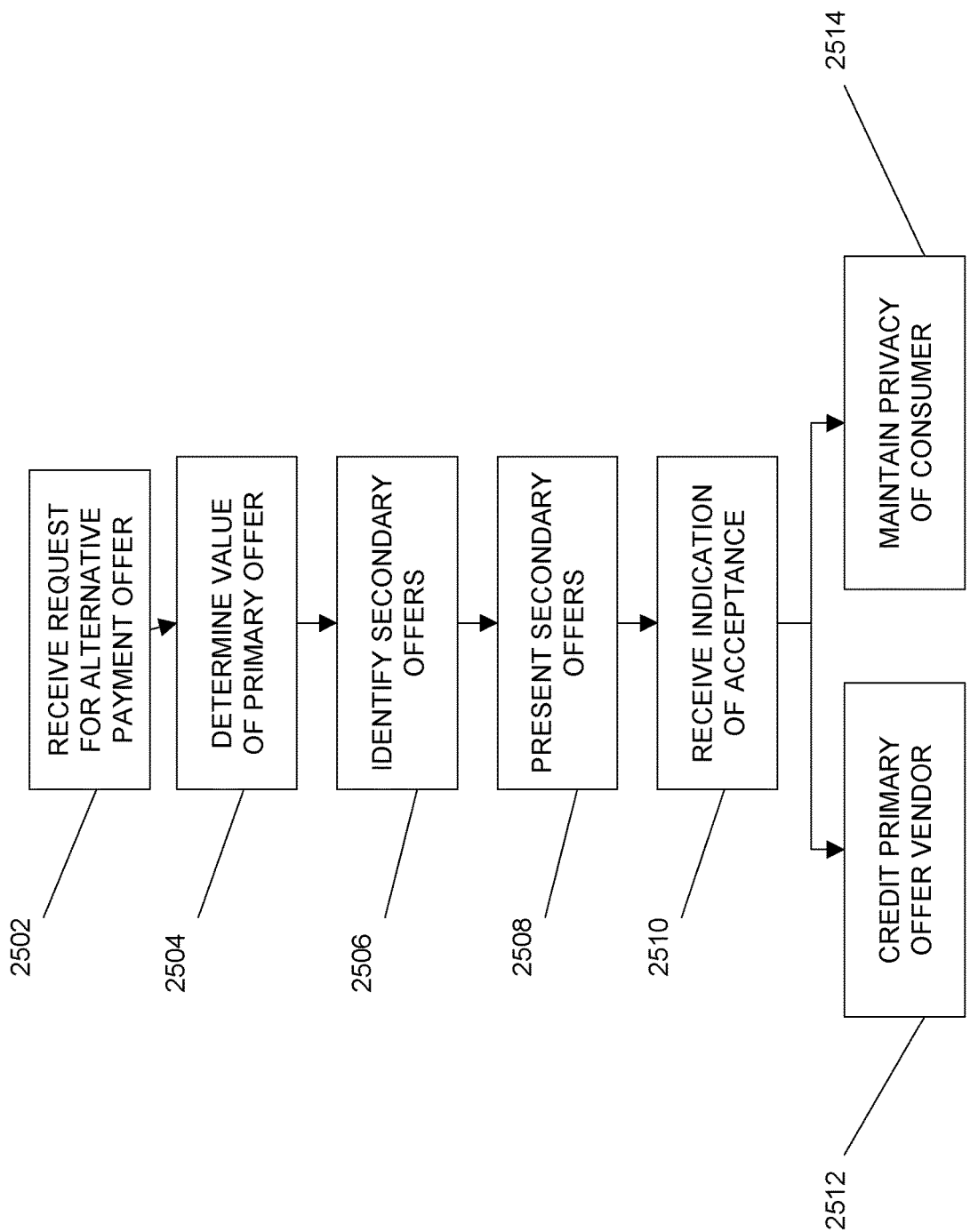
FIG. 25 depicts a block diagram of steps for maintaining consumer privacy in offer fulfillment.

FIG. 25 shows a method of anonymous offer fulfillment associated with an alternative payment platform 100. Such methods and systems may include: at a step 2502 receiving a user 154 request for alternate payment of a primary offer 164; at a step 2504 determining a value of the primary offer 164; at a step 2506 identifying alternate offers 160 based on the primary offer 164 value; at a step 2506 including the identified alternate offers 160 in a presentation of offers; at a step 2510 receiving an indication of the user's acceptance of a presented alternate offer 160 and in response; at a step 2512 providing payment for the primary offer 164; and at a step 2514 facilitating anonymous payment of the primary offer 164 to the user 154. In embodiments such methods and systems are performed in the absence of an initial user request. Such methods and systems may further include securely recording an association of the accepted offer and the primary offer 164 with the user providing access to the recorded association to a third party. In embodiments the user is a minor and the third party is the minor's legal guardian. In embodiments the third party is financially responsible for the user's acceptance of the presented offer.

Figure 26:
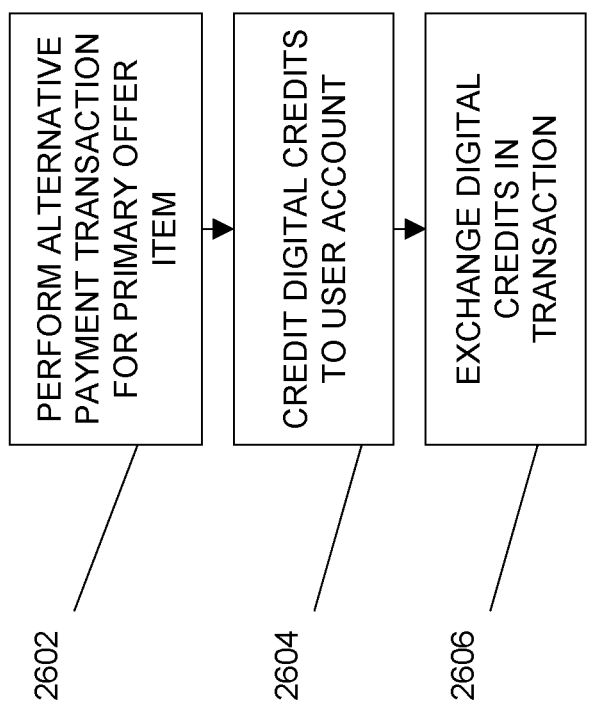
FIG. 26 depicts a block diagram of method of using a digital account associated with an alternative payment platform.

FIG. 26 depicts steps for a method of providing digital credit accounts associated with an alternative payment platform 100. Such methods and systems may include various steps, including: at a step 2602 performing a transaction associated with acquiring an item 182 offered in a primary offer 164 through an alternate payment platform 100; at a step 2604 crediting digital credits for the transaction to a user digital account associated with the platform 100; and at a step 2606 exchanging the digital credits in association with an alternate payment platform transaction.

In embodiments primary offerors 144 provide digital credits. In embodiments providing digital credits is based on value of a primary offer 164. In embodiments the primary offer 164 value is an aggregation of primary offer transactions associated with the user digital account. In embodiments secondary offerors 148 provide digital credits. In embodiments providing digital credits is based on an alternate offer 160 value. In embodiments the primary offer 164 value is an aggregation of alternate offer 160 transactions associated with the user 154 digital account. In embodiments the digital credits are exchanged for at least of one of free shipping, upgraded shipping, customization, a product, a service, a service extension, and the like. In embodiments the digital credits are exchanged for an item 182 associated with a primary offer 164. In embodiments the exchanged digital credits comprise a portion of the primary offer 164 price. In embodiments the user 154 may exchange the digital credits in association with a future transaction.

Figure 27:
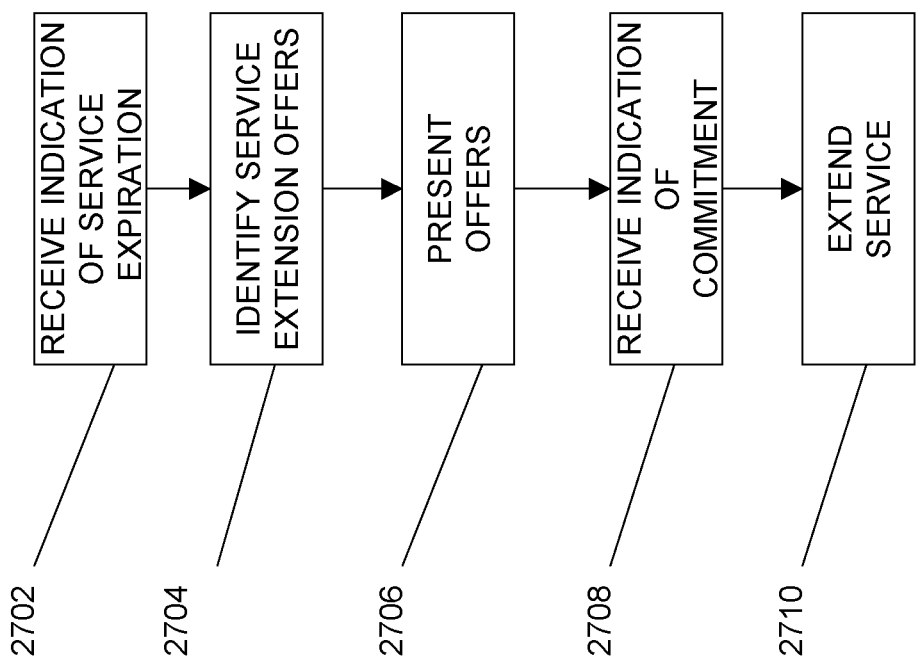
FIG. 27 depicts a block diagram of a service extension method associated with an alternative payment platform.

FIG. 27 depicts a method and system of service extension associated with an alternative payment platform 100. Such a methods and systems may include: at a step 2702 receiving an indication of service expiration (such indication possibly occurring in advance), and in response thereto at a step 2704 identifying a plurality of alternate offers 160, the completion of which will allow the user 154 to extend the service; at a step 2706 presenting the plurality of alternate offers 160 to a user 154 of the service; and at a step 2710 extending the service, extension of the service being based on the user 154 indicating a commitment at a step 2708 to satisfy an obligation related to one of the plurality of presented alternate offers 160. In embodiments at least one of the alternate offers 160 allows a user to satisfy a non-monetary obligation as a basis for extending the service.

Figure 28:
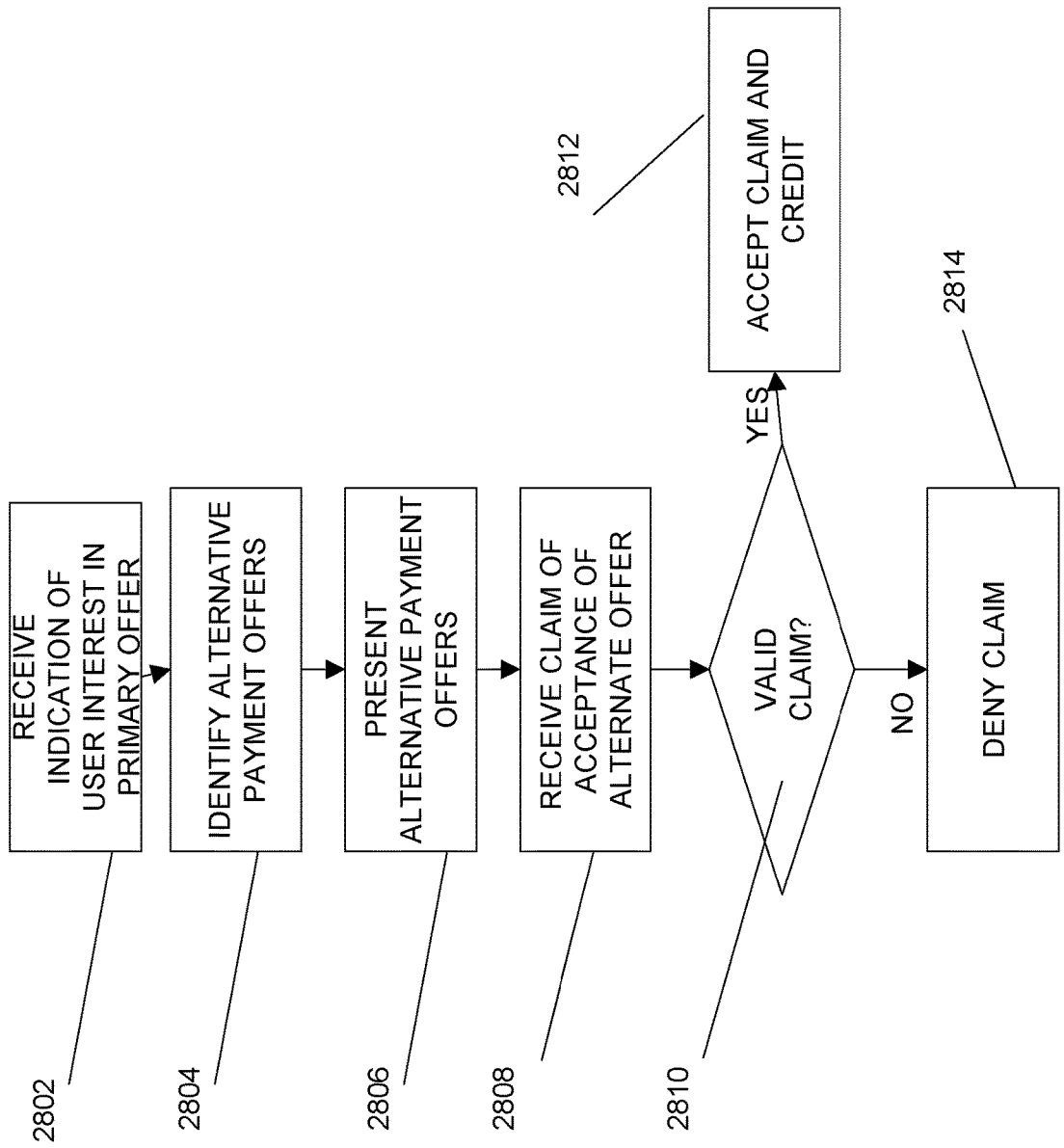
FIG. 28 depicts a block diagram of a method of using receipts associated with an alternative payment platform.

FIG. 28 shows a method of fulfilling transactions associated with an alternate payment platform 100. Such methods and systems may include: at a step 2802 receiving an indication of user 154 interest in a primary offer 164; at a step 2804 identifying at least one alternative payment offer 160 for the primary offer 164; at a step 2806 including the alternative payment offer 160 in a presentation of offers; at a step 2808 receiving the user's 154 claim of acceptance of a presented alternative payment offer 160; at a step 2810 assessing the user's 154 claim; and at least one of (a) at a step 2812 accepting the user's 154 claim and crediting the user 154 with the primary offer 164 and (b) at a step 2814 denying the user's 154 claim. Such methods and systems may include receiving confirmation of the user's 154 acceptance of the alternative payment offer 160.

In embodiments assessment of the user's 154 claim is based on at least one of: the user's 154 history of transactions; the user's 154 demographic data; the user's 154 location; the characteristics of the primary offer 164; and the characteristics of the alternate offer 160, or any of the factors described throughout this disclosure, such as the factors used to optimize offers as described in connection with FIG. 17.

Figure 29:
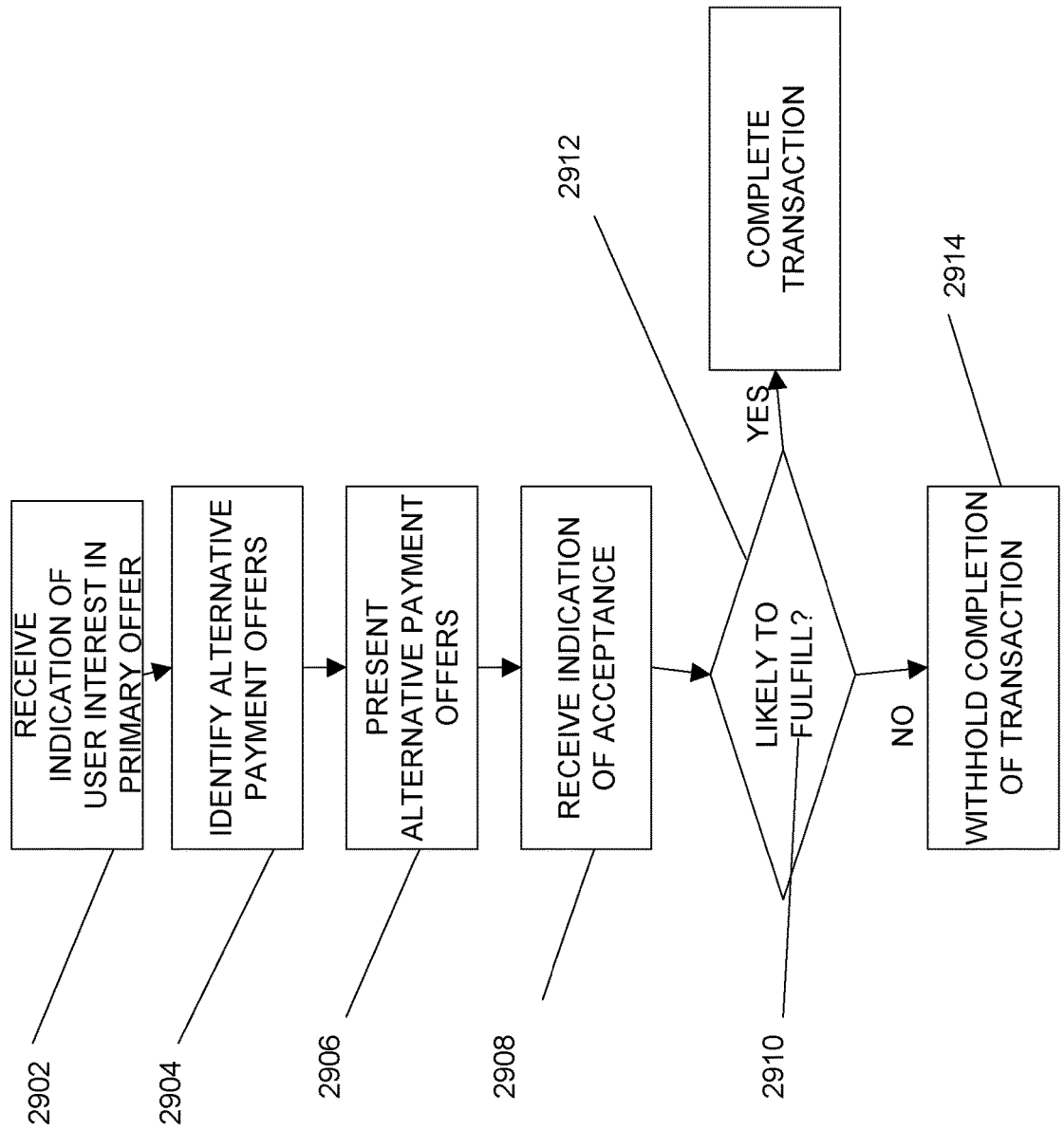
FIG. 29 depicts a block diagram of a method of preventing fraud associated with an alternative payment platform.

FIG. 29 depicts a method of preventing fraud, using an alternative payment platform 100. Such methods and systems may include: at a step 2902 receiving an indication of user 154 interest in a primary offer 164; at a step 2904 identifying alternate offers 160 that allow the user 154 to obtain a benefit associated with the primary offer 164; at a step 2906 including the identified alternate offers 160 in a presentation of offers; at a step 2908 receiving an indication of the user's 154 acceptance of a presented alternate offer 160; at a step 2910 assessing the likelihood of the user 154 fulfilling an obligation with respect to an alternate offer 160; and upon a negative assessment, at a step 2912 withholding completion of a transaction. Upon a positive assessment, the system may at a step 2914 complete the transaction. In embodiments the alternate offer 160 is an alternative payment offer 160. In embodiments withholding completion is based on an assessment of probability of fraudulent activity. In embodiments assessment of the user's 154 claim is based on at least one of: the user's 154 history of transactions; the user's 154 demographic data; the user's 154 location; the characteristics of the primary offer 164; and the characteristics of the alternate offer 160. In other embodiments the assessment is based on any of the factors disclosed herein, including, without limitation, any of the factors used to optimize offers as disclosed in connection with FIG. 17.

Figure 30:
FIG. 30 shows a user interface screen in which a user is presented with an opportunity to view alternate offers.

FIG. 30 shows an interface 3002 of a primary offeror 164, into which alternate offers 160 are made available, as facilitated by a facilitator 150 of an alternative payment platform 100. Here the method of the alternative payment platform 100 is presented in the ecommerce environment of the primary offeror 164. The interface 3002 shows a checkout page of a website, in which the user 154 is presented with an opportunity to get an item 182 associated with a primary offer 164 (in this case an email program) for free by engaging with the alternative payment platform 100. The user 154 is prompted to start checkout, to choose an alternate offer 160 and is promised the item 182 for free.

Figure 31:
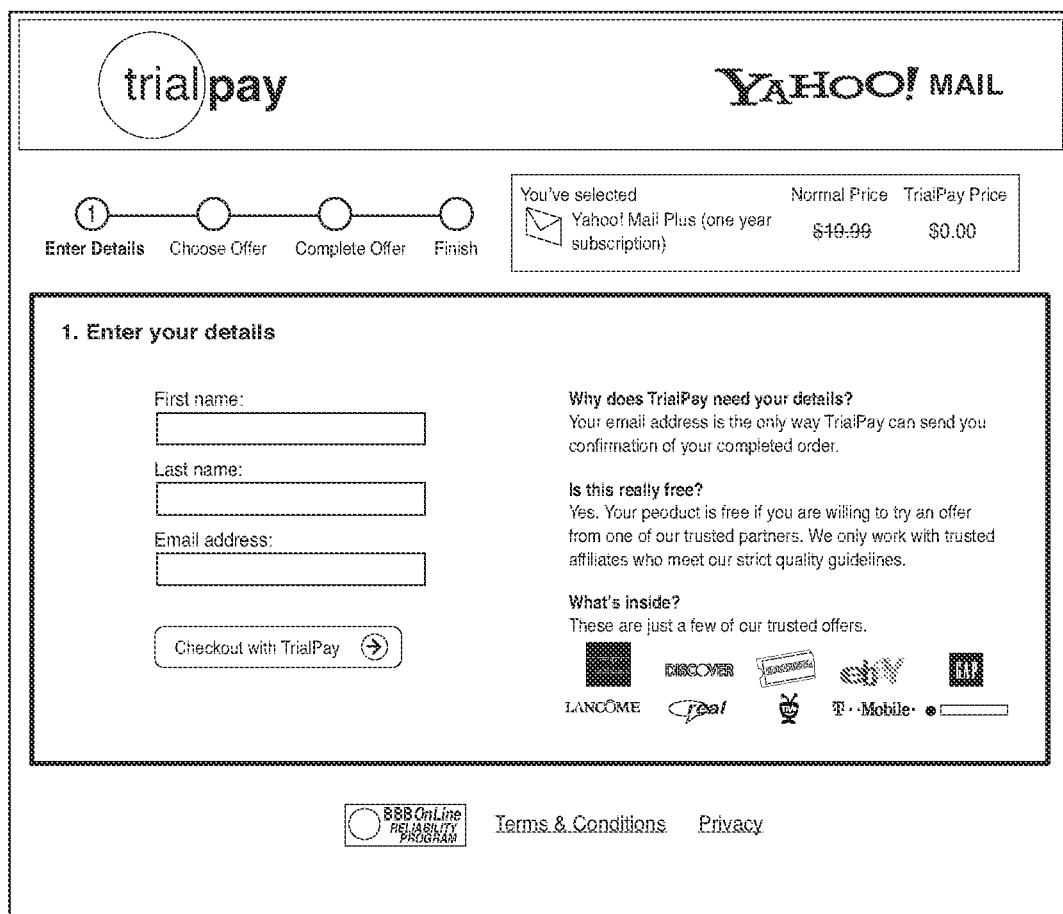
FIG. 31 depicts a screen that a user views upon initially interacting with an alternative payment platform.

The methods and systems disclosed herein may be implemented in a variety of environments, including electronic commerce environments. In such environments, various user interfaces assist in such implementation. FIG. 31 et seq. depict certain embodiments of such user interfaces. FIG. 31 shows a screen 3102 where a user 154 may arrive upon indicating interest in engaging with the alternative payment platform 100. The user 154 is prompted to enter details about the user 154 and is provided with information about how the alternative payment platform 100 operates.

Figure 32:
FIG. 32 depicts an offer selection screen a user receives after entering details at the screen depicted in FIG. 31.

FIG. 32 shows a user interface screen 3202 where a user can view alternate offers 160 that are presented by the alternate payment platform 100. A user can select a preferred alternate offer 160.

Figure 33:
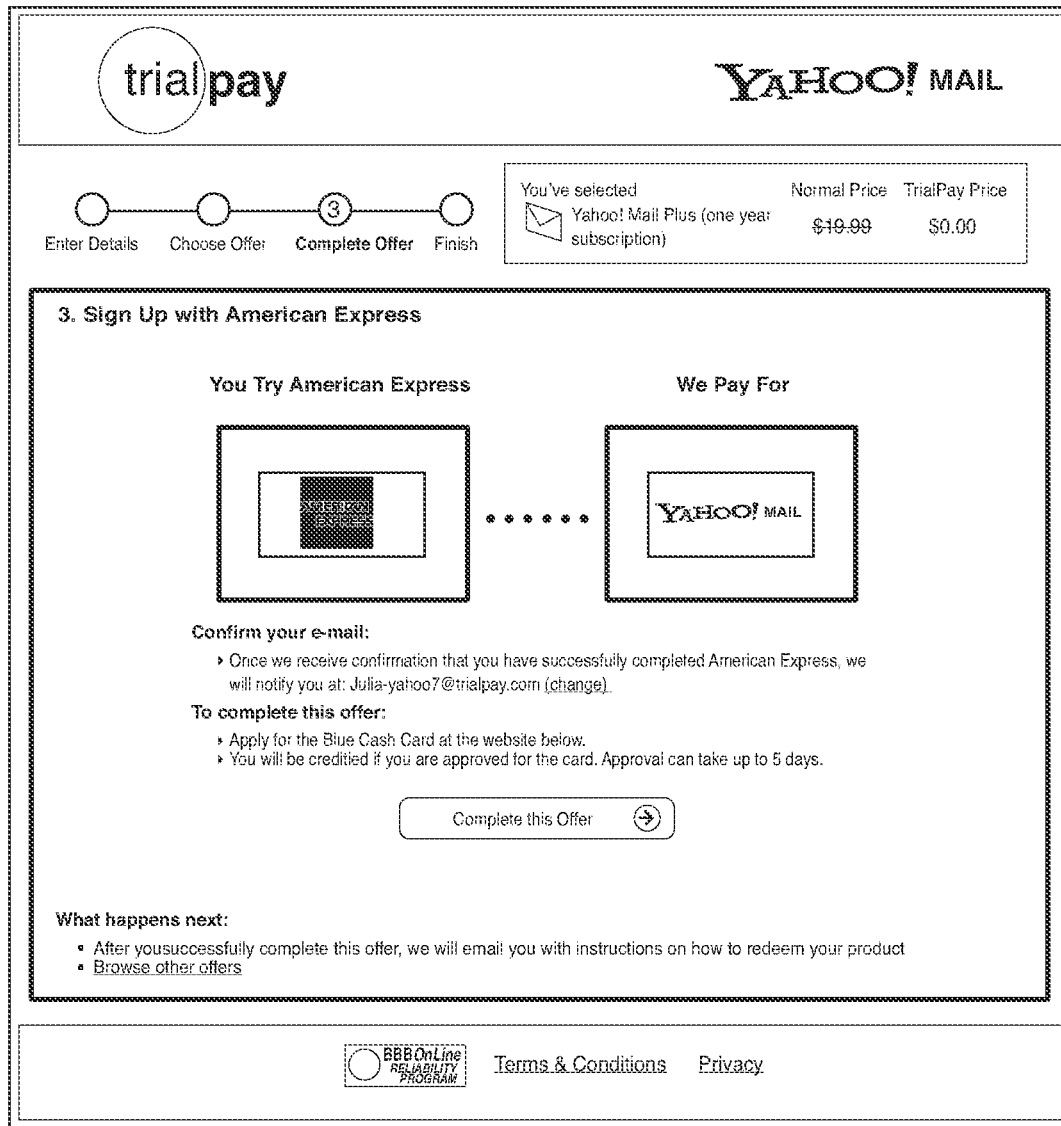
FIG. 33 depicts a user choosing an alternate offer.

FIG. 33 shows a user 154 interface screen 3302 where a user 154 has selected a particular alternate offer 160 (in this case committing to try the American Express card) and in exchange the user 154 is promised to receive the email program item 182 for free.

Figure 34:
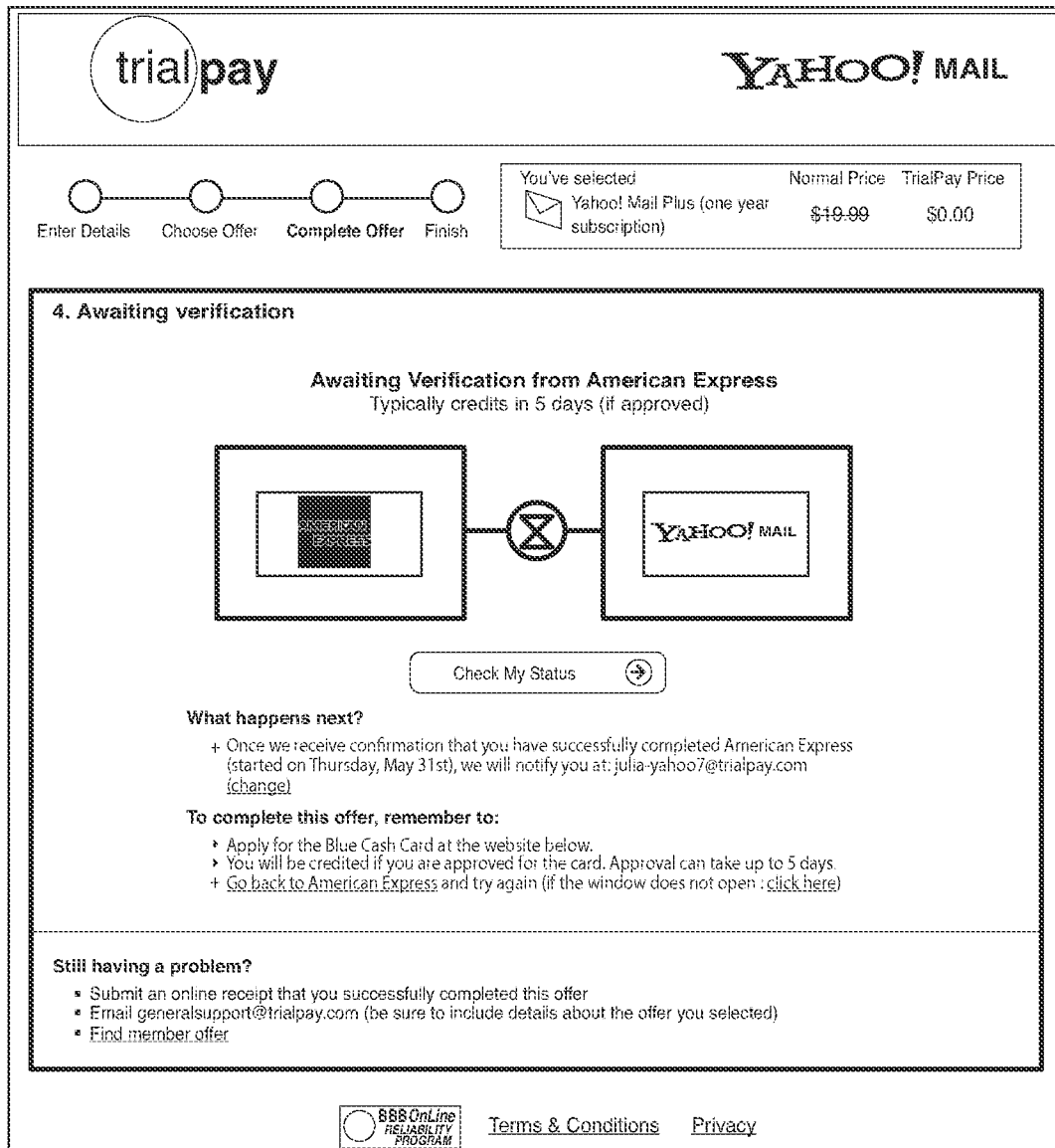
FIG. 34 depicts an awaiting verification screen.

FIG. 34 shows a user interface screen 3402 shown to a user 154 while the alternative payment platform 100 relays notification of acceptance of an alternate offer 160. During this step, an alternate offer 160 that requires approval after acceptance by a user 154 may initiate an approval step. Otherwise, the platform 100 may initiate the steps, as described above, associated with completion of the alternate offer 160.

Figure 35:
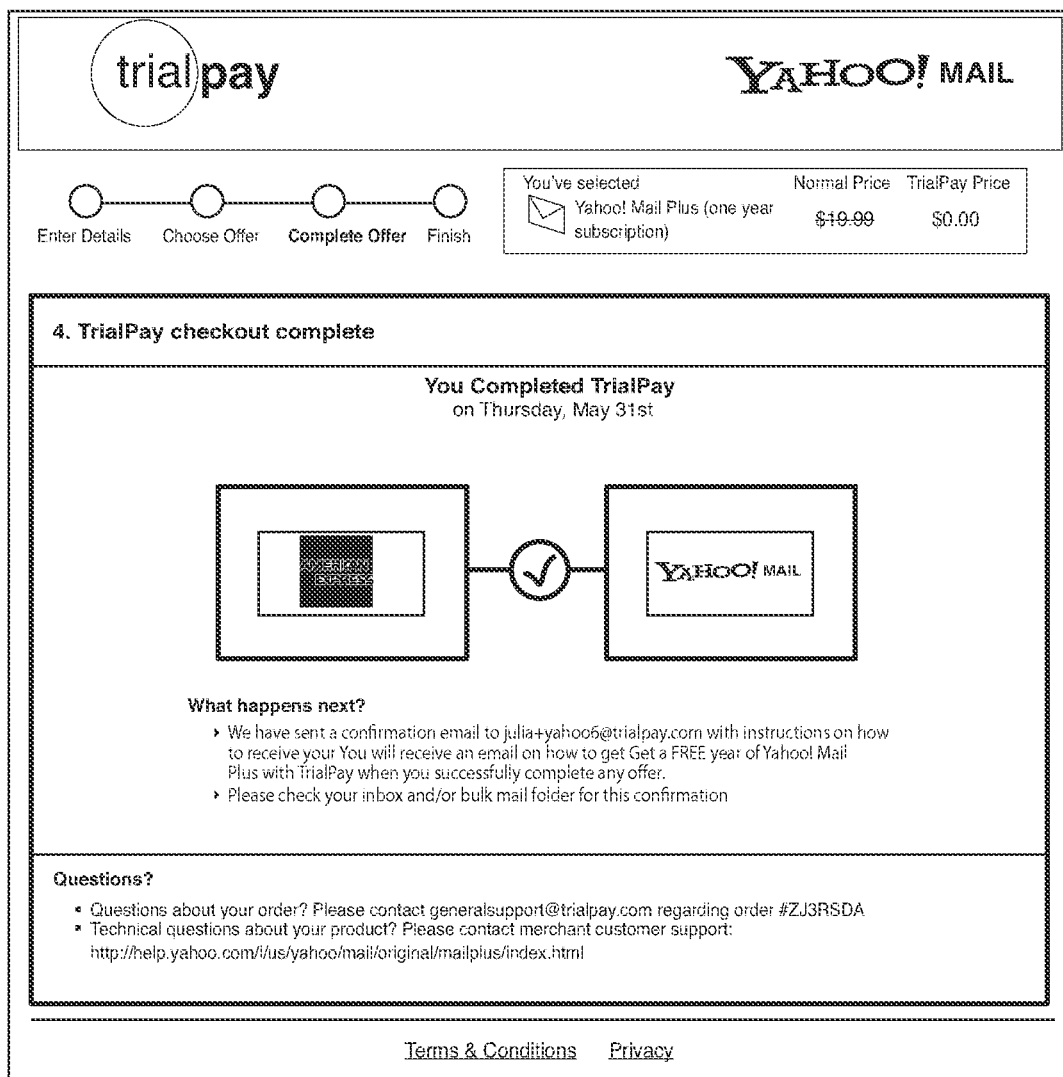
FIG. 35 depicts an email a user may receive on registering with the alternative payment platform.

FIG. 35 shows a screen 3502 showing a notice a user 154 receives upon completion of registration with the alternative payment platform 100.

Figure 36:
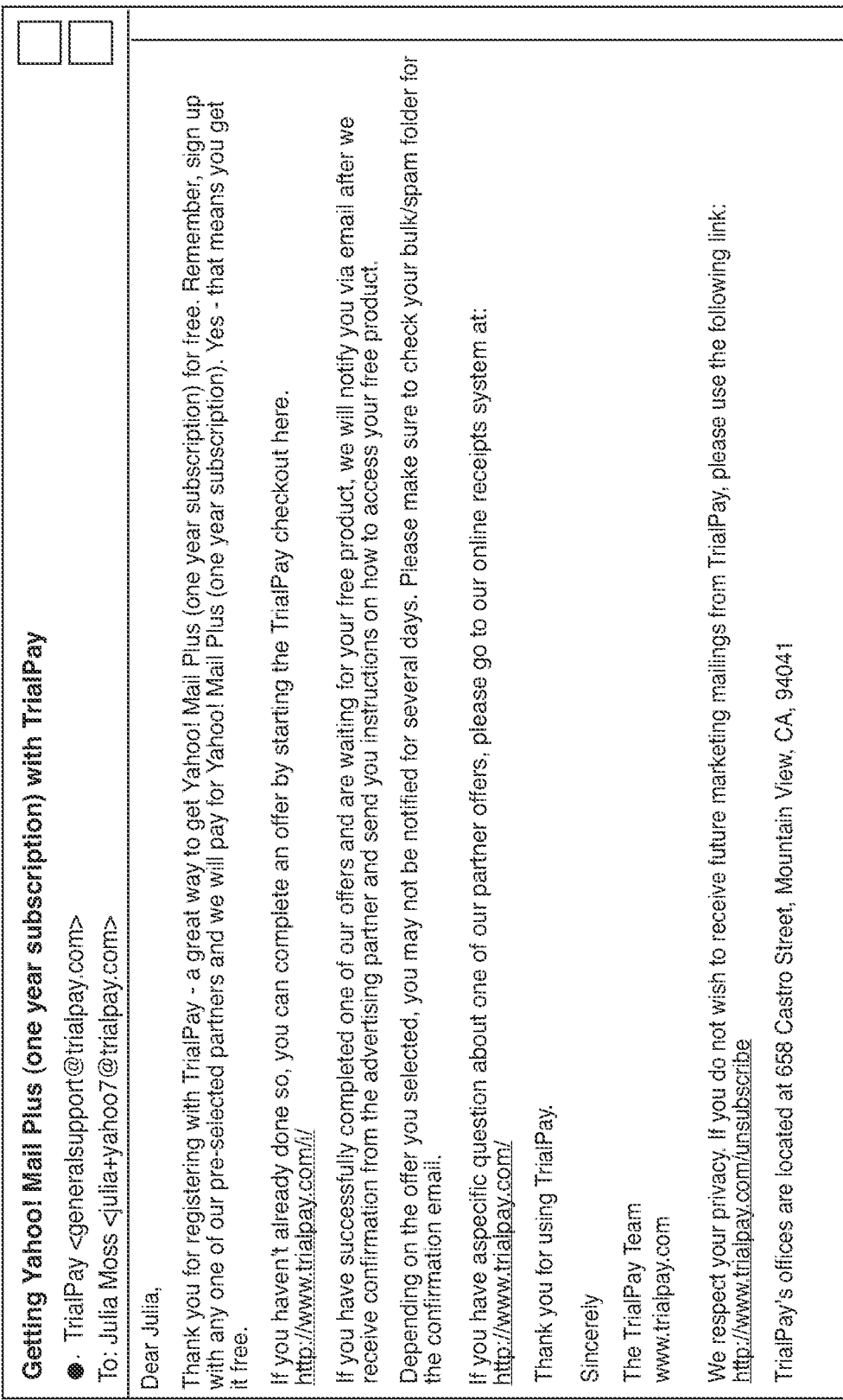
FIG. 36 shows a message describing how to interact with the alternative payment platform to obtain a primary offer.

FIG. 36 shows a user interface screen 3602 shown to a user 154 with details as to how a user 154 may complete an alternate offer 160, in this case involving the opportunity to obtain an email program.

Figure 37:
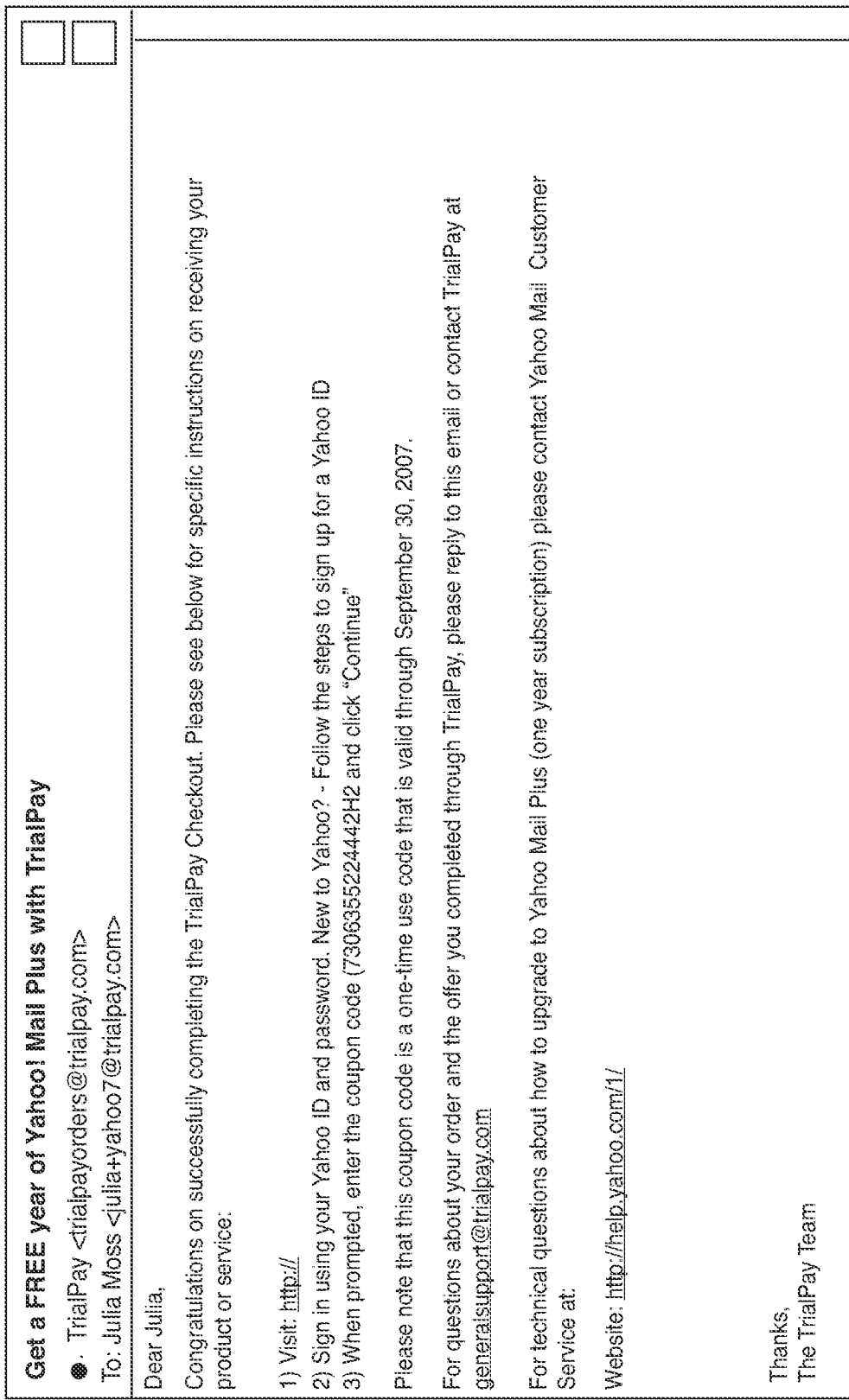
FIG. 37 depicts an email notification to a user.

FIG. 37 shows a user interface screen 3702 shown to a user 154 with additional details as to how a user may complete an alternate offer 160 to obtain an item 182 associated with a primary offer 164.

Figure 38:
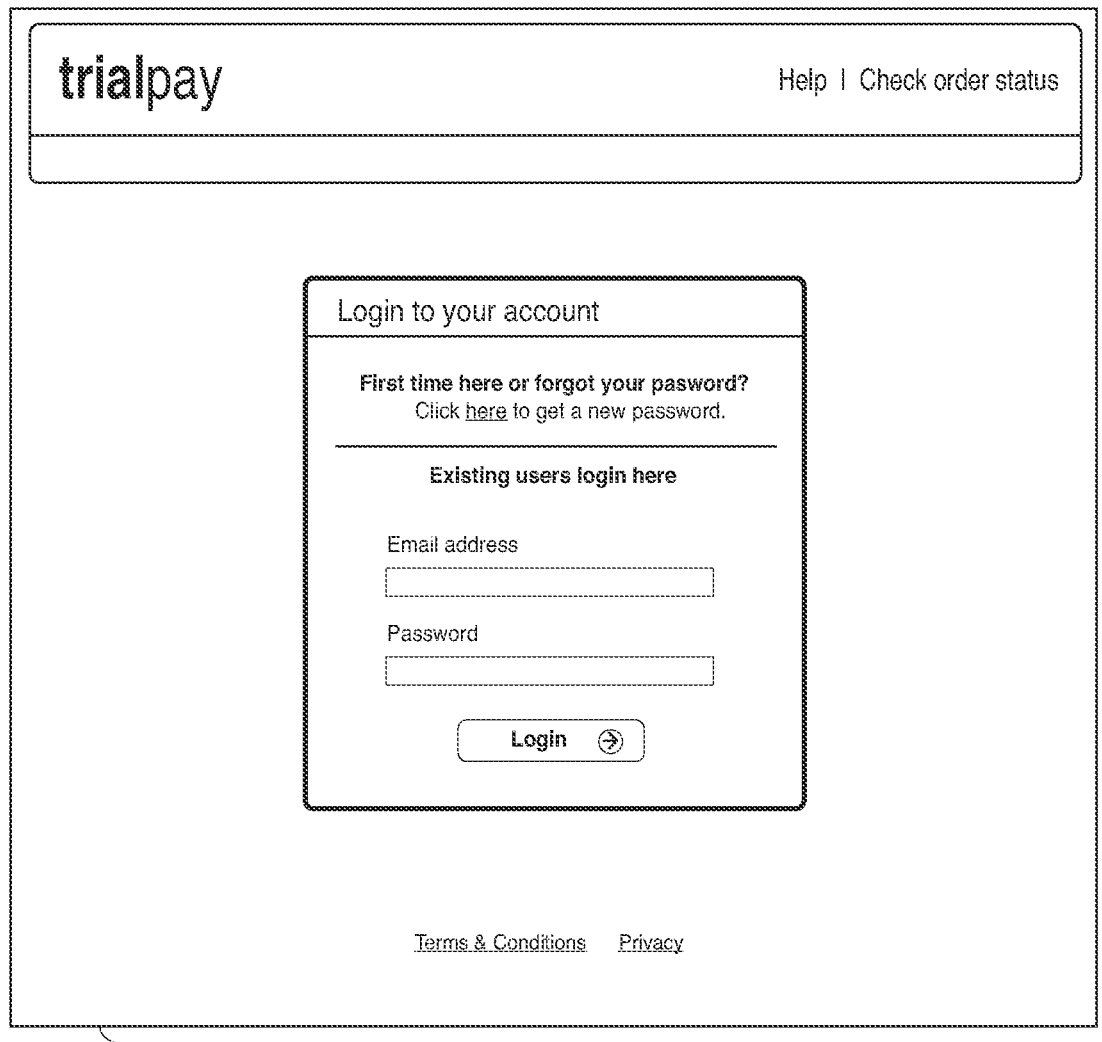
FIG. 38 shows a user account log in screen.

FIG. 38 shows a screen 3802 where a user 154 may log in to the alternative payment platform 100. A user 154 is prompted to enter an e-mail address and password to log in. Otherwise, a first time user 154 or user 154 who has forgotten the user's 154 password is prompted to get a new password.

Figure 39:
FIG. 39 shows a screen summarizing completed transactions.

FIG. 39 shows a screen 3902 shown to a user 154 who has completed an alternate offer 160. The user interface screen 3902 presents the opportunity to activate an item 182 associated with the primary offer 164 with respect to which the alternate offer 160 is associated.

FIG. 40 shows a screen 4002 shown to a user 154 who has alternate offers 160 pending. The screen provides the user 154 details of the user's 154 pending alternate offers 160.

FIG. 41 shows a screen 4102 shown to a user 154 who has completed an alternate offer 160 but who has not received credit for the completed alternate offer 160. A user 154 is prompted to submit a receipt verifying the completed alternate offer 160.

FIG. 42 shows a screen 4202 shown to a user 154 who has completed an alternate offer 160 but who has not received credit for the completed alternate offer 160. A user 154 is prompted to submit a receipt verifying the completed alternate offer 160. The screen 4202 prompts the user 154 to provide details of the completed alternate offer 160.

FIG. 43 shows a screen 4302 where a user 154 may update the user's account information.

Figure 44:
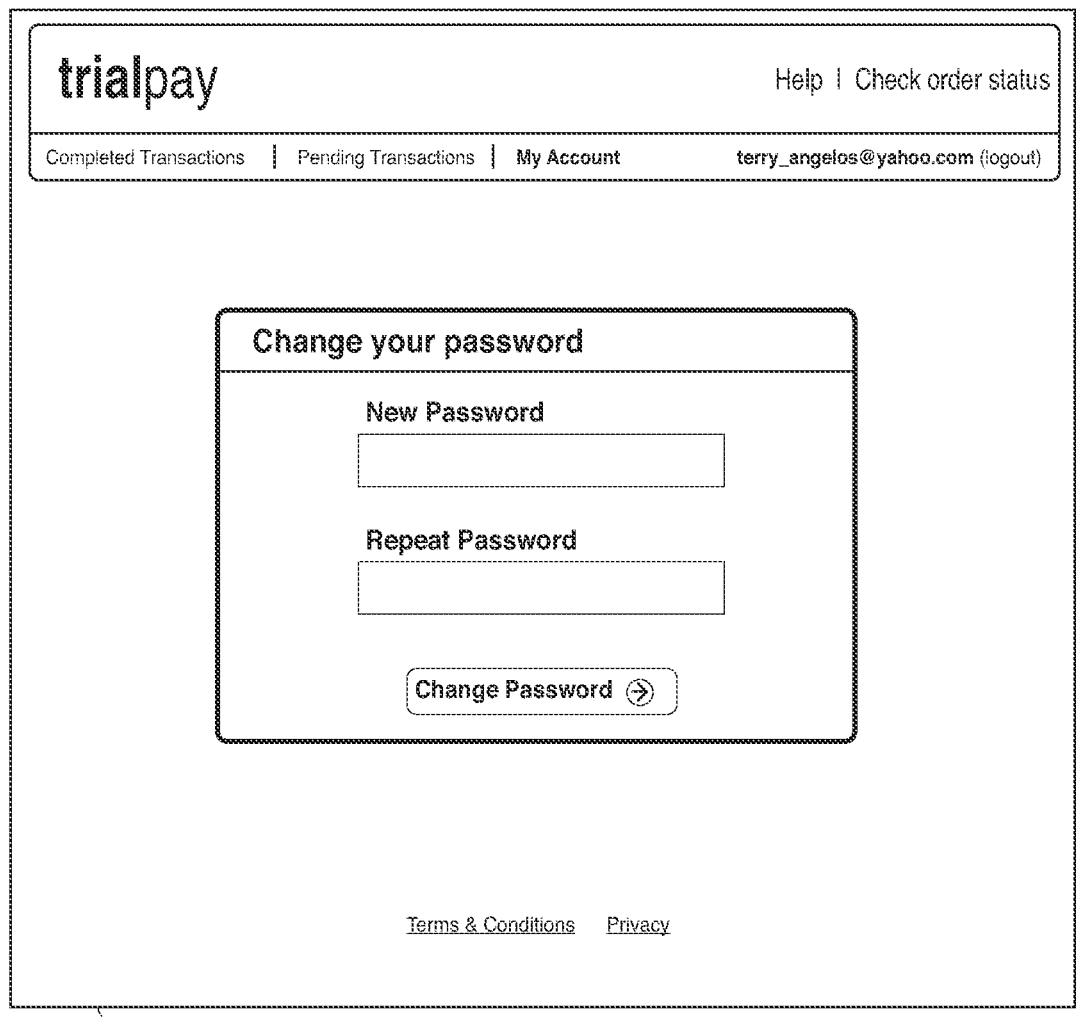
FIG. 44 depicts a screen in which a user updates a password.

FIG. 44 shows a screen 4402 where a user 154 may change the user's password.

Figure 45:
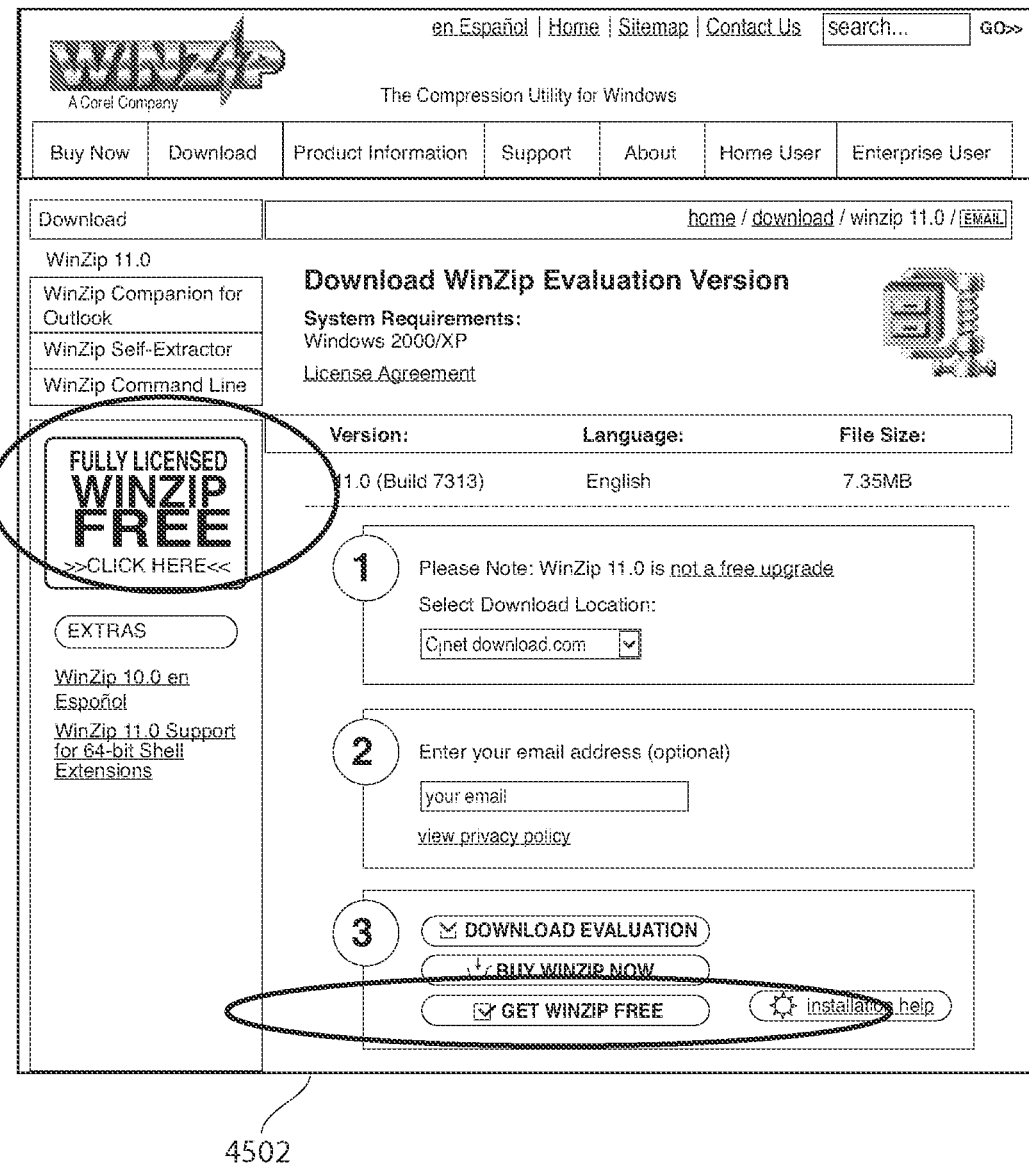
FIG. 45 depicts a screen in which a free trial download is offered.

FIG. 45 shows a user interface screen 4502 of a primary offer 164, into which alternate offers 160 are made available. Here the method of the alternative payment platform 100 is presented as a free download of the item 182. The interface screen 4502 shows a page of a website, in which the user 154 is presented with an opportunity to download an item 182 associated with a primary offer 164 (in this case an evaluation version of software) for free by engaging with the alternative payment platform 100. The user is prompted to select an alternate offer 160 and is promised the item 182 for free.

Figure 46:
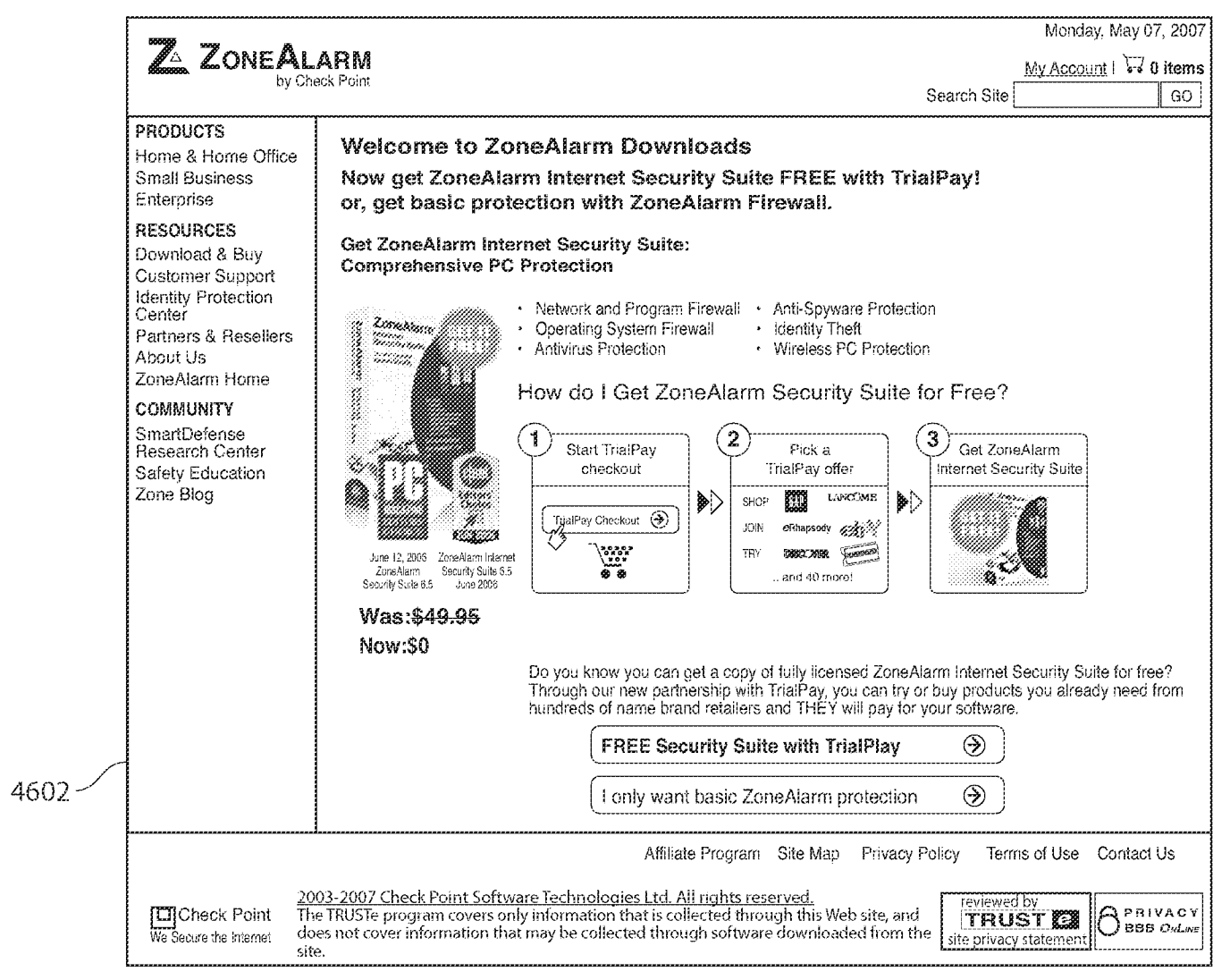

FIG. 46 shows a user interface screen 4602 of a primary offer 164, into which alternate offers 160 are made available. Here the method of the alternative payment platform 100 is presented as an opportunity to upgrade from a free version to a premium version of an item 182 before a user 154 downloads the free version of the item 182. The interface screen 4602 shows a page of a website, in which the user 154 is presented with an opportunity to proceed to the alternative payment platform 100 or to select an alternate offer 160.

Figure 47:
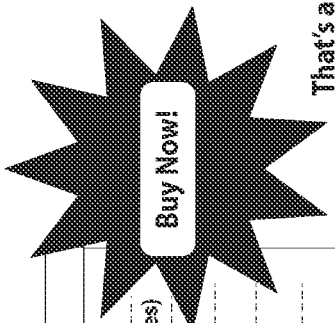
FIG. 47 depicts a screen in which in upgrade from a free account to a premium account is offered.

FIG. 47 shows a user interface screen 4702 of a primary offer 164, into which alternate offers 160 are made available. Here the method of the alternative payment platform 100 is presented as an opportunity to upgrade from free basic accounts to premium accounts.

Figure 48:
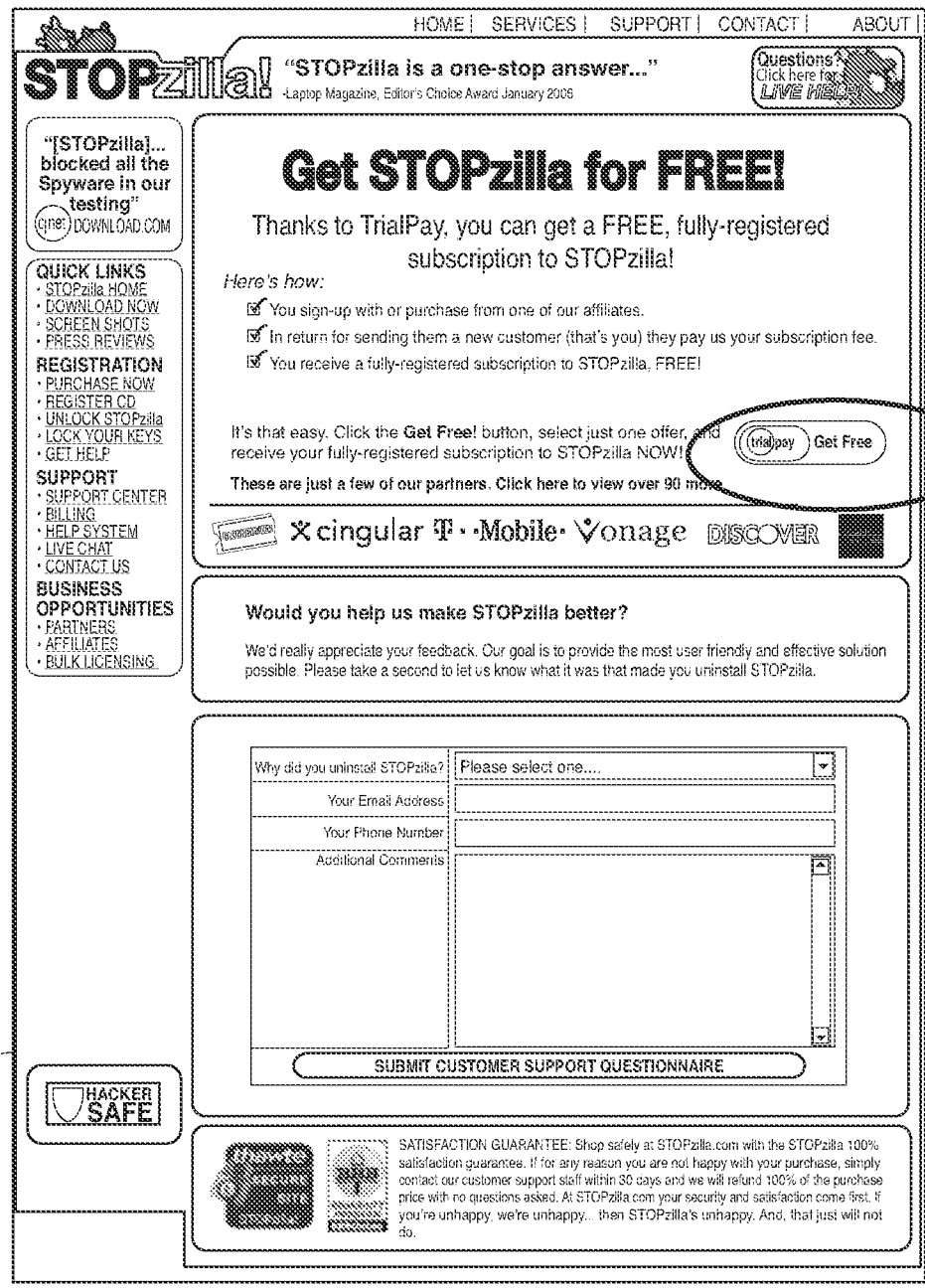
FIG. 48 depicts a screen in which a user abandons a shopping cart or leaves a website.

FIG. 48 shows a user interface screen 4802 of a primary offer 164 where a user 154 is presented with an alternate offer 160 when a user 154 backs out or cancels out of a primary offer 164 shopping cart web page.

Figure 49:
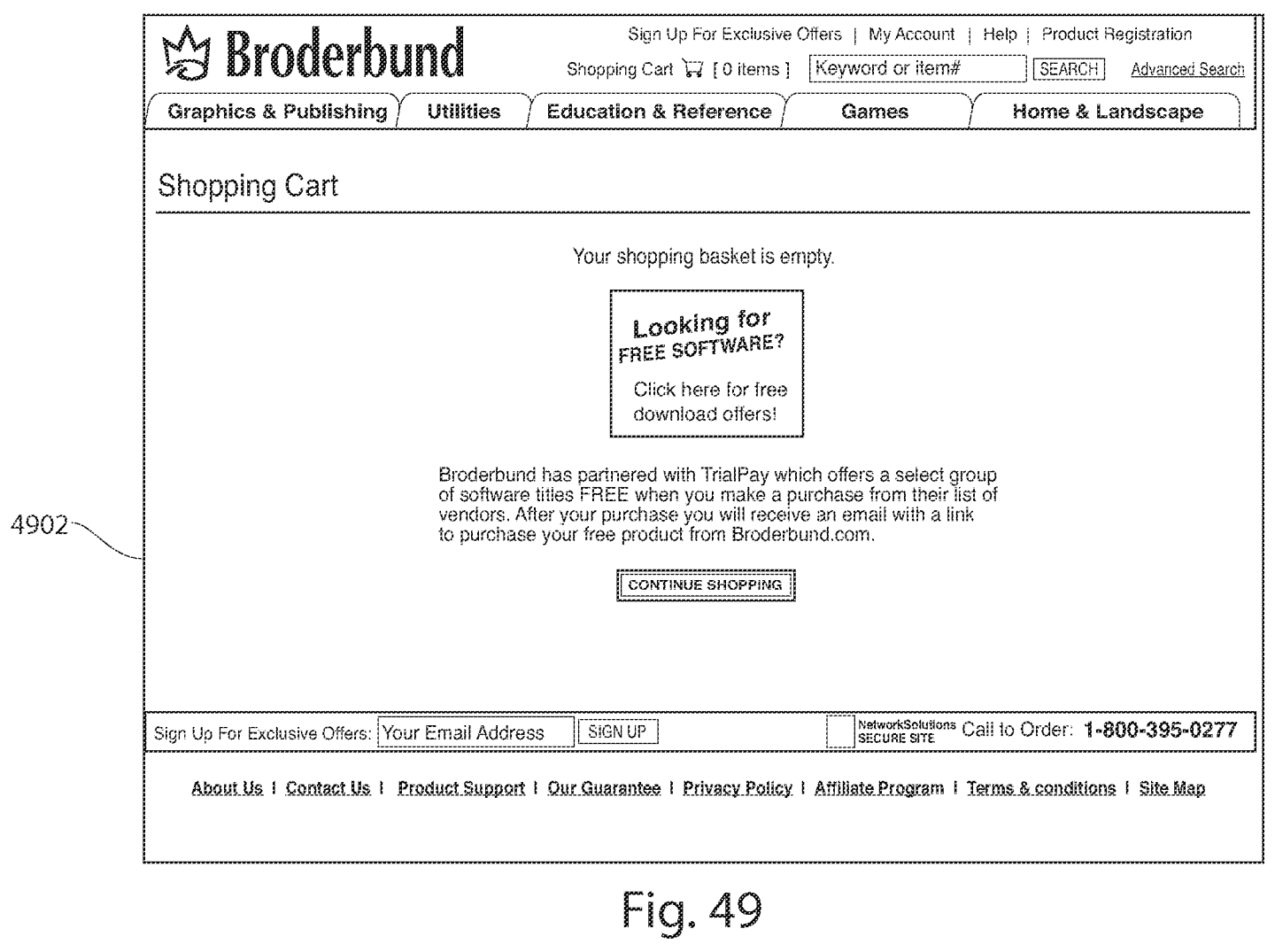

FIG. 49 shows a user interface screen 4902 of a primary offer 164 where a user 154 is presented with an alternate offer 160 when a user 154 removes items from a primary offer 164 shopping cart.

Figure 50:
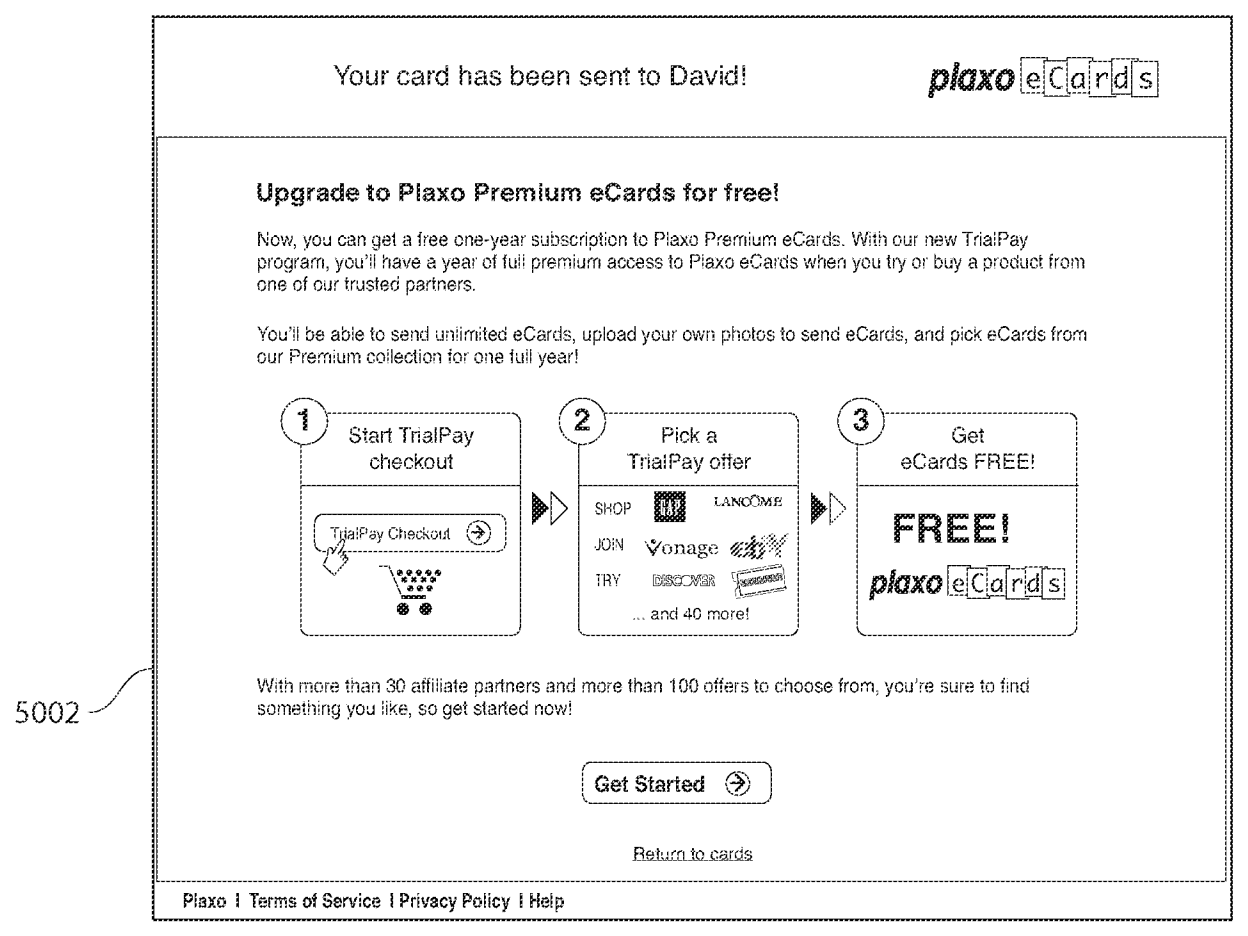

FIG. 50 shows a user interface screen 5002 of a primary offer 164 where a user 154 is presented with an alternate offer 160 when a user 154 completes a transaction or, in this case, has sent an e-card.

Figure 51:
FIG. 51 depicts a download screen.

FIG. 51 shows a user interface screen 5102 of a primary offer 164 where a user 154 is presented with an alternate offer 160 when a user 154 clicks to download a free version.

Figure 52:
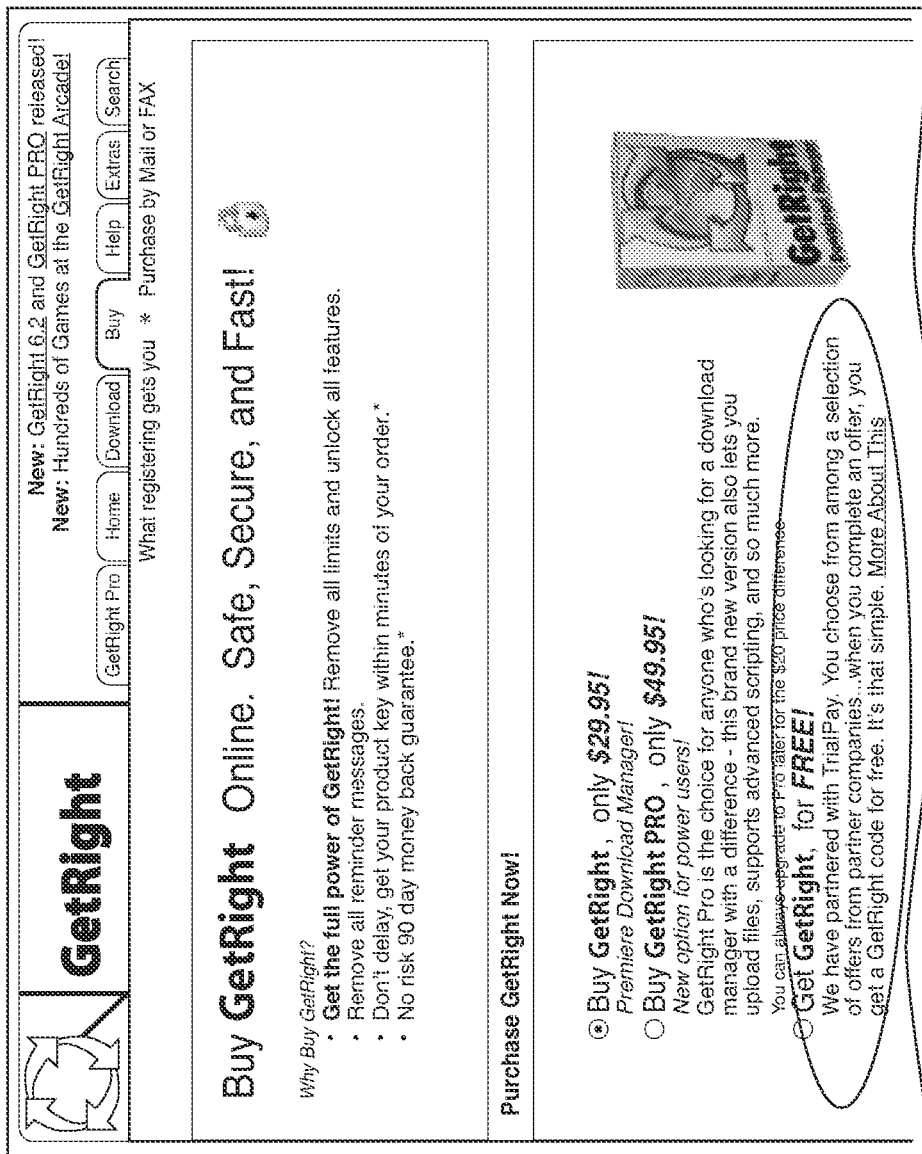
FIG. 52 shows a screen depicting various purchase methods.

FIG. 52 shows a user interface screen 5202 of a primary offer 164, into which alternate offers 160 are made available. Here the method of the alternative payment 100 is presented along with other payment method offers from the primary offeror 144. The interface 5202 shows a page of a website, in which the user 154 is presented with an opportunity to get an item 182 associated with a primary offer 164 (in this case a software program) for free by engaging with the alternative payment platform 100.

Figure 53:
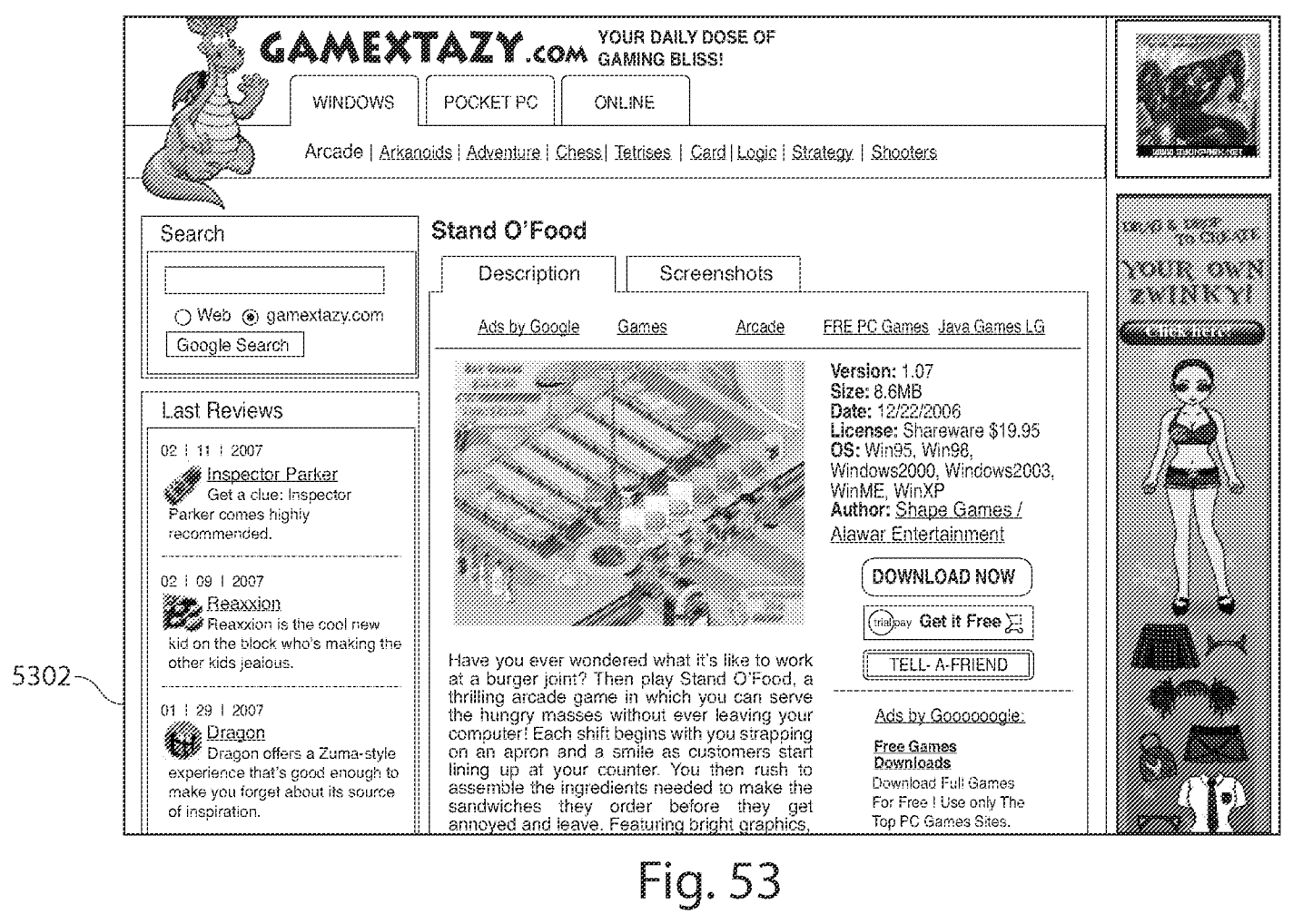

FIG. 53 shows another example of a user interface screen 5302 of a primary offer 164, into which alternate offers 160 are made available. Here also the method of the alternative payment 100 is presented along with other payment method offers from the primary offeror 144. The interface 5302 shows a page of a website, in which the user 154 is presented with an opportunity to get an item 182 associated with a primary offer 164 (in this case an online gaming platform) for free by engaging with the alternative payment platform 100.

Figure 54:
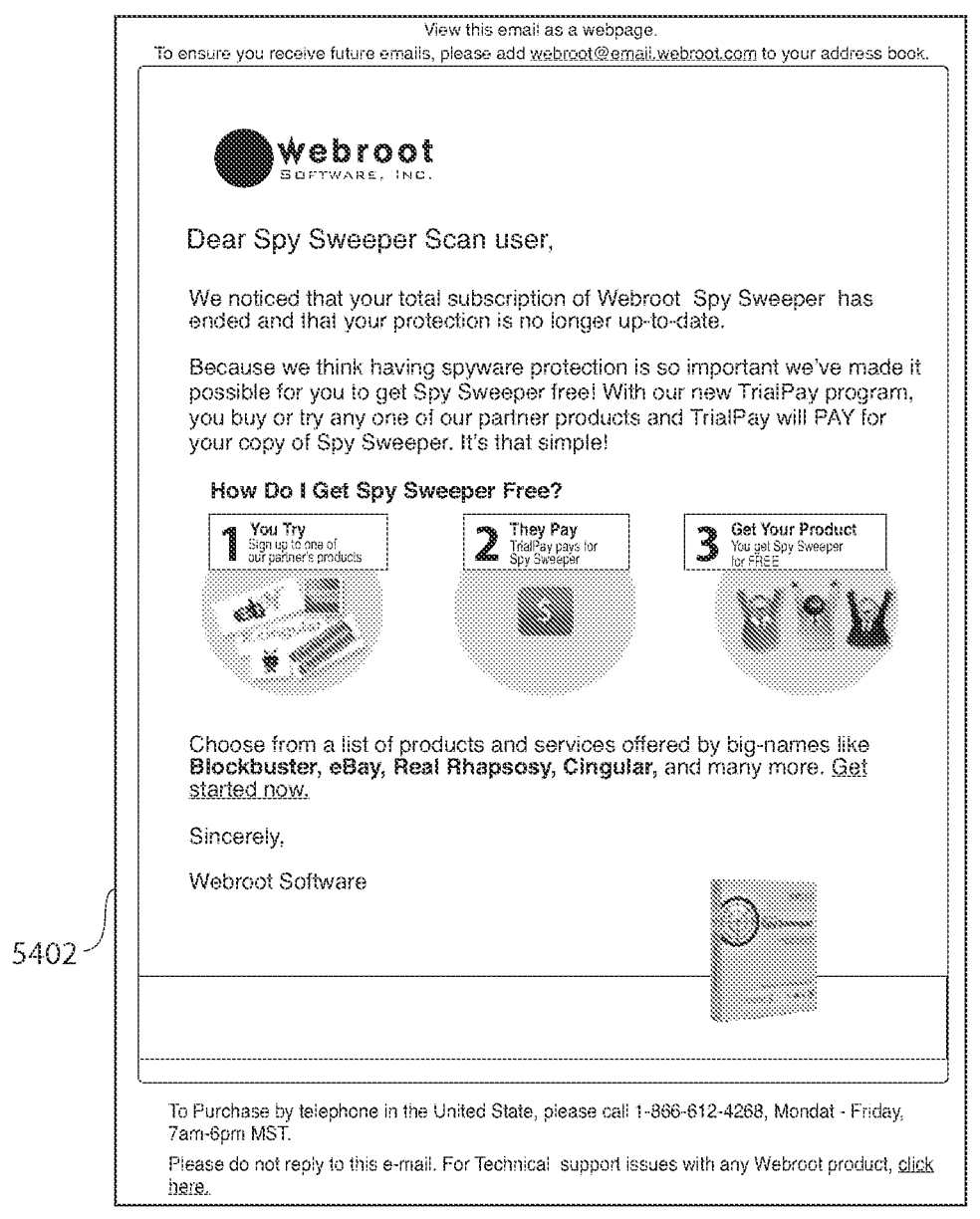

FIG. 54 shows an example of a user interface screen 5402 of a primary offer 164, into which an alternate offer 160 is made available to previous users of a primary offeror 144 (in this case, in an e-mail campaign to existing primary offeror 144 users). Here the method of the alternative payment is presented along with a notification from the primary offeror 144 alerting the user 154 that the user's 154 trial period is expiring. The interface 5402 shows an e-mail notification, in which the user 154 is presented with an opportunity to get an item 182 associated with a primary offer 164 (in this case spyware software) for free by engaging with the alternative payment platform 100.

Figure 55:
FIG. 55 shows a screen depicting a winback e-mail campaign.

FIG. 55 shows an example of a user interface screen 5502 of a primary offer 164, into which an alternate offer 160 is made available to previous users of a primary offeror 144 (in this case, in an e-mail campaign to existing primary offeror 144 users). Here the method of the alternative payment 100 is presented along with an alternate offer 160 from the primary offeror 164 notifying the user 154 that the user's 154 subscription is expiring. The interface 5502 shows an e-mail notification, in which the user 154 is presented with an opportunity to get an item 182 associated with a primary offer 164 (in this case a subscription to Zagat.com) for free by engaging with the alternative payment platform 100.

Figure 56:
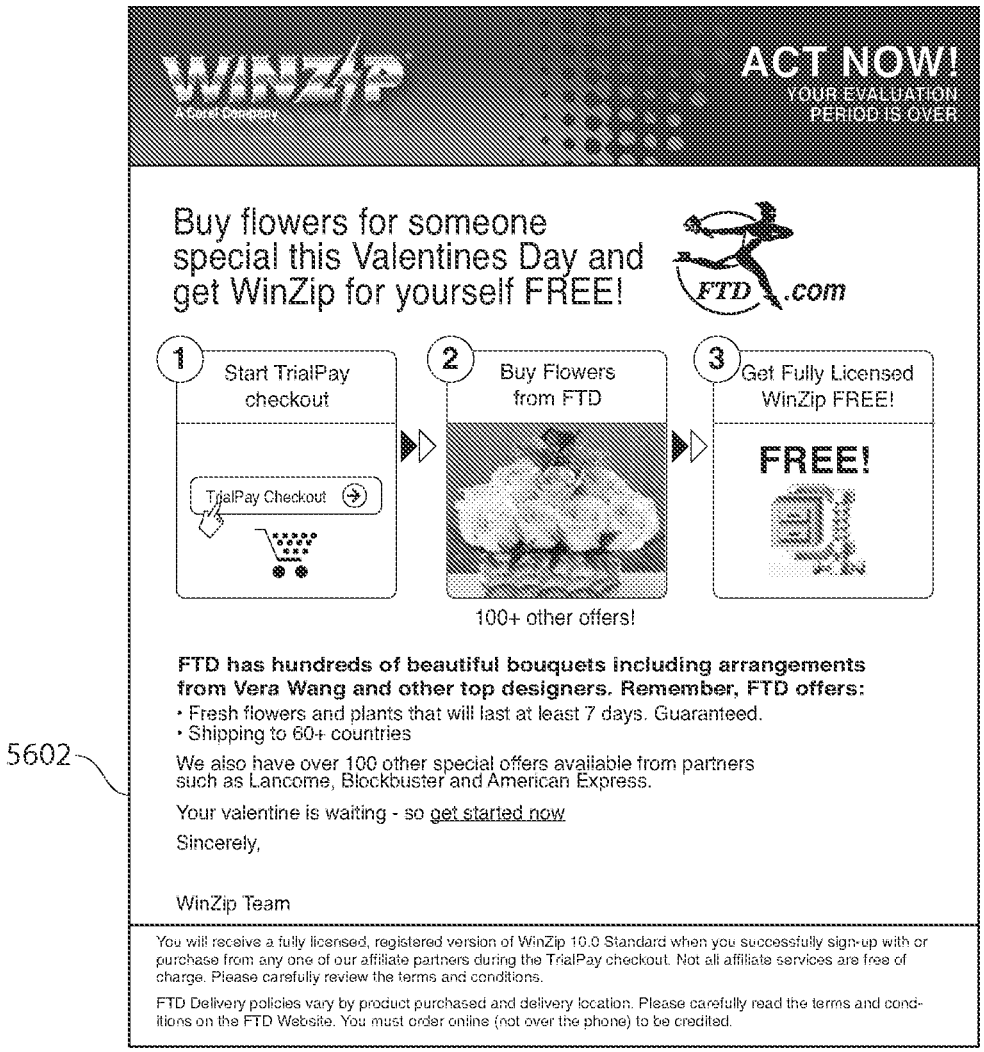
FIG. 56 shows a screen depicting themed e-mail campaigns.

FIG. 56 shows an example of a user interface screen 5602 of a primary offer 164, into which an alternate offer 160 is made available in an e-mail campaign by a primary offeror 144 (in this case, in a holiday offer to potential users). Here the method of the alternative payment 100 is presented along with an alternate offer 160 from the primary offeror 144 relating to holiday offers. The interface 5602 shows an e-mail notification, in which the user 154 is presented with an opportunity to get an item 182 associated with a primary offer 164 (in this case a subscription to Winzip) for free by engaging with the alternative payment platform 100.

FIG. 57 shows an example of a user interface screen 5702 of a primary offer 164, into which an alternate offer 160 is made available when a primary offeror 144 sends automated account setup e-mails. Here the method of the alternative payment 100 is presented in an e-mail notification verifying that the user 154 has set up an account with the primary offeror 144. The interface 5702 shows an e-mail account setup notification, in which the user 154 is presented with an opportunity to get an item 182 associated with a primary offer 164 (in this case an upgrade to a photosharing site) for free by engaging with the alternative payment platform 100.

Figure 58:
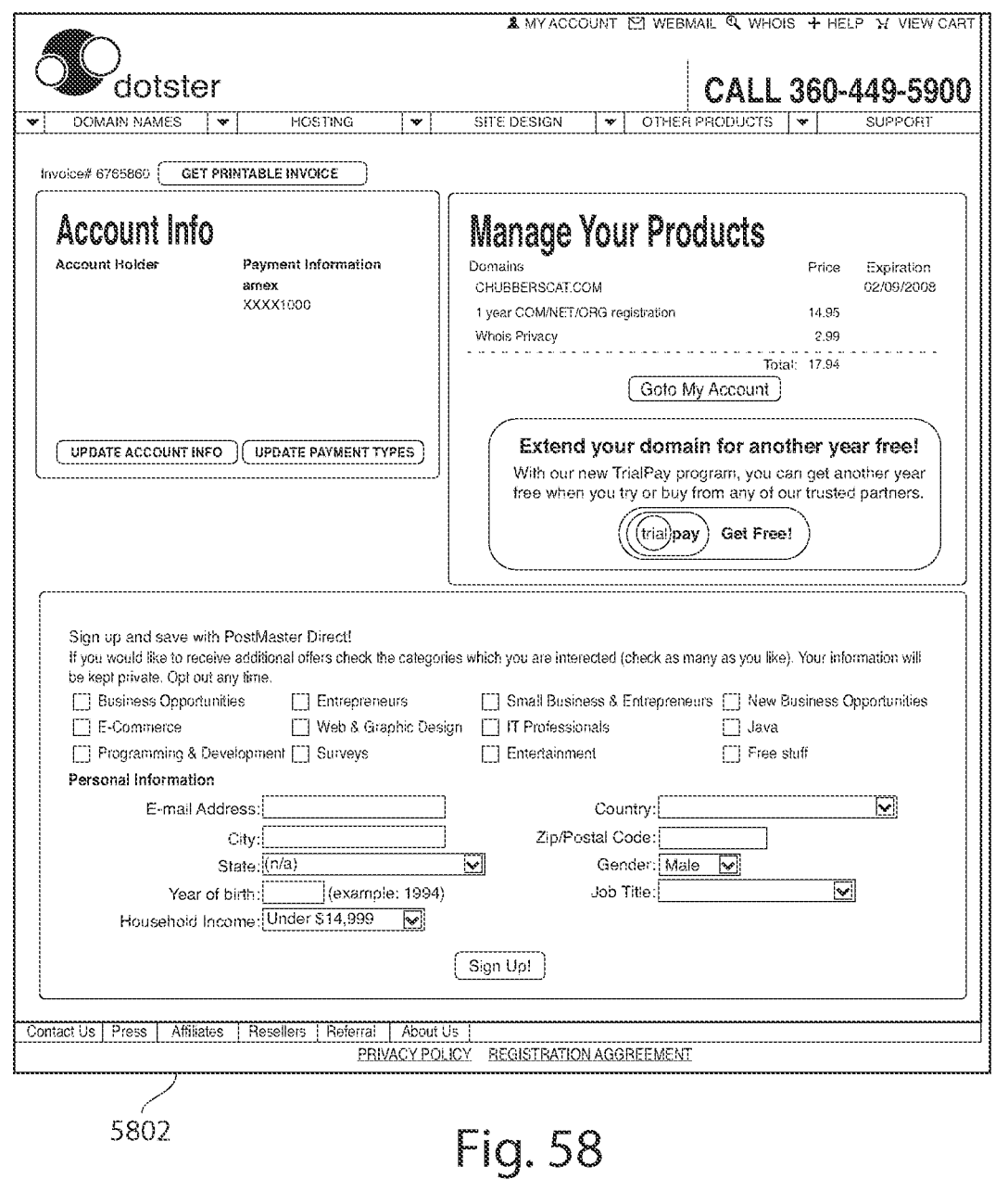

FIG. 58 shows an example of a user interface screen 5802 of a primary offer 164, into which an alternate offer 160 is made available when a primary offeror 144 sends an order confirmation. Here the method of the alternative payment 100 is presented when the user 154 receives confirmation that the user's 154 order has been placed. The interface 5802 shows an order confirmation, in which the user 154 is presented with an opportunity to get an item 182 associated with a primary offer 164 (in this case an offer to extend a domain) for free by engaging with the alternative payment platform 100.

Figure 59:
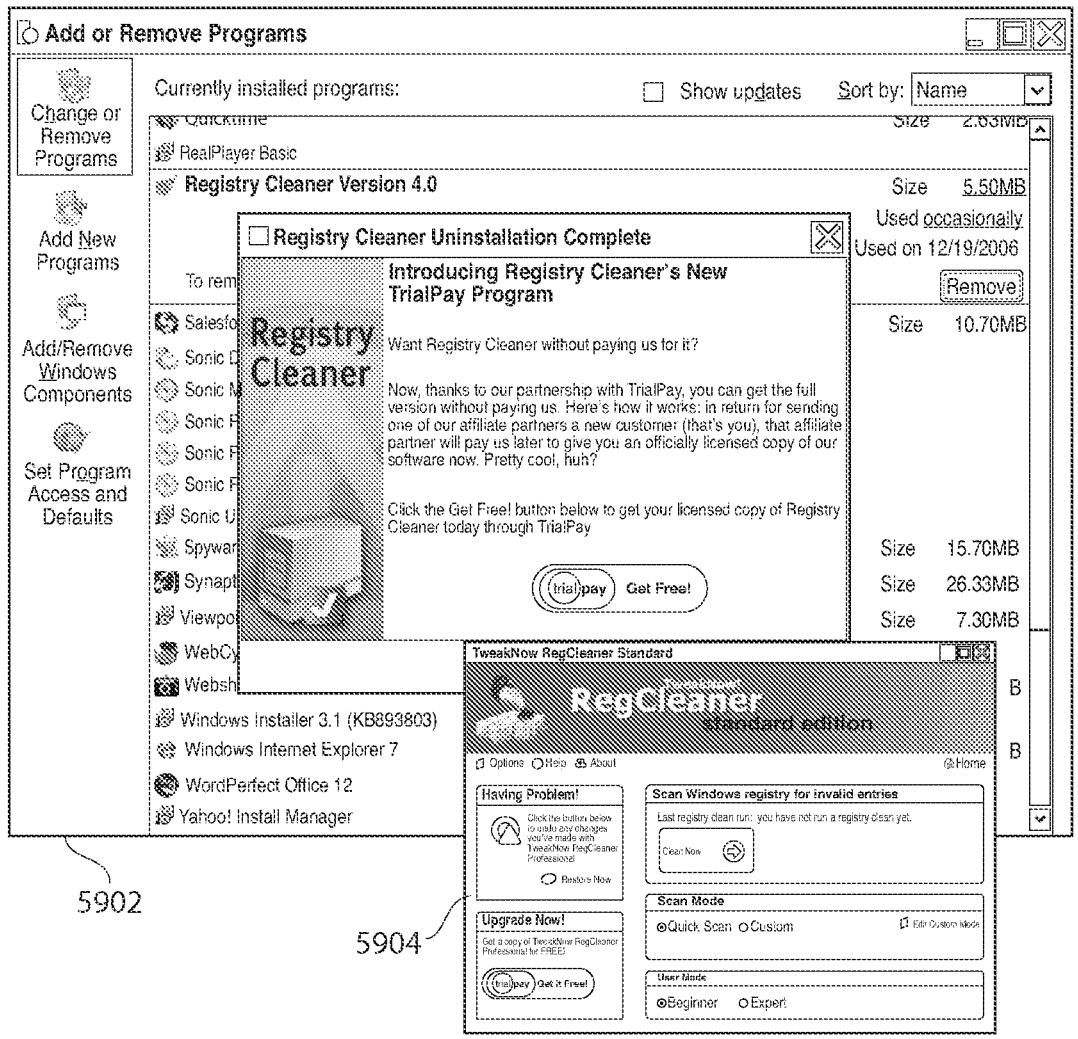
FIG. 59 shows a screen depicting uninstalls and in-product messaging.

FIG. 59 shows an example of a user interface screen 5902 of a primary offer 164, into which an alternate offer 160 is made available within a primary offeror's 144 product. Here the method of the alternative payment 100 is presented to the user 154 in-product or on a webpage popup detailing the alternate offer 160; on a screen reminding the user 154 that the user's 154 trial is almost over; and/or on the main product interface, reminding the user 154 of the alternate offer 160.

Figure 60:
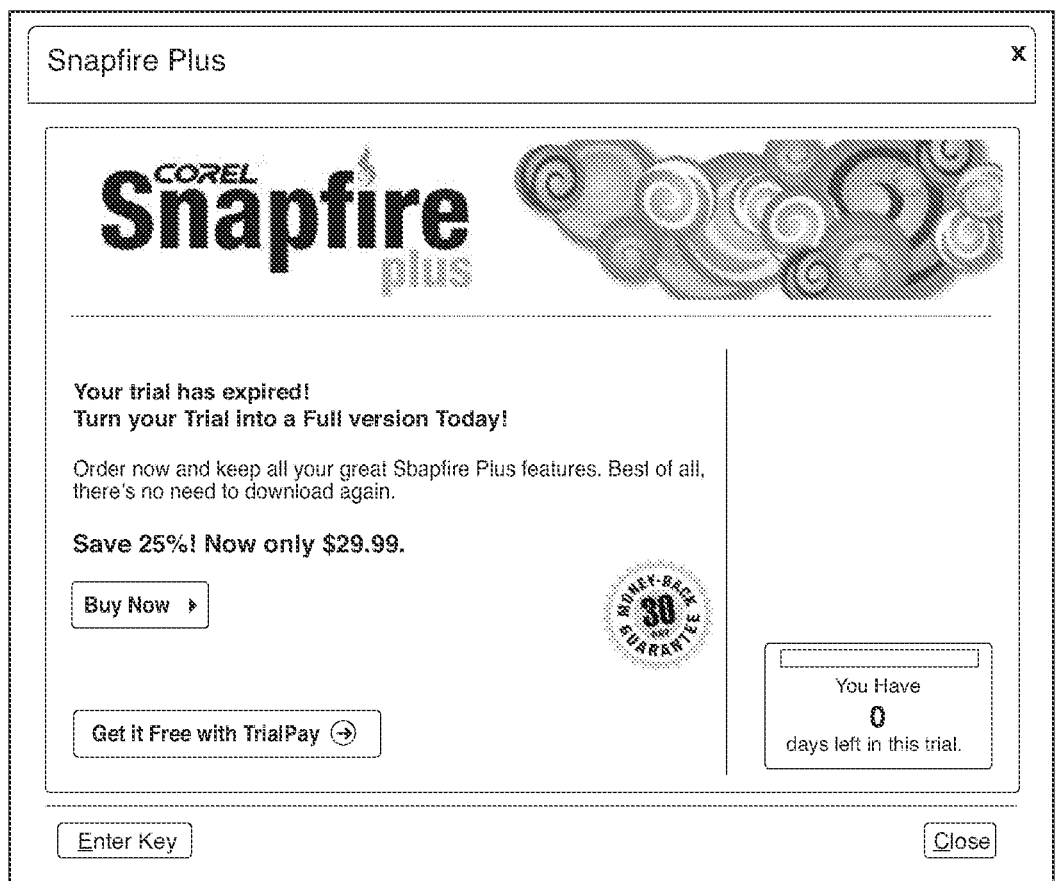
FIG. 60 shows a screen depicting an in product expired trial.

FIG. 60 shows an example of a user interface screen 6002 of a primary offer 164, into which an alternate offer 160 is made available in-product to users of a primary offeror 144 when their trial period expires. Here the method of the alternative payment 100 is presented in-product along with a notification from the primary offeror 144 alerting the user 154 that the user's 154 trial period is expiring. The interface 6002 shows an in-product notification, in which the user 154 is presented with an opportunity to get an item 182 associated with a primary offer 164 (in this case Corel software) for free by engaging with the alternative payment platform 100.

Figure 61:
FIG. 61 shows a screen depicting examples of uninstall messaging.

FIG. 61 shows an example of a user interface screen 6102 of a primary offer 164, into which an alternate offer 160 is made available in-product to users of a primary offeror 144 when the user is uninstalling the primary offeror's 144 product. Here the method of the alternative payment 100 is presented in an automated popup screen, which appears when the user is uninstalling the primary offeror's 164 product. The interface 6102 shows a popup screen, in which the user 154 is presented with an opportunity to get an item 182 associated with a primary offer 164 (in this case an online game) for free by engaging with the alternative payment platform 100.

Figure 62:
FIG. 62 shows a screen depicting in-product messaging.

FIG. 62 shows an example of a user interface screen 6202 of a primary offer 164, into which an alternate offer 160 is made available to free-level users of a primary offeror 144. Here the method of the alternative payment 100 is presented in a notification to users of the primary offeror's 144 product sent to the user after the user was upgraded to the latest version of the software. The interface 6202 shows a notification, in which the user 154 is presented with an opportunity to get an item 182 associated with a primary offer 144 (in this case an upgraded version of a software product) for free by engaging with the alternative payment platform 100.

FIG. 63 shows a screen 6302 shown to an advertiser 148 by which an advertiser 148 or secondary offeror 148 may track performance of alternate offers 160 offered through the alternative payment platform 100. An advertiser 148 may track the clicks associated with each alternate offer 160, the conversions of users 154 with respect to each alternate offer 160 and other statistics associated with each alternate offer 160.

FIG. 64 shows a screen 6402 with additional details as to the interface 6402 of FIG. 63.

FIG. 65 shows a screen 6502 shown to an advertiser 148 with statistics as to performance of an alternate offer 160 offered through the alternative payment platform 100. A report may provide transaction detail as to each transaction entered into by a user 154 with respect to each alternate offer 160.

FIG. 66 shows a screen 6602 where a user 154 is shown a detailed transaction report associated with performance of an alternate offer 160 offered by an advertiser or secondary offeror 148 through the alternative payment platform 100.

Figure 67:
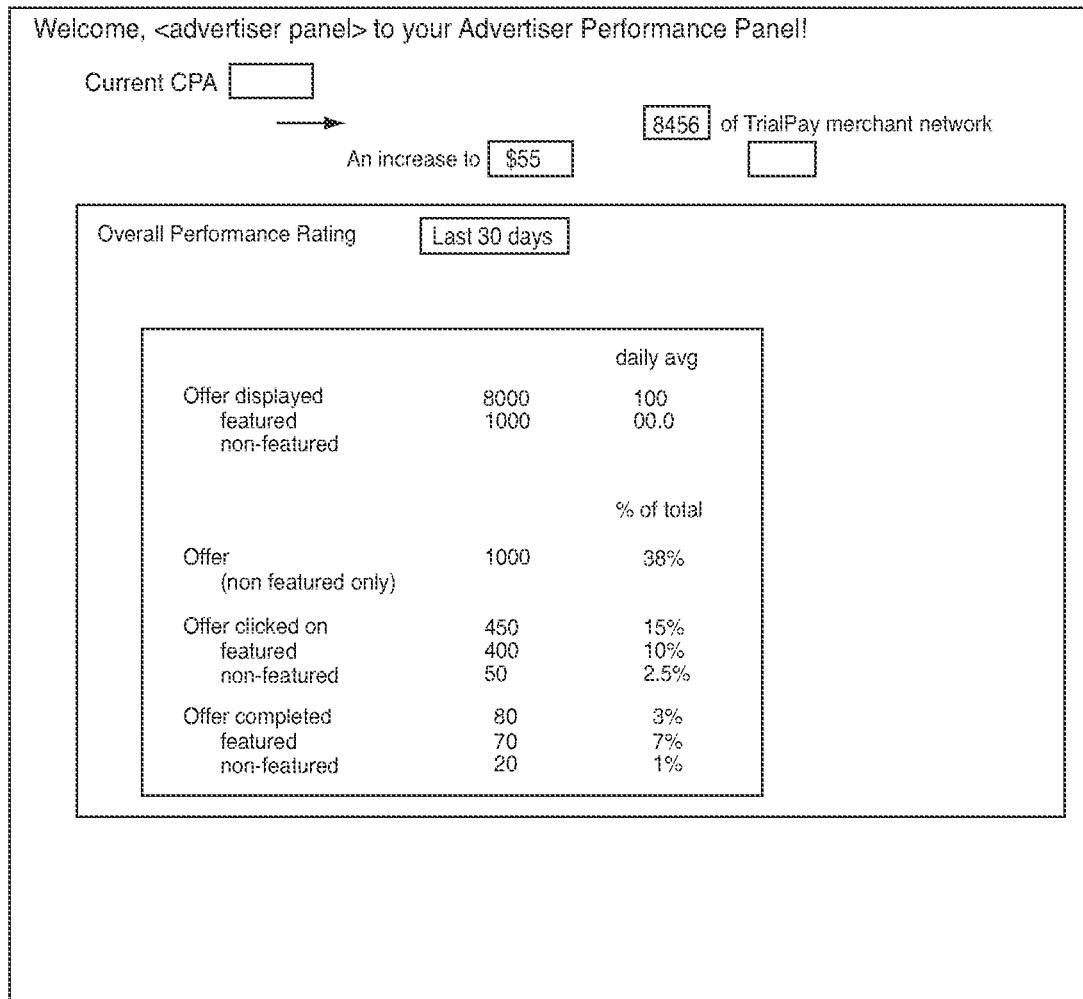
FIG. 67 shows an advertiser performance panel, in which an advertiser is presented with performance statistics associated with the performance of alternate offers.

FIG. 67 shows a screen 6702 where an advertiser is shown a detailed reported associated with the advertisers performance of alternate offers 160 offered by an advertiser through the alternative payment platform.

In various embodiments, including any of the preferred embodiments disclosed above and throughout this disclosure, a variety of other features, attributes, characteristics, steps, components, modules and the like may be provided in accordance with the methods and systems disclosed herein. Thus, except where context indicates otherwise, in any of the embodiments described herein, features such as the following may be provided. In embodiments the alternate form of payment is a non-monetary payment. In embodiments the non-monetary payment includes a commitment to undertake an action. In embodiments the action is undertaking a trial of another item. In embodiments the commitment needs to be fulfilled before the primary offer 164 is fulfilled. In embodiments the primary offer 164 comprises a micro-payment transaction. In embodiments the primary offer 164 is fulfilled by a download of digital content. The embodiment may further include accumulating transaction credits associated with secondary offer 160 acceptance; and surrendering at least one of the transaction credits as an alternative payment for the micro-payment. In embodiments the primary offer comprises virtual currency. In embodiments the secondary offer 160 comprises virtual currency. In embodiments the alternate payment offer 160 comprises a complete payment for the primary offering. In embodiments the payment to the primary vendor 144 is made prior to confirmation of the user 154 acceptance of the secondary offer 160. In embodiments the payment to the primary vendor 144 is made based on a comparison of the payment to a payment threshold. In embodiments the alternate payment offers 160 are based at least in part on a geographic location of the user 154.

In embodiments financial terms associated with fulfillment of the alternate offer 160 is based on the user geographic location. In embodiments financial terms associated with fulfillment of the primary offer is based on the user 154 geographic location. In embodiments the alternate offers 160 are presented in response to a user declining a primary offer. In embodiments the alternate offers 160 are presented in response to a user 154 uninstalling digital content. In embodiments the alternate offers 160 are presented for a user to upgrade a primary offering 164. In embodiments the alternate offers 160 are presented within a computer game environment. In embodiments the upgrade is access to selected levels in a computer game. In embodiments the alternate offers 160 are related to the primary offer 164. In embodiments the obligation is an obligation to enter a promotional program with respect to the secondary offering 148. In embodiments the obligation is to undertake an online action. In embodiments the online action includes viewing an item of content. In embodiments the online action includes visiting a website. In embodiments the online action is selected from the group consisting of submitting at least one on-line auction bid, submitting at least one winning on-line auction bid, placing at least one item for sale through an on-line auction, submitting demographic information, providing an email address, completing a credit application, and making at least one purchase.

In embodiments the obligation is to undertake an offline action. In embodiments the offline action includes receiving a phone call. In embodiments the offline action includes signing up for telephone service. In embodiments the offline action includes visiting a retail location. In embodiments the offline action includes applying for a loan. In embodiments the alternate offer 160 is based on an upcoming event. In embodiments the event is at least one of Valentines Day, Thanksgiving, mother's day, father's day, Memorial day, July 4.sup.th, and the like. In embodiments the event is related to the user 154. In embodiments the user 154 related event is at least one of a birthday, an anniversary, a marriage, a new baby, a promotion, and the like. In embodiments accepting the alternate offer 160 has a lower financial cost to the user 154 than directly paying for the primary offering. In embodiments accepting the alternate offer 160 has a higher financial cost to the user 154 than directly paying for the primary offering. In embodiments the alternate offer 160 is associated with a fulfillment process. In embodiments the fulfillment process includes providing a secondary offering 148 to the user 154. In embodiments the secondary offering 148 is a physical object. In embodiments the primary offering is not a physical object. In embodiments the primary offering converts a trial copy of software to a full version of software. In embodiments the primary offering is selected from the group consisting of a product, a service, a good, a premium good, a wine club subscription, a software package, an online service, a subscription-based offering, a newspaper/magazine/professional subscription, an offering with a one-time purchase price, or the like. In embodiments a secondary offering 148 is selected from the group consisting of a product, a service, a good, a premium good, a wine club, a software package, an online service, a subscription-based offering, a newspaper/magazine/professional subscription, an offering with a one-time purchase price or the like.

Methods and systems may include identifying a plurality of alternate offers 160 that correspond to a primary offer 164, the alternate offers 160 allowing an alternative form of payment for the same item as the primary offer 164. In embodiments the alternate offers 160 are offers from a plurality of providers. Methods and systems may include providing a transaction facility for resolving fulfillment of an alternate offer 160 if the user 154 accepts the alternate offer 160. In embodiments the transaction facility is adapted to fulfill alternate offers 160 of a plurality of merchants. Methods and systems may include first presenting the alternate offer 160 to the user 154. Methods and systems may further include initiating a primary fulfillment process, upon receiving the user's 154 acceptance. In embodiments the primary fulfillment process is associated with delivering the primary offering to the user. Methods and systems may further include initiating a secondary fulfillment process, upon receiving the user's 154 acceptance. In embodiments the secondary fulfillment process is associated with delivering the alternate offer 160 to the user 154. Methods and systems may include initiating a payment process for both debiting a secondary entity and crediting a primary entity. In embodiments the secondary entity is associated with the alternate offer 160 and the primary entity is associated with the primary offer 164.

In embodiments the primary entity is a vendor, retailer, seller, dealer, trader, purveyor, merchant, advertiser, sales person, affiliate, supplier, service provider, or the like. In embodiments the secondary entity is a vendor, retailer, seller, dealer, trader, purveyor, merchant, sales person, affiliate, supplier, service provider, or the like. In embodiments the continued use of the primary product is tied to the continued use of the alternate offer 160. In embodiments cancellation of the alternate offer 160 results in automatic cancellation of the primary offer 164. The embodiment may further include charging the user for the primary offer, and upon receipt of confirmation of the user acceptance of the alternate offer 160 crediting the user a predetermined amount.

In embodiments the user 154 provides a method of payment for automatic payment at expiration of the trial period.

In embodiments the participation comprises completing a survey. In embodiments the participation comprises applying for a credit card.

In embodiments acceptance of the alternate payment offer 160 obligates the user 154 to fulfill a purchase associated with the alternate payment offer 160.

All of the elements of the alternative payment platform 100 may be depicted throughout the figures with respect to logical boundaries between the elements. According to software or hardware engineering practices, the modules that are depicted may in fact be implemented as individual modules. However, the modules may also be implemented in a more monolithic fashion, with logical boundaries not so clearly defined in the source code, object code, hardware logic, or hardware modules that implement the modules. All such implementations are within the scope of the present invention.

It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

It will be appreciated that the above processes, and steps thereof, may be realized in hardware, software, or any combination of these suitable for a particular application. The hardware may include a general purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across a camera system and/or a computer in a number of ways, or all of the functionality may be integrated into a dedicated, standalone image capture device or other hardware. All such permutations and combinations are intended to fall within the scope of the present disclosure.

It will also be appreciated that means for performing the steps associated with the processes described above may include any of the hardware and/or software described above. In another aspect, each process, including individual process steps described above and combinations thereof, may be embodied in computer executable code that, when executing on one or more computing devices, performs the steps thereof.

While the invention has been disclosed in connection with certain preferred embodiments, other embodiments will be recognized by those of ordinary skill in the art, and all such variations, modifications, and substitutions are intended to fall within the scope of this disclosure. Thus, the invention is to be understood in the broadest sense allowable by law.

All documents referenced herein are hereby incorporated by reference.

What is claimed is:

1. A computer-implemented method comprising:
rendering, by a host computing device at a first entity, on a mobile device over a computer network, a primary offer graphical user interface (GUI) on a primary payment platform;
rendering alternate payment offers, by the host computing device at the first entity on the mobile device for display on an alternative offer GUI, said alternative offer GUI being rendered to process fulfillment of the alternate payment offer on an alternate payment platform;
transitioning, from the host computing device, from the primary payment platform to the alternate payment platform over the computer network in response to a selection of any one of the alternate payment offers rendered on the primary offer GUI, said alternative payment platform being different from the primary payment platform;

transitioning from a site of a second entity to the alternate payment platform and causing additional GUI elements to be rendered from the alternate payment platform on the electronic display, wherein the additional GUI elements interacting with the user as an indication to acquire the primary offer via the alternate payment platform through the one of the alternate offers;

establishing, via a server on the alternate payment platform, a credit for the primary offer to be paid by the host computing device at the first entity to the second entity, the credit including a fixed cost related to a retail cost and a variable portion determined when one of the alternate offers is fulfilled in response to a selection by the user on the alternative offer GUI;

receiving, at the server, an indication of the user's fulfillment of one of the alternative offers; and paying the credit from the host computing device at the first entity to the second entity.

2. The computer-implemented method of claim 1, wherein the credit for the primary offer is not disclosed to the user.

3. The computer-implemented method of claim 1, wherein the credit is more than the purchase price.

4. The computer-implemented method of claim 1, wherein the user's fulfillment entitles the user to receive the primary offering independent of the purchase price.

5. The computer-implemented method of claim 1, wherein the presenting of alternate payment offers includes selecting one or more offers to present based at least in part on the credit.

6. The computer-implemented method of claim 1, wherein the purchase price is not disclosed to a server-based payment facility prior to the server-based payment facility calculating the credit.

7. A computer-implemented method of electronic commerce, comprising:

rendering, from a server over a computer network one a mobile device of a user for display on a primary offer graphical user interface (GUI) on a primary payment platform, an electronic commerce primary offering of a second entity;

receiving at the server a request to present one or more offers to the user on the mobile device on an alternative offer GUI, said alternative offer GUI being rendered to process fulfillment of the alternate payment offer on an alternate payment platform;

transitioning, via the server, from the primary payment platform to the alternate payment platform over the network in response to a selection of the electronic commerce primary offering, wherein the electronic commerce primary offering includes a purchase price and a second entity credit, wherein the second entity credit is not disclosed to the user on the alternative offer GUI on the alternate payment platform, and wherein the second entity credit includes a fixed cost determined before one of the offers is fulfilled and a variable portion determined when one of the offers is fulfilled;

receiving at the server a selection of one or more of the offers on the alternative offer GUI that facilitate user acceptance from a memory accessible by the server;

presenting, to the mobile device for display on the alternative offer GUI for the alternate payment platform, the one or more offers which were selected; and paying the second entity credit to the second entity in fulfillment of the electronic commerce primary offering in response to the user acceptance of one of the one or more offers which were rendered.

8. The computer-implemented method of claim 7, wherein the user acceptance entitles the user to receive the primary offering independent of the purchase price and the second entity credit.

9. The computer-implemented method of claim 7, wherein the second entity credit is independent of the purchase price.

10. The computer-implemented method of claim 7, wherein the second entity credit is greater than the purchase price.

11. The computer-implemented method of claim 7, wherein user acceptance of one of the one or more offers which were rendered results in the user receiving the electronic commerce primary offering before a primary offeror of the primary offering receives the second entity credit.

12. The computer-implemented method of claim 7, wherein the selecting one or more of the offers is based at least in part on the second entity credit and not on the purchase price.

13. The computer-implemented method of claim 7, wherein committing to pay the second entity credit is performed by a server-based payment facility independent of the purchase price.

14. A system comprising a memory and a processor configured to provide:

an electronic commerce platform for receiving a request to render a plurality of offers to a mobile device over a computer network, having an alternative offer graphical user interface (GUI) for an alternate payment platform for display, of a user to fulfill a primary offering of a second entity displayed on a primary offer GUI that includes a purchase price and a second entity credit, wherein the second entity credit is not disclosed on the alternative offer GUI to the user;

an offer selection facility for selecting one or more of the plurality of offers that facilitate user acceptance from a memory accessible by the offer selection facility;

an offer display facility for rendering the one or more of the plurality of offers on the GUI of the electronic commerce platform for the alternate payment platform which were selected to the mobile device;

a secondary transaction facility for receiving a user acceptance of one of the one or more of the plurality of offers which were rendered on the GUI, wherein the secondary transaction facility transitioning from the electronic commerce platform to the alternate payment platform over the computer network for processing the acceptance; and a payment module for processing a payment of the second entity credit to the second entity in fulfillment of the primary offering via the alternate payment platform in response to the user acceptance via interactions on the GUI, the second entity credit including a fixed cost determined before the user acceptance and a variable portion determined upon the user acceptance.

15. The system of claim 14, wherein the user acceptance entitles the user to receive the primary offering independent of the purchase price and the second entity credit.

16. The system of claim 14, wherein the second entity credit is independent of the purchase price.

17. The system of claim 14, wherein the second entity credit is greater than the purchase price.

18. The system of claim 14, wherein the payment module is further for receiving a merchant payment and using a portion of the merchant payout to pay the second entity credit.

19. The system of claim 18, wherein the merchant payout is independent of the purchase price.

20. The system of claim 18, wherein the purchase price is not disclosed to the payment module.

* * * * *